United States Patent [19]
Belanger et al.

[11] Patent Number: 5,729,680
[45] Date of Patent: Mar. 17, 1998

[54] AD HOC INITIALIZATION FOR WIRELESS LOCAL AREA NETWORK

[75] Inventors: Philip H. Belanger, Saratoga; William N. Baugh, Milpitas; David B. Rosen, Agoura Hills, all of Calif.

[73] Assignee: Netwave Technologies Limited, Pleasanton, Calif.

[21] Appl. No.: 439,337

[22] Filed: May 11, 1995

Related U.S. Application Data

[62] Division of Ser. No. 82,313, Jun. 25, 1993, abandoned.

[51] Int. Cl.[6] .................. G06F 15/16; H04L 9/00
[52] U.S. Cl. .................. 395/200.1; 395/200.19; 395/200.11; 370/436; 375/200
[58] Field of Search .................. 375/356, 202, 375/200; 395/200.19, 200.1, 200.11; 370/254, 255, 431, 436, 437

[56] References Cited

U.S. PATENT DOCUMENTS

| Re. 34,034 | 8/1992 | O'Sullivan | 379/59 |
|---|---|---|---|
| 4,456,793 | 6/1984 | Baker et al. | 179/99 |
| 4,665,519 | 5/1987 | Kirchner et al. | 370/94 |
| 4,697,281 | 9/1987 | O'Sullivan | 379/59 |
| 4,807,222 | 2/1989 | Amitay | 370/85 |
| 4,817,115 | 3/1989 | Campo et al. | 375/22 |
| 4,852,122 | 7/1989 | Nelson et al. | 375/8 |
| 4,857,716 | 8/1989 | Gombrich et al. | 235/462 |
| 4,972,457 | 11/1990 | O'Sullivan | 379/59 |
| 4,991,197 | 2/1991 | Morris | 379/58 |
| 5,003,472 | 3/1991 | Perrill et al. | 364/401 |
| 5,008,661 | 4/1991 | Raj | 340/825.54 |
| 5,029,180 | 7/1991 | Cowart | 375/1 |
| 5,046,066 | 9/1991 | Messenger | 370/94.1 |
| 5,048,057 | 9/1991 | Saleh et al. | 375/40 |
| 5,101,500 | 3/1992 | Marui | 455/33 |
| 5,123,029 | 6/1992 | Bantz et al. | 375/1 |
| 5,128,981 | 7/1992 | Tsukamoto et al. | 379/58 |
| 5,130,987 | 7/1992 | Flammer | 370/436 |
| 5,138,328 | 8/1992 | Zibrik et al. | 343/702 |
| 5,142,534 | 8/1992 | Simpson et al. | 370/95.1 |
| 5,146,471 | 9/1992 | Cowart | 375/1 |
| 5,159,592 | 10/1992 | Perkins | 370/85.7 |
| 5,164,985 | 11/1992 | Nysen et al. | 380/9 |
| 5,166,932 | 11/1992 | Hoff et al. | 370/95.1 |

(List continued on next page.)

OTHER PUBLICATIONS

Ken Biba, *A Modest Proposal for an Asynchronous, Data Intensive, Wireless Local Area Network*, IEEE P802.11/91–25, Mar. 1991.

Ken Biba, *A Hybrid Wireless MAC Protocol Supporting Asynchronous and Synchronous MSDU Delivery Services*, IEEE P802.11/91–92, Sep. 1991.

Ken Biba, *An Update to the Hybrid Wireless MAC Protocol Supporting Asynchronous and Synchronous MSDU Delivery Services*, IEEE P802.11/92–14, Jan. 1992.

Phil Belanger, *MAC interaction with a Frequency Hopping PHY*, IEEE P802.11-93/13, Jan. 1993.

(List continued on next page.)

*Primary Examiner*—Dinh C. Dung
*Attorney, Agent, or Firm*—Skjerven, Morrill, MacPherson, Franklin & Friel; Norman R. Klivans, Jr.

[57] ABSTRACT

A wireless network is initialized by communications between mobile units forming an ad hoc network or by communications between a mobile unit and an access point unit. Mobile units transmit announcements in order to establish a communication link. To ensure the announcements are received, the mobile units scan different frequencies at various times using various hop sequences. Once communication is established, one mobile unit adopts the hop frequency of the other mobile unit according to a comparison between the hop frequencies of the two units. Multiple mobile units initialize to form ad hoc networks in similar manner.

15 Claims, 139 Drawing Sheets

Microfiche Appendix Included
(7 Microfiche, 594 Pages)

U.S. PATENT DOCUMENTS

| | | | |
|---|---|---|---|
| 5,183,404 | 2/1993 | Aldous et al. | 439/55 |
| 5,185,700 | 2/1993 | Bezos et al. | 364/424.04 |
| 5,189,632 | 2/1993 | Paajanen et al. | 364/705.5 |
| 5,212,806 | 5/1993 | Natarajan | 455/33.2 |
| 5,218,188 | 6/1993 | Hanson | 235/375 |
| 5,226,540 | 7/1993 | Bradbury | 206/576 |
| 5,235,495 | 8/1993 | Blair et al. | 361/680 |
| 5,239,466 | 8/1993 | Morgan et al. | 395/148 |
| 5,239,545 | 8/1993 | Bucholz | 370/95.3 |
| 5,239,689 | 8/1993 | Fukuda | 455/86 |
| 5,241,542 | 8/1993 | Natarajan et al. | 370/95.3 |
| 5,274,841 | 12/1993 | Natarajan et al. | 455/33.4 |
| 5,276,680 | 1/1994 | Messenger | 370/85.1 |
| 5,287,384 | 2/1994 | Avery et al. | 375/1 |
| 5,293,400 | 3/1994 | Monod et al. | 375/7 |
| 5,307,378 | 4/1994 | Norimatsu | 375/39 |
| 5,319,799 | 6/1994 | Morita | 455/78 |
| 5,323,419 | 6/1994 | Mori et al. | 375/1 |
| 5,335,276 | 8/1994 | Thompson et al. | 380/21 |
| 5,371,738 | 12/1994 | Moelard et al. | 370/85.1 |
| 5,400,338 | 3/1995 | Flammer | 370/255 |
| 5,428,666 | 6/1995 | Fyfe et al. | 379/58 |
| 5,430,790 | 7/1995 | Williams | 379/63 |
| 5,432,814 | 7/1995 | Hasegawa | 375/202 |
| 5,442,633 | 8/1995 | Perkins et al. | 370/94.1 |
| 5,444,765 | 8/1995 | Marui | 379/59 |
| 5,491,457 | 2/1996 | Feher | 332/103 |

OTHER PUBLICATIONS

Mike Smith, *Further Simulations of the Hybrid MAC Protocol*, IEEE P802.11–93/37, Mar. 1992.

Wim Diepstraten, *A Wireless MAC Protocol Comparison*, IEEE P802.11–92/51, May 1992.

ed. David Bagby, *Functional Requirements IEEE Project 802.11 Version 1.0*, IEEE P802.11–92/91, Jul. 1992.

ed. Francois Simon, *IEEE P802.11 Issues Document*, IEEE P802.11–92/64, Mar. 1993.

Whitfield Diffie and Ashar Aziz, *Wireless Network Security*, IEEE P802.11–93/08, Jan. 1993.

*A Class of Frequency Hop Codes with Nearly Ideal Characteristics* by Maric & Titlebaum, IEEE Transactions on Communications, Sep., 1992.

*Proposal for 2 Mbit/S DSSS PHY* by Jan Boer, IEEE P802.11–93/37, Mar. 1993.

| FIG. 8A | FIG. 8B | FIG. 8C | FIG. 8D | FIG. 8E |
|---------|---------|---------|---------|---------|
| FIG. 8F | FIG. 8G | FIG. 8H | FIG. 8I | FIG. 8J |

FIG. 8

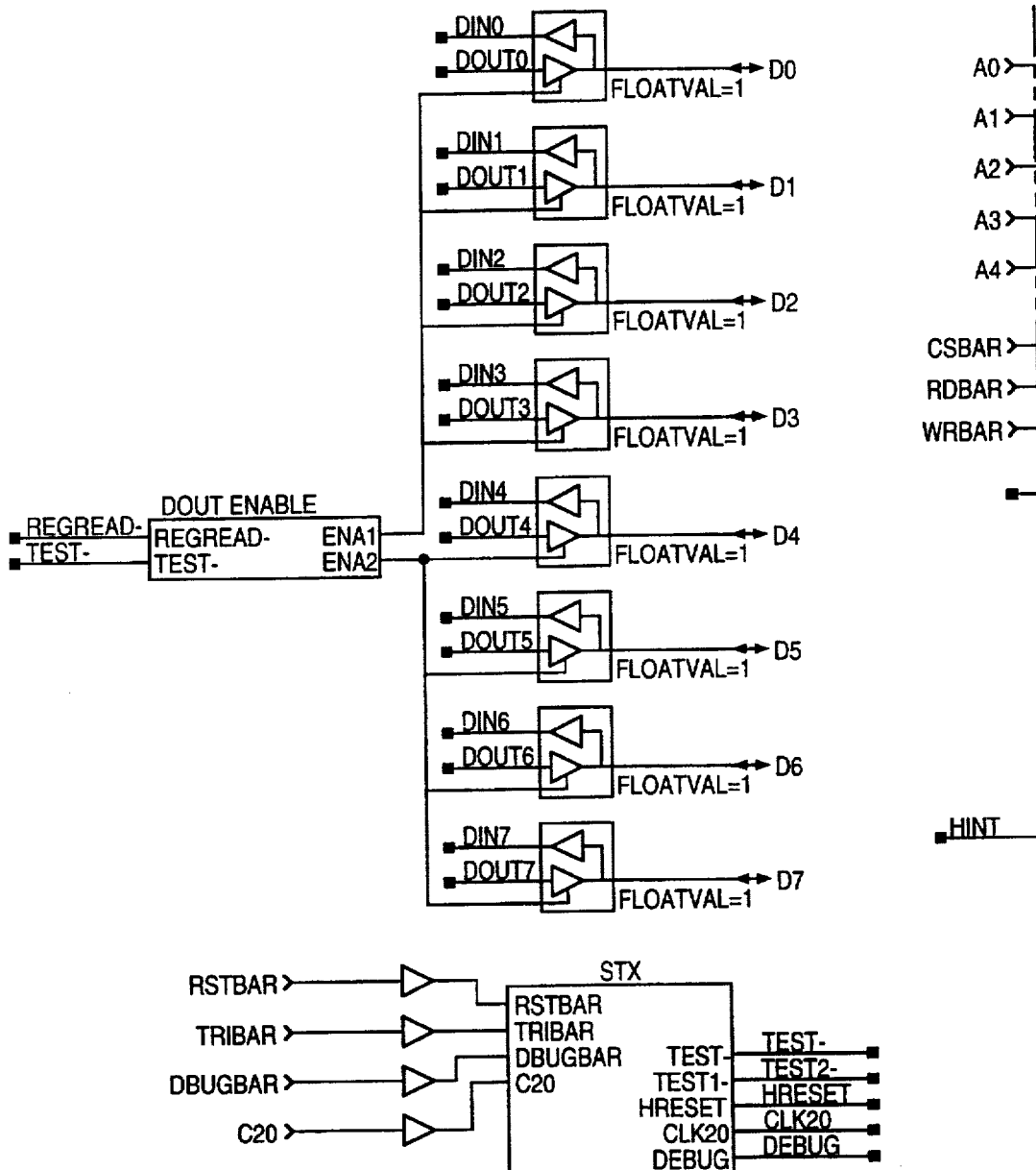
FIG. 9A(1)

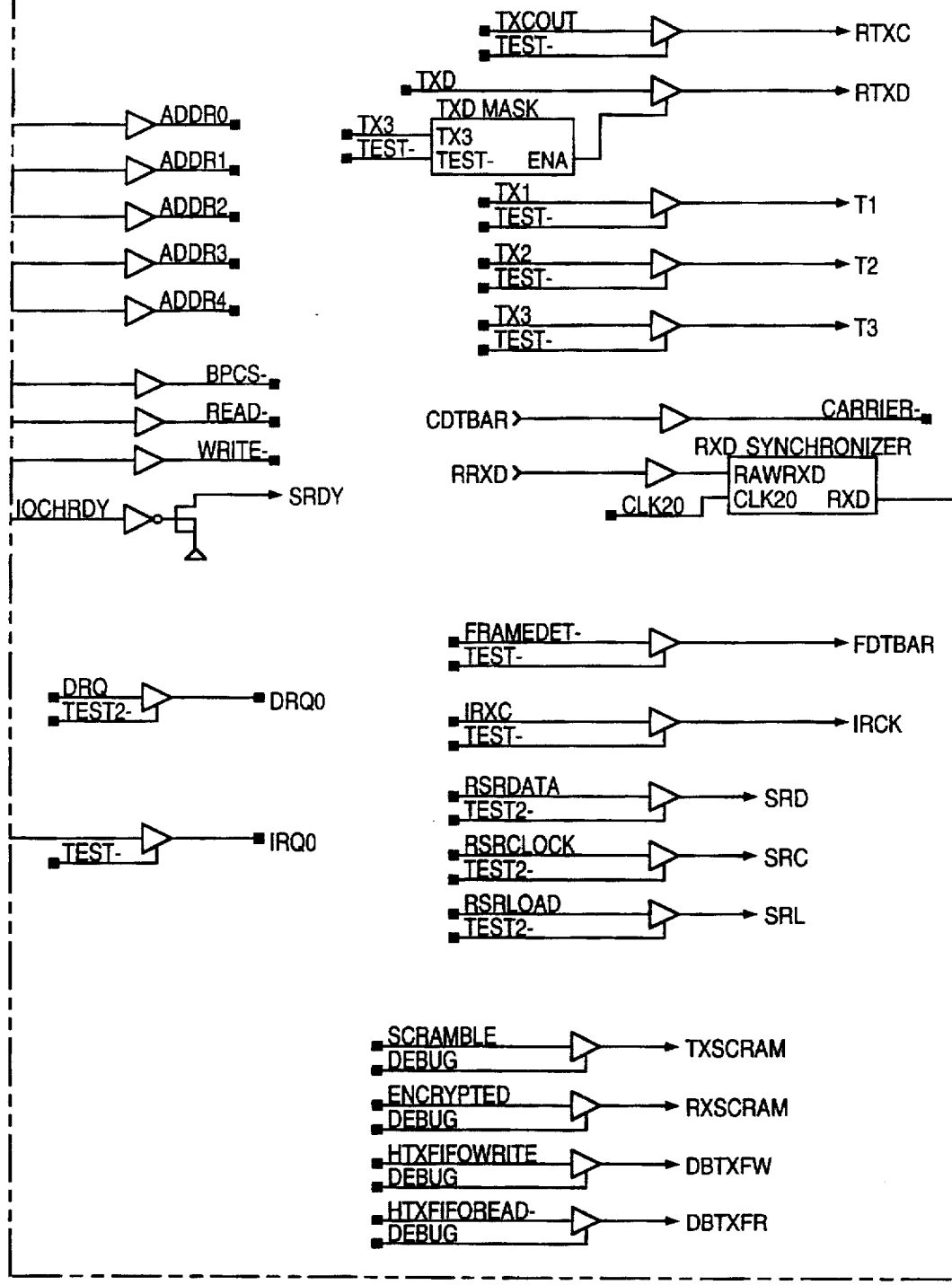
FIG. 9A(2)

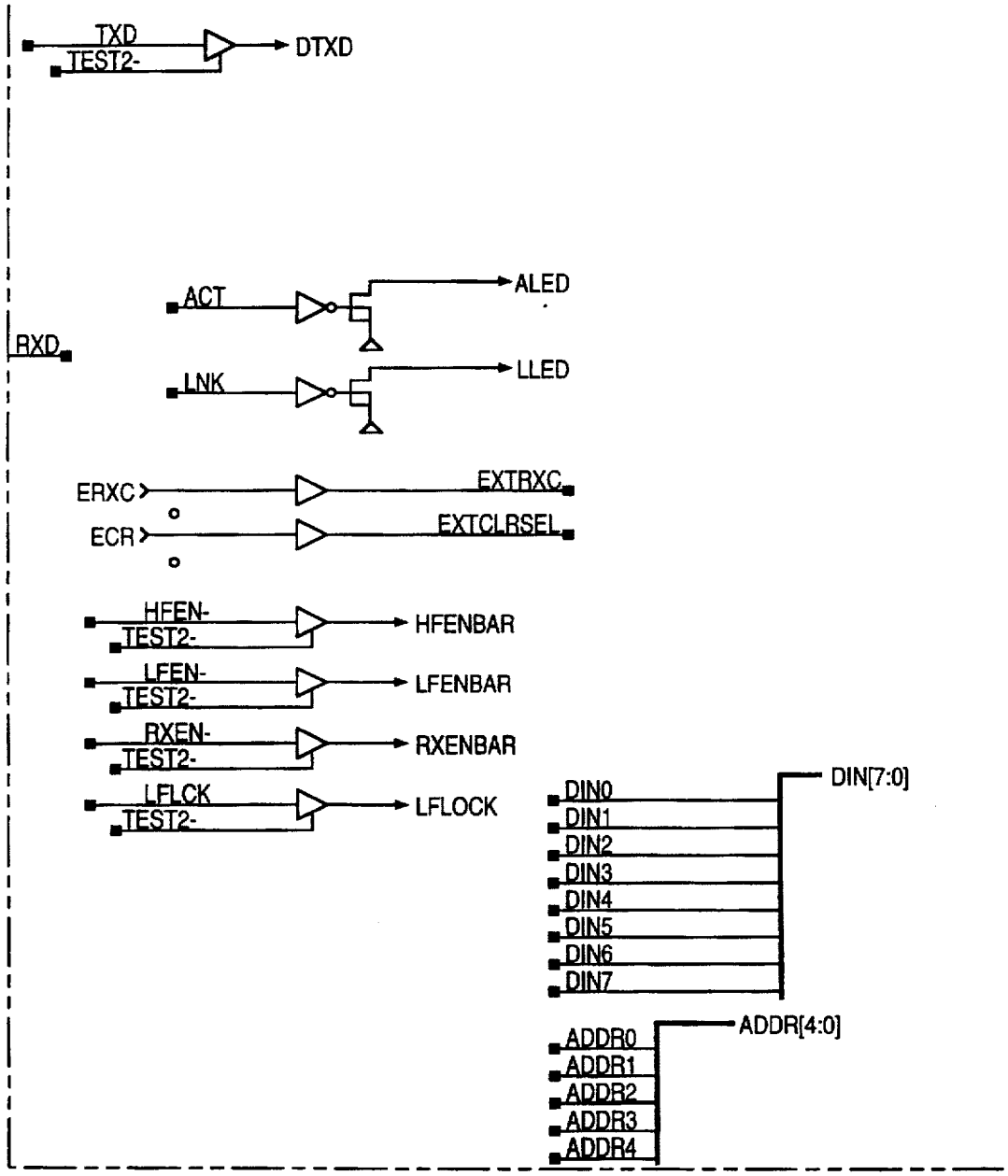
FIG. 9A(3)

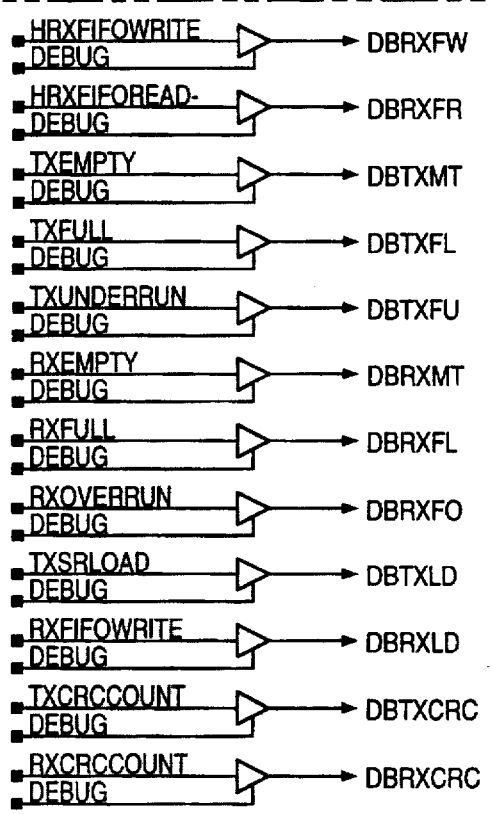
FIG. 9A(4)

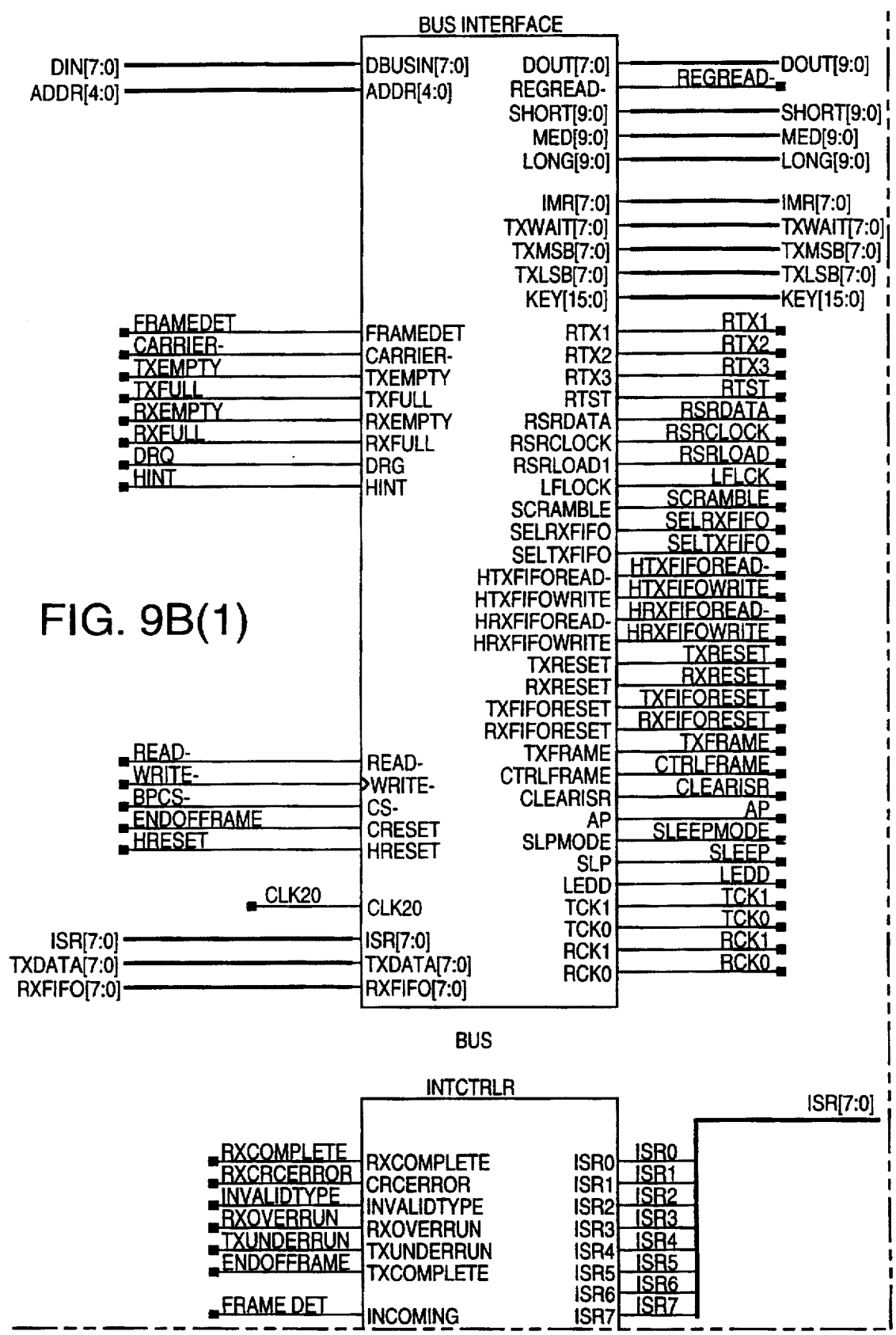
FIG. 9B(1)

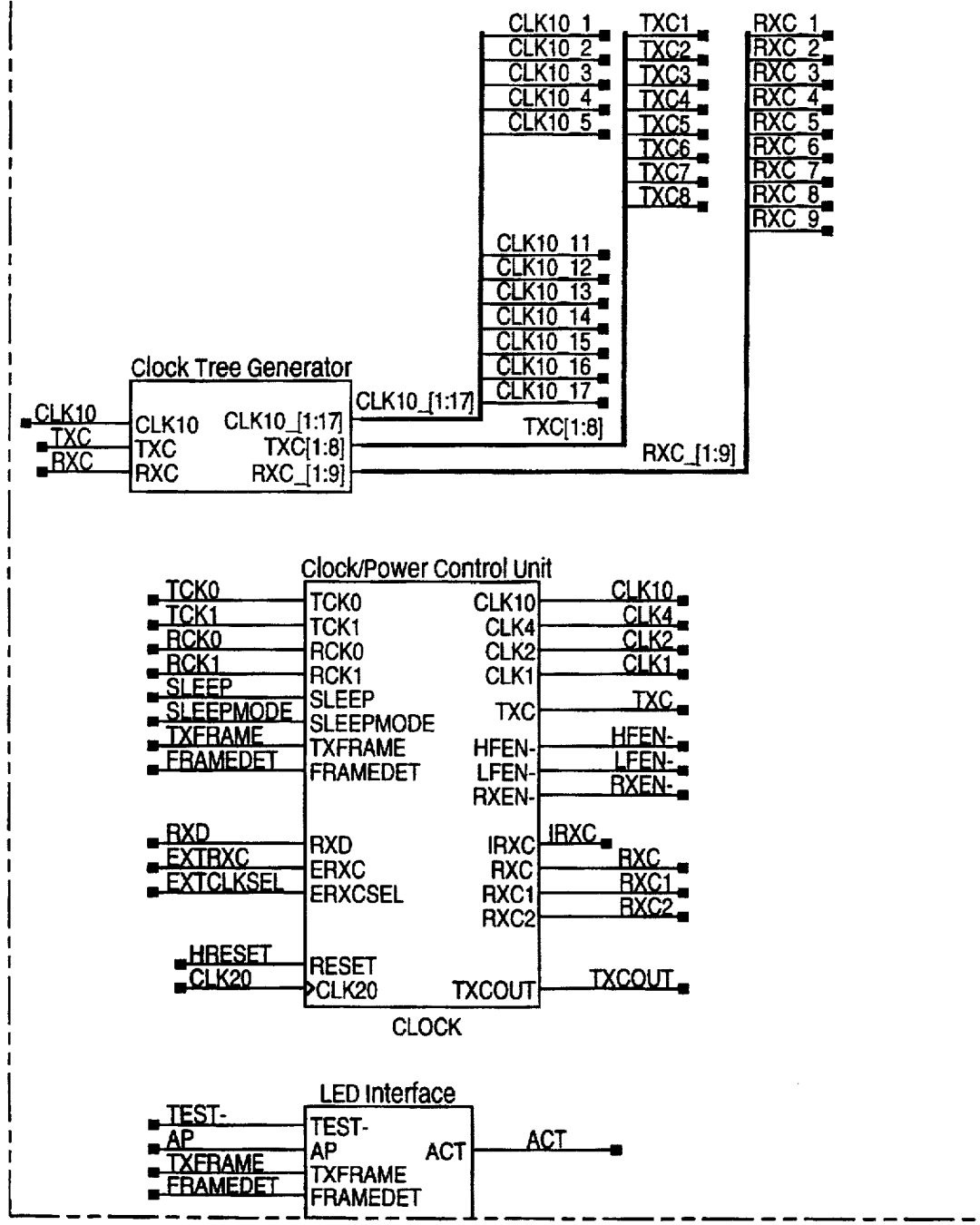
FIG. 9B(2)

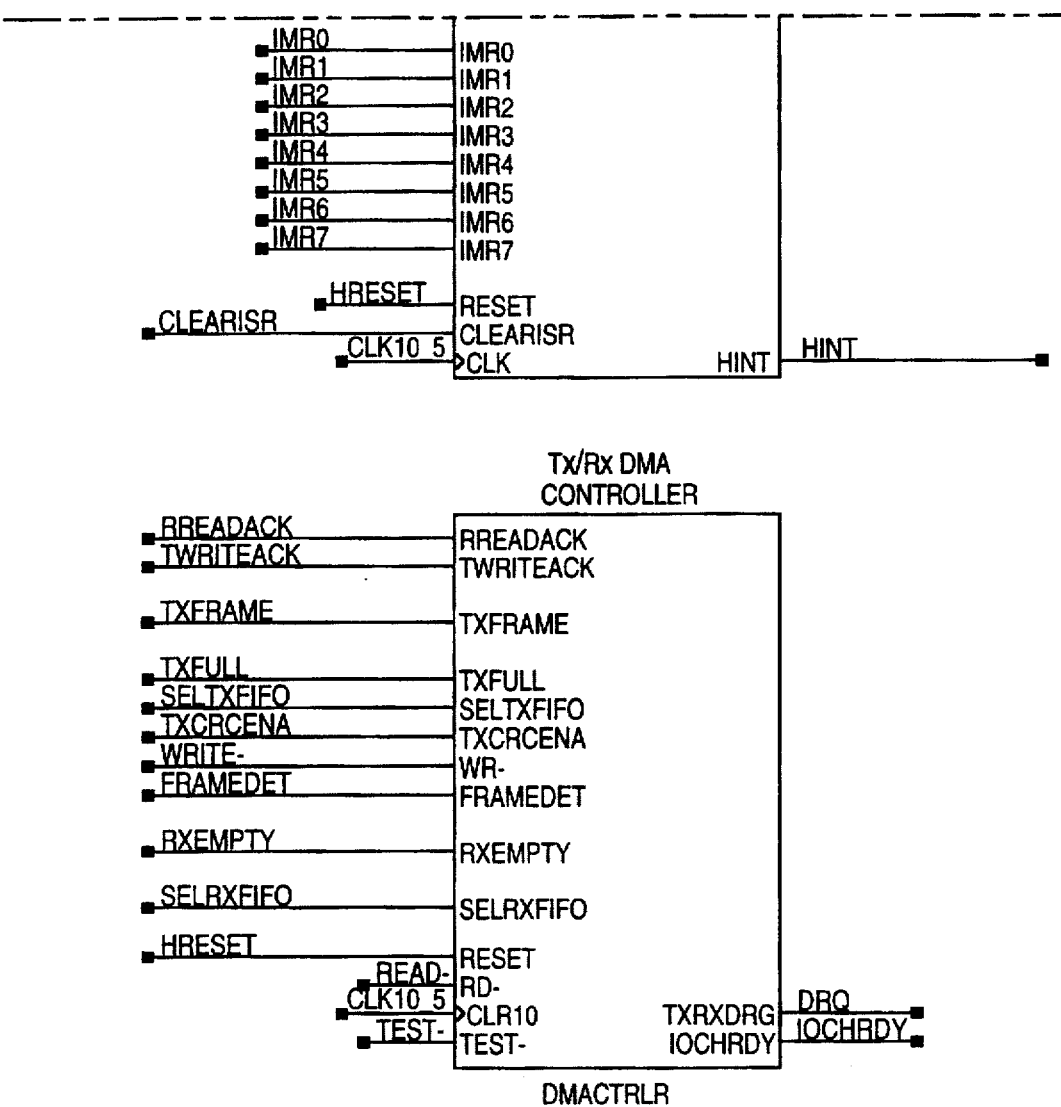
FIG. 9B(3)

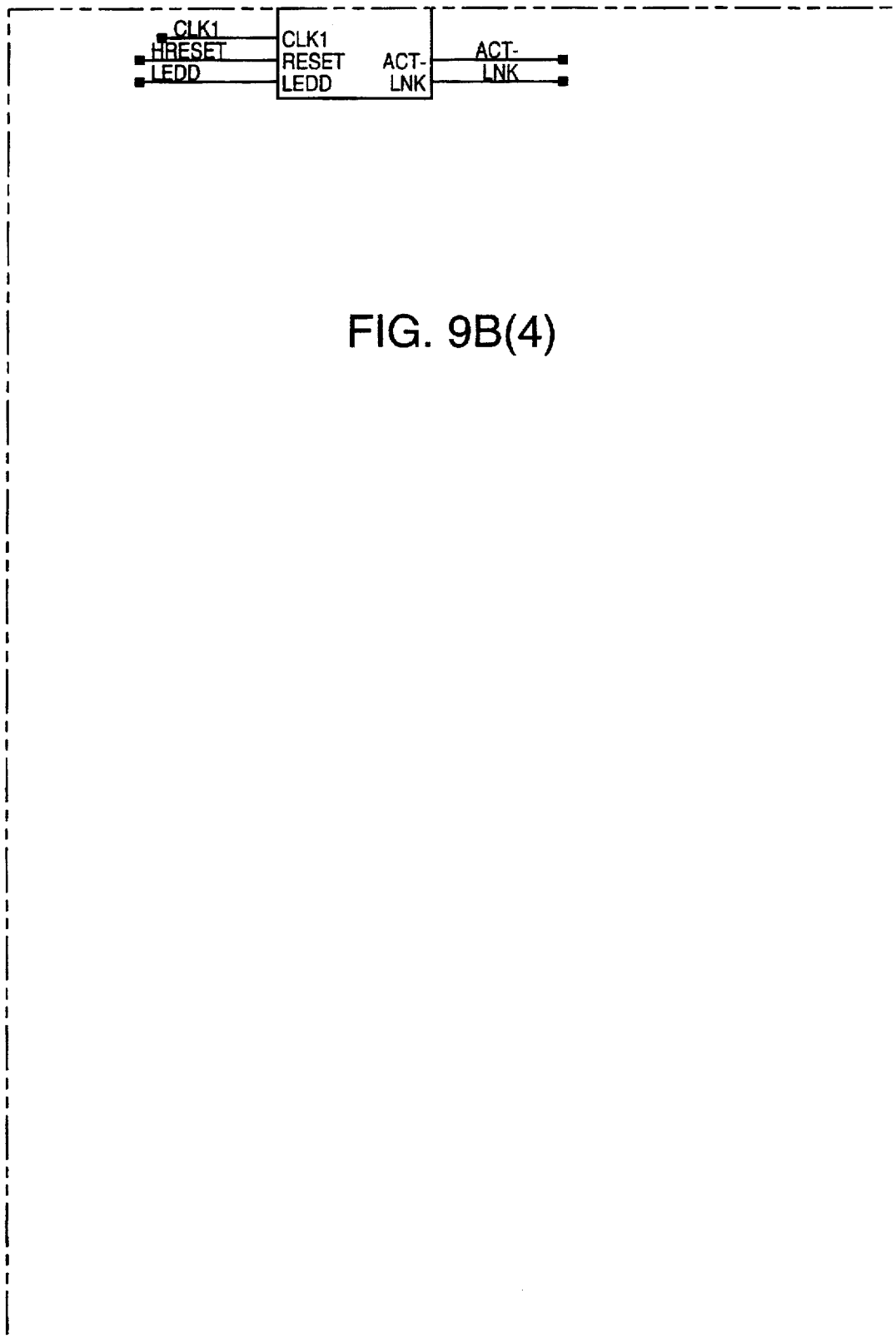
FIG. 9B(4)

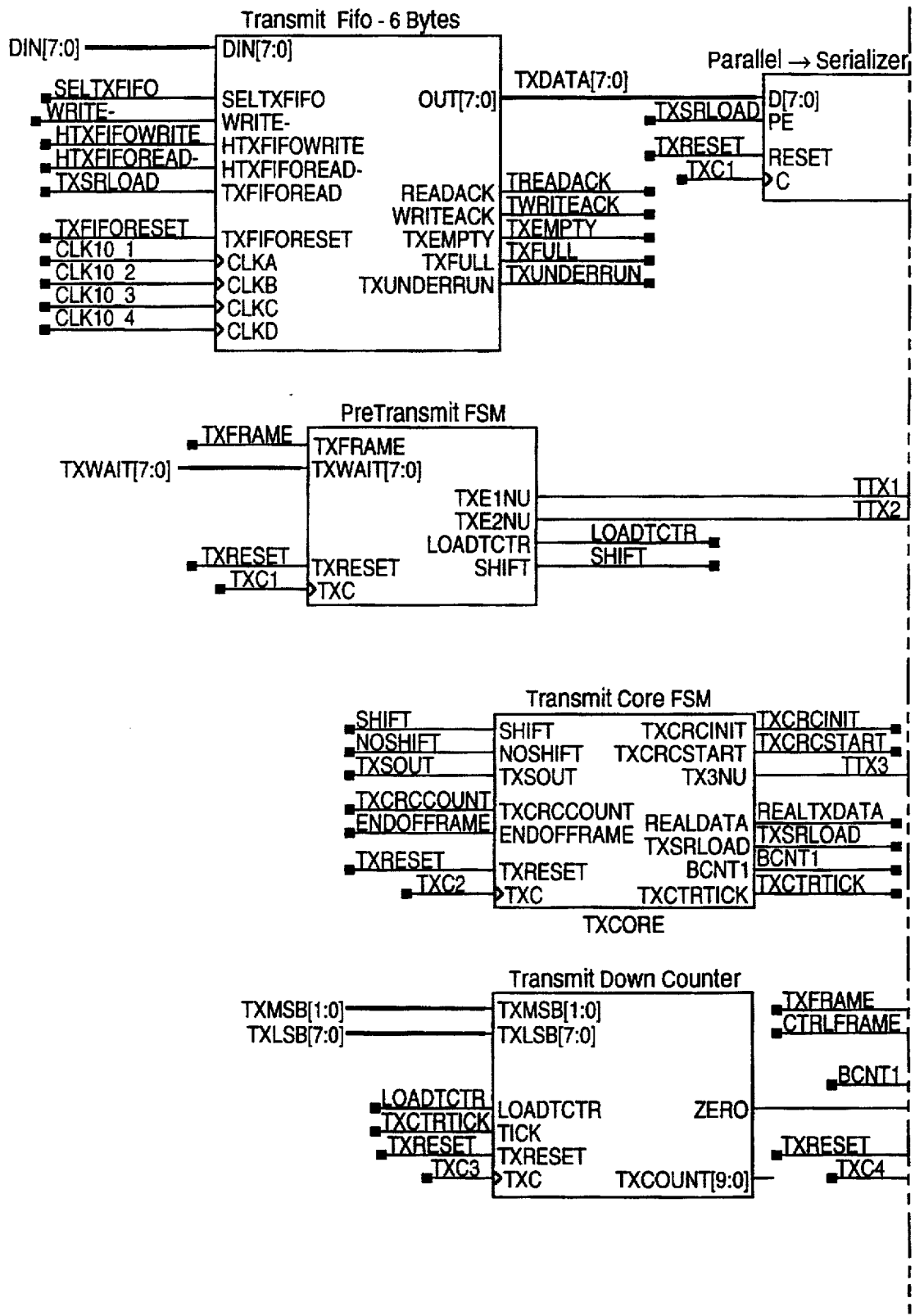
FIG. 9C(1)

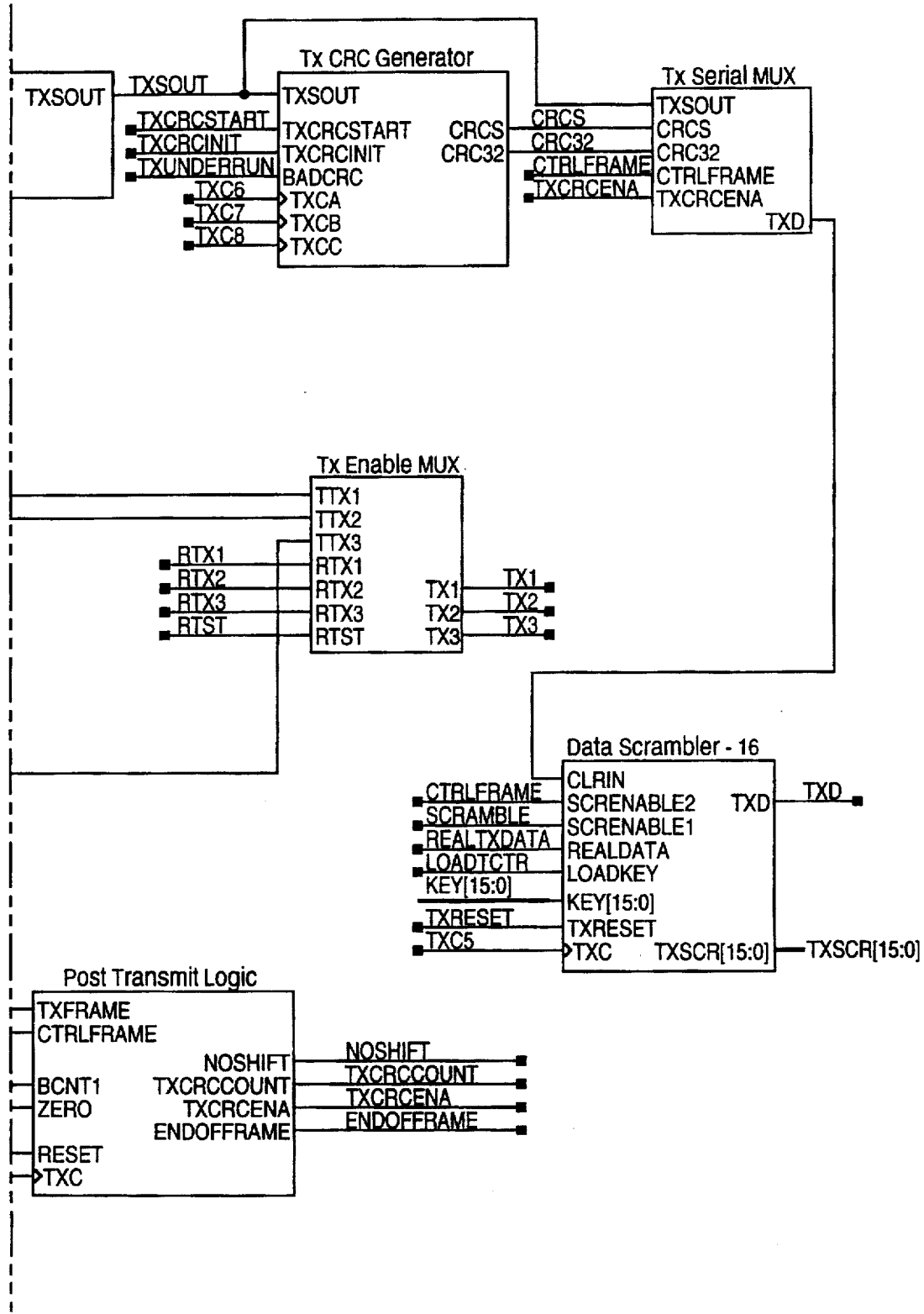
FIG. 9C(2)

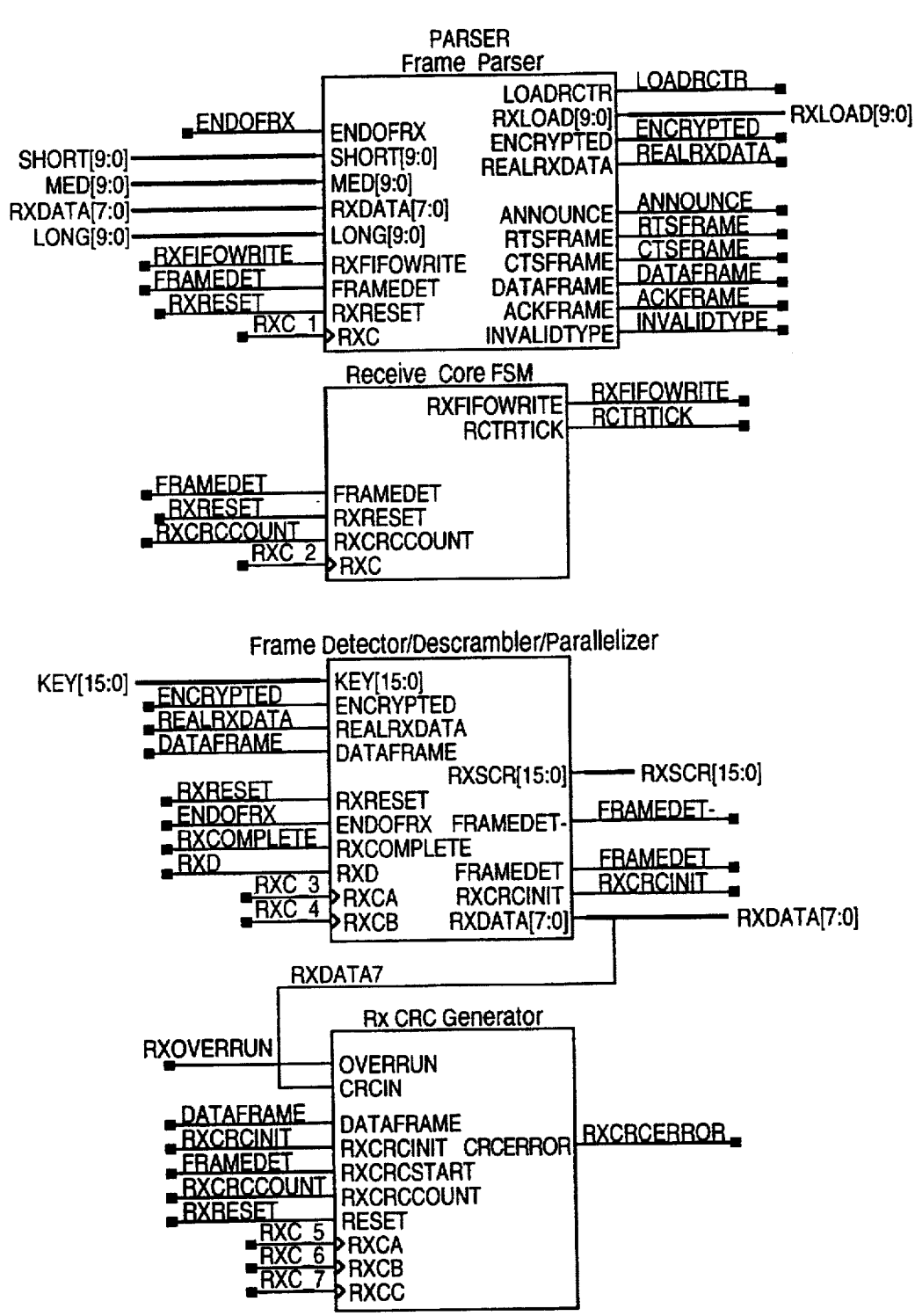
FIG. 9D(1)

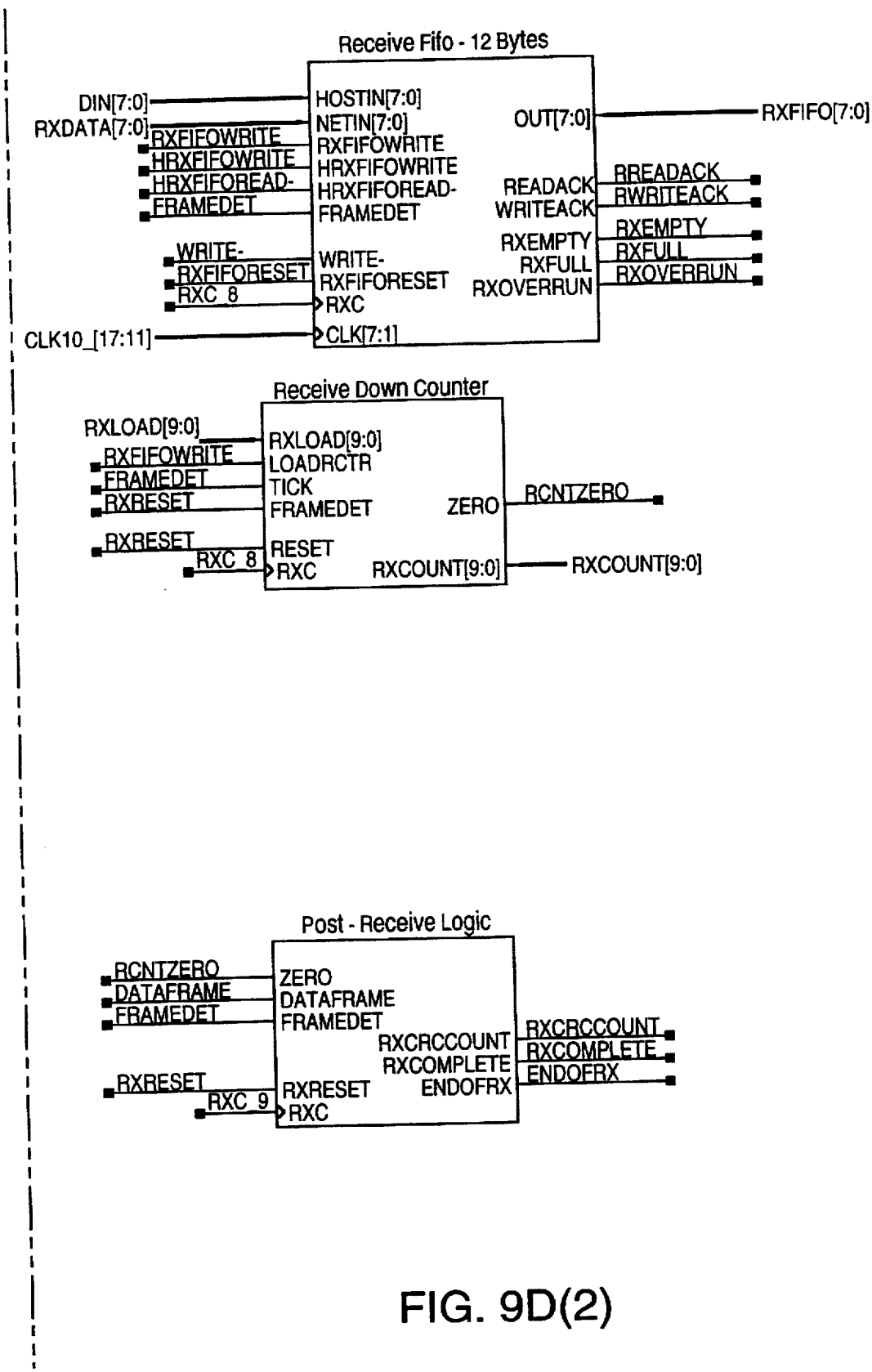
FIG. 9D(2)

| FIG. 10A | FIG. 10B | FIG. 10C | FIG. 10D |
| --- | --- | --- | --- |
| FIG. 10E | FIG. 10F | FIG. 10G | FIG. 10H |
| FIG. 10I | FIG. 10J | FIG. 10K | FIG. 10L |
| FIG. 10M | FIG. 10N | FIG. 10O | FIG. 10P |

FIG. 10

| FIG. 11A | FIG. 11B | FIG. 11C | FIG. 11D |
|---|---|---|---|
| FIG. 11E | FIG. 11F | FIG. 11G | FIG. 11H |
| FIG. 11I | FIG. 11J | FIG. 11K | FIG. 11L |

FIG. 11

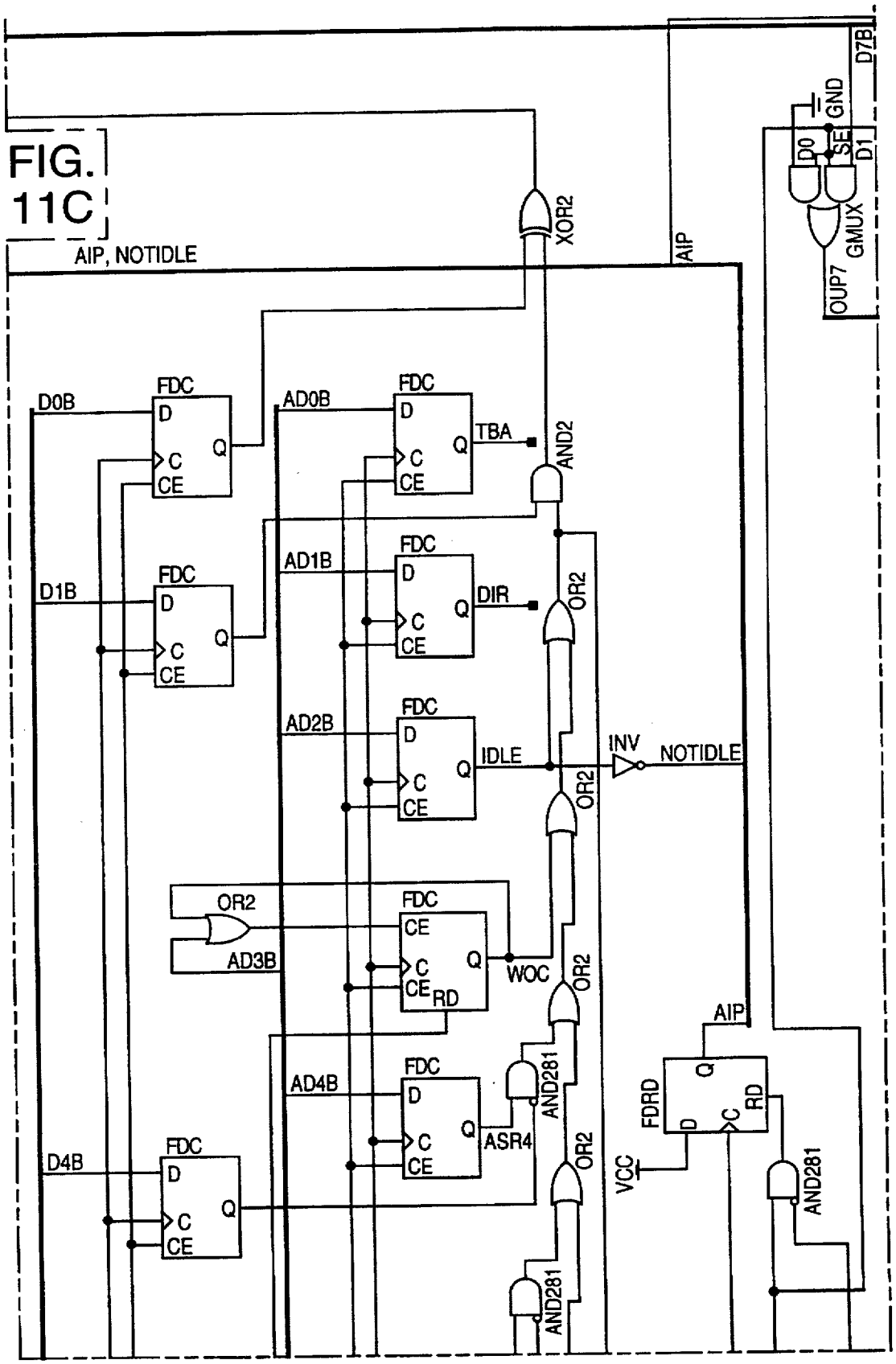

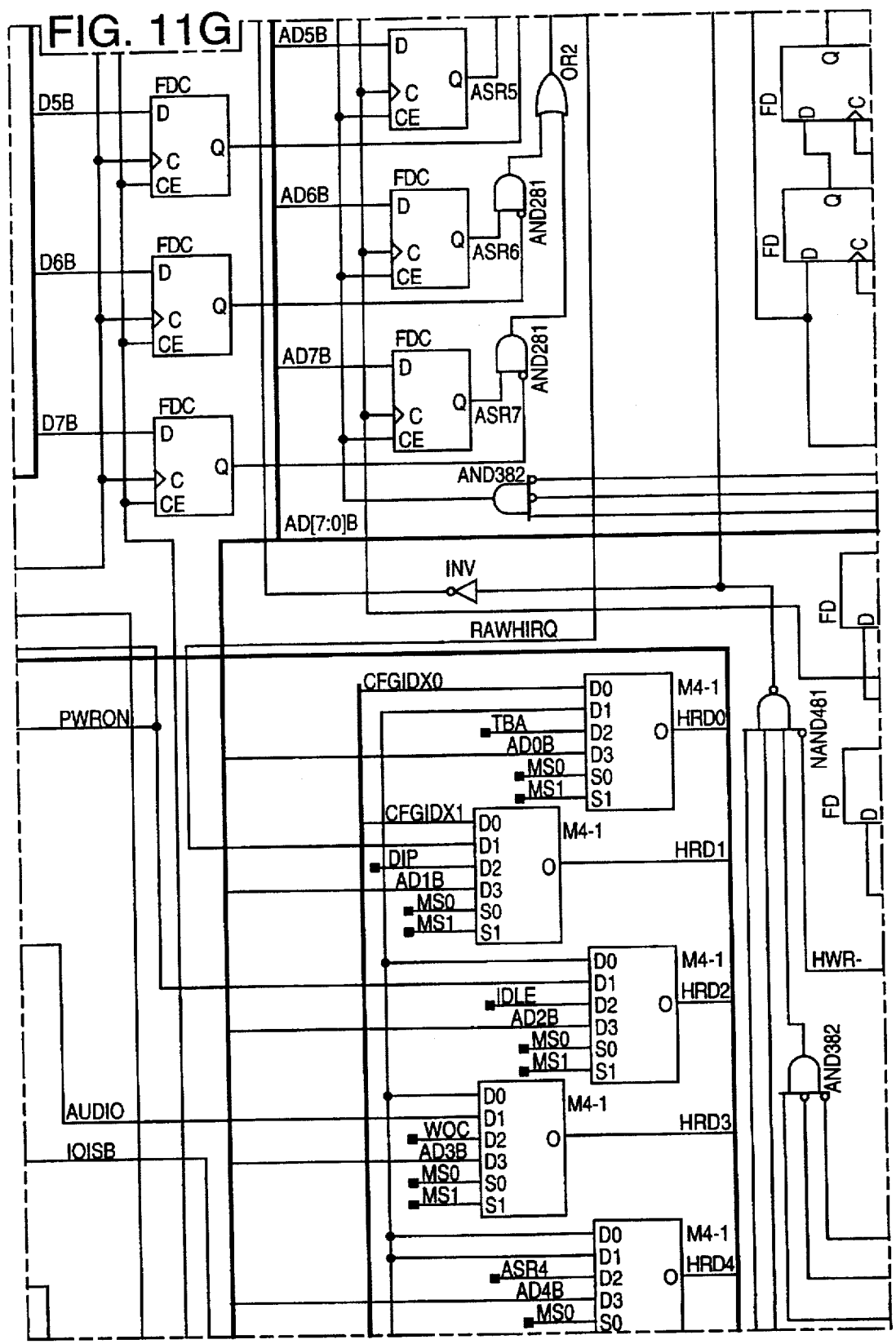

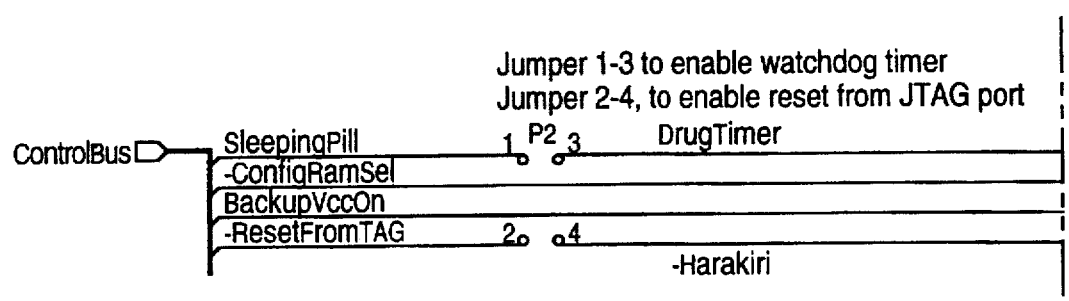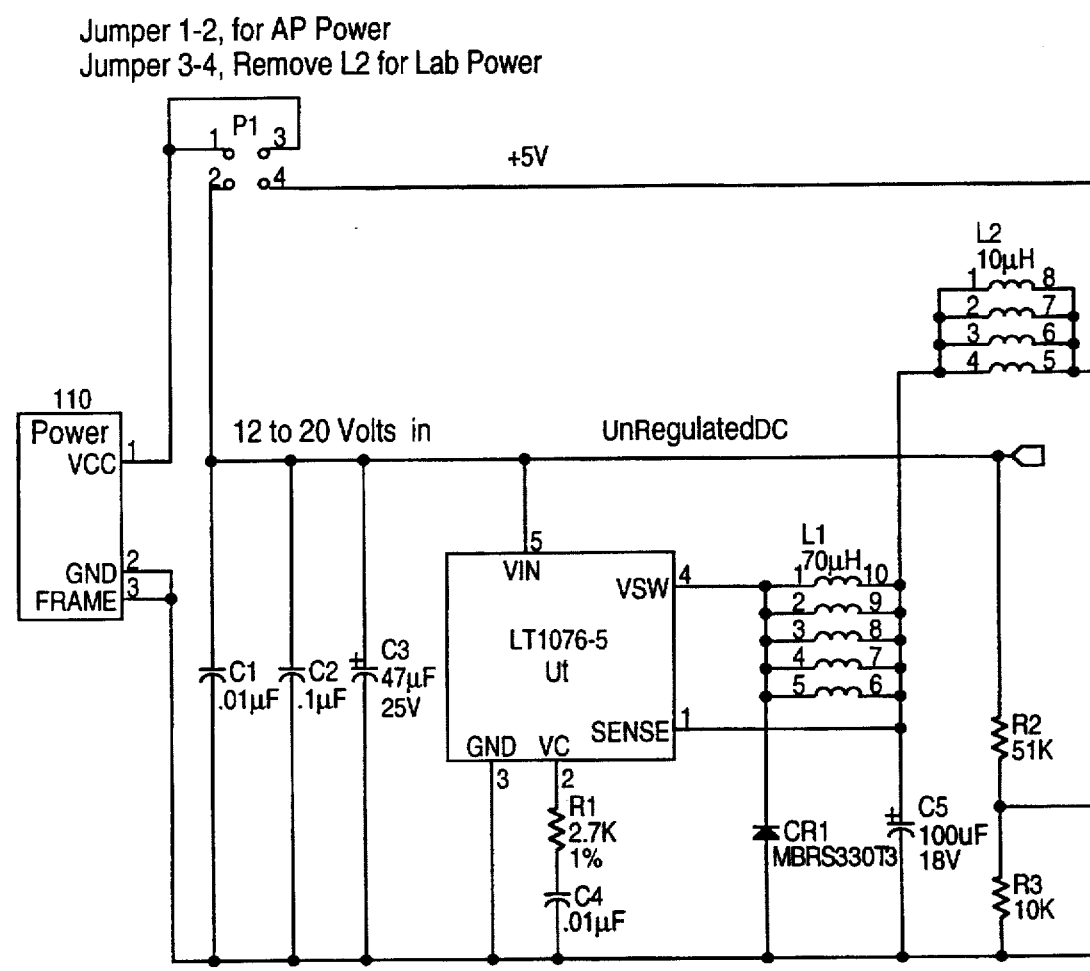
FIG. 40A(1)

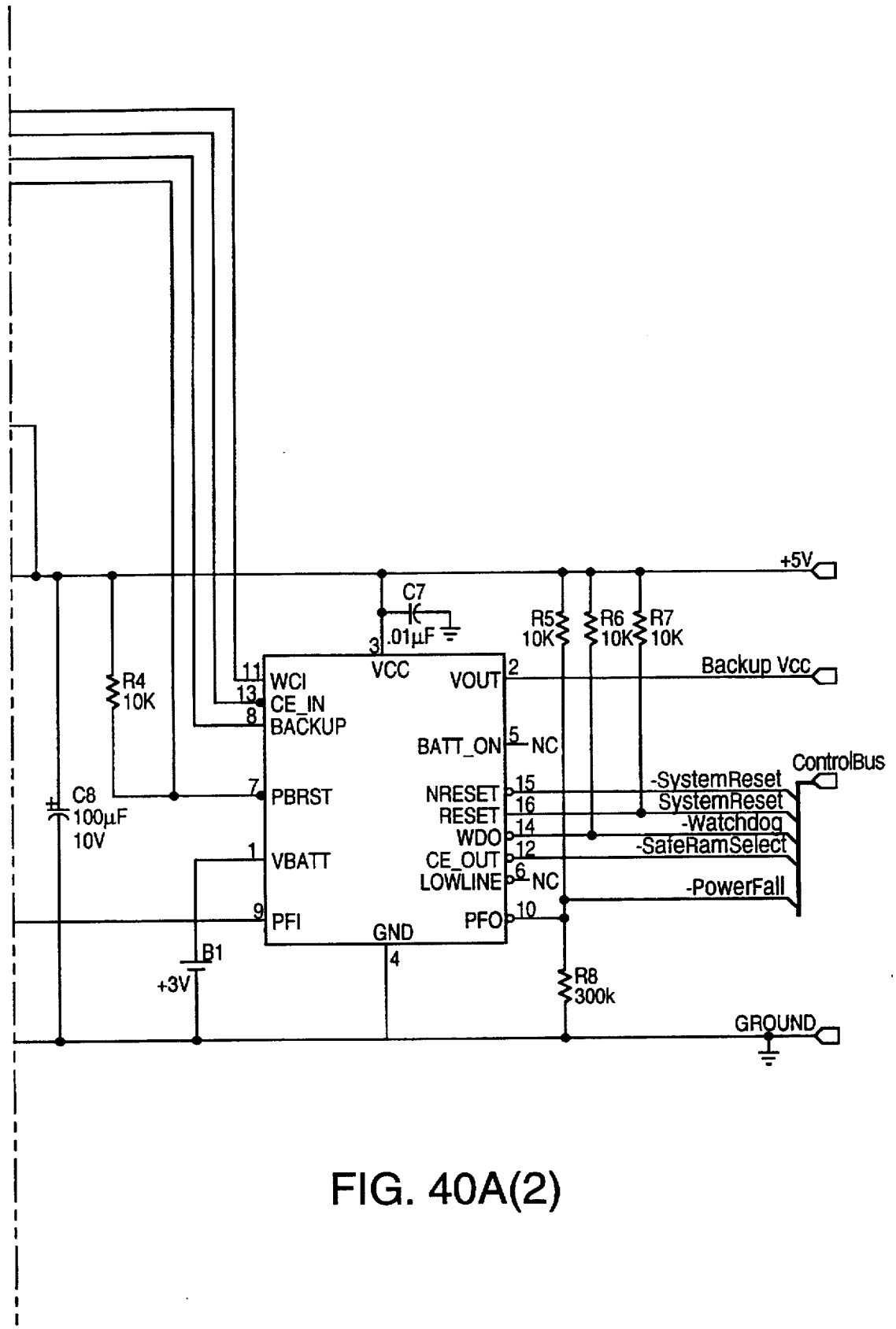
FIG. 40A(2)

| FIG. 40B(1) | FIG. 40B(2) |
|---|---|
| FIG. 40B(3) | FIG. 40B(4) |

FIG. 40B

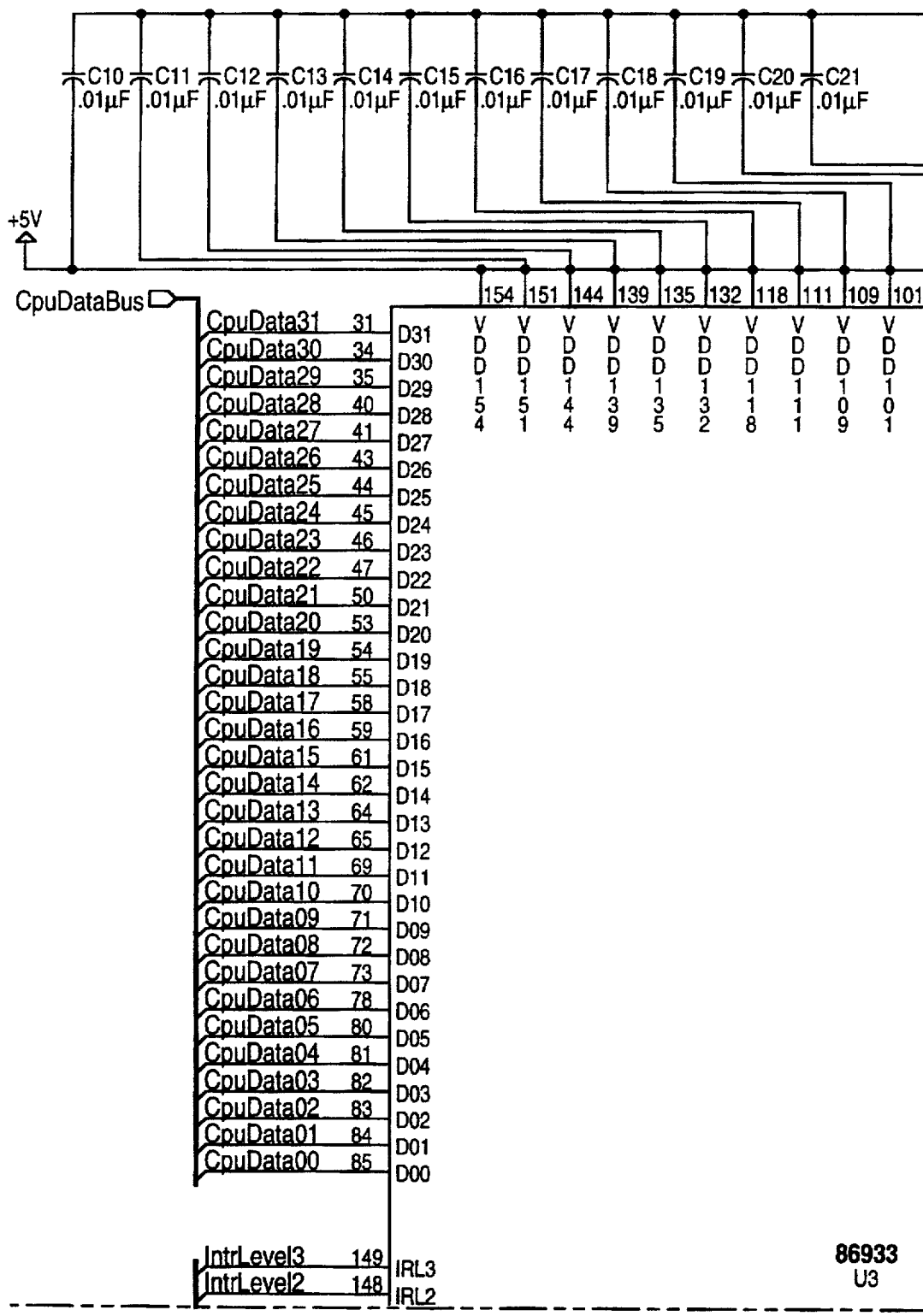
FIG. 40B(1)

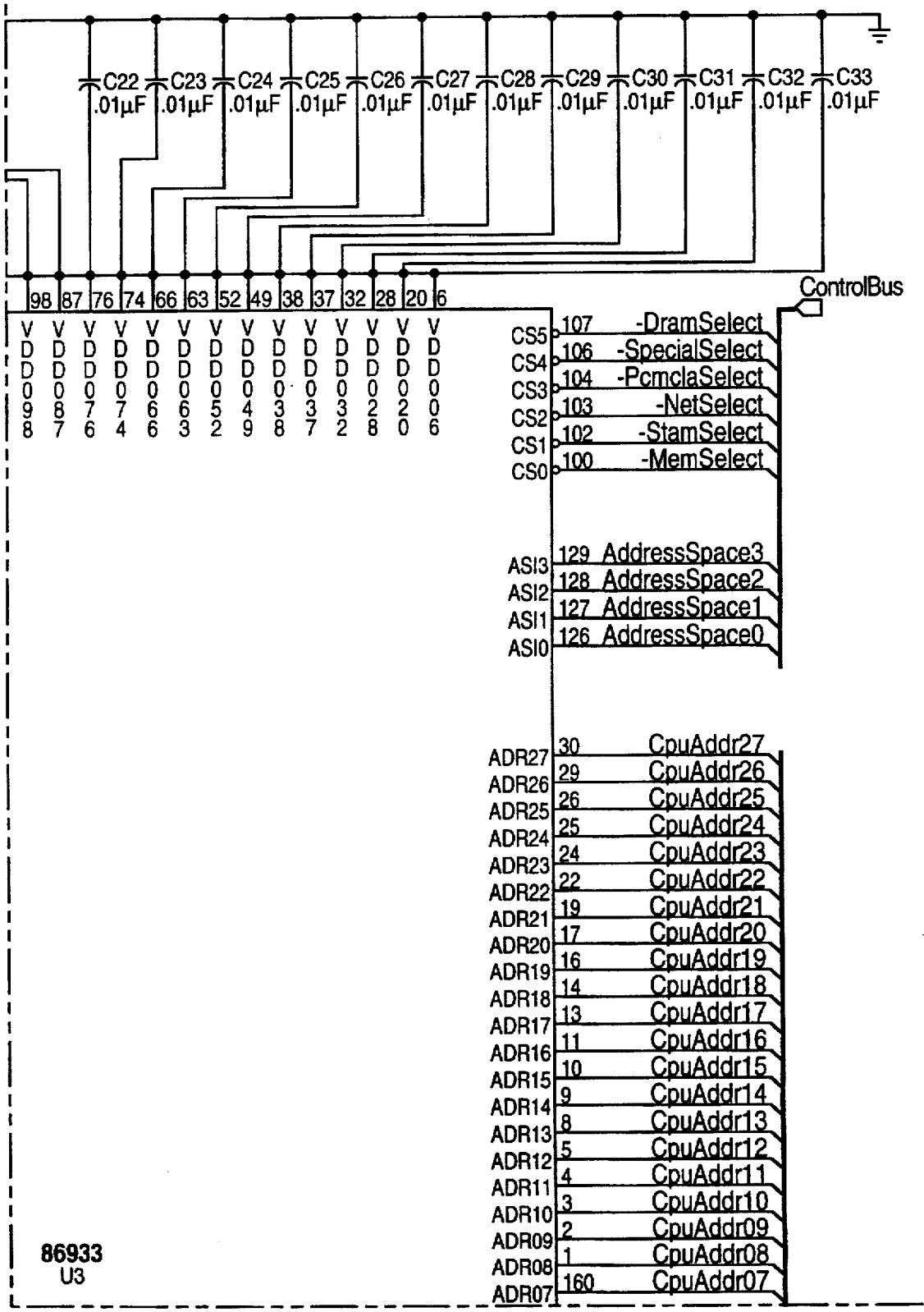
FIG. 40B(2)

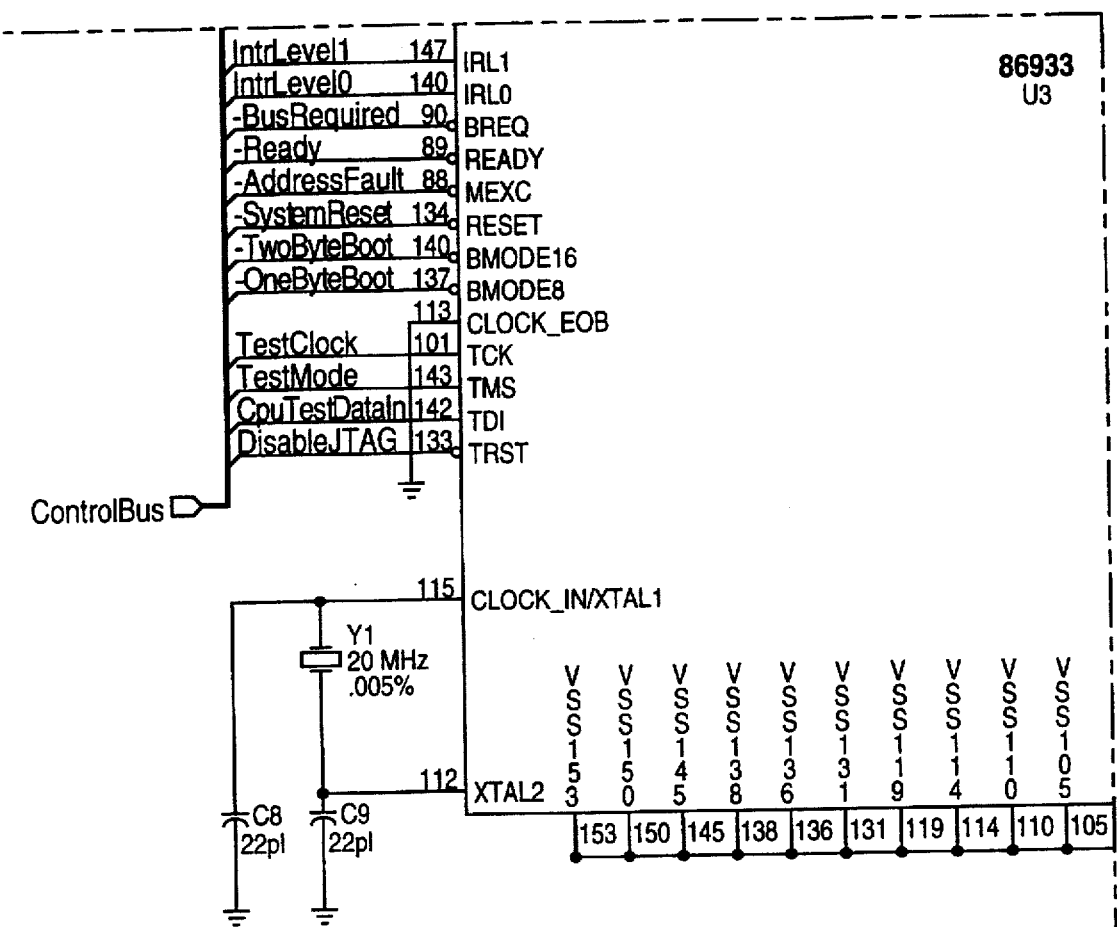
FIG. 40B(3)

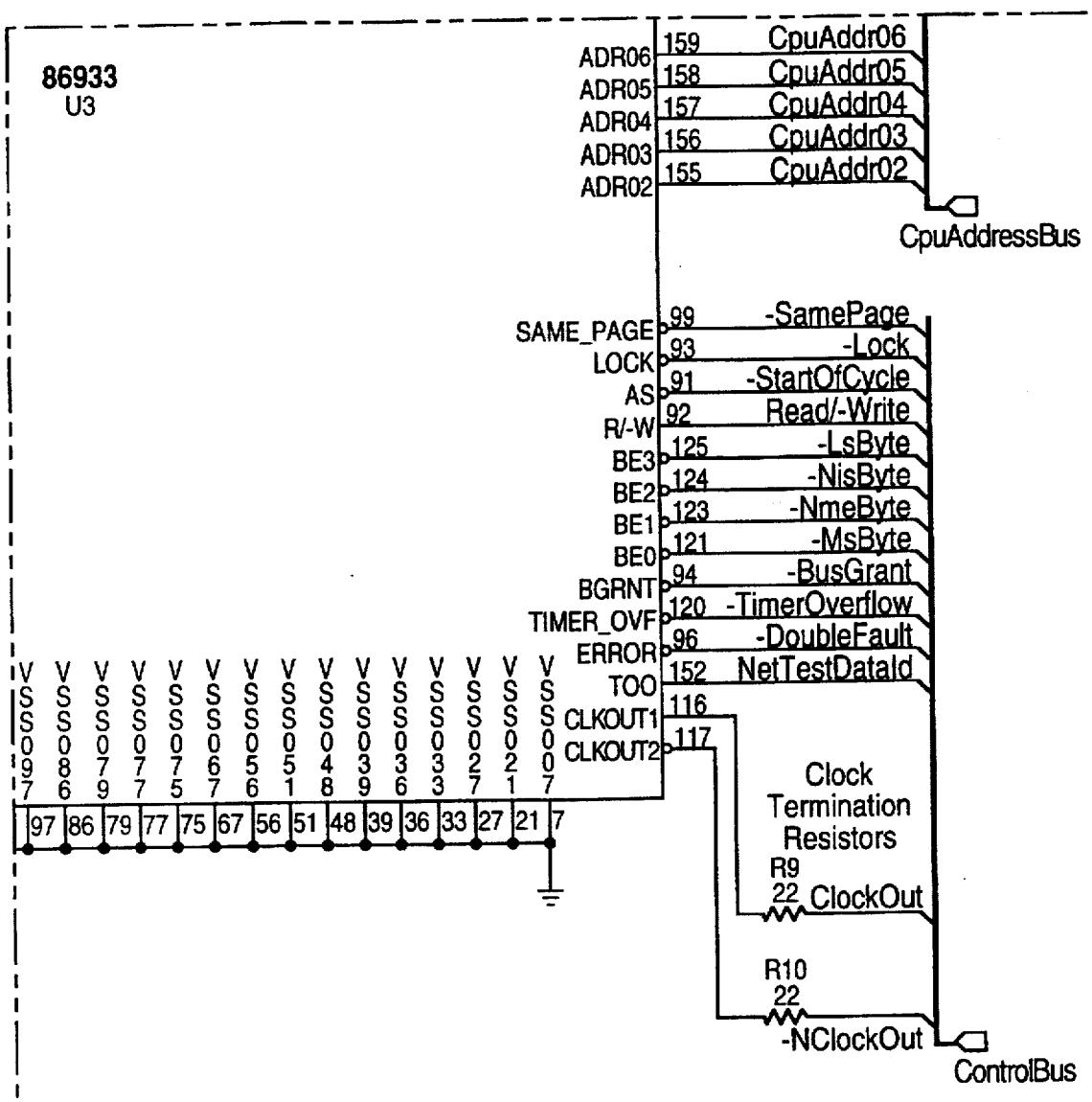
FIG. 40B(4)

| FIG. 40C(1) | FIG. 40C(2) |
|---|---|
| FIG. 40C(3) | FIG. 40C(4) |

FIG. 40C

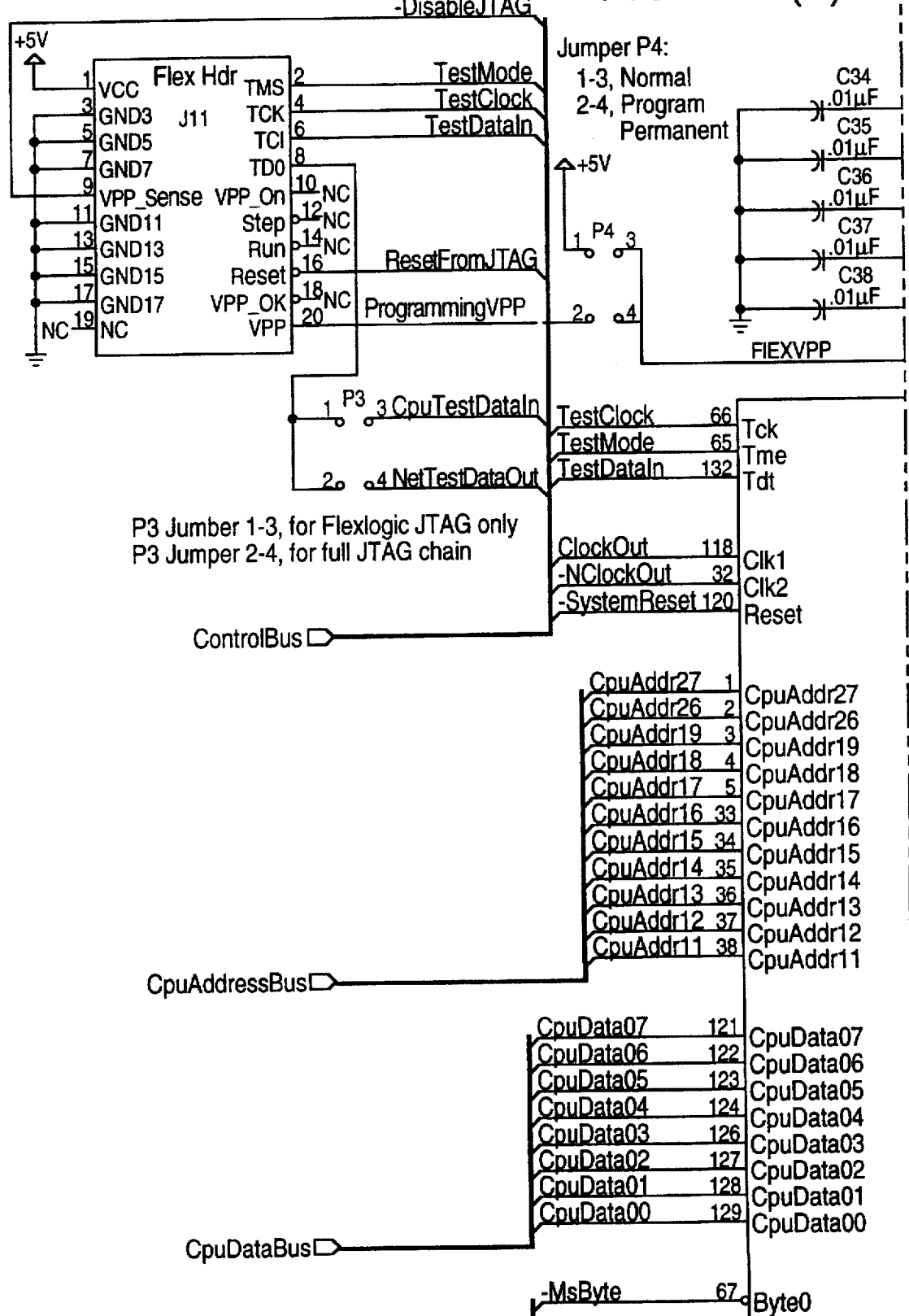
FIG. 40C(1)

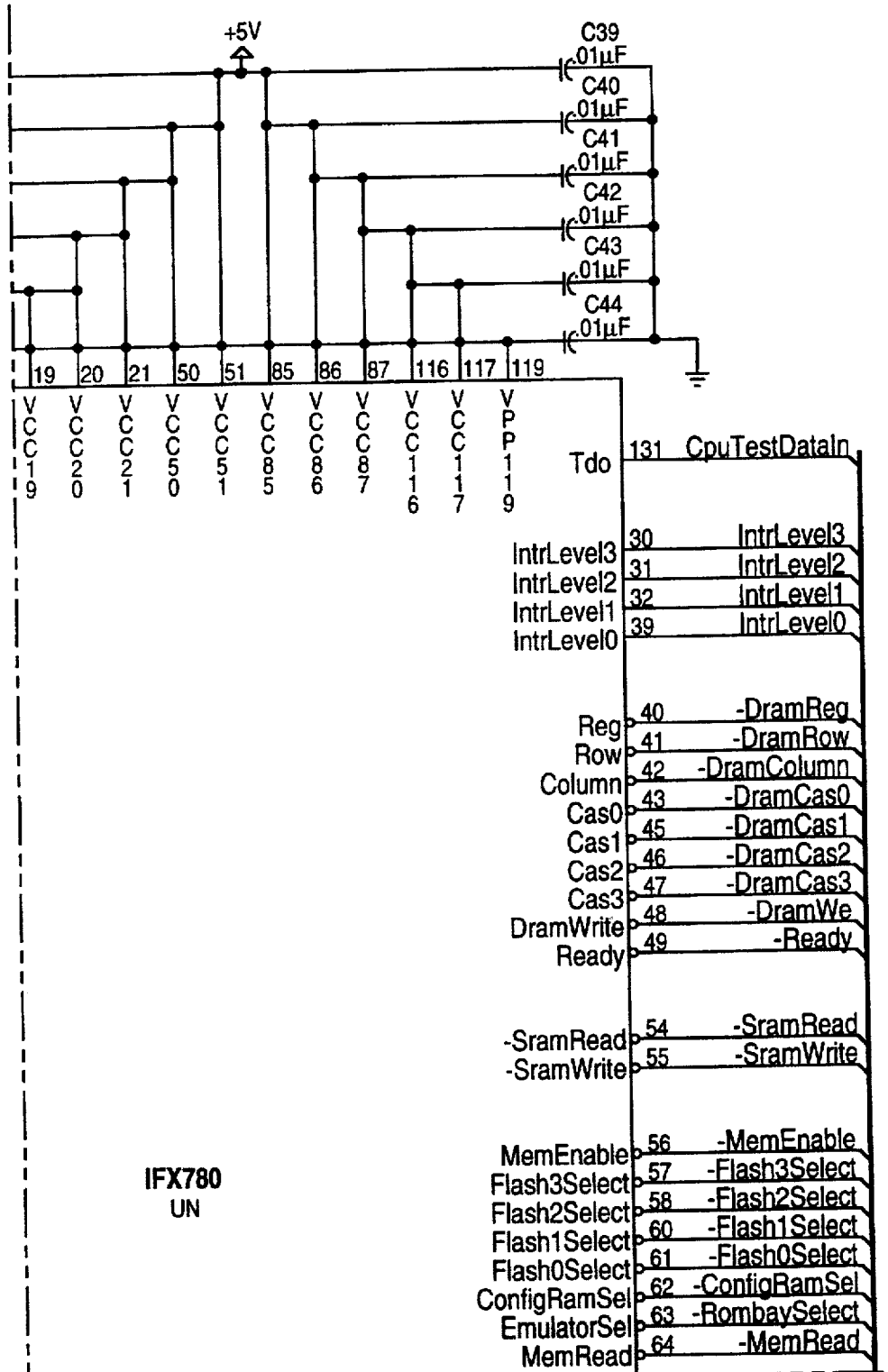
FIG. 40C(2)

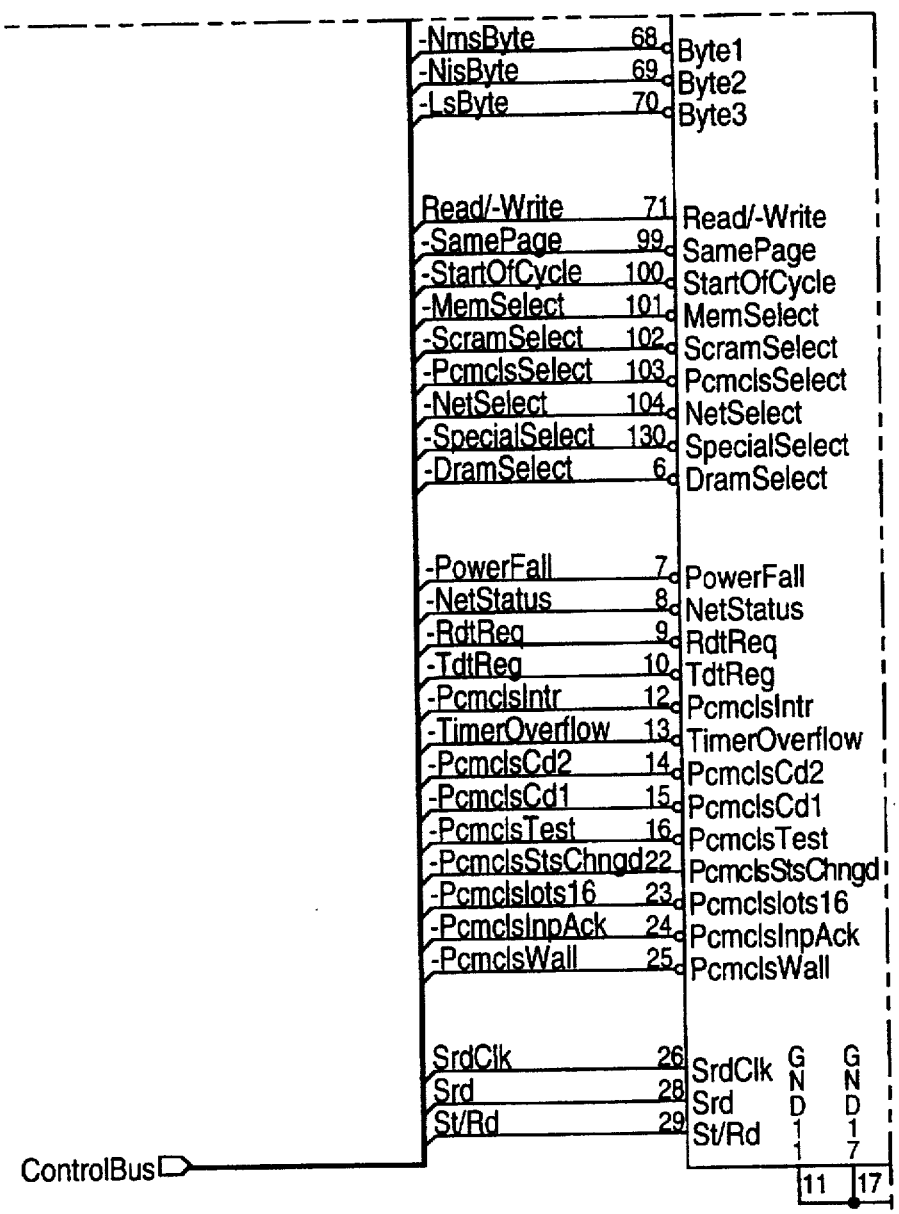
FIG. 40C(3)

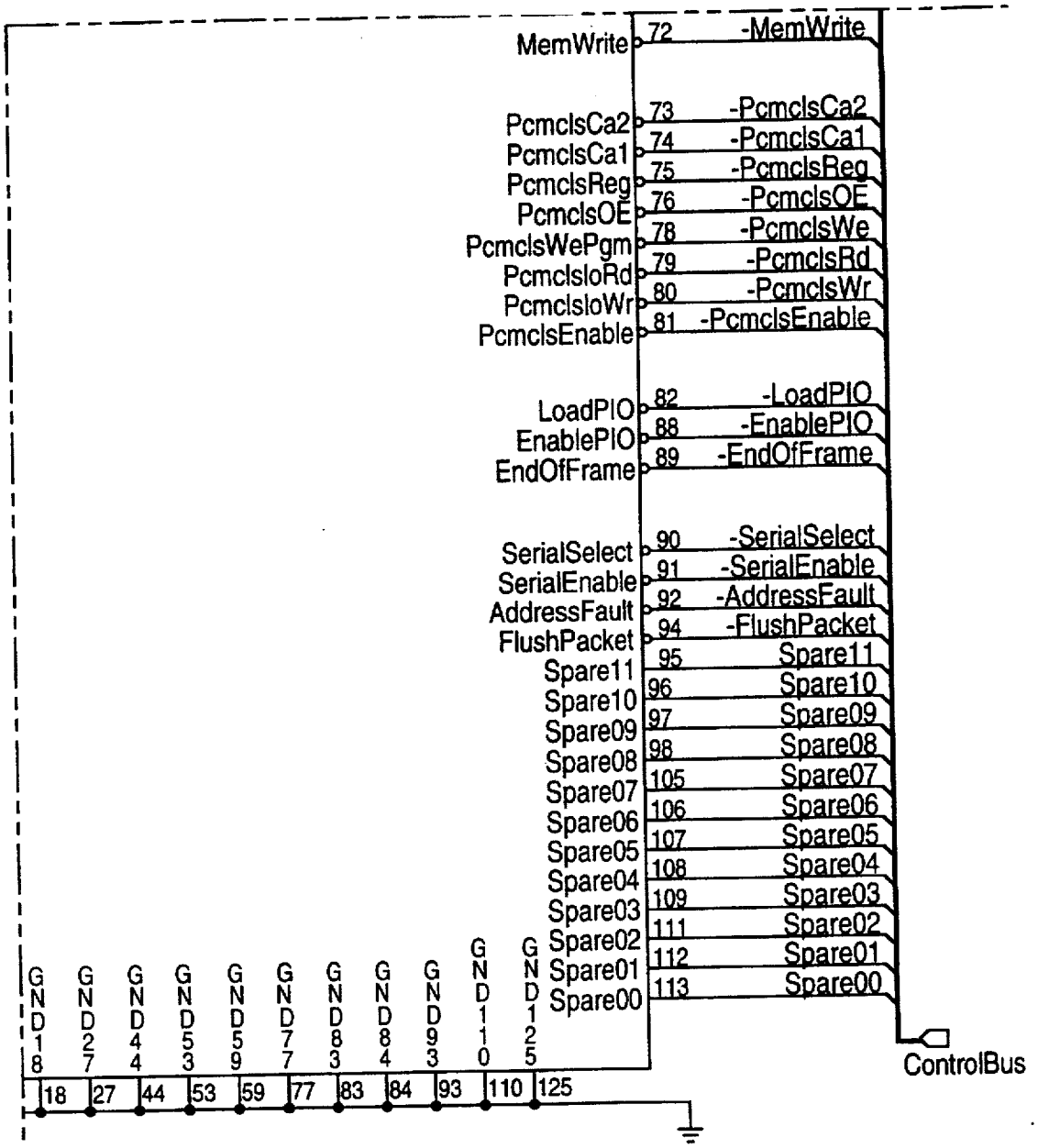
FIG. 40C(4)

| FIG. 40D(1) | FIG. 40D(2) |
|---|---|
| FIG. 40D(3) | FIG. 40D(4) |

FIG. 40D

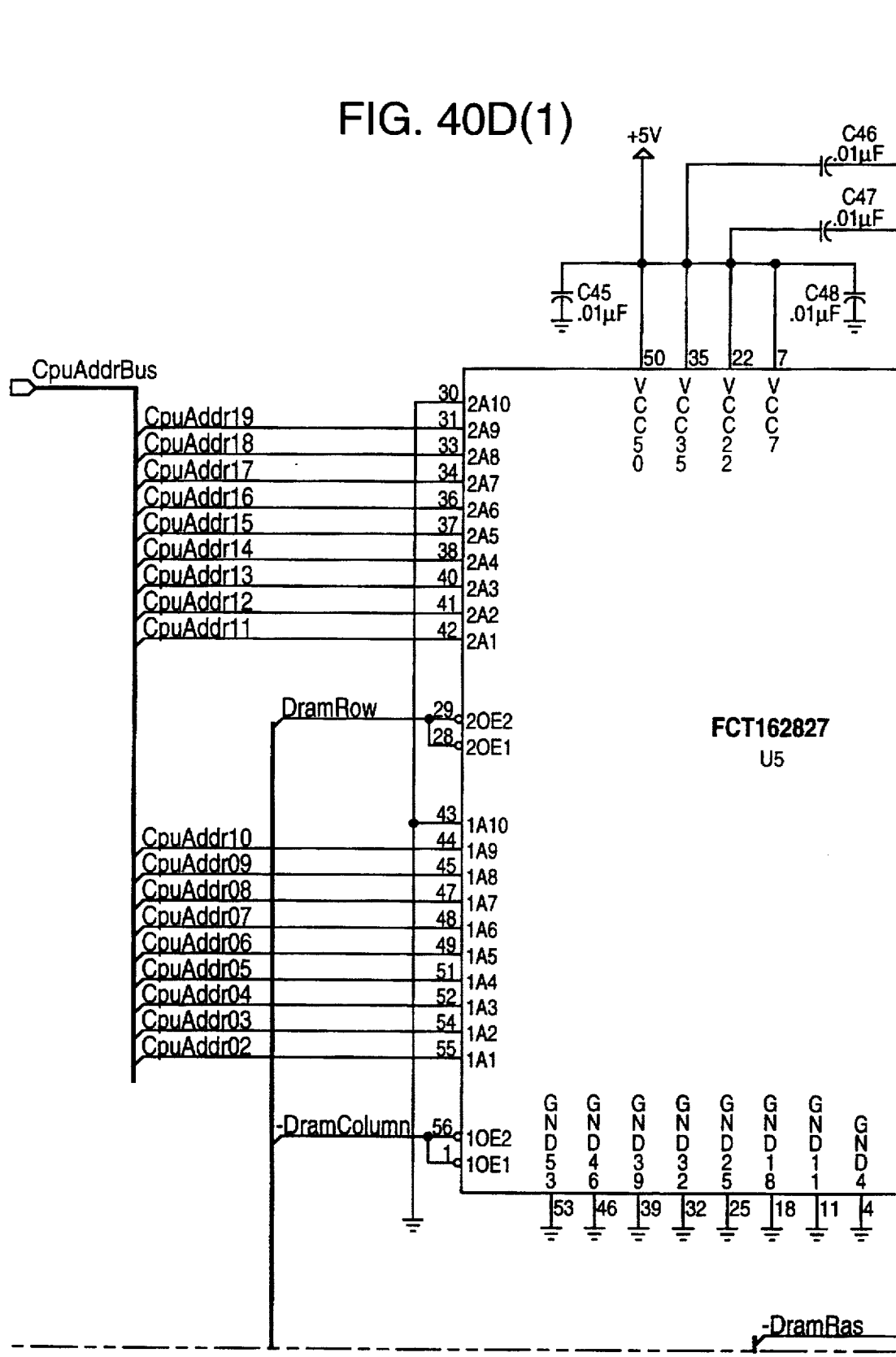
FIG. 40D(1)

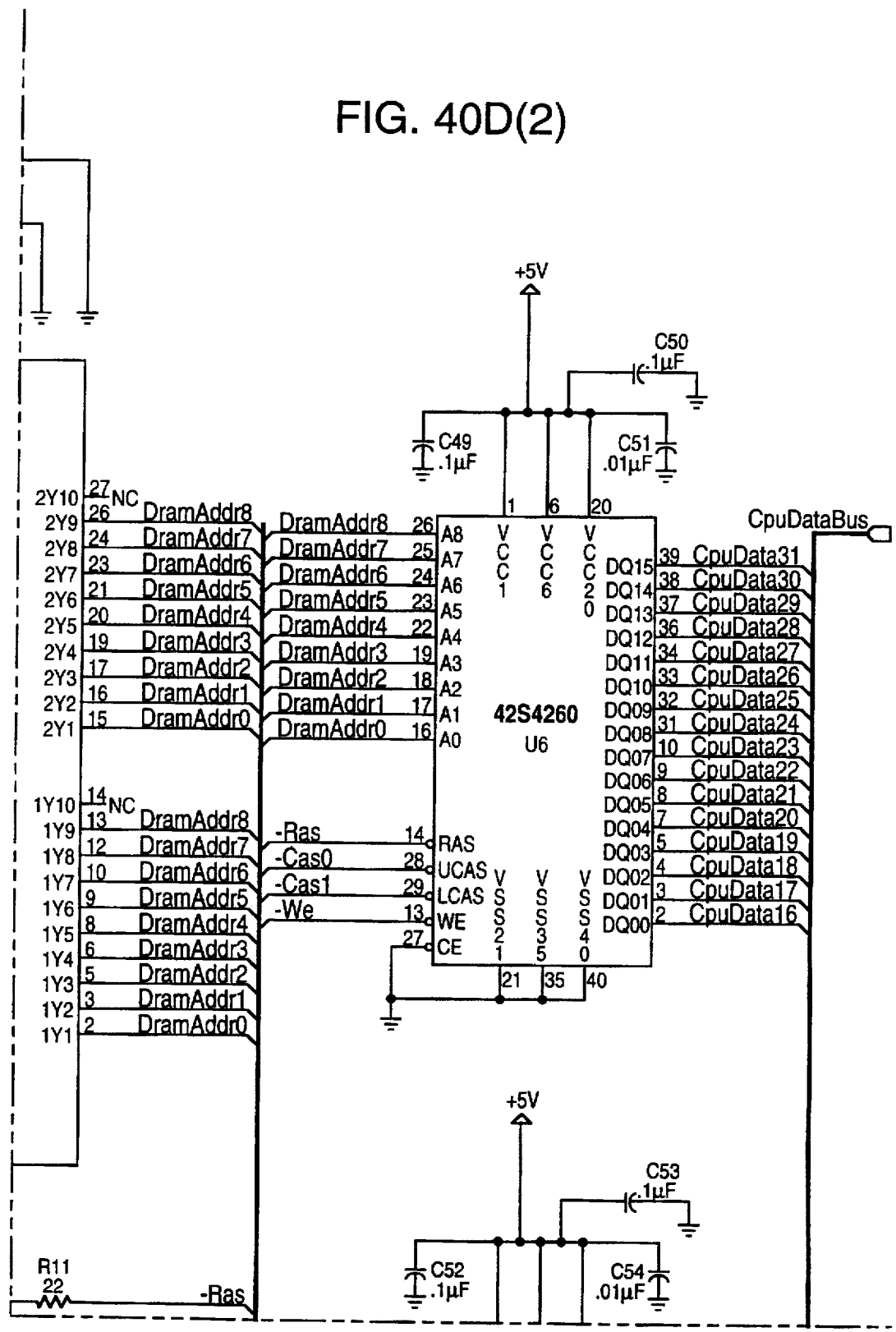
FIG. 40D(2)

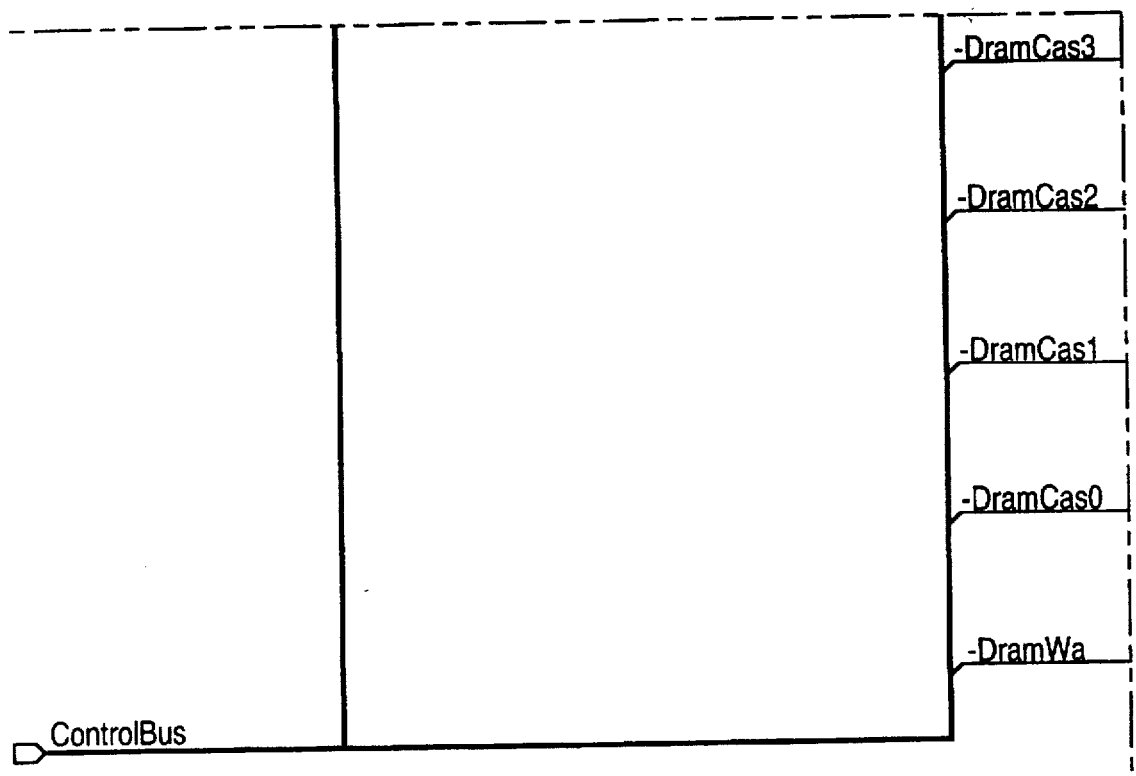
FIG. 40D(3)

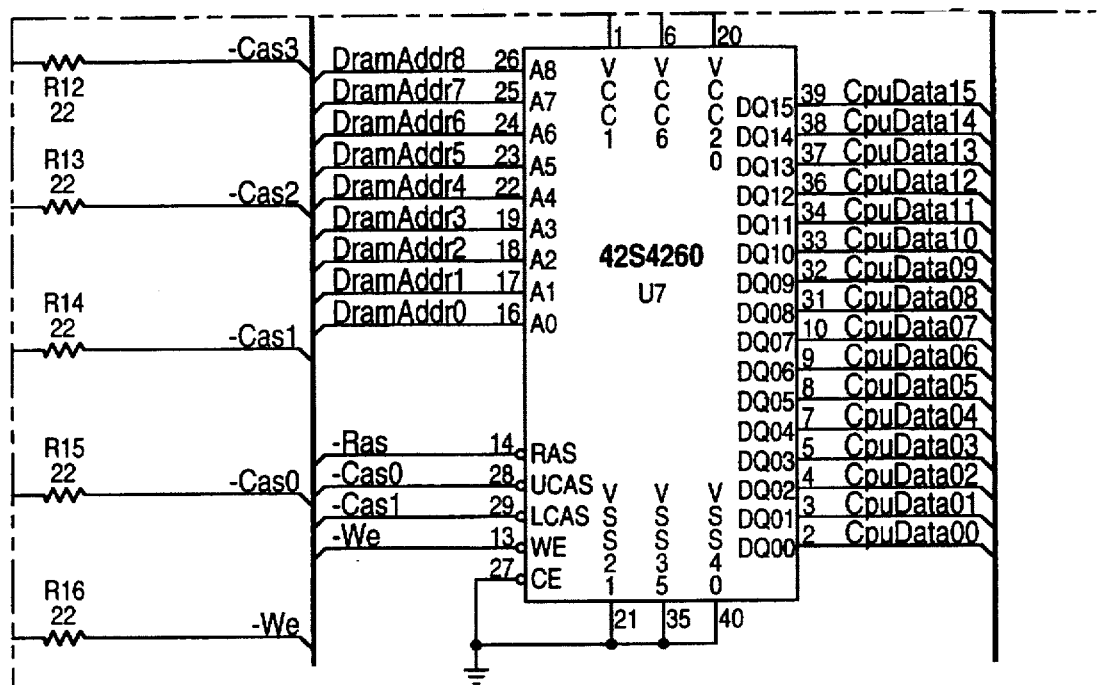
FIG. 40D(4)

FIG. 40E(1)
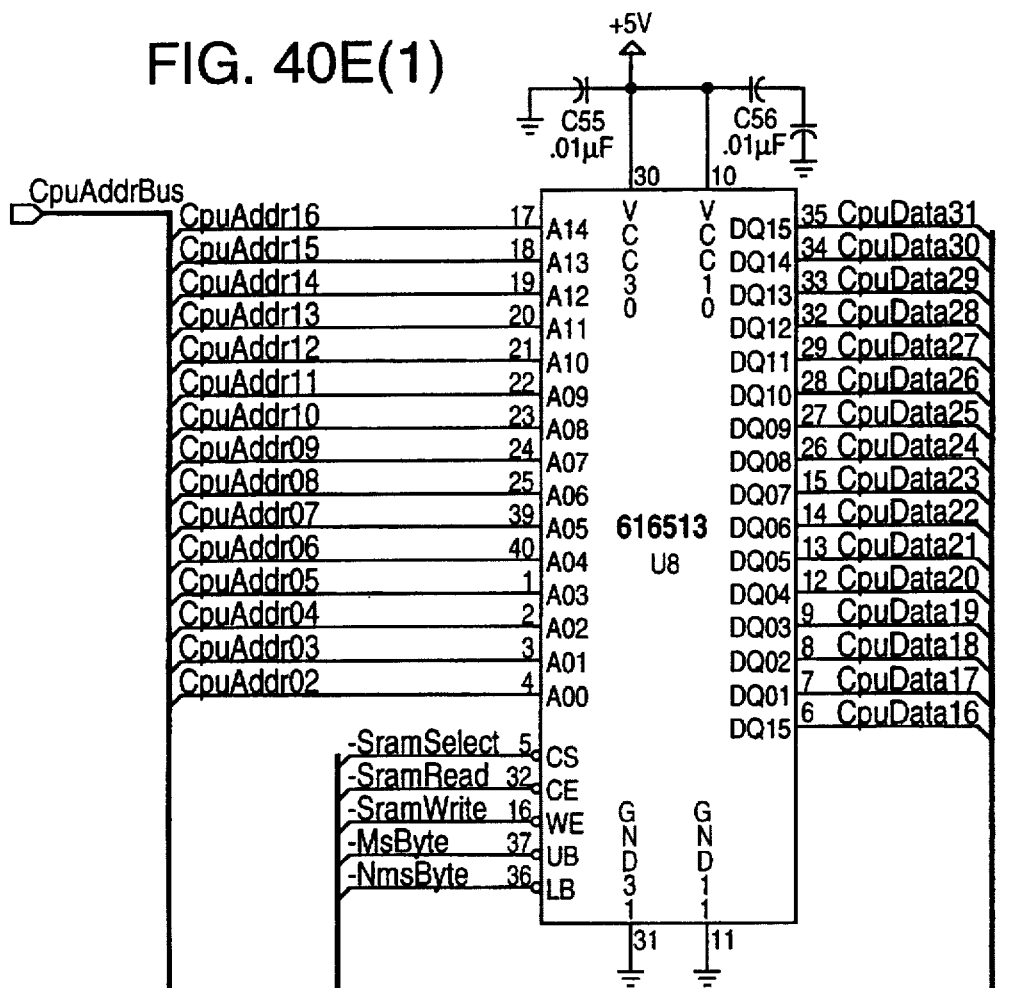

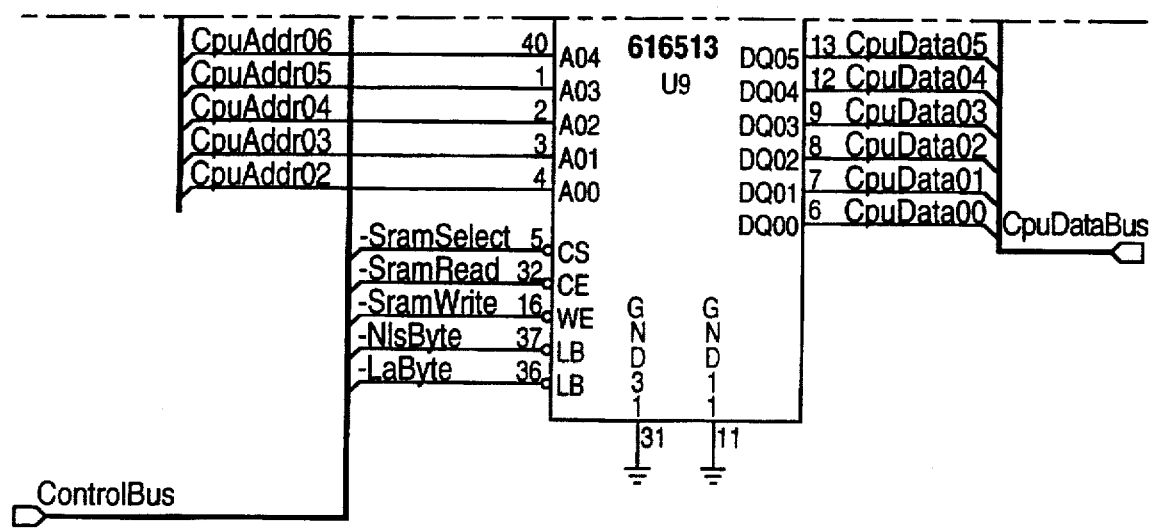
FIG. 40E(2)

| FIG. 40F(1) | FIG. 40F(2) | FIG. 40F(3) |
|---|---|---|
| FIG. 40F(4) | FIG. 40F(5) | FIG. 40F(6) |

FIG. 40F

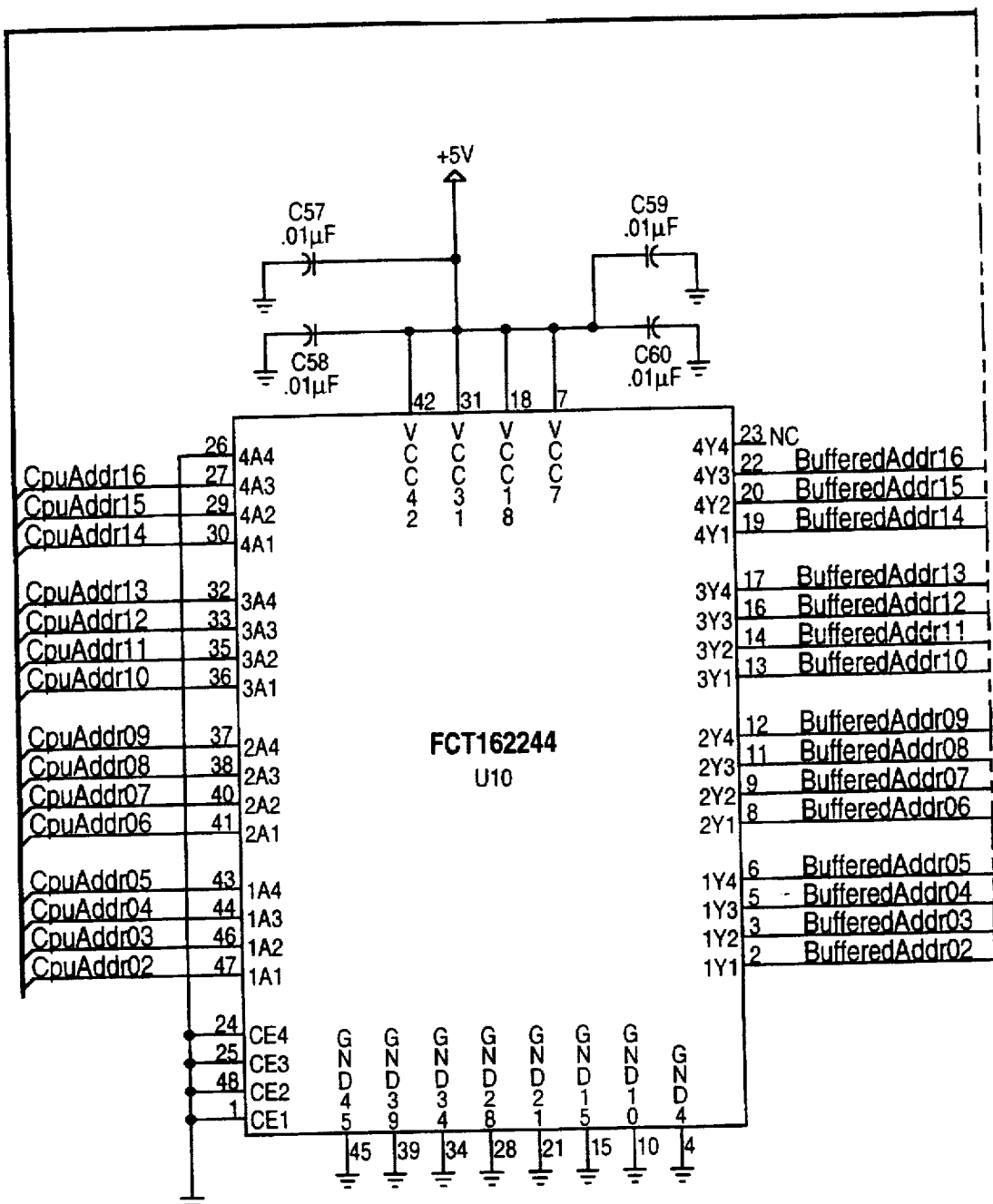
FIG. 40F(1)

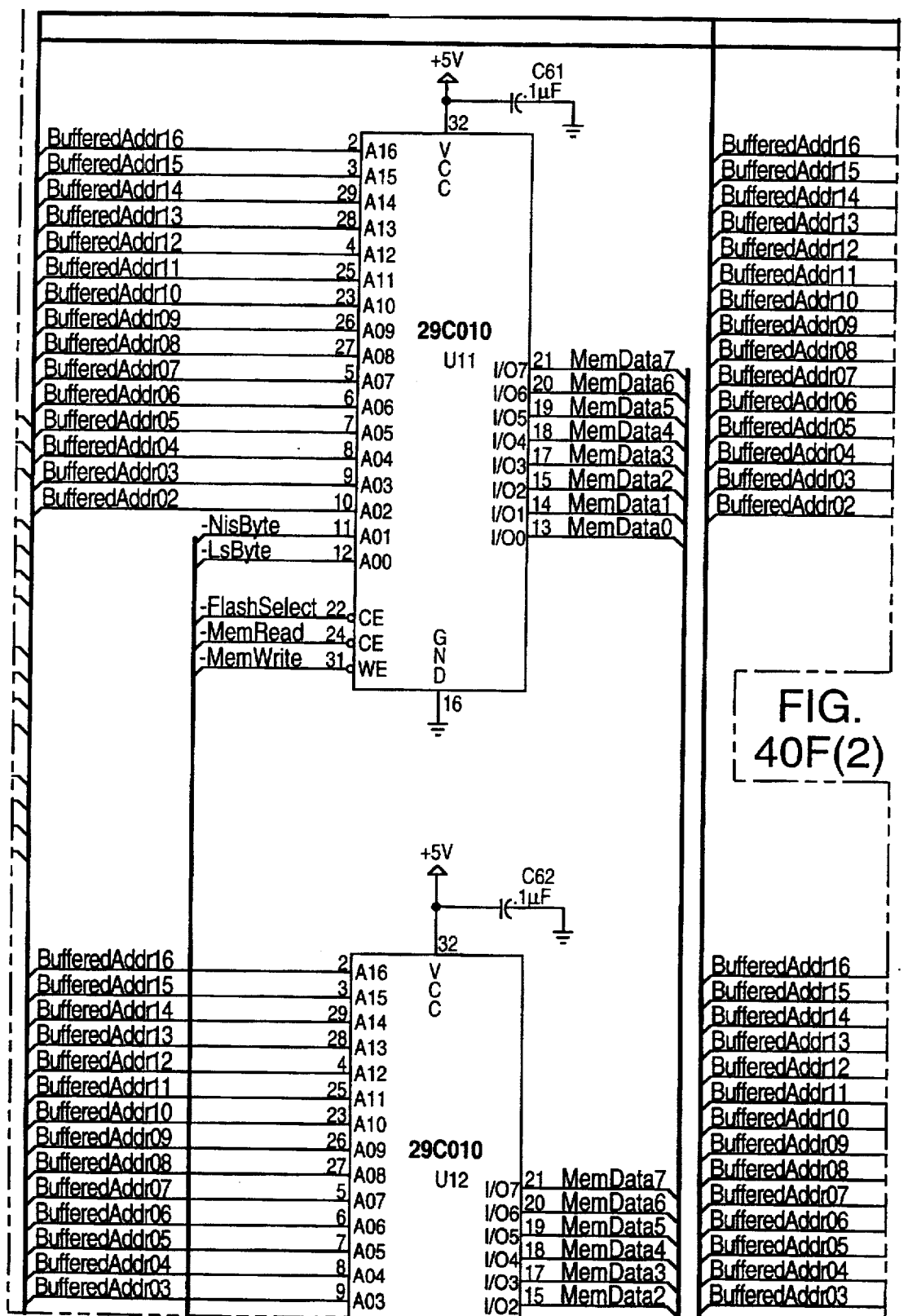

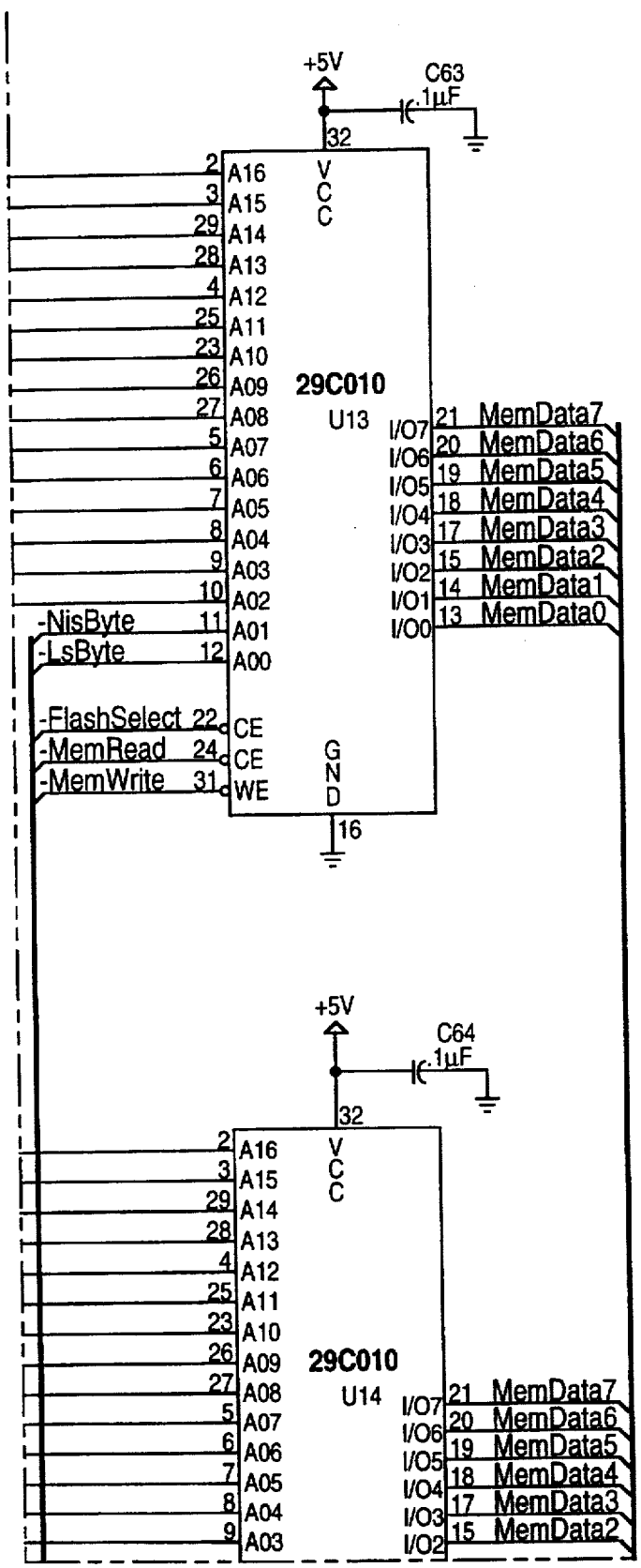
FIG. 40F(3)

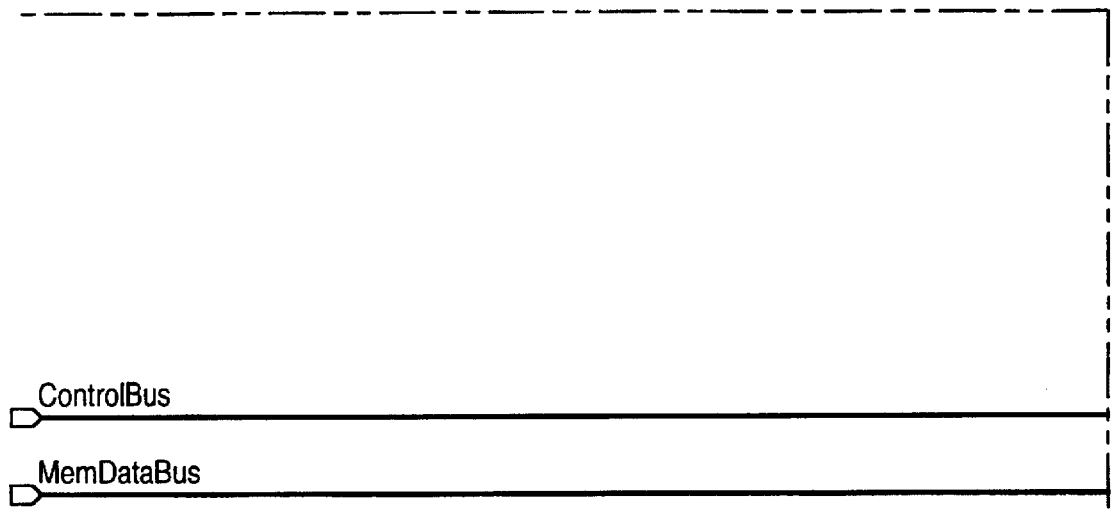
FIG. 40F(4)

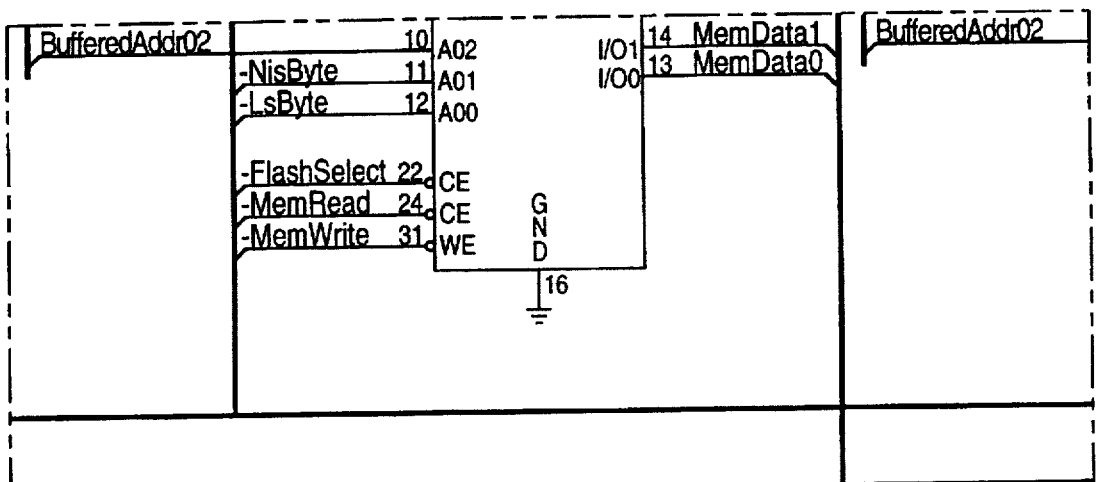
FIG. 40F(5)

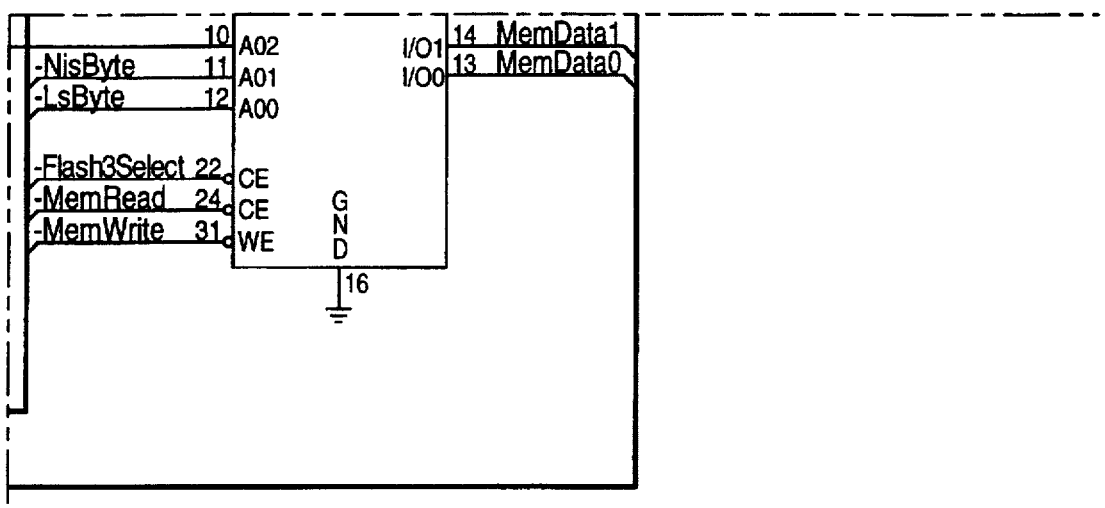
FIG. 40F(6)

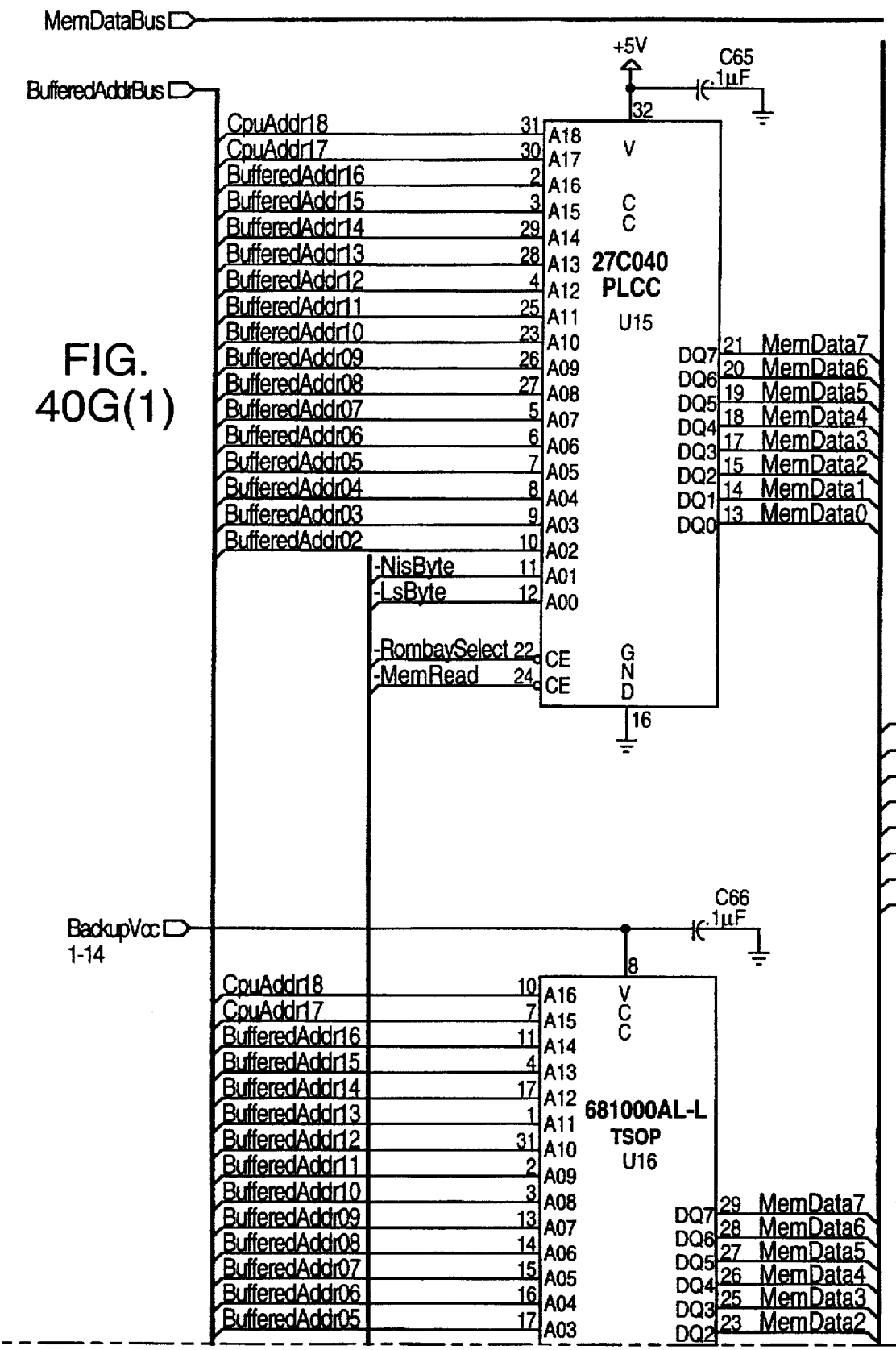
FIG. 40G(1)

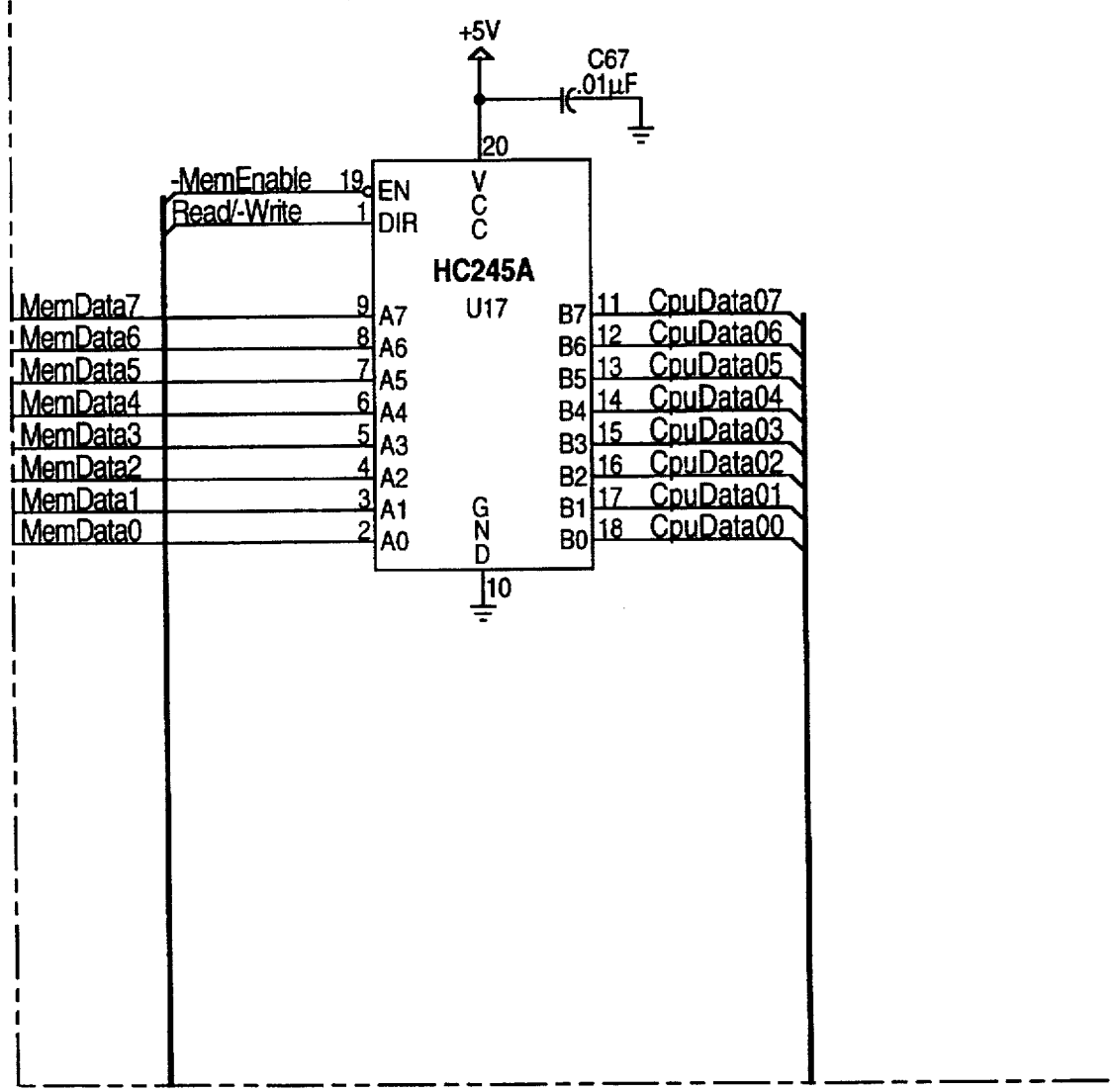
FIG. 40G(2)

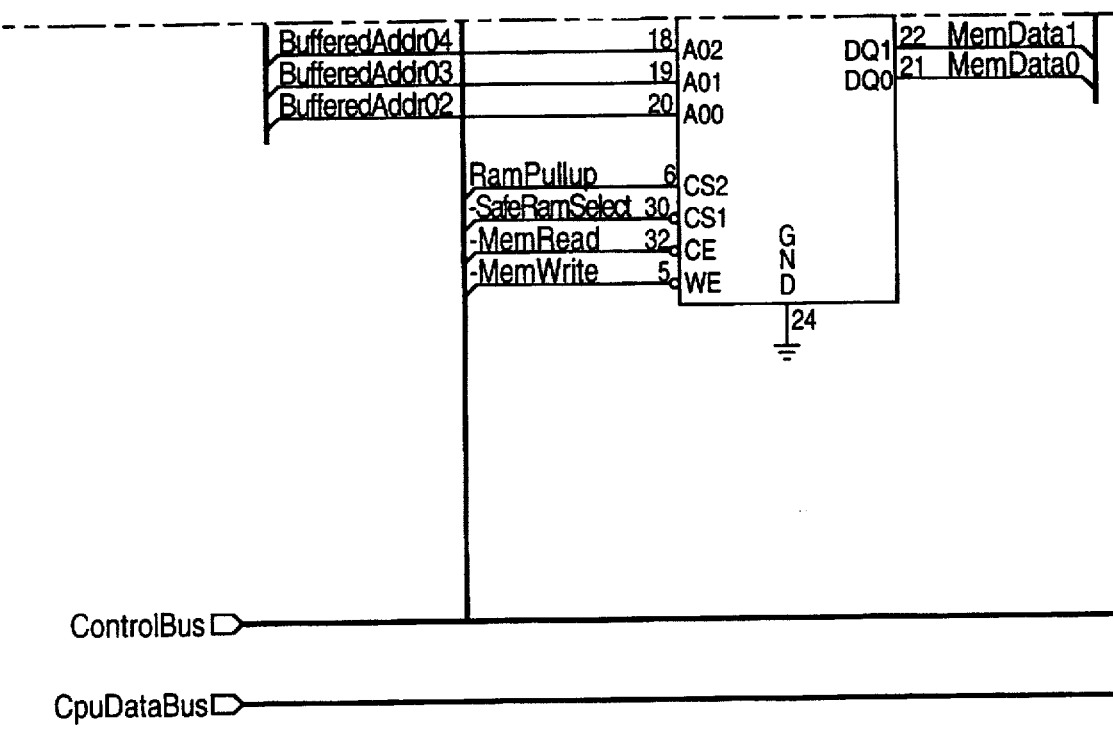
FIG. 40G(3)

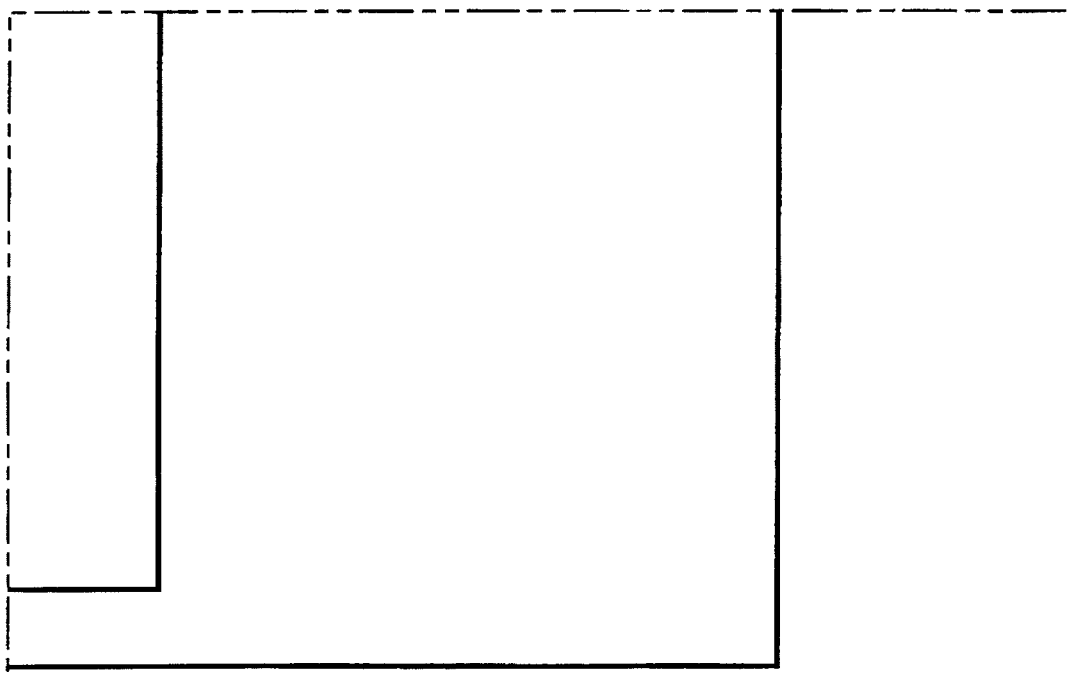
FIG. 40G(4)

| FIG. 40H(1) | FIG. 40H(2) | FIG. 40H(3) |
|---|---|---|
| FIG. 40H(4) | FIG. 40H(5) | FIG. 40H(6) |

FIG. 40H

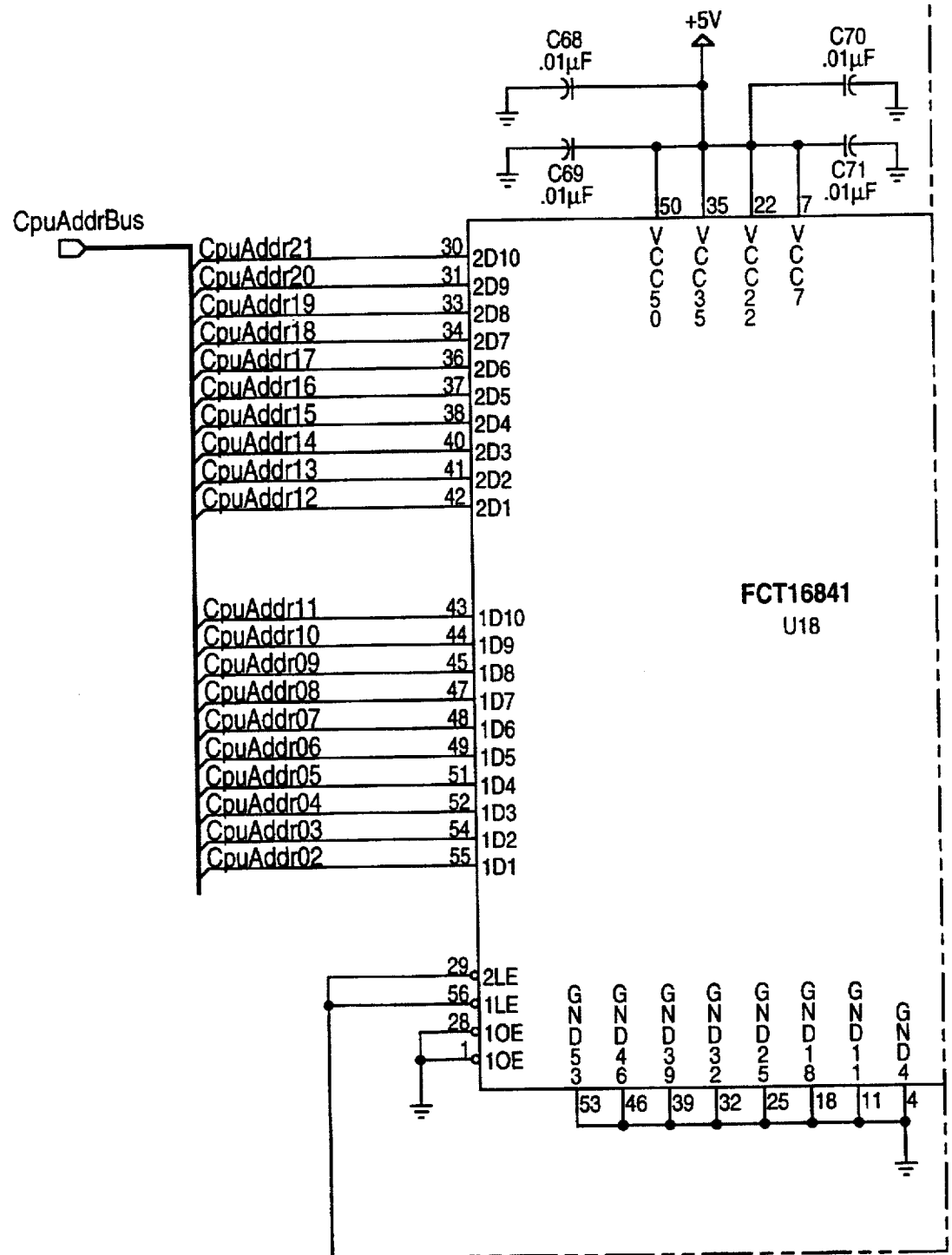
FIG. 40H(1)

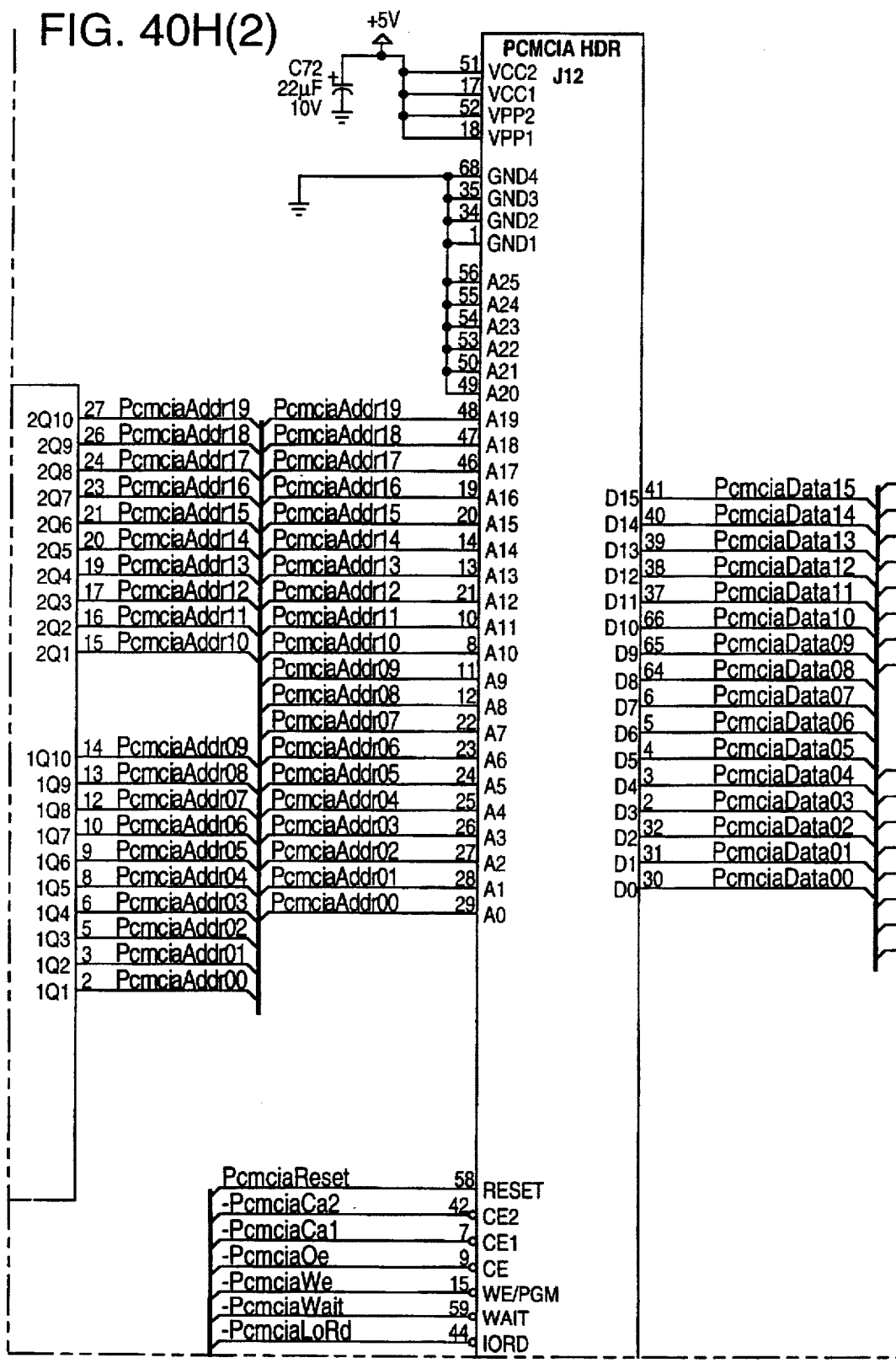
FIG. 40H(2)

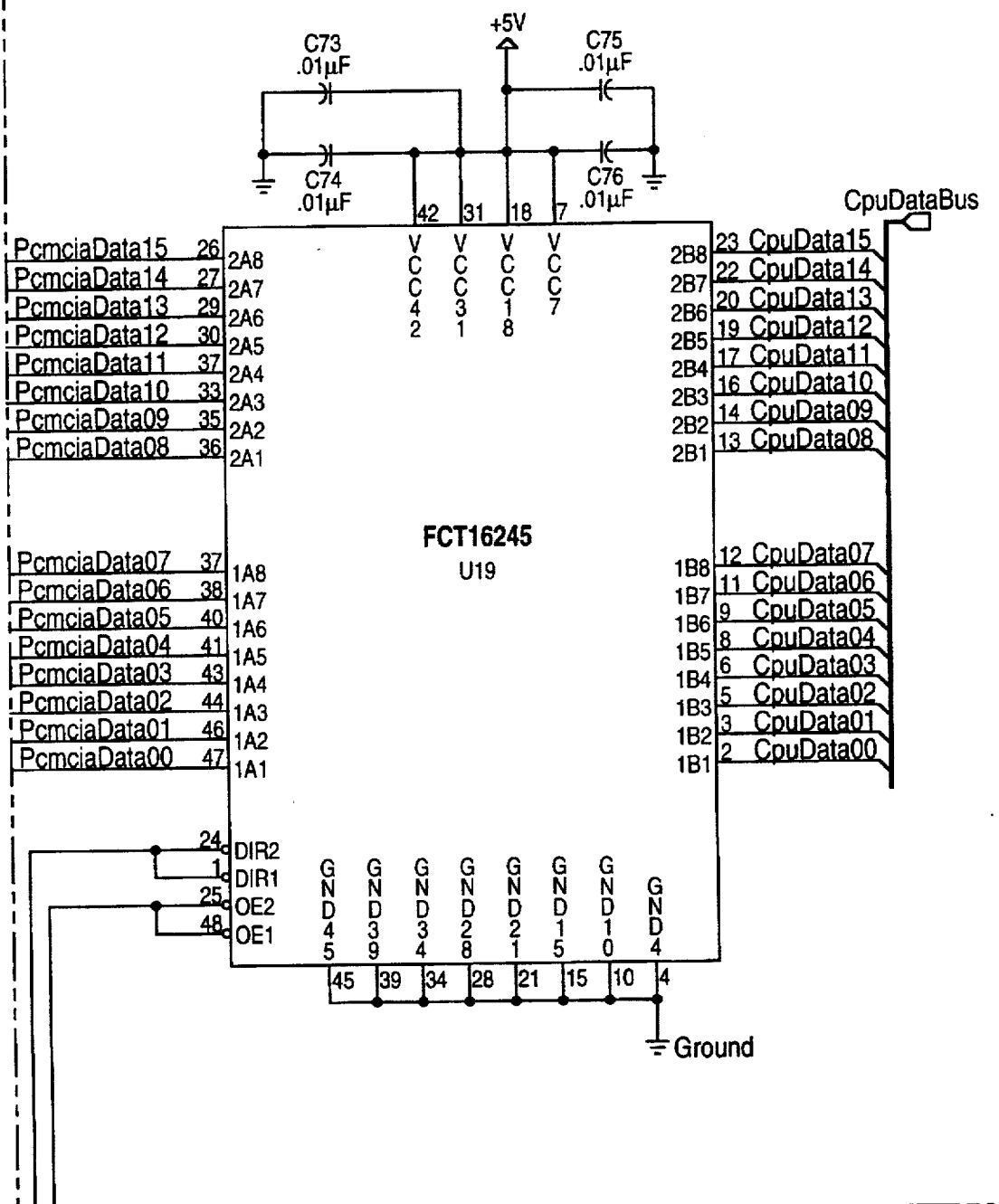
FIG. 40H(3)

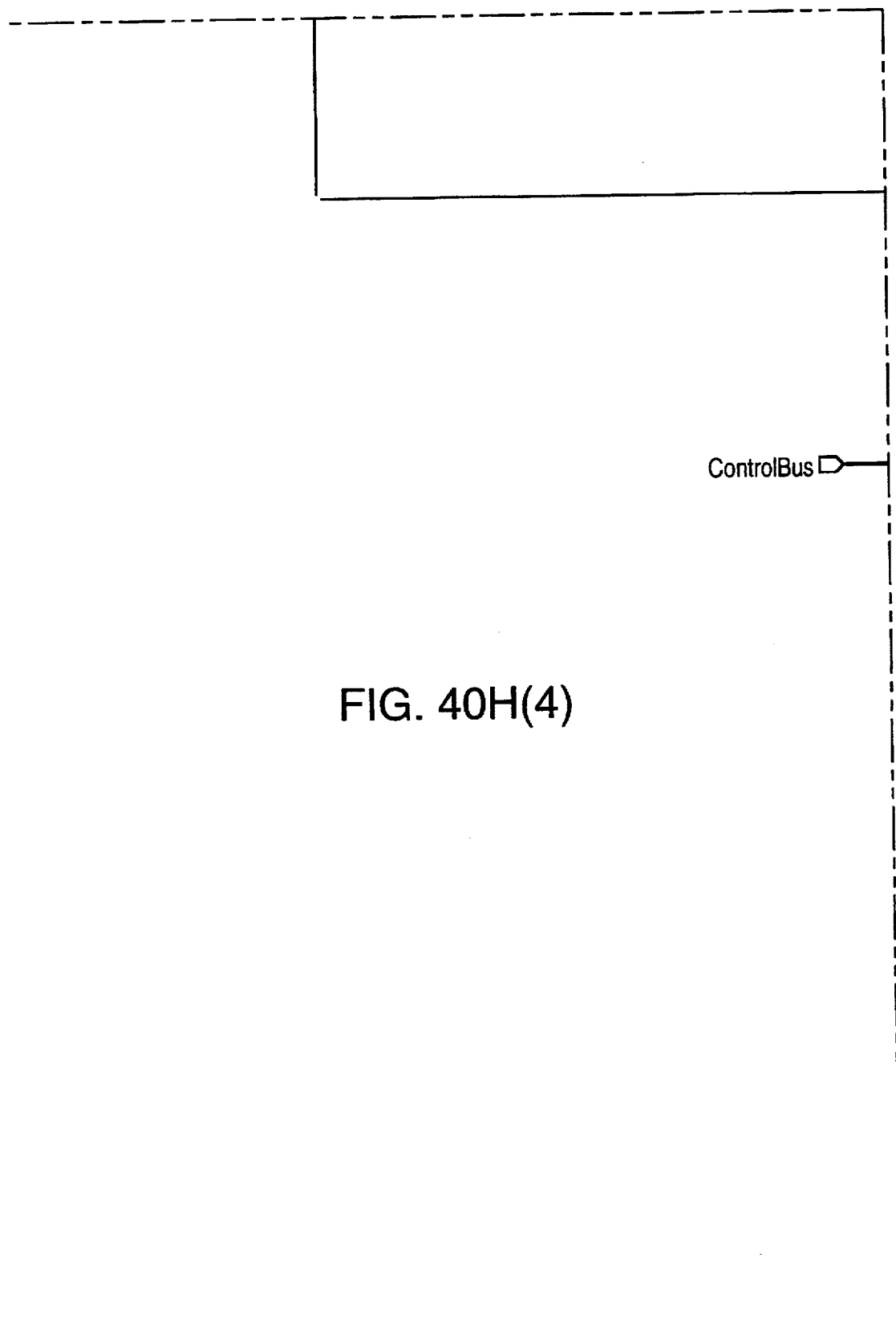
FIG. 40H(4)

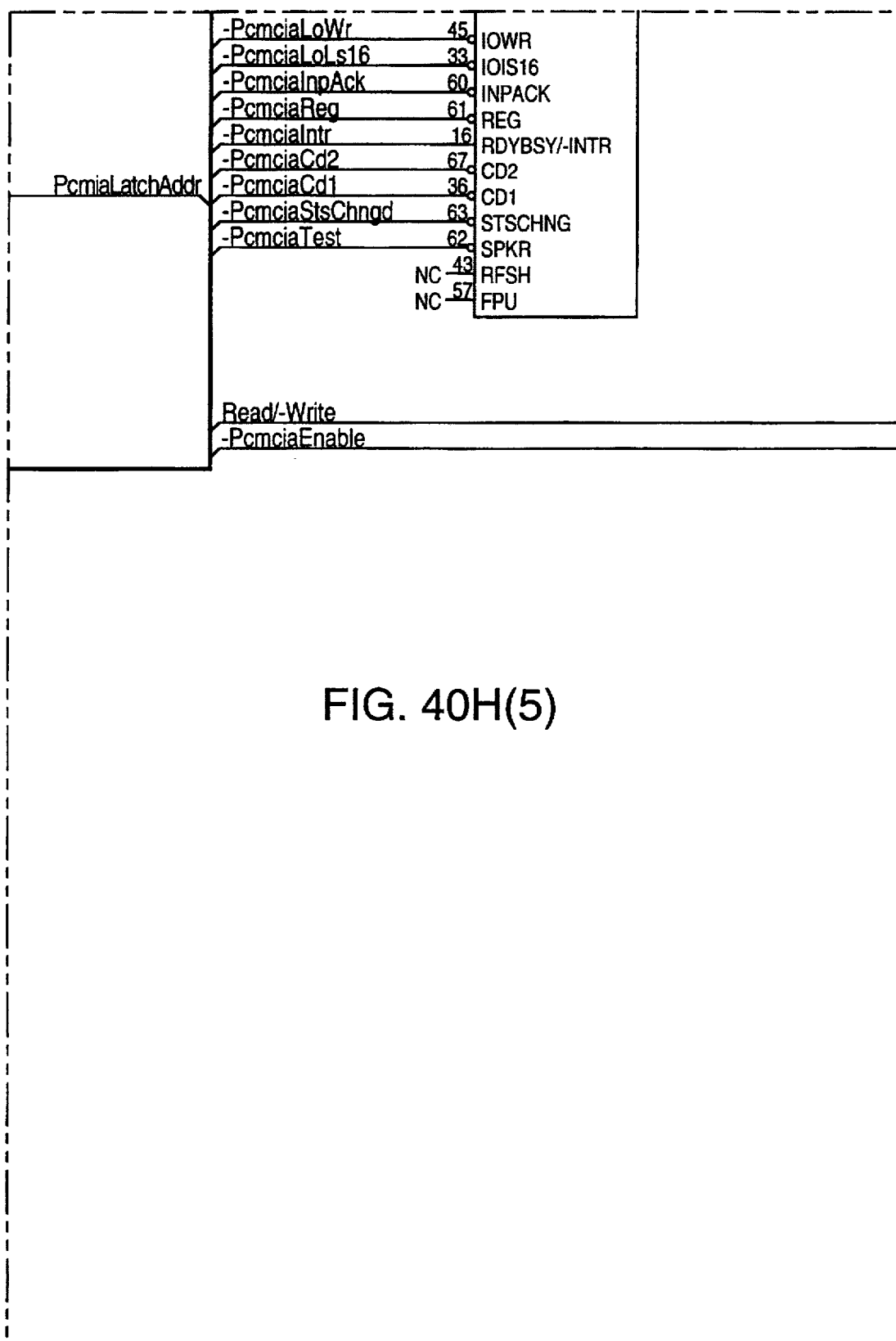
FIG. 40H(5)

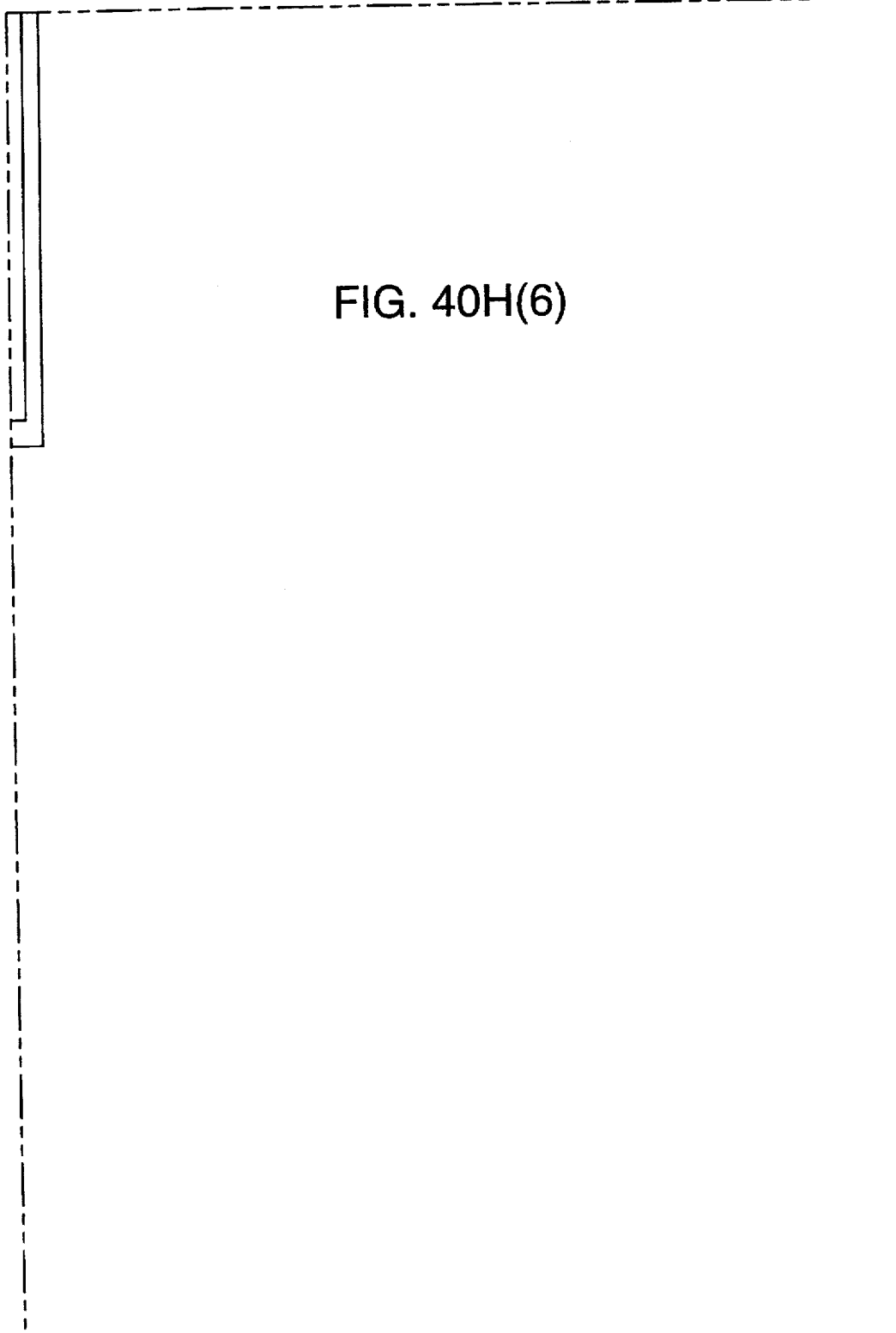
FIG. 40H(6)

| FIG. 40I(1) | FIG. 40I(2) | FIG. 40I(3) |
|---|---|---|
| FIG. 40I(4) | FIG. 40I(5) | FIG. 40I(6) |

FIG. 40I

FIG. 40I(1)
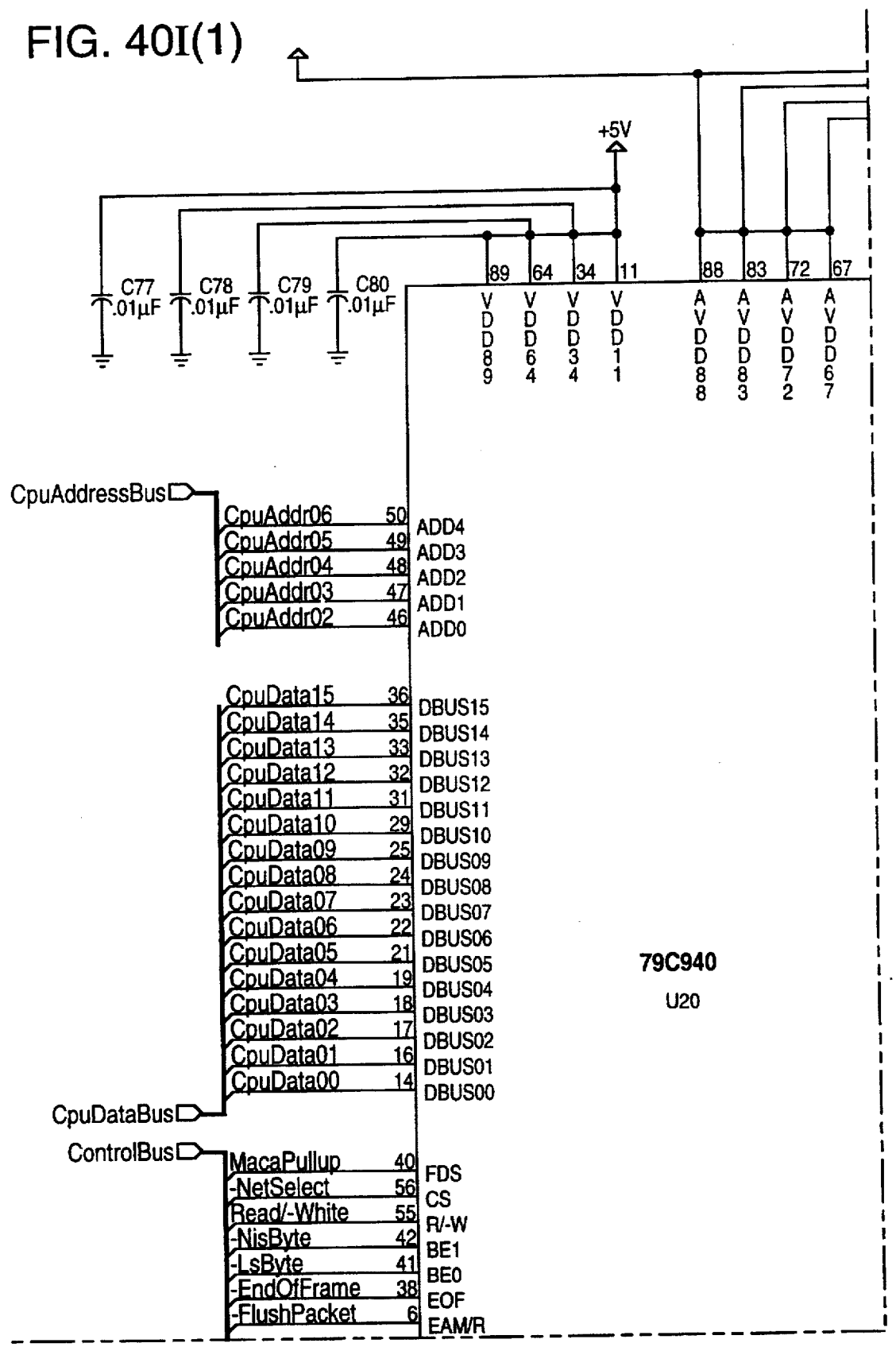

FIG. 40I(2)
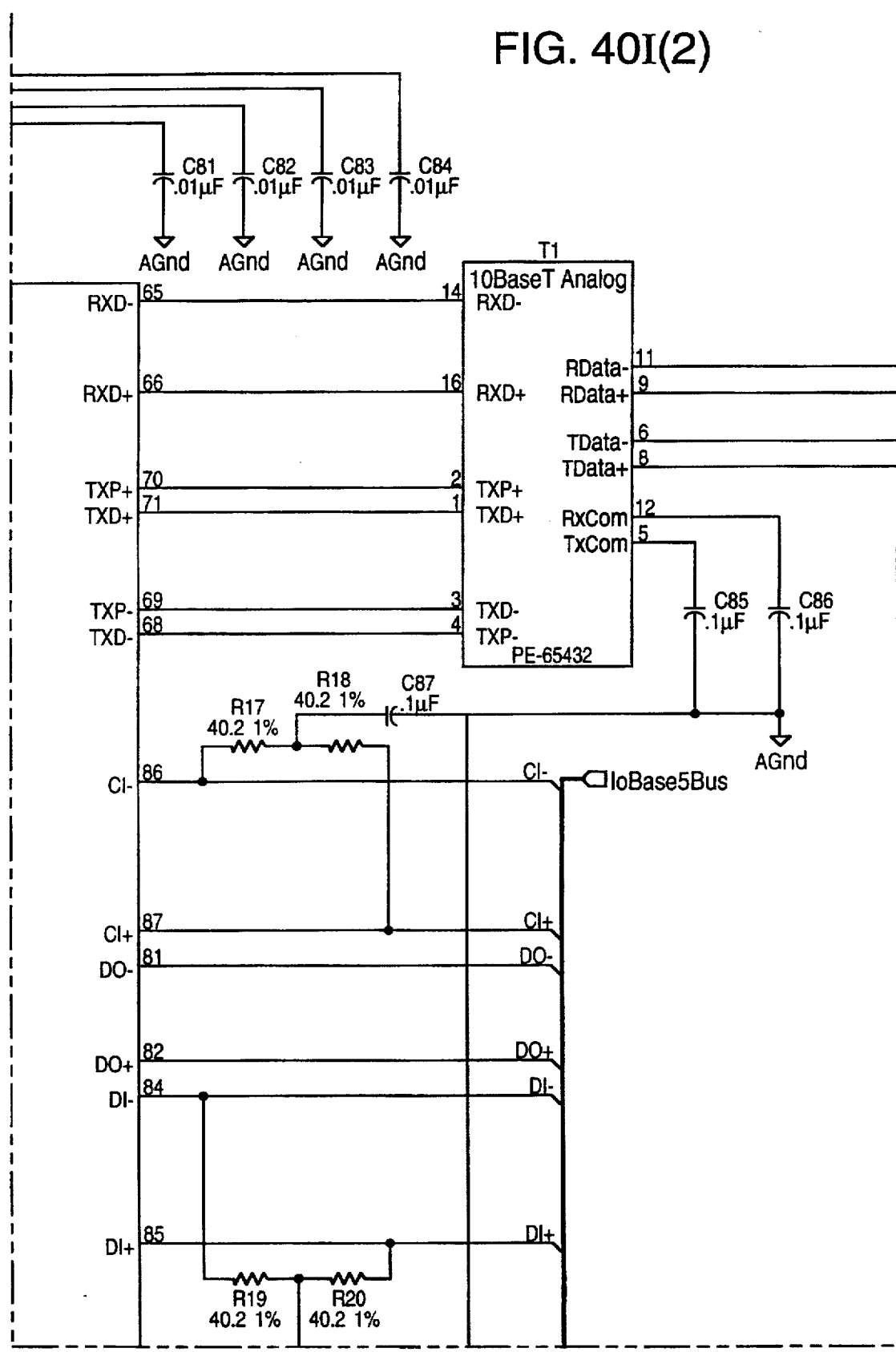

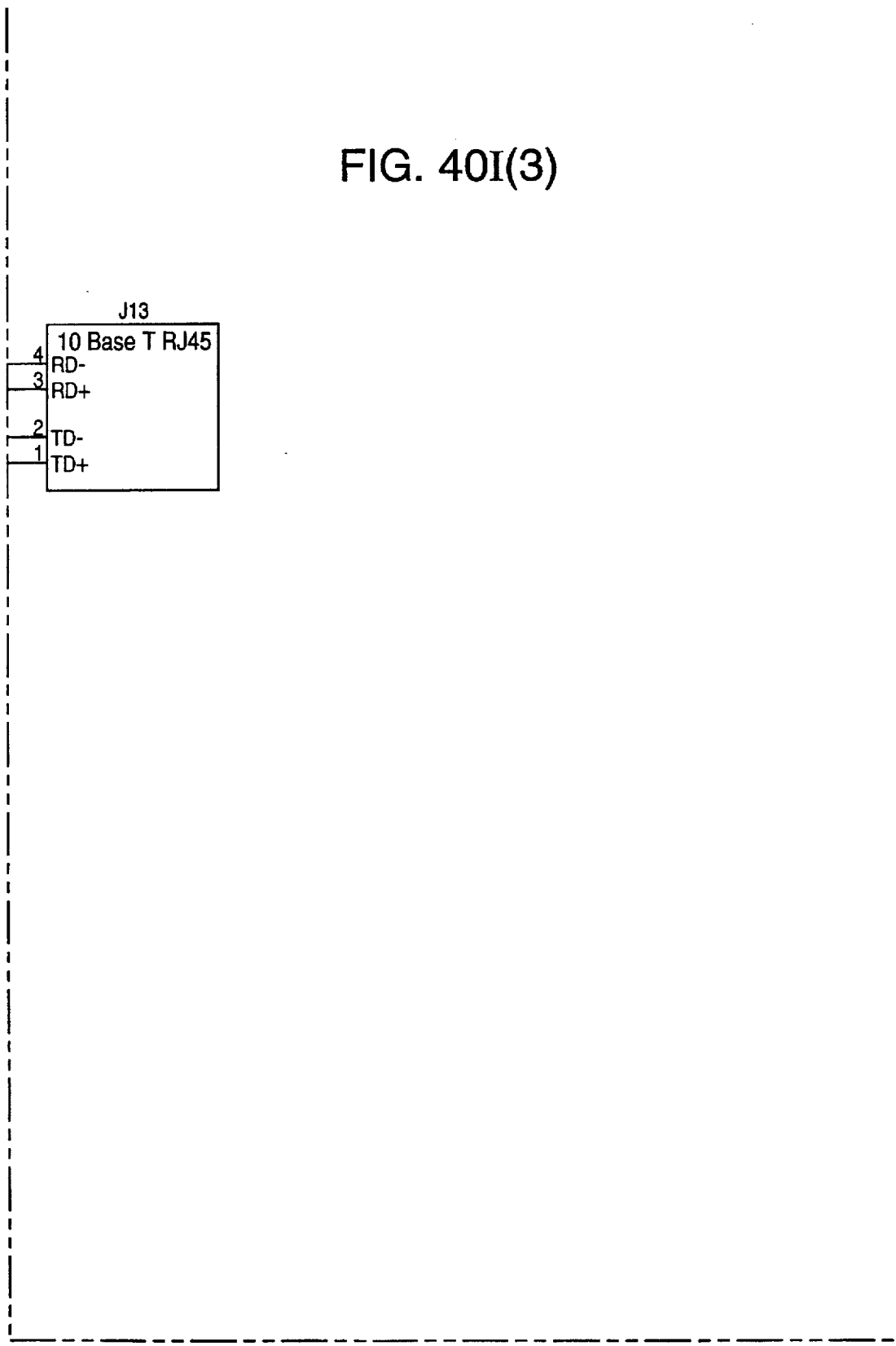
FIG. 40I(3)

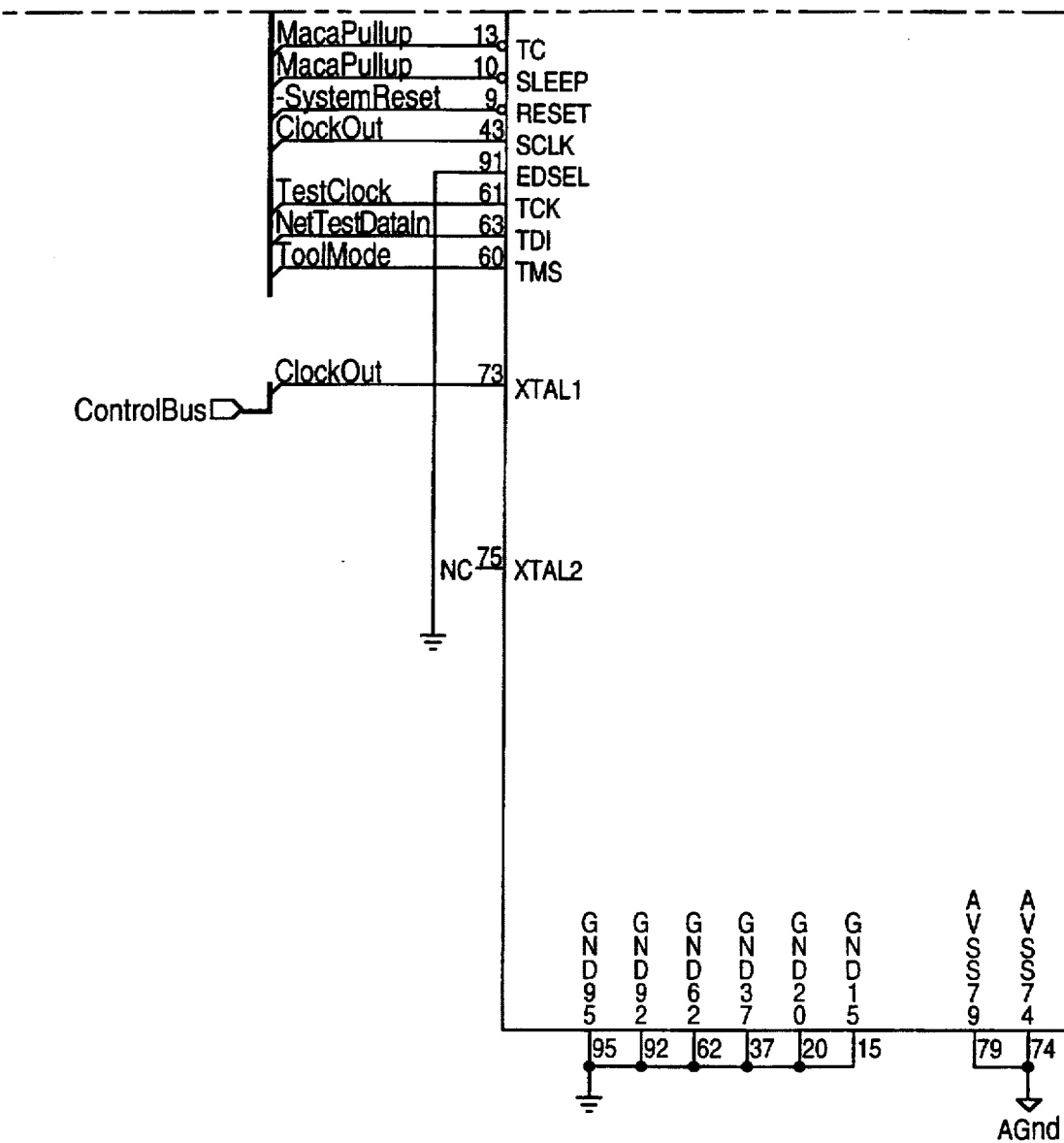
FIG. 40I(4)

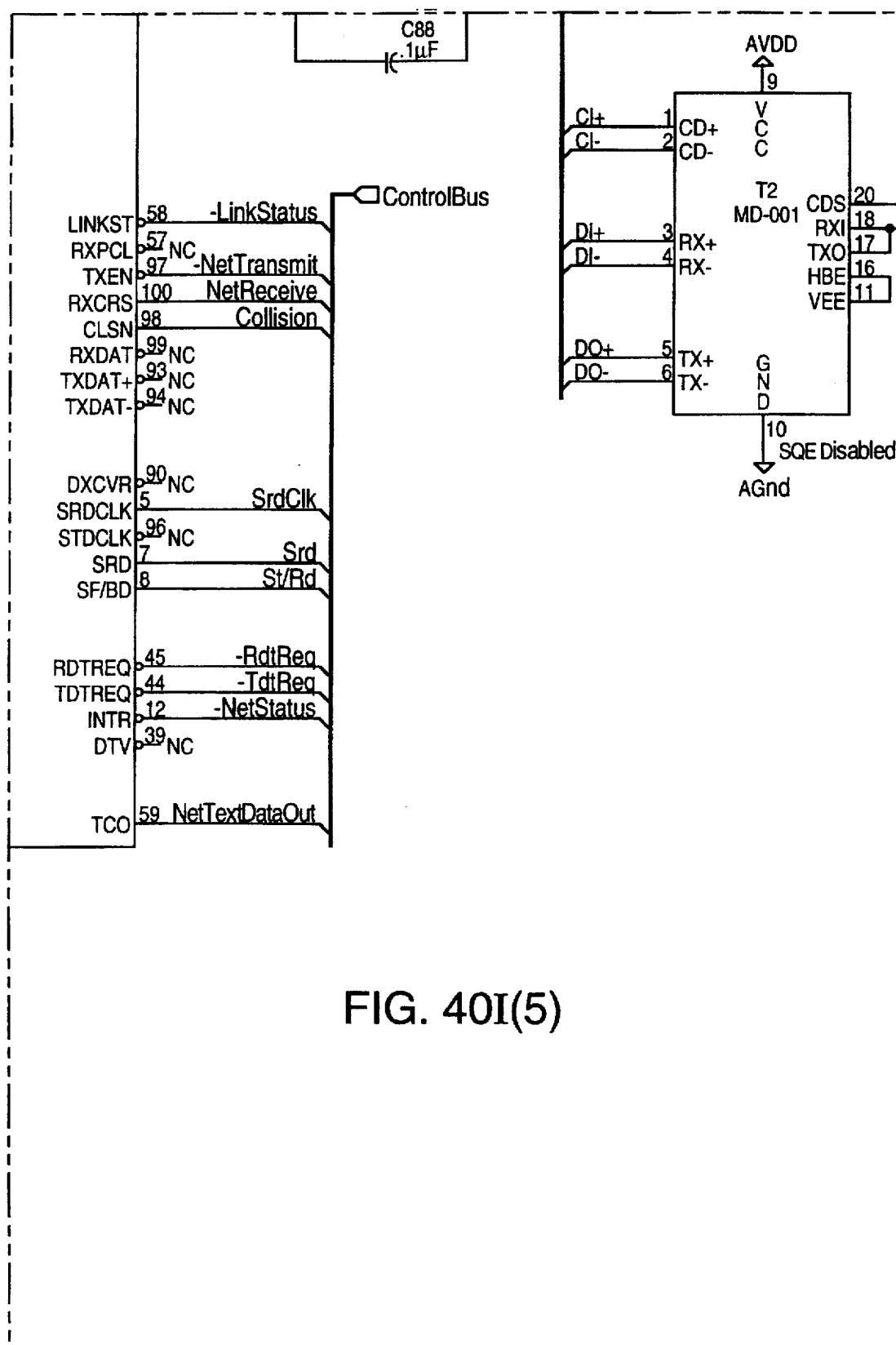
FIG. 40I(5)

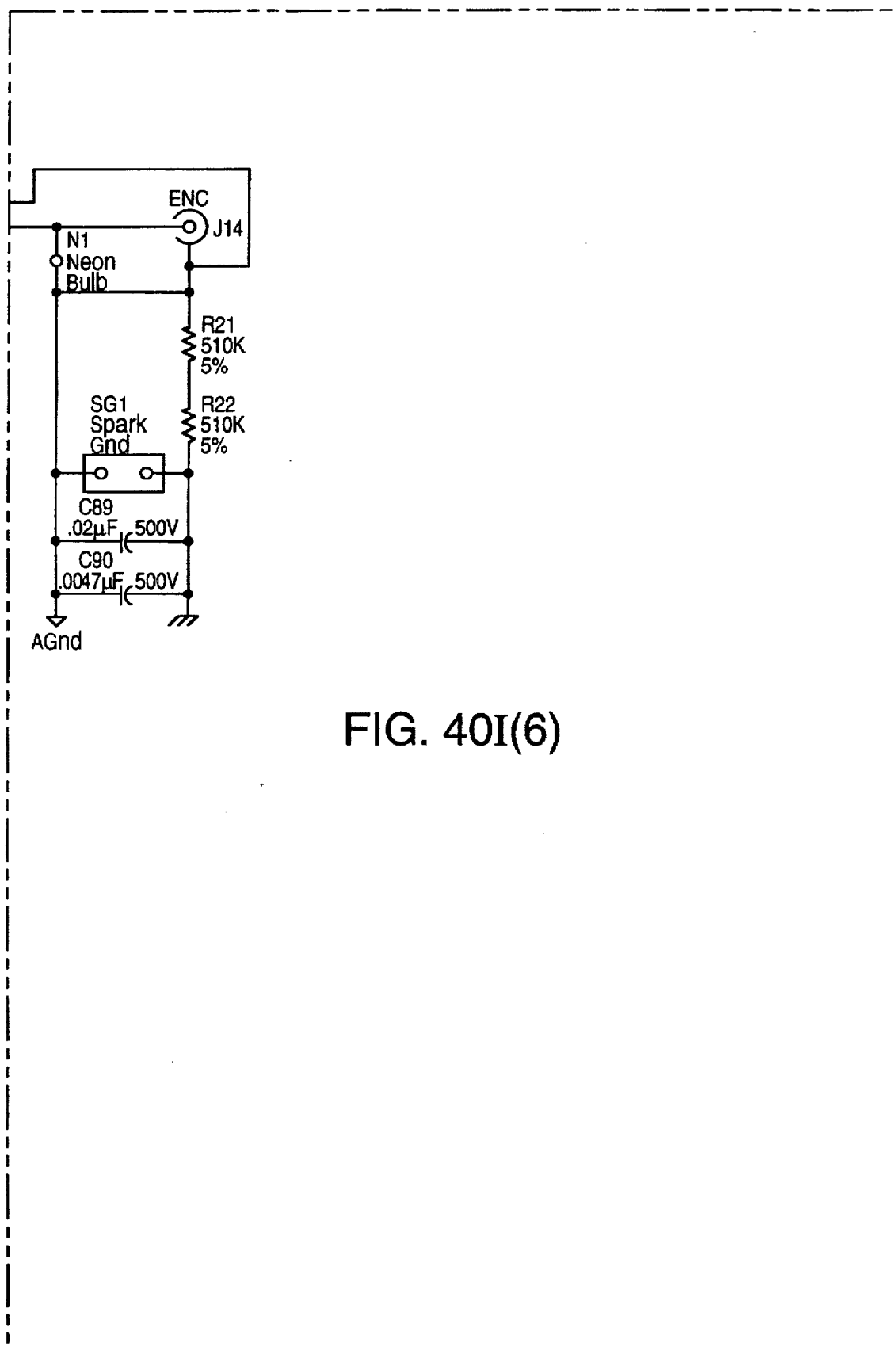
FIG. 40I(6)

| FIL. 40L(1) | FIL. 40L(2) |
|---|---|
| FIL. 40L(3) | FIL. 40L(4) |

FIG. 40L

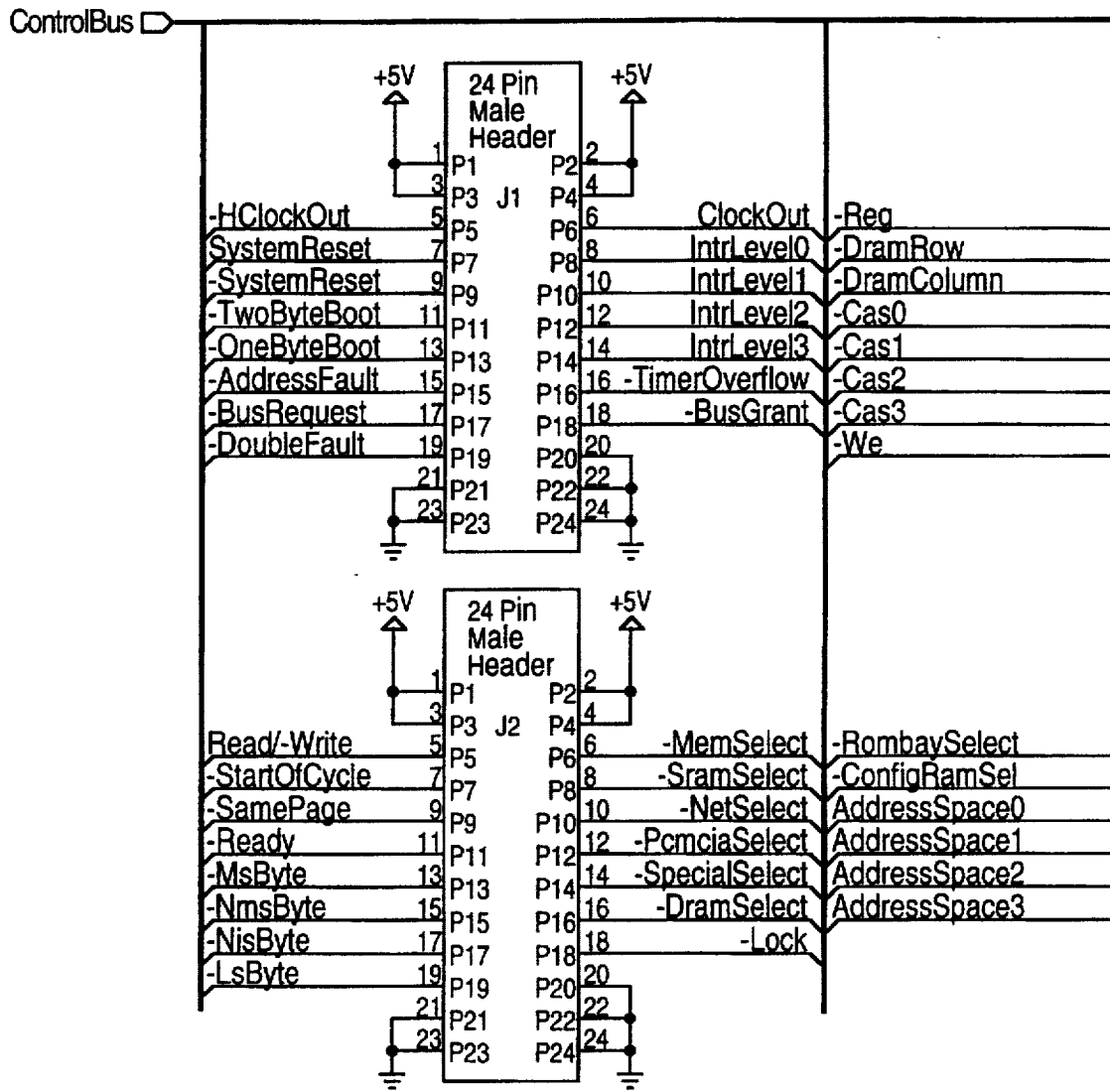
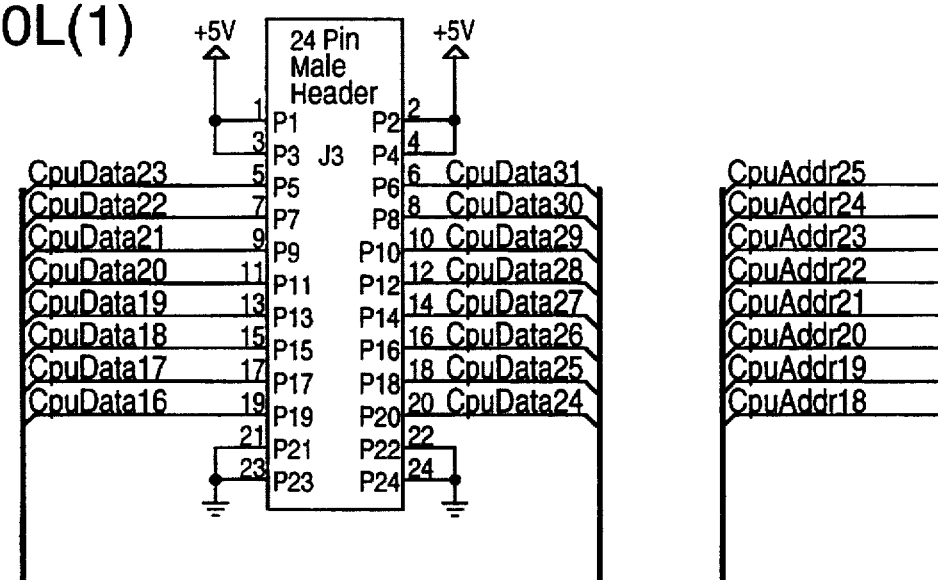
FIG. 40L(1)

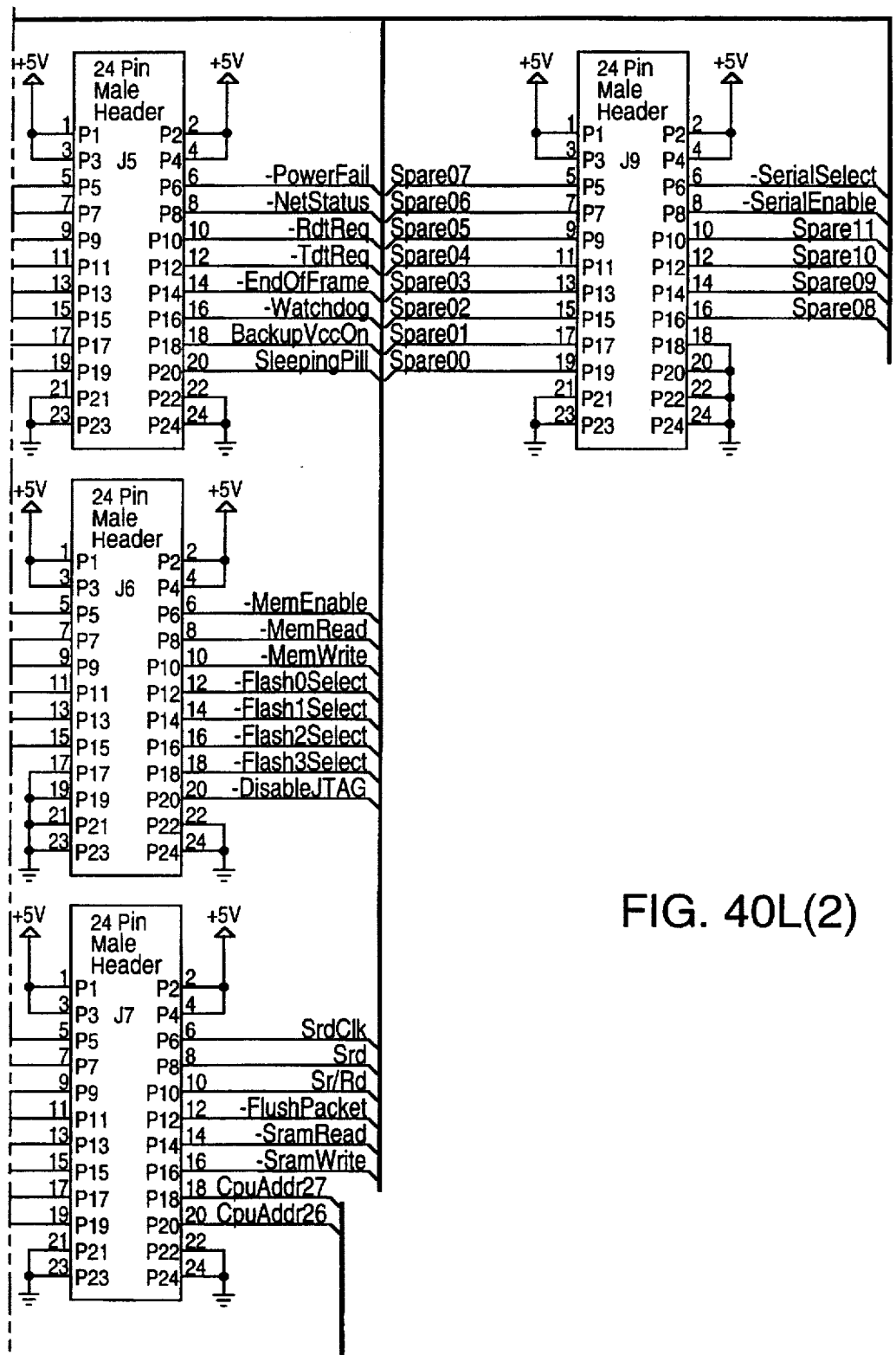
FIG. 40L(2)

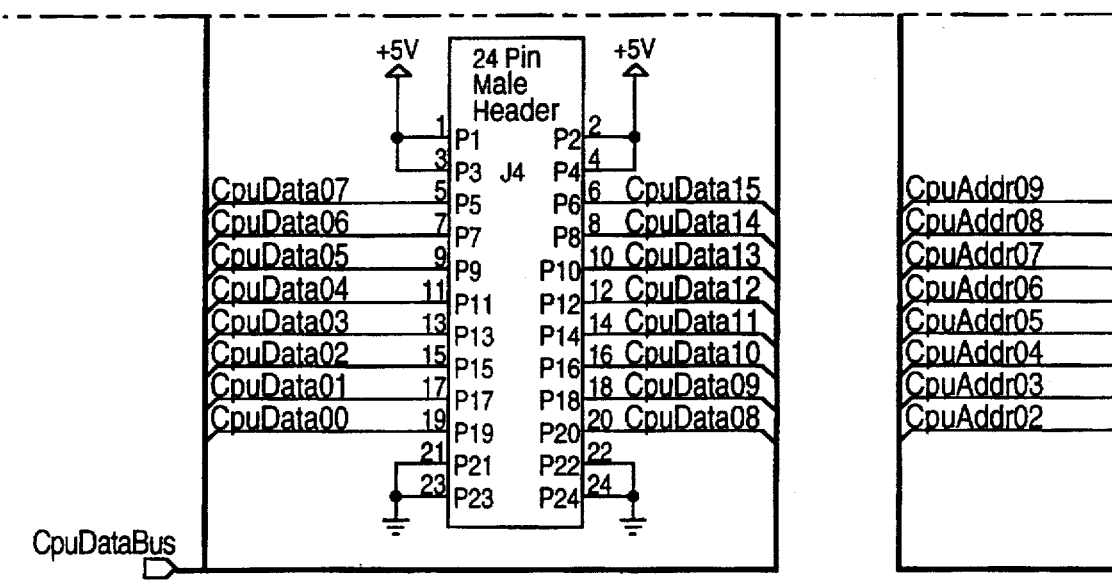
FIG. 40L(3)

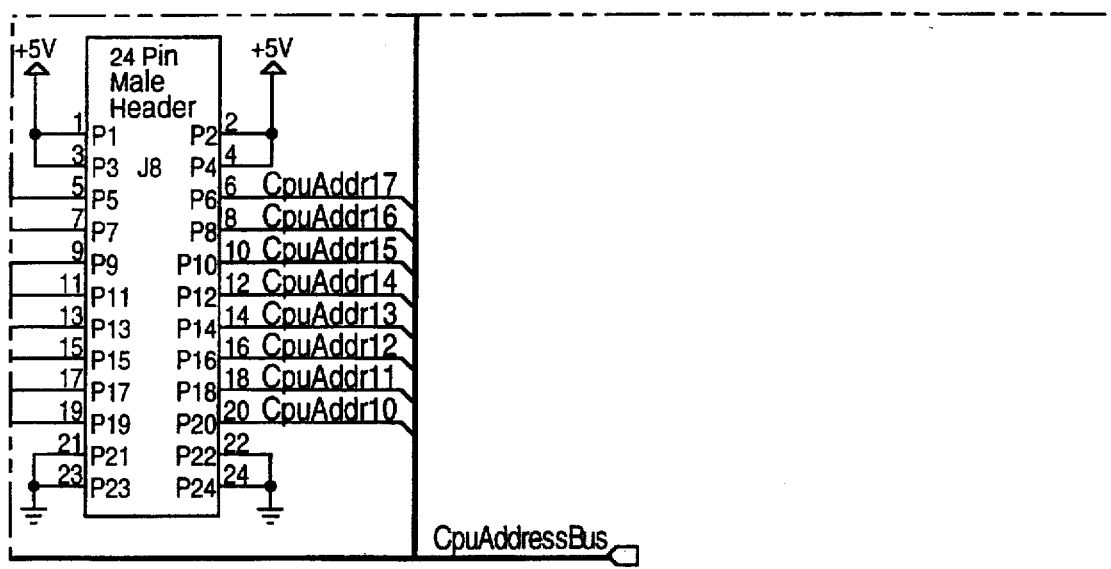
FIG. 40L(4)

AD HOC INITIALIZATION FOR WIRELESS LOCAL AREA NETWORK

This application is a division of application Ser. No. 08/082,313, filed Jun. 25, 1993 now abandoned.

MICROFICHE APPENDIX

Microfiche Appendix A, which is part of the present disclosure, is a microfiche appendix of two sheets of microfiche having a total of 123 frames. Microfiche Appendix A is a listing of software executed in a mobile unit in accordance with one embodiment of the present invention.

Microfiche Appendix B, which is part of the present disclosure, is a microfiche appendix of one sheet of microfiche having a total of 63 frames. Microfiche Appendix B is a hierarchical schematic of a radio controller ASIC of a mobile unit in accordance with one embodiment of the present invention.

Microfiche Appendix C, which is part of the present disclosure, is a microfiche appendix of six sheets of microfiche having a total of 588 frames. Microfiche Appendix C is a listing of software executing in an access point unit in accordance with one embodiment of the present invention.

A portion of the disclosure of this patent document contains material which is subject to copyright protection. The copyright owner has no objection to the facsimile reproduction by anyone of the patent documents or patent disclosure, as it appears in the Patent and Trademark Office patent files or records, but otherwise reserves all copyright rights whatsoever.

BACKGROUND OF THE INVENTION

1. Field of the Invention

This invention relates to local area networks and particularly to a wireless local area network having distributed control using time dimension multiple access and for preventing collisions of messages transmitted by network stations.

2. Description of the Prior Art

Local area networks such as Ethernet are well known. Most local area networks are wired, so that each station (network node) is connected directly or indirectly to all the other stations by cabling or wires, thus providing full connectivity between all stations. Such local area networks avoid collisions and achieve efficient use of the communications channel (in this case the wire) by well known carrier sensing and collision avoidance schemes. Such schemes are typically not suitable for wireless networks, such as those communicating by radio or infrared.

Prior art wireless networks typically suffer from the problem that in a network having for instance stations A, B, and C, station A can communicate with B and station C can communicate with Station B, but stations A and C cannot communicate. Thus it is likely that transmissions from stations A and C will collide, resulting in inefficient use of the network bandwidth and reducing network throughput.

In the prior art this is avoided by providing a network central controller which controls transmissions by each station. However, such a system is only operative if the central controller can communicate with every other station. This is a significant disadvantage both in terms of limiting communication distance to the communications radius of the controller, and in the need for the relatively expensive and complex central controller. Also, if the central controller for some reason is not available or accessible, all communications fails.

A similar problem obtains in a wired network having an extremely long wire between particular stations, so as effectively to lack full connectivity between those particular stations.

Therefore there is no way known in the prior art to have a wireless (lacking full connectivity) local area network with all stations sharing a common communications channel using time distributed multiple access, without central control, while achieving efficient use of the communications channel.

SUMMARY OF THE INVENTION

A wireless local area network is initialized by communications between a mobile unit and an access point unit or by communications between mobile units to form an ad hoc network. When no network activity has been received by either of two mobile units, each mobile unit transmits announcements in order to establish a communication link. During a hop frame, the mobile units transmit for a period of time and scan different frequencies for the remaining frame period. In order to ensure announcements are received, the mobile units scan and/or transmit at different times depending on the hop number.

Once communication is established, one mobile unit adopts the hop frequency of the other mobile unit according to a comparison between the hop frequencies of the two units. If the communication is between an access point unit and a mobile unit, the mobile unit adopts the system parameters of the access point unit. Multiple mobile units initialize to form ad hoc networks in similar manner, providing the advantage of allowing mobile unit communications without access point units.

BRIEF DESCRIPTION OF THE DRAWINGS

FIG. 8, 8A–8J are a schematic of radio circuitry of an embodiment of a mobile unit in accordance with the invention as illustrated in FIGS. 5 and 6.

FIGS. 11, 11A–11L are a schematic diagram illustrating a PCMCIA embodiment of field programmable gate array component U2 of the schematic of FIG. 7.

FIGS. 40A–M comprise a schematic of an embodiment of an access point unit in accordance with the present invention.

DETAILED DESCRIPTION OF THE INVENTION

A wireless local area network in accordance with the present invention may comprise one or more mobile units as well as one or more access point units. A mobile unit may, for example, be coupled to a portable personal computer ("host") so that the personal computer can form part of a wireless local area network. In the event the personal computer comprises a PCMCIA port, a mobile unit having a PCMCIA connector may be inserted into the PCMCIA port of the personal computer and thereby be coupled to the personal computer. If, on the other hand, the personal computer is provided with a parallel port, then a mobile unit having a parallel port connector may be coupled to the parallel port of the personal computer.

Figure 1:
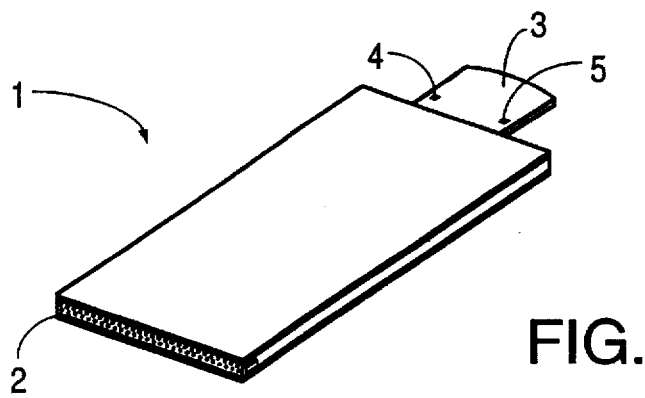
FIG. 1 is a perspective view showing a mobile unit having a PCMCIA connector in accordance with one embodiment of the present invention.
Figure 35:
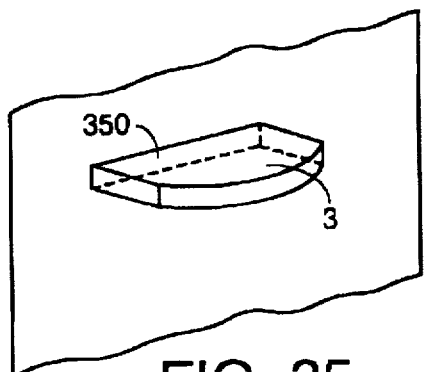
FIGS. 35 and 36 show two embodiments of the mobile unit in FIG. 1 inserted into a PCMCIA slot.
Figure 36:
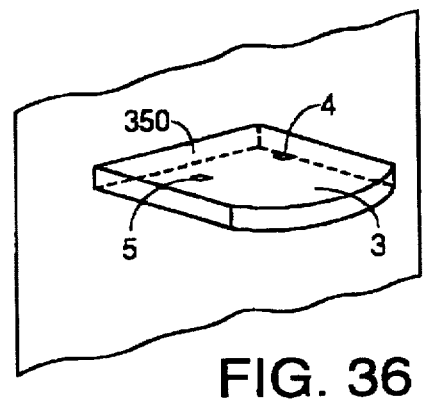

FIG. 1 is a perspective view illustrating mobile unit 1 having a PCMCIA form factor as well as a PCMCIA connector 2. Mobile unit 1 also provides, however, an antenna extension 3. A first light emitting diode (LED) 4 and a second LED 5 are provided on the antenna extension 3. The mobile unit illustrated in FIG. 1 may be inserted into a PCMCIA slot 350 (FIG. 35) of a personal computer (not shown) so that the connector 2 will couple to a corresponding PCMCIA connector of the personal computer. Antenna extension 3 as well as LEDs 4 and 5, in some embodiments, extend beyond the mouth of the PCMCIA slot 350 in the housing of the personal computer so that LEDs 4 and 5 as well as the antenna extension 3 are not concealed from view or significantly electromagnetically shielded by the personal computer housing (FIG. 36).

Figure 2:
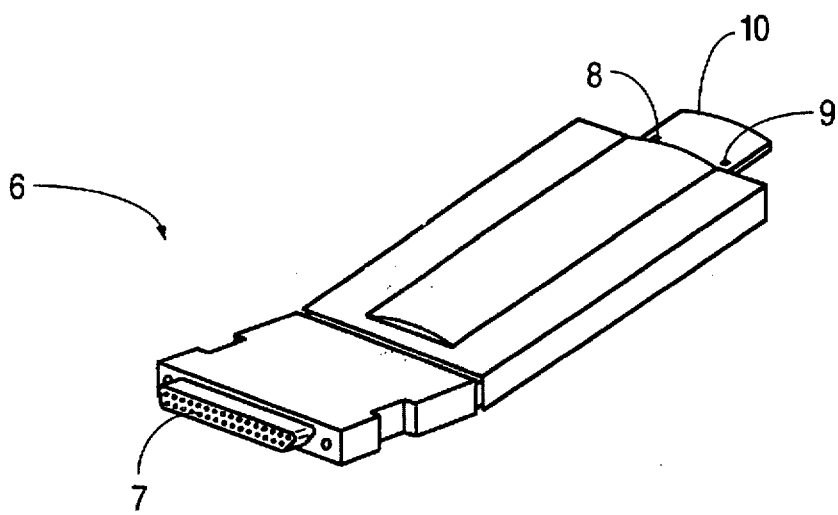
FIG. 2 is a perspective view of a mobile unit having a parallel port connector in accordance with one embodiment of the present invention.

FIG. 2 is a perspective view of another embodiment 6 of the mobile unit in accordance with the present invention. This embodiment 6, rather than having a PCMCIA connector 2, has a connector 7 for connecting to a standard parallel port of the personal computer. The embodiment 6 of the mobile unit illustrated in FIG. 2 also has a first LED 8 as well as a second LED 9 disposed on a antenna extension 10.

Figure 3:
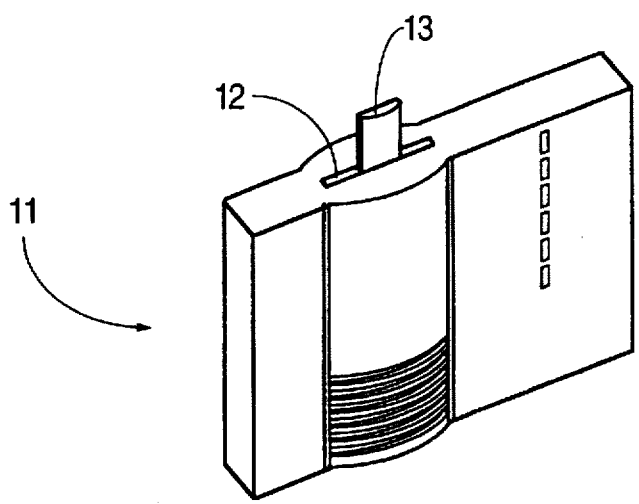
FIG. 3 is a perspective view of an access point unit in accordance with one embodiment of the present invention.

FIG. 3 is a perspective view of an access point unit 11 in accordance with the present invention. Access point unit 11 may, in some embodiments, comprise a telephone jack (not shown) for connecting to a standard wall mounted telephone jack and an associated land line. In the embodiment of FIG. 3, the access point unit 11 comprises a mobile unit i which is inserted into a slot 12 in a housing of the access point unit 11. The mobile unit provides a radio transmitter/receiver for communicating with mobile unit. FIG. 3 illustrates that an antenna extension 13 extends from the enclosure of the access point unit 11 in similar fashion to the way an antenna extension 3 of a mobile unit extends from the housing of a host personal computer.

In accordance with one embodiment of the present invention, an access point unit 11 is in radio communication with a mobile unit 1 such that a portable personal computer coupled to mobile unit 1 may be part of the local area network to which the access point unit 11 provides access. In some embodiments of the present invention, there are multiple access point units coupled to a single hardwired local area network. This hardwired local area network may comprise mechanical connections between desktop personal computers, other computers, printers, plotters, fax machines, and other peripherals. The access point units are located throughout an area so that a personal computer provided with a mobile unit can access the hardwired local area network through one or more of the access point units which are within radio communication range of the mobile unit. A mobile unit may be moved throughout the operating area of the hardwired local area network such that the mobile unit moves out of a radio communication range with a first access point unit but moves into a radio communication range with a second access point unit. In this situation the mobile unit is said to be "roaming". Control of the mobile unit may be passed from the first access point unit to the second access point unit in order to maintain communication between the mobile unit and the hardwired local area network to which the access point units are coupled.

In accordance with another embodiment of the present invention, no access point units are required to form a local area network. When a first mobile unit enters a communication range of another mobile unit, the two mobile units may form an "ad hoc" local area network. An ad hoc local area network may include many mobile units, some of which are not in direct radio communication with other of the mobile units. As long as each mobile unit of the ad hoc network can communicate with each other mobile unit of the network either directly or indirectly through other intermediary mobile units, all the mobile units can be part of the same ad hoc network. In this way, a user of a personal computer having a mobile unit is able to enter a communication range of either another mobile unit or an access point unit and join the local area network without having to establish any mechanical electrical (wired) connections to the local area network whatsoever. When the user of the personal computer removes the personal computer and the attached mobile unit from the radio communication range of the wireless network, radio communication is broken. The local area network continues operating without the departed mobile unit.

MOBILE UNIT HARDWARE

Figure 4:
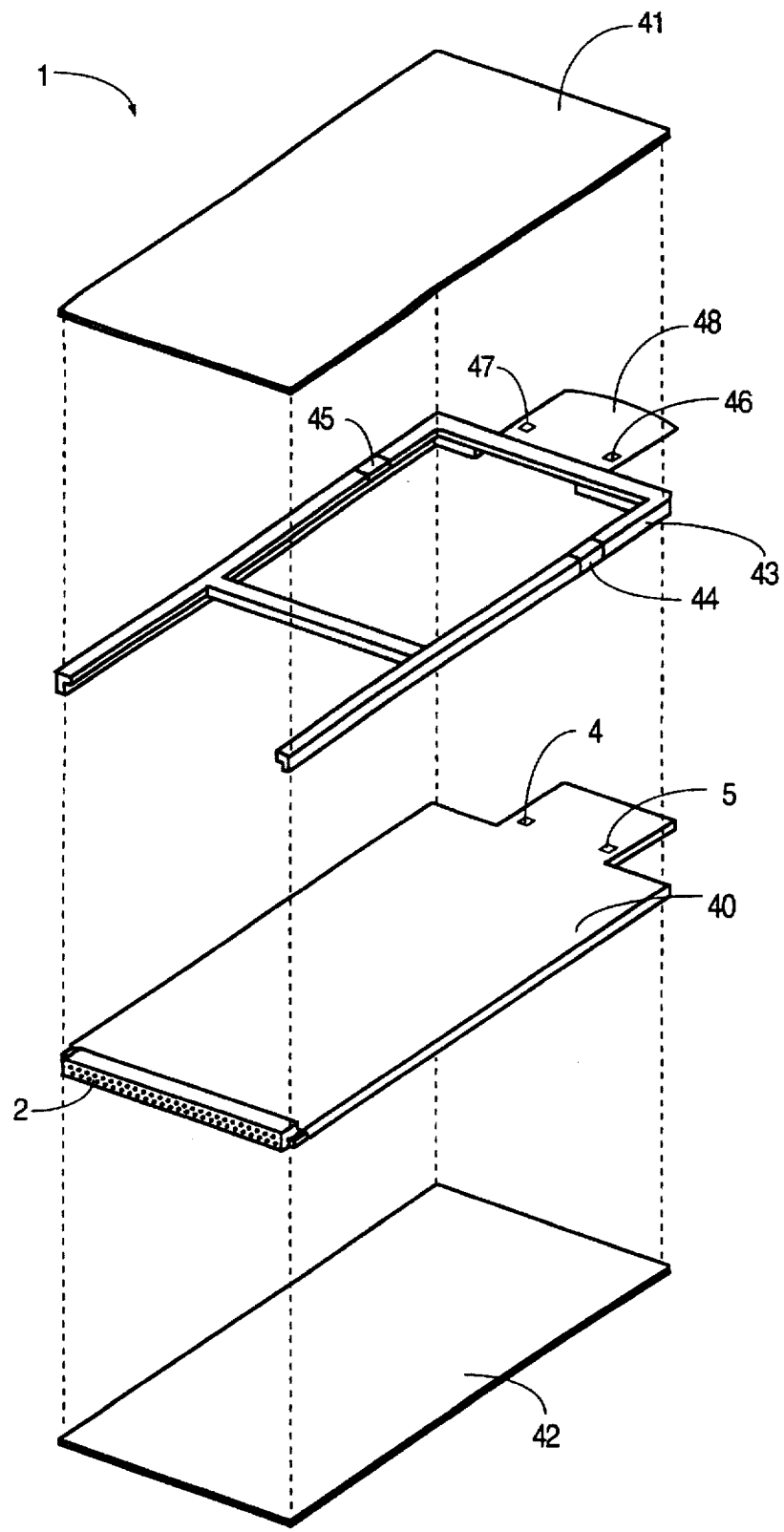
FIG. 4 is an exploded perspective view of a mobile unit having a PCMCIA connector in accordance with one embodiment of the present invention.

FIG. 4 is an exploded perspective view of an embodiment of the mobile unit 1 of FIG. 1 having a PCMCIA form factor and a PCMCIA connector 2. A printed circuit board 40 is sandwiched between a top cover member 41 and a bottom cover member 42. The printed circuit board 40 is held in place and somewhat sealed into the PCMCIA form factor by a plastic gasket 43 to which the top cover member 41 and bottom cover member 42 adhere. The plastic gasket 43 comprises first and second metal electrostatic discharge (ESD) protection contacts 44 and 45 disposed on the edges of the gasket member 43 such that high voltage electrostatic charge on, for example, the hand of a person will be discharged when the person grasps the mobile unit in a natural way between the thumb and forefinger. The gasket member 43 has two holes 46 and 47 in a plastic antenna extension 48. These openings 46 and 47 are positioned so that first and second LEDs 4 and 5 disposed on the printed circuit board 40 can be viewed from the outside of the assembled PCMCIA form factor enclosure. The PCMCIA connector 2 is soldered to one end of the printed circuit board 40 as illustrated in FIG. 4. Details of the electrical components, integrated circuits, and traces of the printed circuit board assembly are not illustrated in FIG. 4 for ease of illustration.

Figure 5:
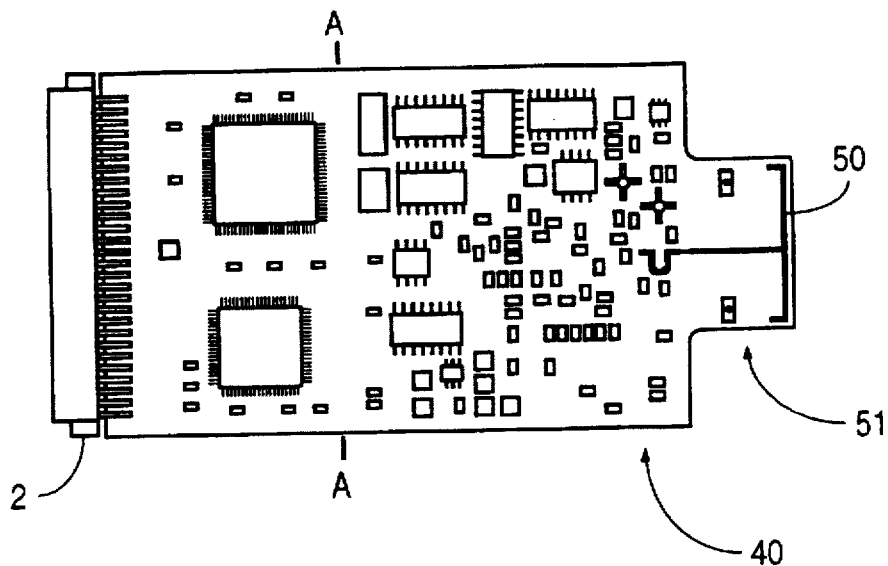
FIG. 5 is a view of the top of a populated printed circuit board of an embodiment of a mobile unit in accordance with the invention as illustrated in FIG. 4.

FIG. 5 is a top down view of the top of populated printed circuit board 40 of the mobile unit of FIG. 4. The circuit components to the right of the designators A in FIG. 5 comprise radio circuitry for both transmitting and receiving information. The circuitry and components to the left of the line designated A comprise digital circuitry associated with coupling the radio circuitry to an PCMCIA port such as a PCMCIA port of a host personal computer (not shown). A substantially T-shaped antenna trace 50 is illustrated on an antenna extension 51 of the printed circuit board 40.

Figure 6:
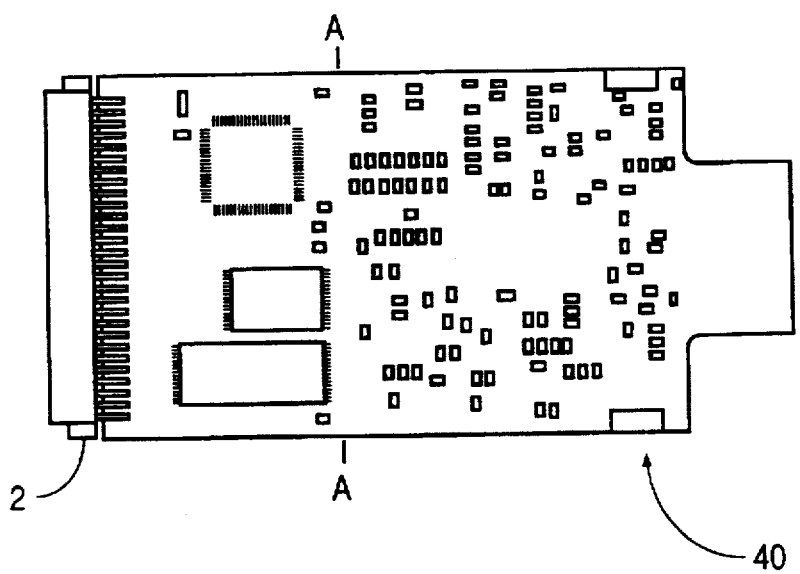
FIG. 6 is a view of the bottom of a populated printed circuit board of an embodiment of a mobile unit in accordance with the invention as illustrated in FIG. 4.

FIG. 6 is a view of the bottom of the populated printed circuit board 40 of FIG. 4. The components and circuitry disposed to the right of the line designated A comprise part of the radio circuitry whereas components and circuitry to the left of line A comprise part of the digital circuitry which couples the radio circuitry to the PCMCIA port of the host computer. All components are surface mount components.

Figure 7:
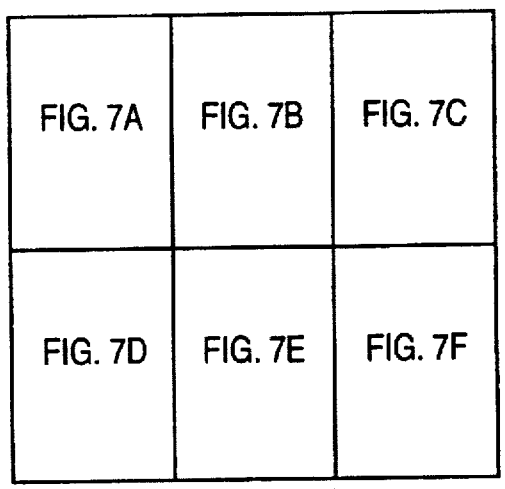
FIG. 7, 7A–7F a schematic of a digital portion of an embodiment of a mobile unit in accordance with the invention as illustrated in FIGS. 5 and 6.
Figure 7A:
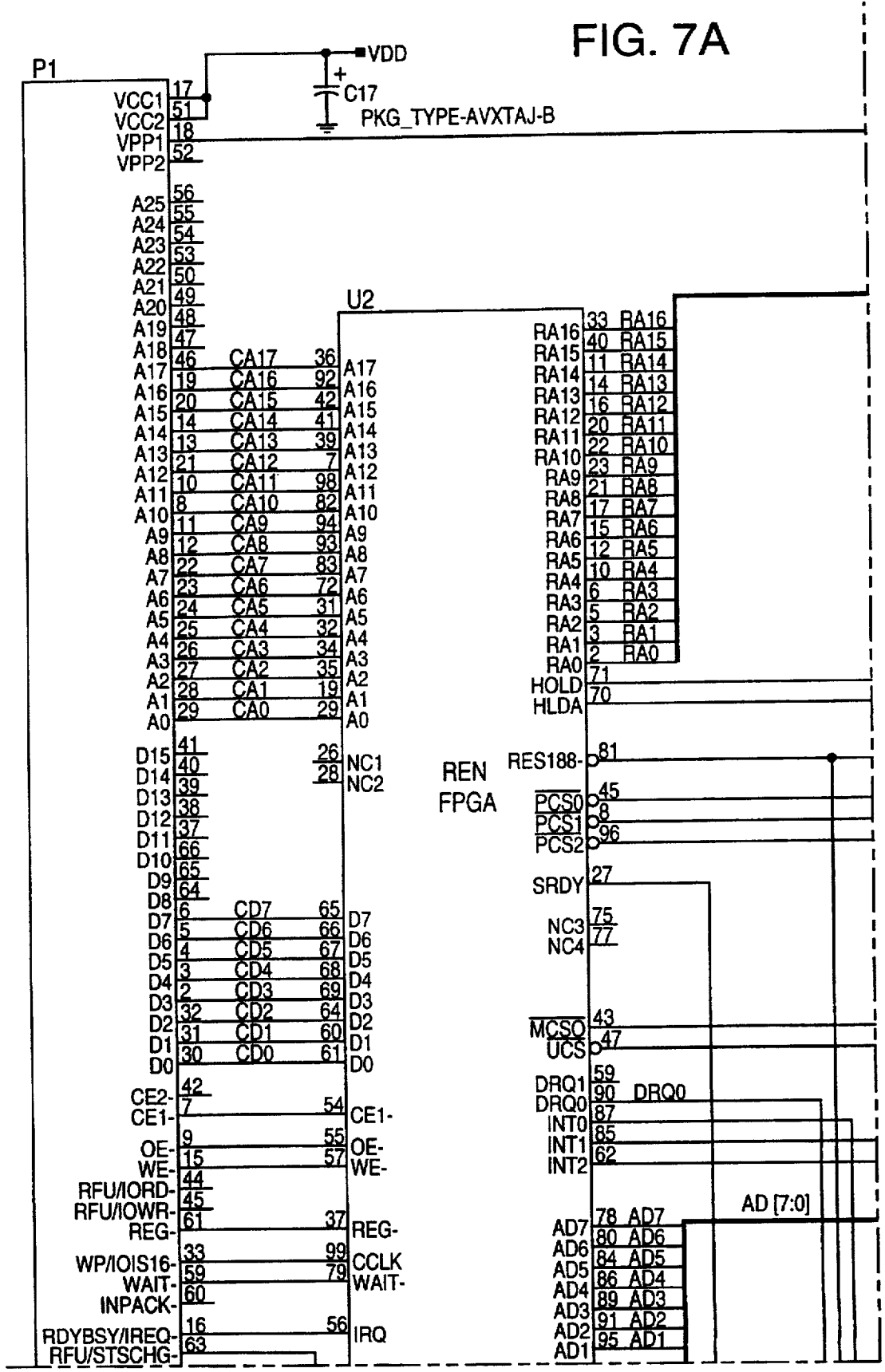
Figure 7B:
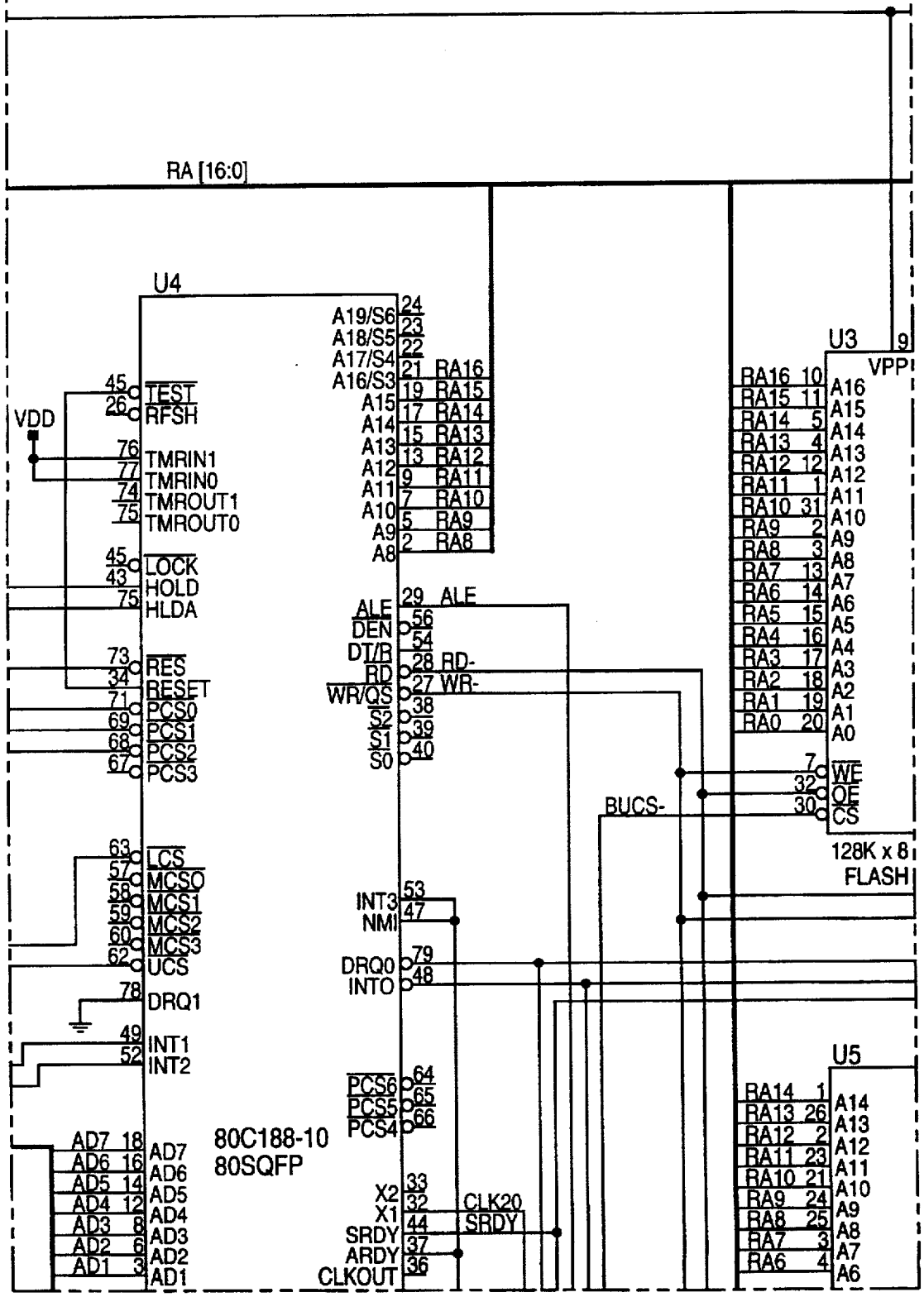
Figure 7C:
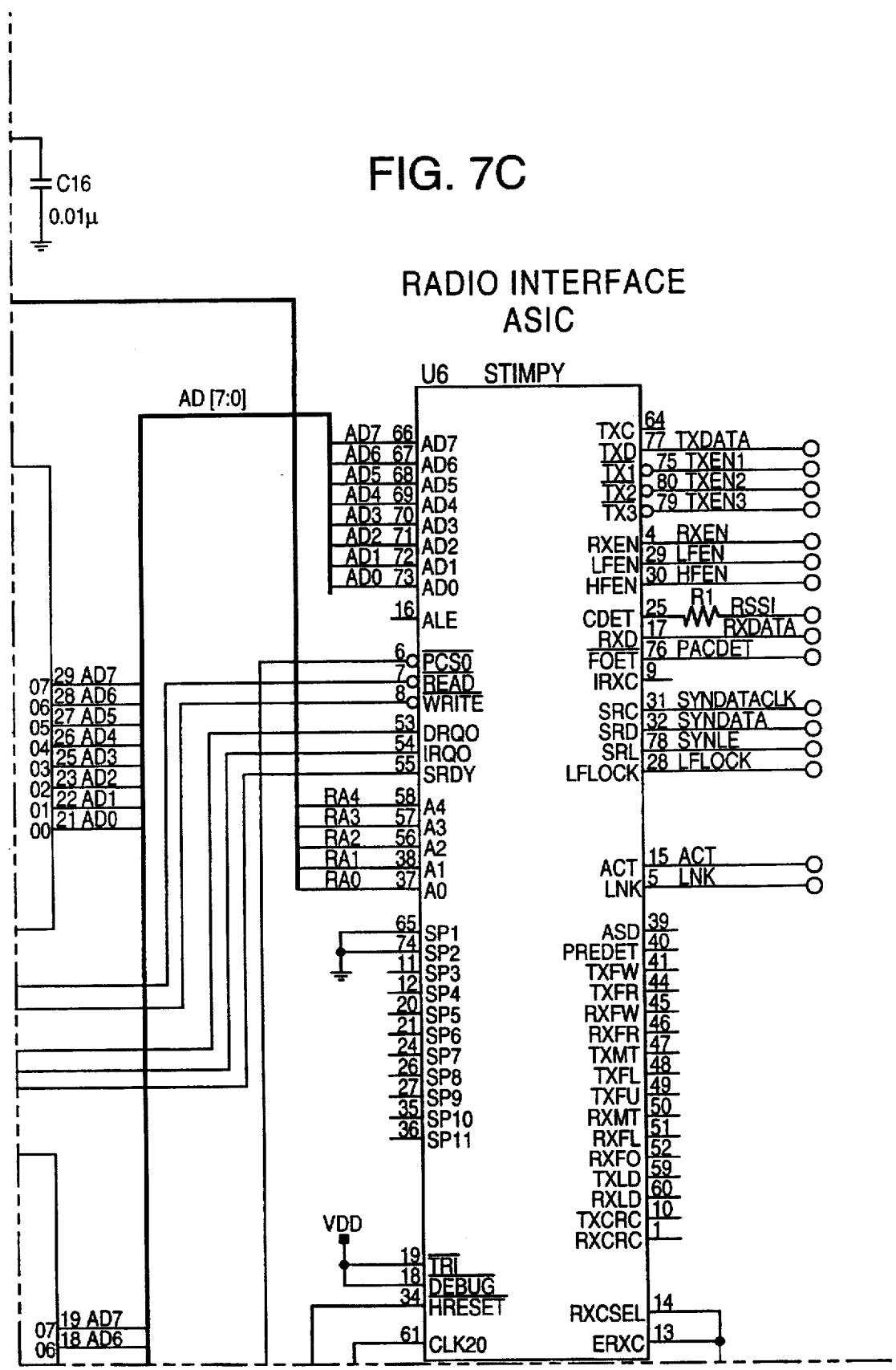
Figure 7D:
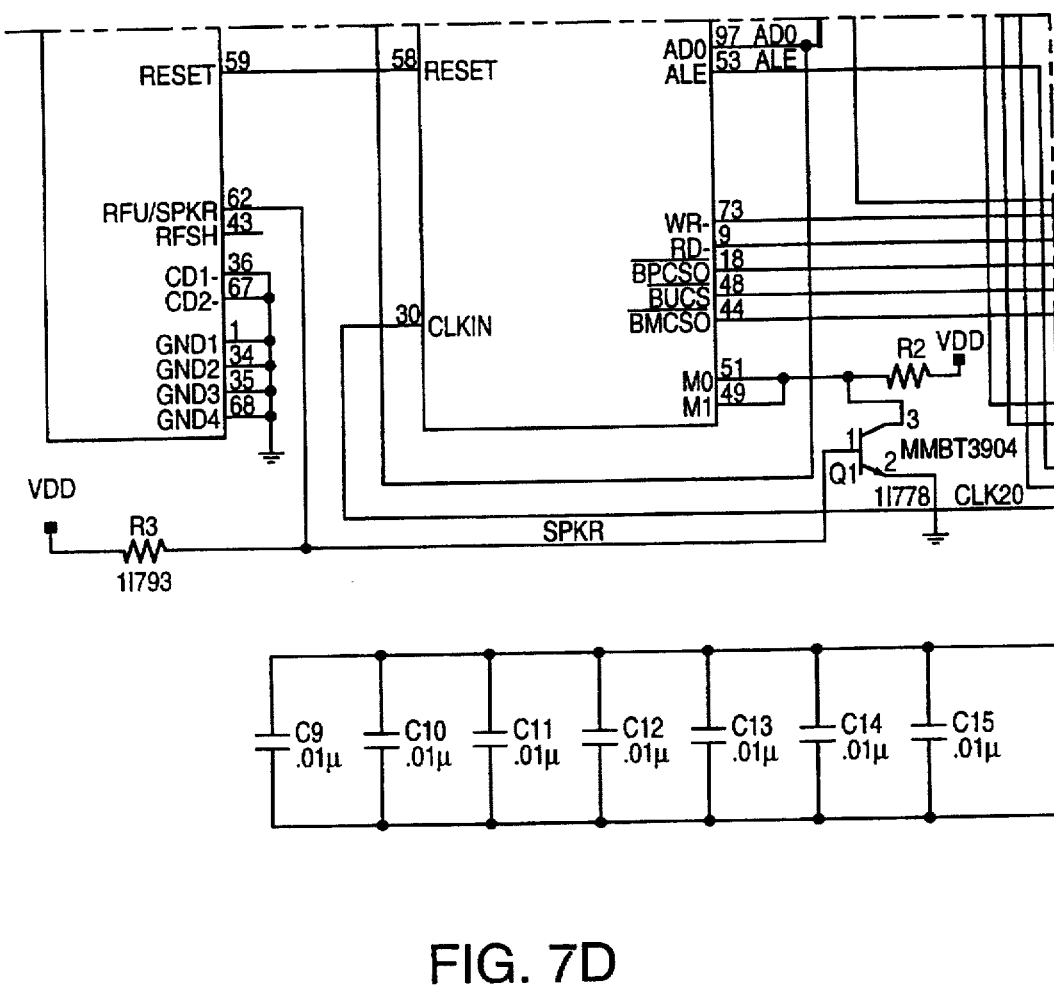
Figure 7E:
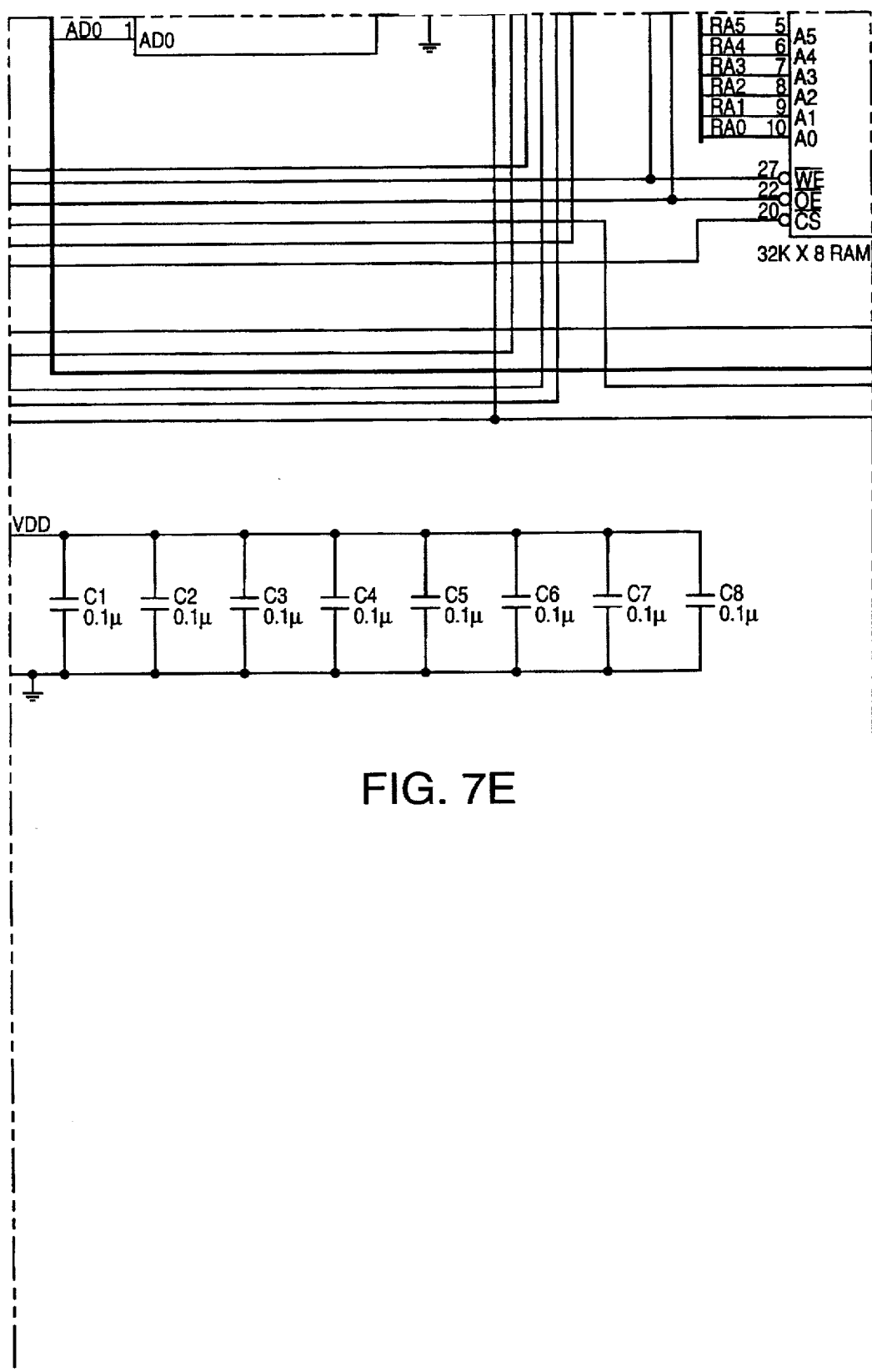
Figure 7F:
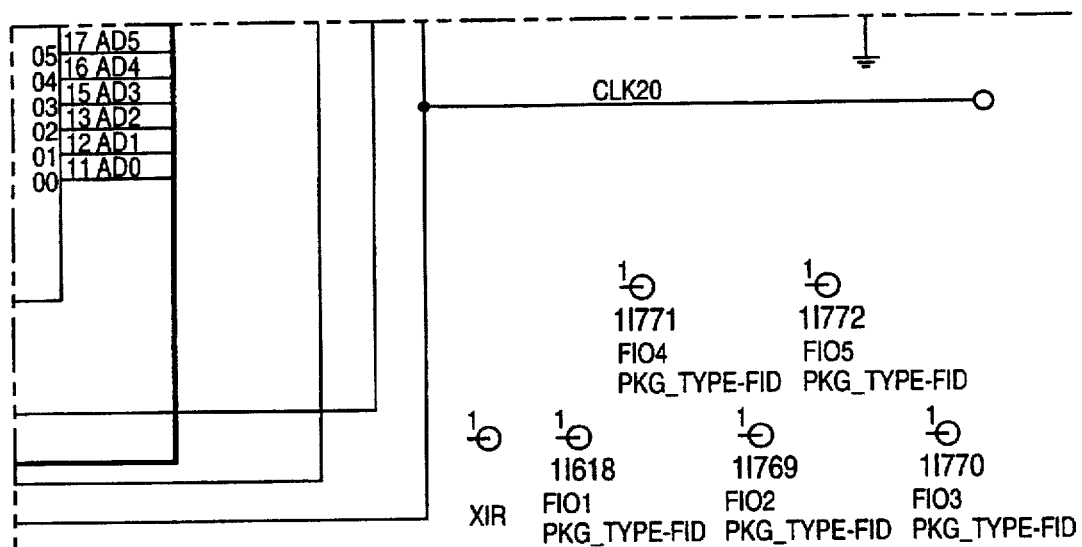
Figure 8A:
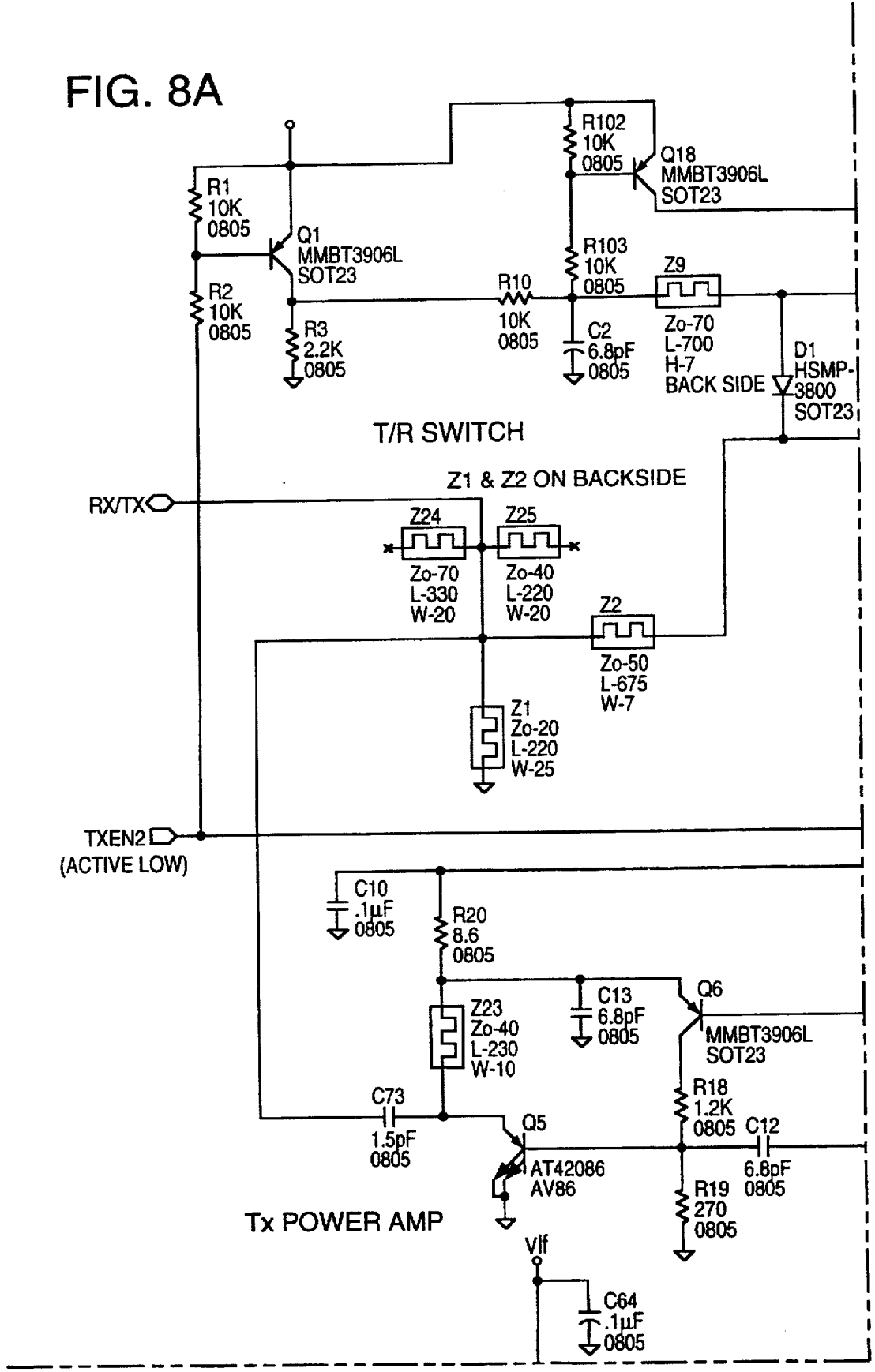
Figure 8B:
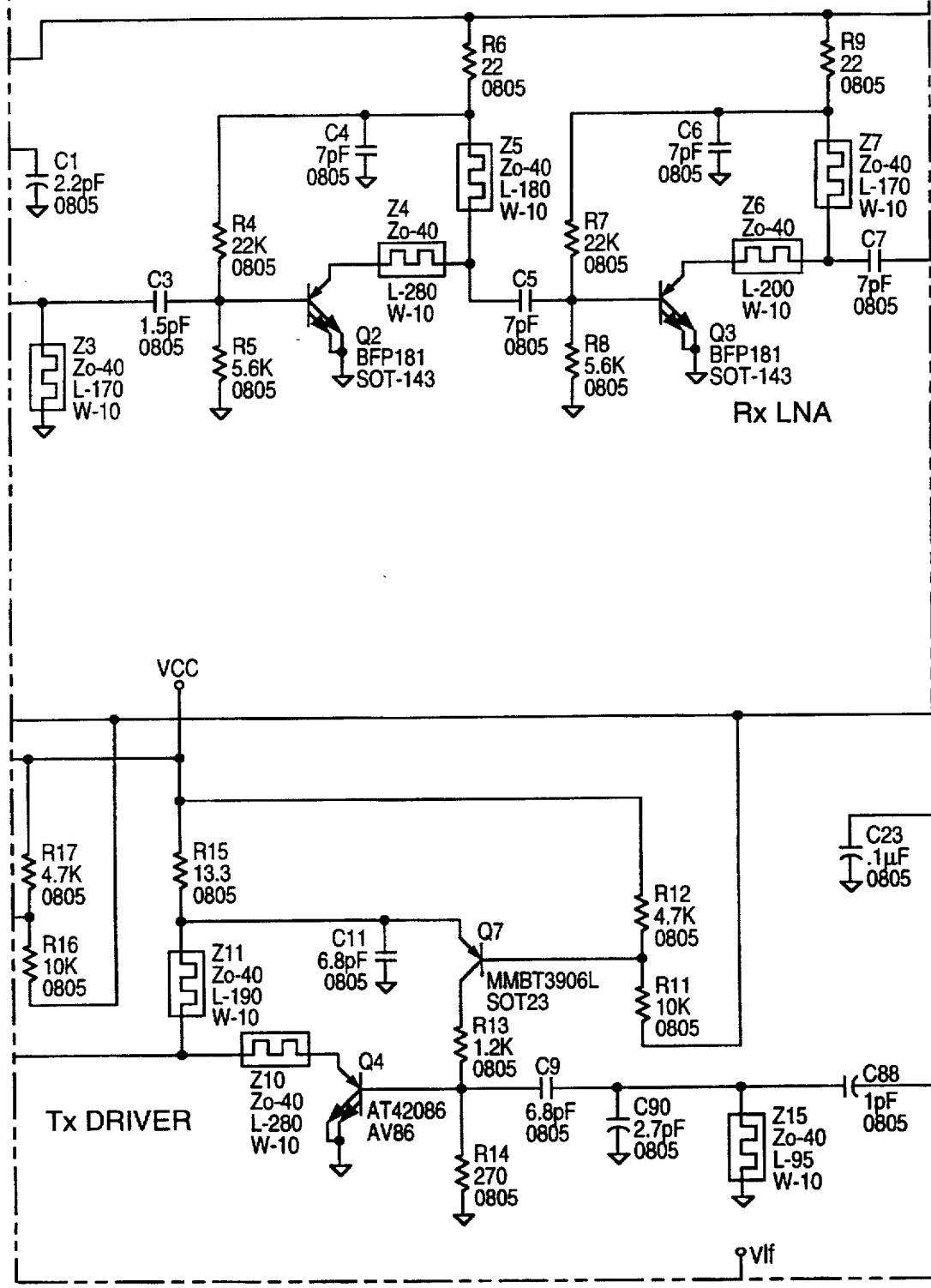
Figure 8C:
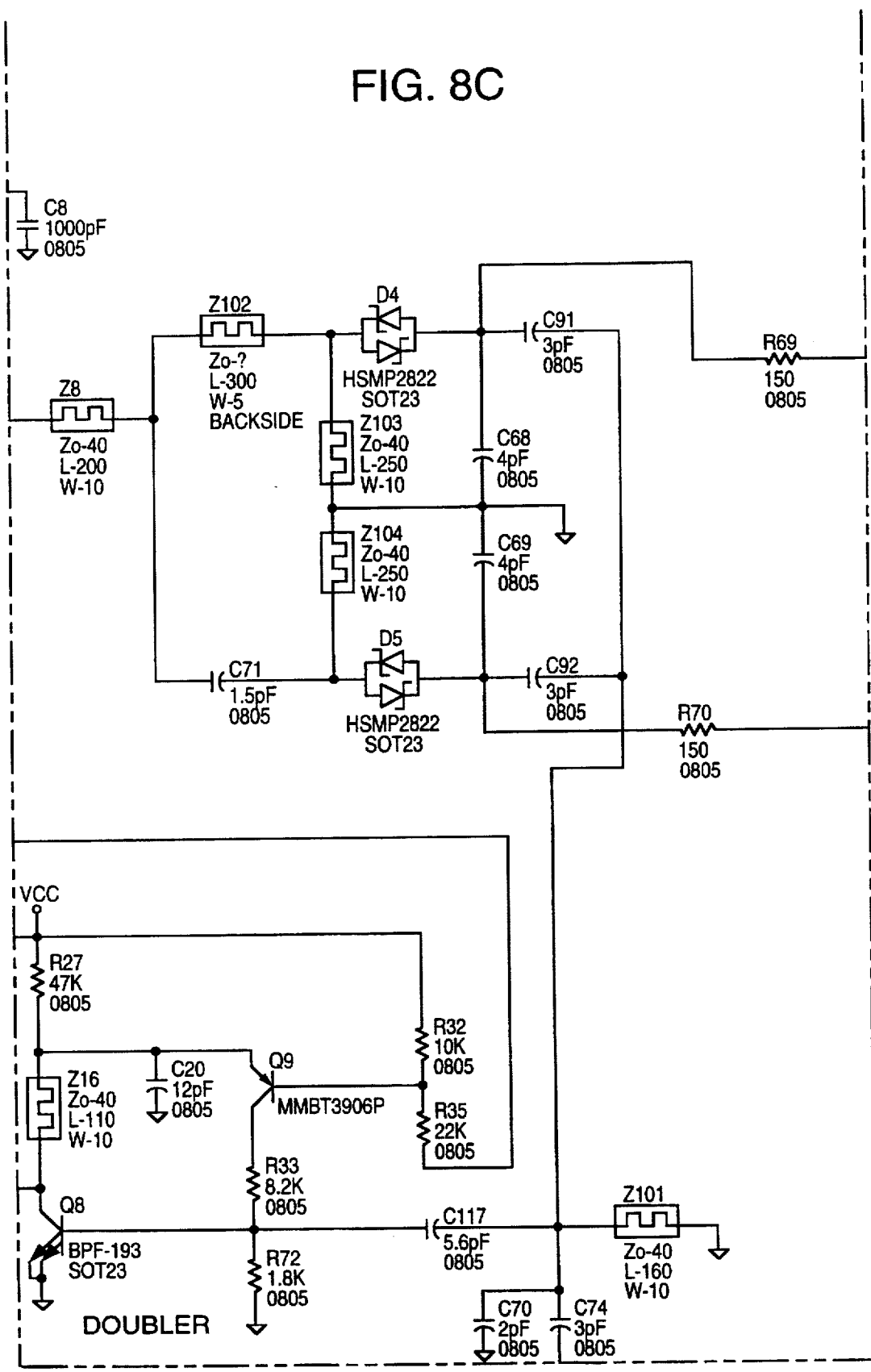
Figure 8D:
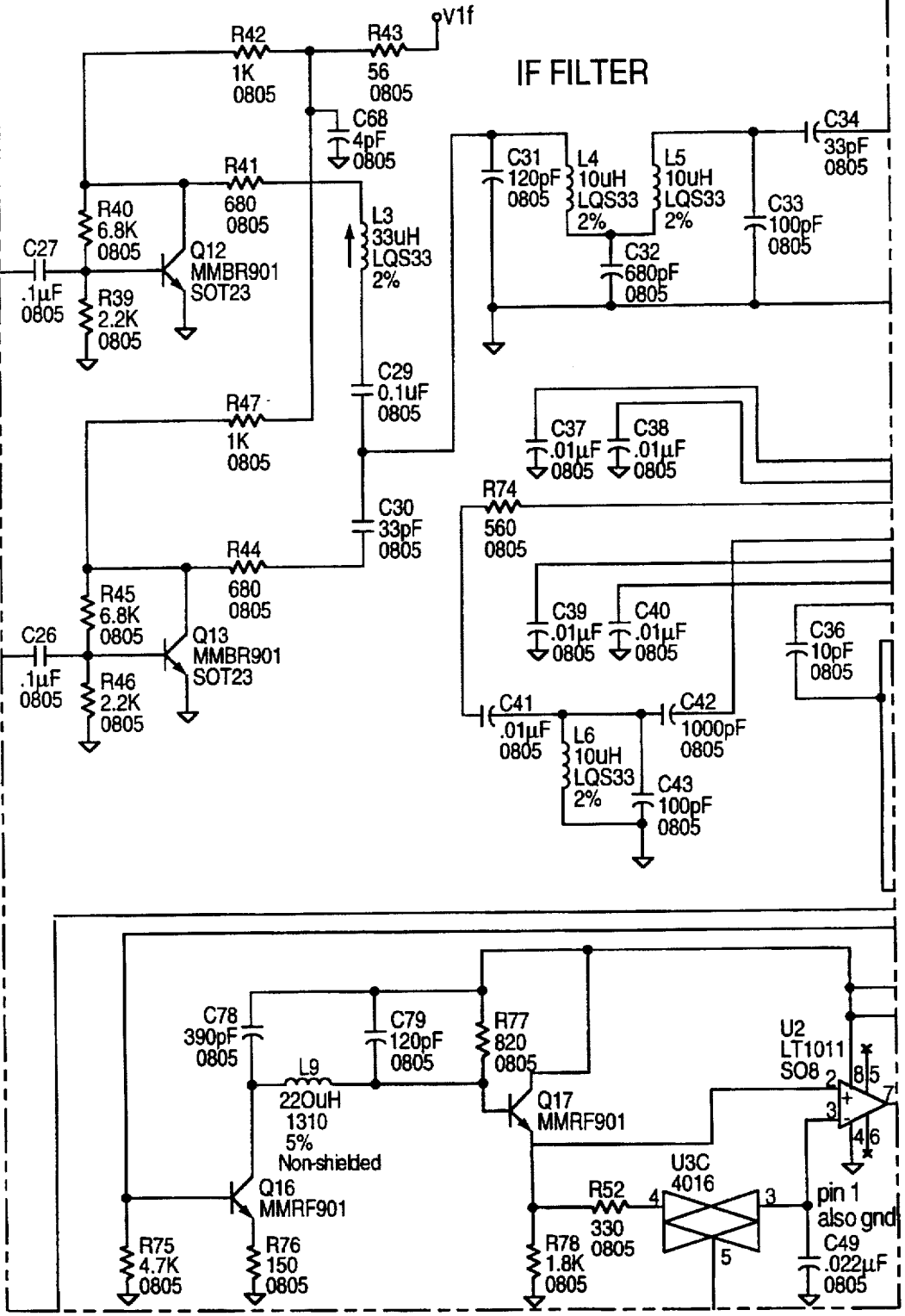
Figure 8E:
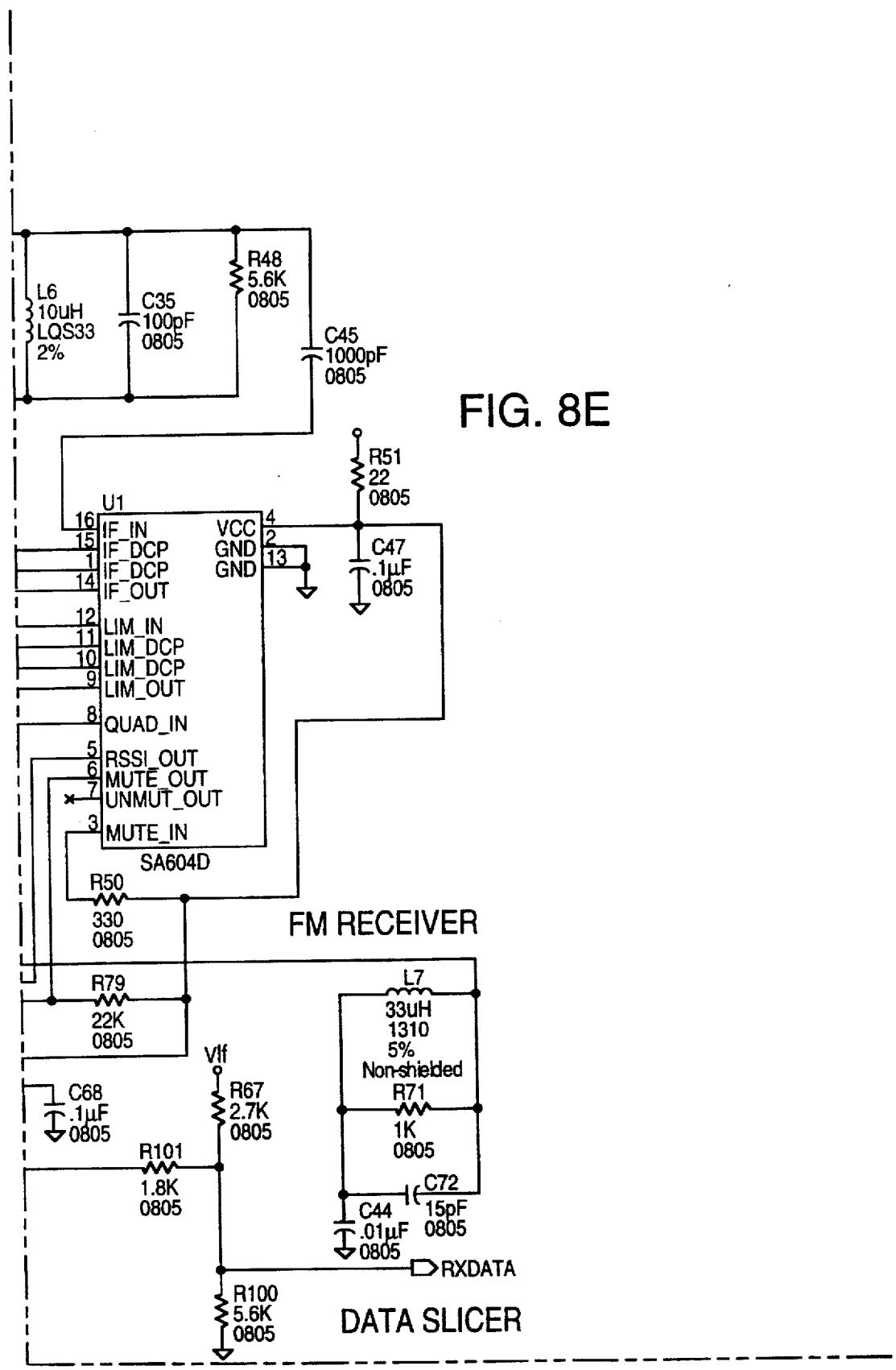
Figure 8F:
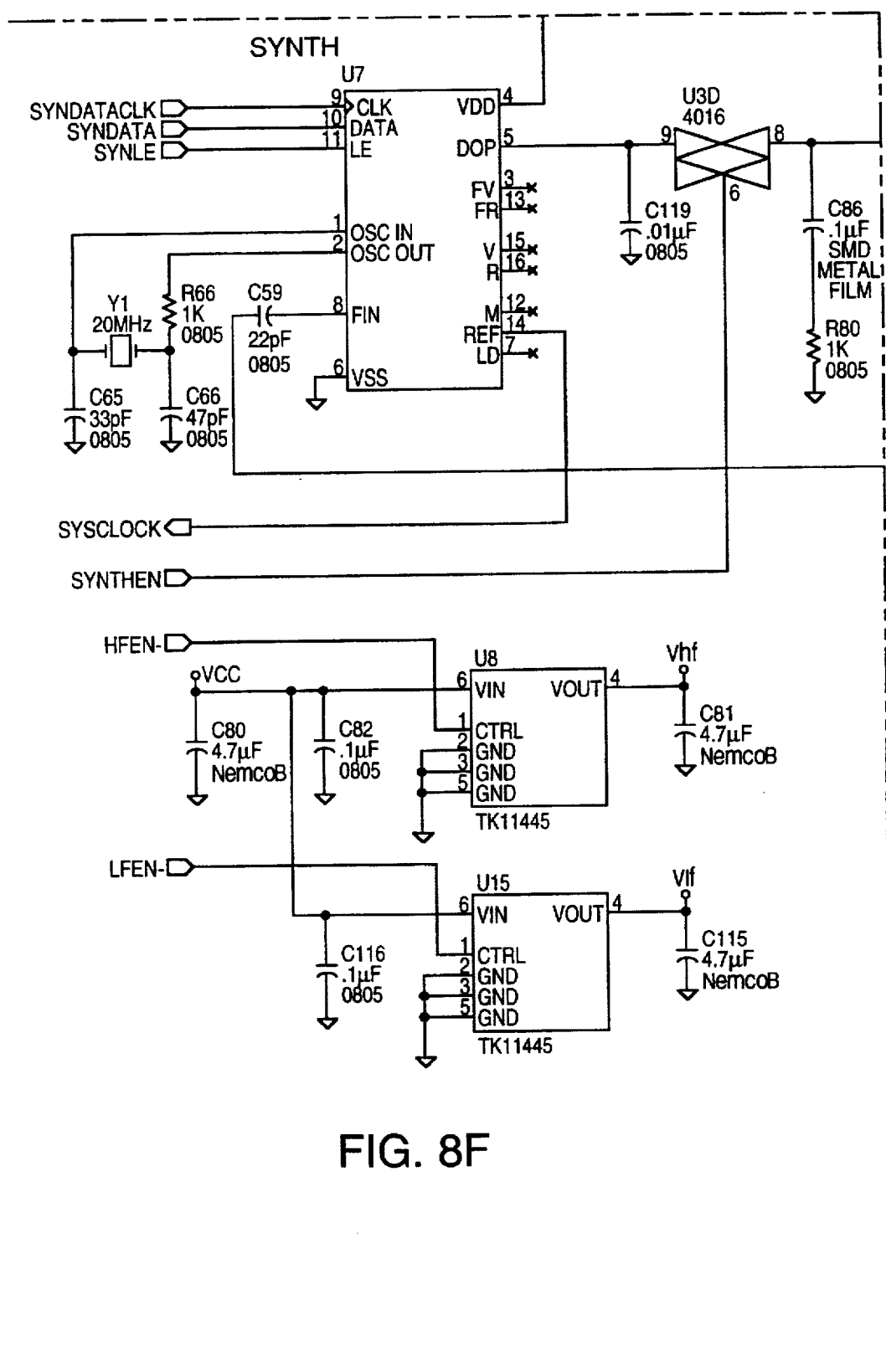
Figure 8G:
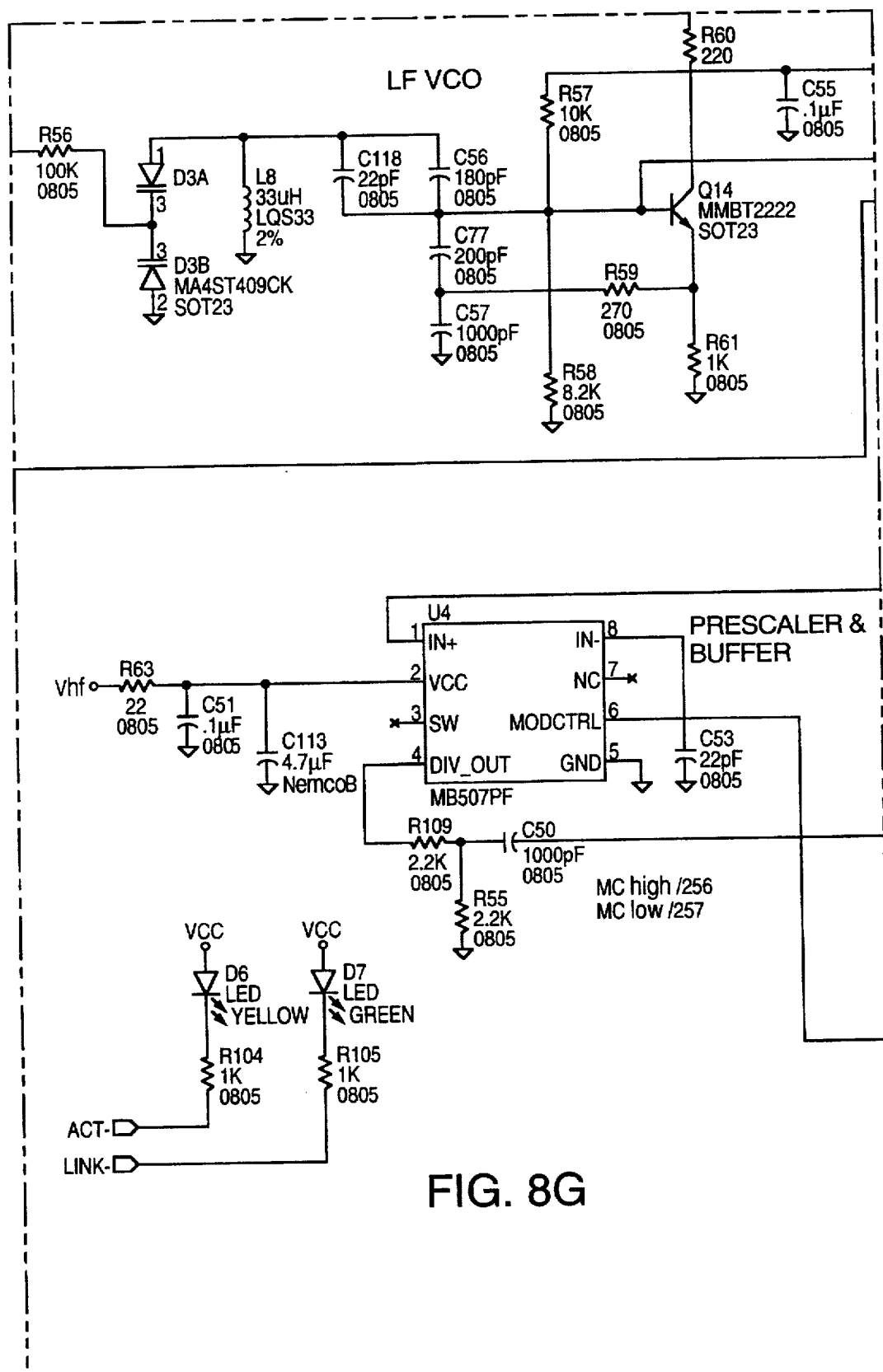
Figure 8H:
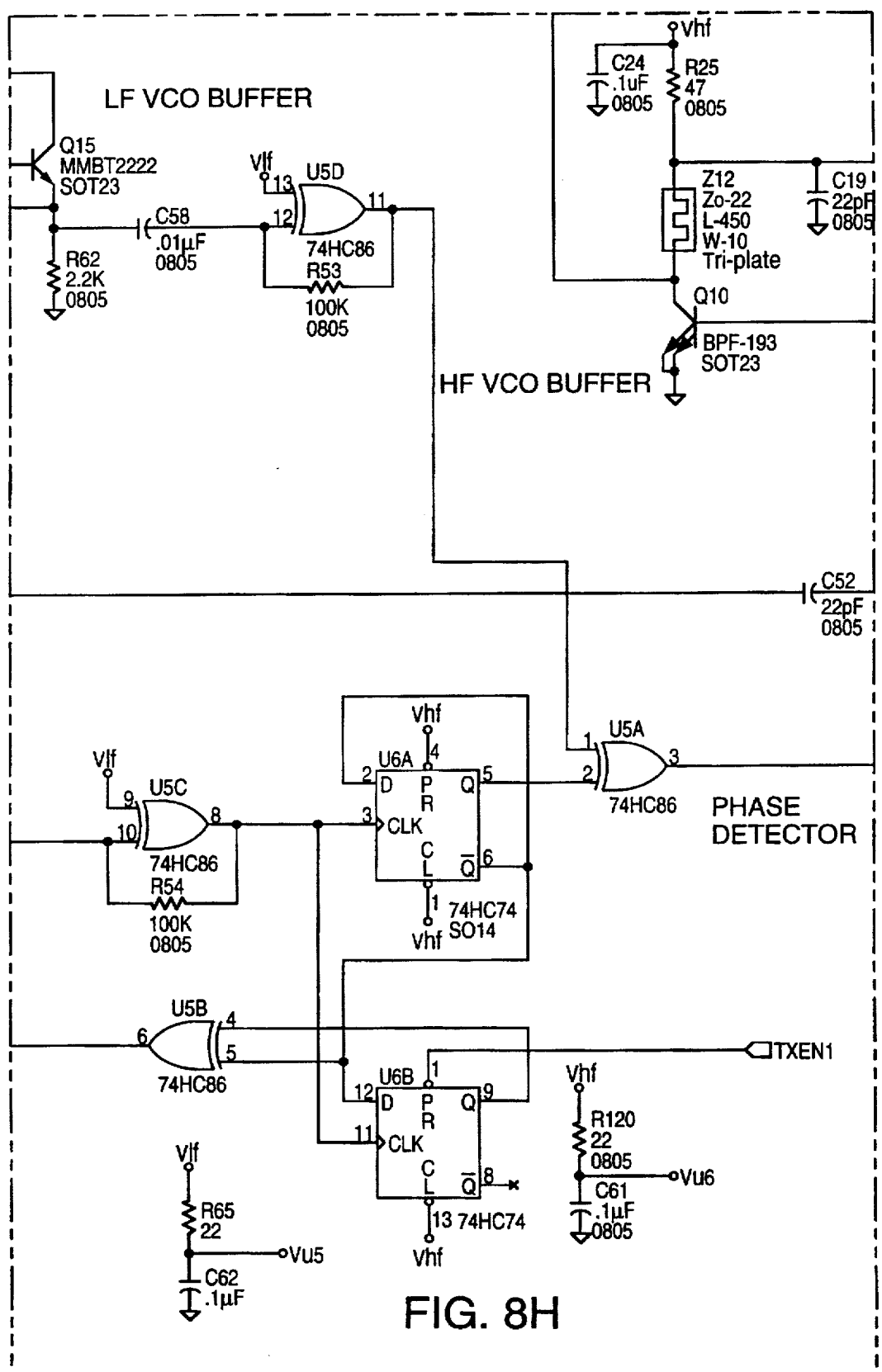
Figure 8I:
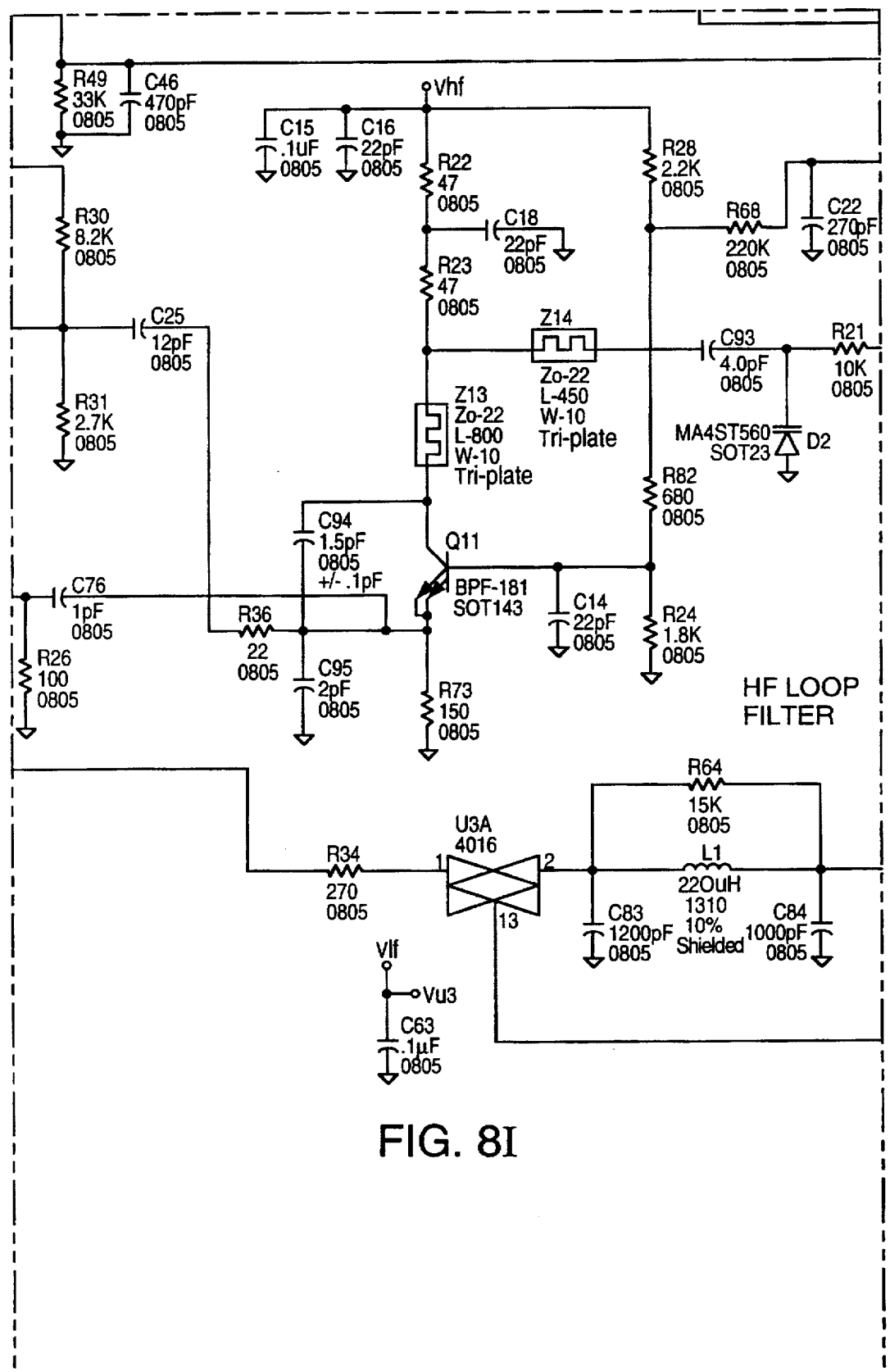
Figure 8J:
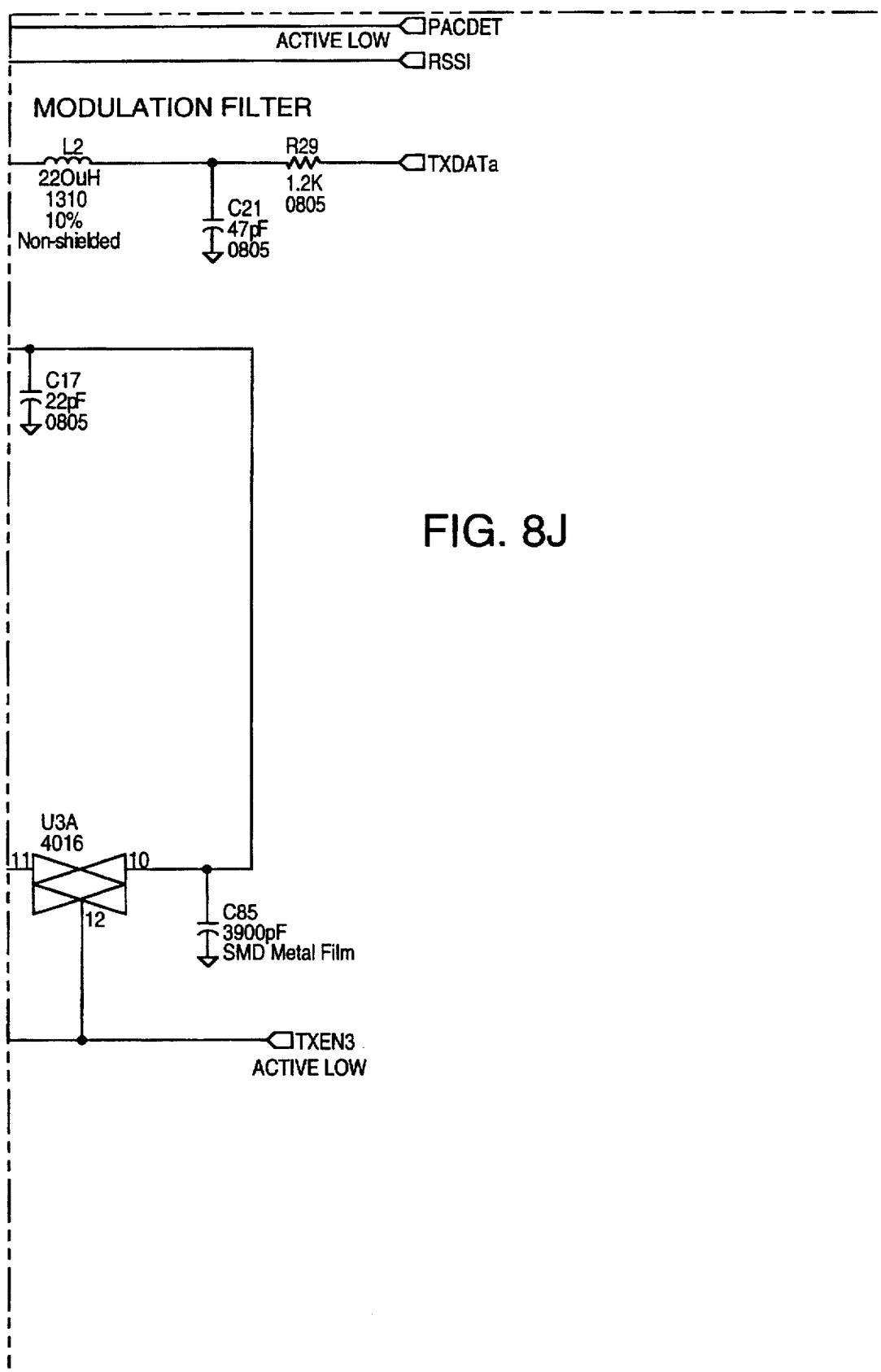

FIG. 7 is a schematic illustrating the digital portion of the mobile unit illustrated in FIGS. 5 and 6. FIG. 8 is a schematic of the radio circuitry of the mobile unit illustrated in FIGS. 5 and 6. The PCMCIA connector illustrated in FIGS. 5 and 6 is designated on FIG. 7 by the reference numeral P1. The circuitry illustrated in FIG. 7 comprises PCMCIA connector P1, a field programmable gate array (FPGA) U2, an 80C188-10 microcontroller U4, a 128K×8 flash memory U3, a 32K×8 static RAM U5 and a application specific integrated circuit (ASIC) radio controller U6. The connections designated with circles to the right of radio controller U6 in FIG. 7 designate electrical connections to correspondingly labeled connectors on the radio circuit illustrated in FIG. 8.

In the event the mobile unit is to provide a PCMCIA interface for coupling to a host computer, then the circuitry of FIG. 11 is programmed into the field programmable gate array U2 of FIG. 7. If, on the other hand, the mobile unit is to communicate with a host computer via a parallel port, then the circuitry illustrated in the schematic of FIG. 10 is programmed into the field programmable gate array U2 of FIG. 7 and PCMCIA connector P1 is replaced with a suitable parallel port connector.

Figure 9A:
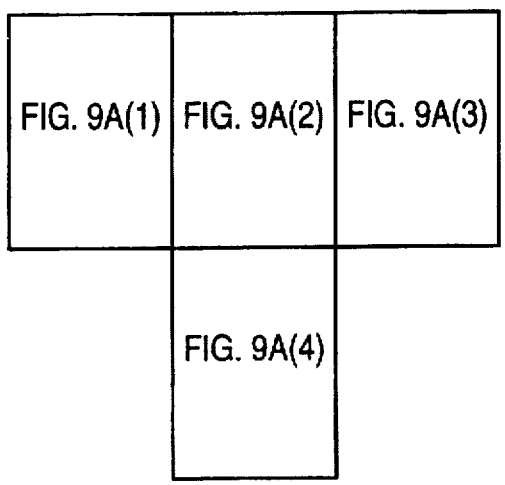
FIGS. 9A, 9A(1)–9A(H), 9B, 9B(1)–9B(k), 9C, 9C(1)–9C(2), 9C, (D(1)–9D(2) comprise a high level block diagram of an embodiment of the radio controller ASIC U6 of the schematic of FIG. 7.

FIGS. 9A–9D comprise a high level block diagram schematic of the contents of the radio controller ASIC U6. The Radio Controller ASIC U6 is realized in approximately 11,000 gates in a one micron CMOS NEC gate array in an 80-pin thin quad flat pack package. External pins of the radio controller ASIC are illustrated on FIG. 9A and are designated either with arrowheads, arrow tails, or both. Arrowheads designate output pins, arrowtails designate input pins, and nets having both an arrowhead and an arrowtail designate bidirectional pins. The squares in the schematic of FIG. 9A illustrate net connections connecting various identically labelled nets on FIGS. 9A through 9D. The output pins illustrated in a column and labelled TXSCRAM through DBRXCRC are diagnostic pins usable to determine information about the operation of the radio controller ASIC.

Figure 9B:
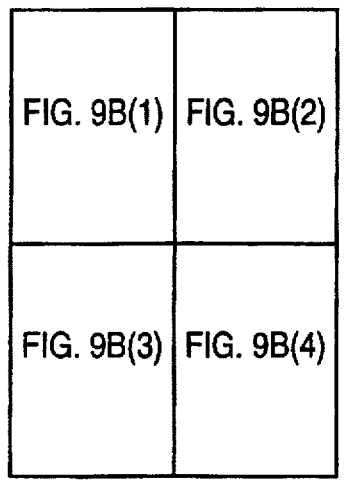

The block labelled Bus Interface in FIG. 9B contains a plurality of registers for communicating to and from the radio controller ASIC. Once a register is written with an appropriate value, the Bus Interface block causes an appropriate signal to be asserted indicative of the particular activity or operating mode the ASIC is to perform or assume. The signals to the right of the Bus Interface block labelled RTX1 through RCK0 are these signals. The registers are accessed by address pins A0–A4 of FIG. 9A and address/data pins D0–D7 of FIG. 9A.

The block labelled Interrupt Controller in FIG. 9B provides an interrupt interface for interrupting the 80C188 microcontroller 04. Each interrupt is capable of being masked at the control of either microcontroller U4 of the host via lines IMR0 through IMR7 which extend from the Bus Interface block. The interrupt request output of the Interrupt Controller which is coupled to the 80C188 microcontroller U4 via pin IRQ0 is labelled HINT. When the Interrupt Controller block interrupts the microcontroller U4 with line HINT and pin IRQ0, the microcontroller can cease program execution and determine the cause of the interrupt by reading lines ISR[7:0] via the Bus Interface block.

The block labelled TX/RX DMA Controller in FIG. 9B allows the radio controller ASIC to operate as a slave DMA device at the command of the DMA controller of the 80C188 microcontroller U4. Accordingly, the ASIC may be instructed to supply byte after byte of information from a 5-byte FIFO in the TX/RX DMA Controller block to the radio circuit and to assert a DMA request signal DRQ back to the DMA controller of the microcontroller U4 when the ASIC requires additional bytes to forward to the radio circuit. In such a situation, the TX/RX DMA Controller block is able to determine that a DMA request on line DRQ should be asserted because the ASIC has been programmed with information indicating how many total bytes should be transmitted. Alternatively, assertion of the DMA request line DRQ by the DMA Controller block when the ASIC is receiving data from the radio circuit indicates to microcontroller U4 that it should relinquish control of the address bus RA[16:0] and address/data bus AD[7:0] and indicates to the host that the host should empty the FIFO of the DMA Controller in the ASIC.

The Clock Tree Generator block in FIG. 9B comprises a plurality of clock buffers to supply clock signals throughout the ASIC. The clock signal CLK10 is a one megahertz clock signal which may be increased if required to enable higher data bit rates.

The Clock/Power Control Unit block of FIG. 9B allows the mobile unit to be placed into a sleep mode to conserve power and allows the unused ports of the radio circuit to be unpowered to conserve power. When data is being transmitted from the transmitter portion of the radio circuitry, the radio receiver portion of the radio circuitry is not being used. The Clock/Power Control Unit can therefore cut power to the receiver portion of the radio circuit to conserve power. Also, when a radio transmission is being transmitted from the radio transmitter portion of the radio circuit, the digital circuitry in the ASIC associated with receiving an incoming radio signal is not used. This digital circuitry is therefore not clocked so as to conserve power. Similarly, when a radio transmission is being received, the transmitter portion of the radio circuit is not powered and the digital circuitry on the ASIC associated with generating a bit stream to transmit is not clocked. A register in the Bus Interface block may also be written to change the clock frequency of CLK10 output by the Clock/Power Control Unit block to the Clock Tree Generator block.

The LED Interface block of FIG. 9B causes the two LEDs on the antenna extension of the mobile unit to light under appropriate conditions. One LED blinks when information is either being transmitted or received by the mobile unit. This LED may therefore be considered to be an indication of "activity". The other LED is turned on to indicate that the mobile unit has registered with an access point unit, and has been authenticated. This LED therefore indicates that the mobile unit is "linked" into a hardwired local area network by an access point unit.

Figure 9C:
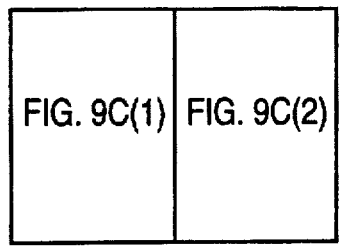

The blocks of FIG. 9C can be grouped into a data flow group and a control group. The data flow group comprises the blocks labelled Transmit FIFO, Parallel-Serializer, TX CRC Generator, TX Serial Mux and Data Scrambler. The control blocks comprise the blocks labelled Pre-Transmit FSM, Transmit Core FSM, Transmit Down Counter, Post-Transmit Logic and TX Enable Mux. The letters FSM are an acronym for finite state machine. When the mobile unit is transmitting, bytes of information to be transmitted are supplied one by one into the five byte Transmit FIFO block. Bits from the Transfer FIFO block are then serialized one at a time by the Parallel-Serializer block. Serial bits are supplied out of the Parallel-Serializer block on the signal line indicated TXSOUT. The serial data bit stream is supplied through the TX-Serial Mux to the Data Scrambler. After an appropriate number of serial bits have been supplied from the Parallel-Serializer, through the TX Serial Mux and to the Data Scrambler, the TX Serial Mux is switched so that a CRC code which is generated for the preceding serial bit stream is appended to the end of the serial bit stream. The CRC bits are therefore also supplied to the Data Scrambler. The Data Scrambler contains a linear feedback shift register for generating a pseudorandom sequence of bits from an incoming sequence of bits based on a key received on bus lines KEY[15:0]. KEY[15:0] is controlled by writing an appropriate register in the Bus Interface block of FIG. 9B. The other blocks illustrated in FIG. 9C control the five data flow blocks in accordance with the frame formats described below to generate the output serial bit stream on the conductor labelled TXD of the Data Scrambler Block. The Pre-Transmit finite state machine is activated by the signal TXFRAME. TXFRAME is asserted by writing an appropriate register in the Bus Interface block. TXFRAME is an indication that something is to be transmitted. The Pre-Transmit state machine therefore asserts TX1 through the TX Enable Mux block to switch the radio circuit to transmit as opposed to receive. Some time later, the Pre-Transmit finite state machine will assert TX2 high that will turn power on to the transmitter of the radio circuit. After a period of time, TX3 is asserted to start modulating information into the radio transmitter.

After the Pre-Transmit FSM block has prepared the radio circuit for the transmission, the Transmit Core FSM operates to read the FIFO of the Transmit FIFO block and to load the Parallel-Serializer every eight microseconds. The Transmit Down Counter block is decremented once upon serialization of each byte. After all the bytes of a frame to be transmitted are serialized, the Post-Transmit Logic block enables the Tx CRC Generator to append the CRC bits and then issues an end of frame ENDOFFRAME interrupt to the 80C188 microcontroller indicating that the frame has been transmitted.

Figure 9D:
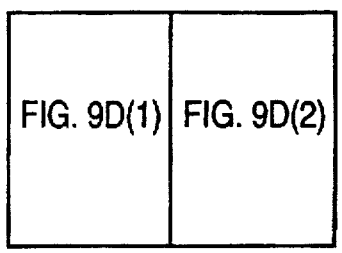
Figure 10A:
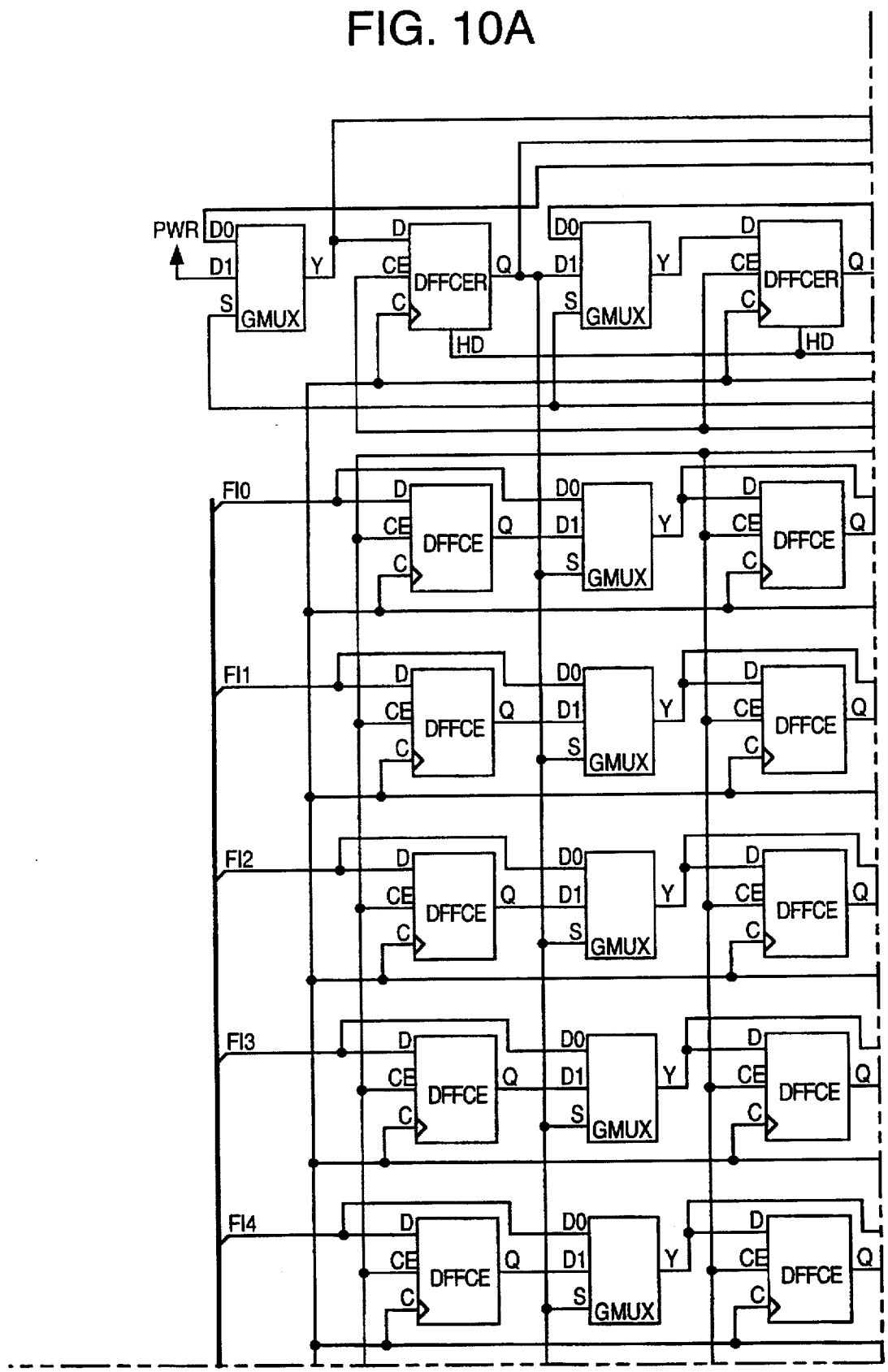
FIG. 10, 10A–10P are a schematic diagram illustrating a parallel port embodiment of field programmable gate array component U2 of the schematic of FIG. 7.
Figure 10B:
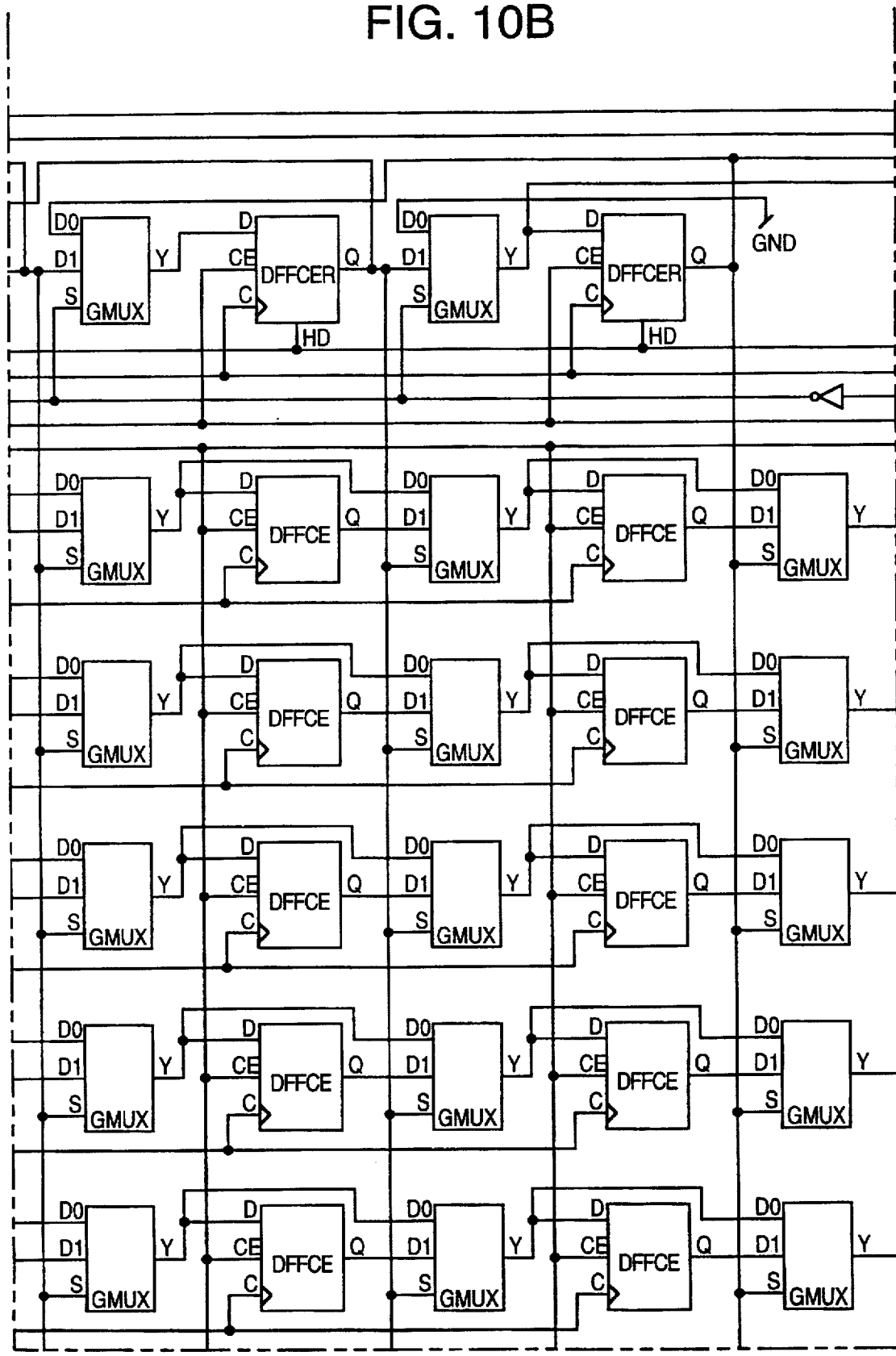
Figure 10C:
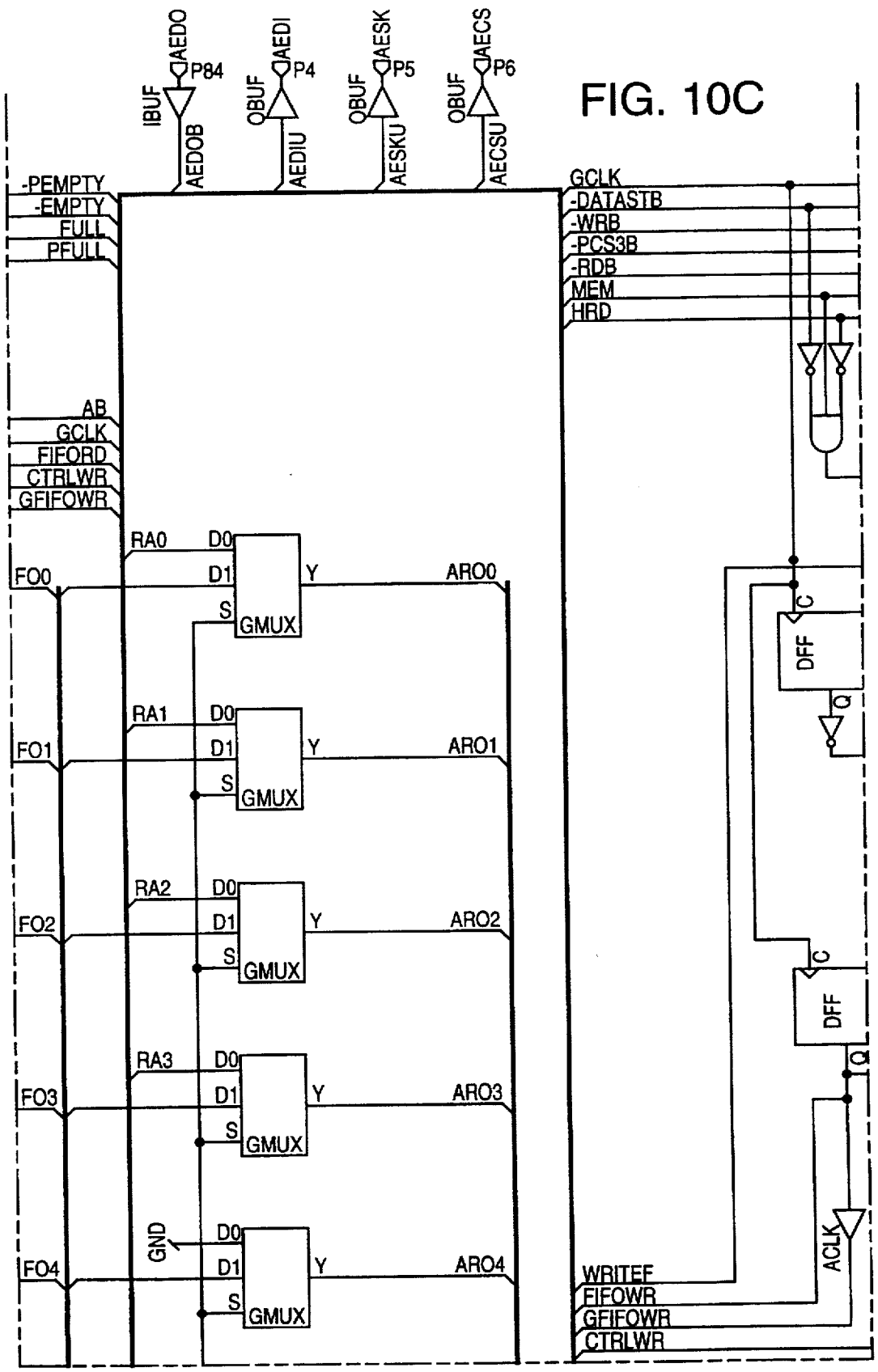
Figure 10D:
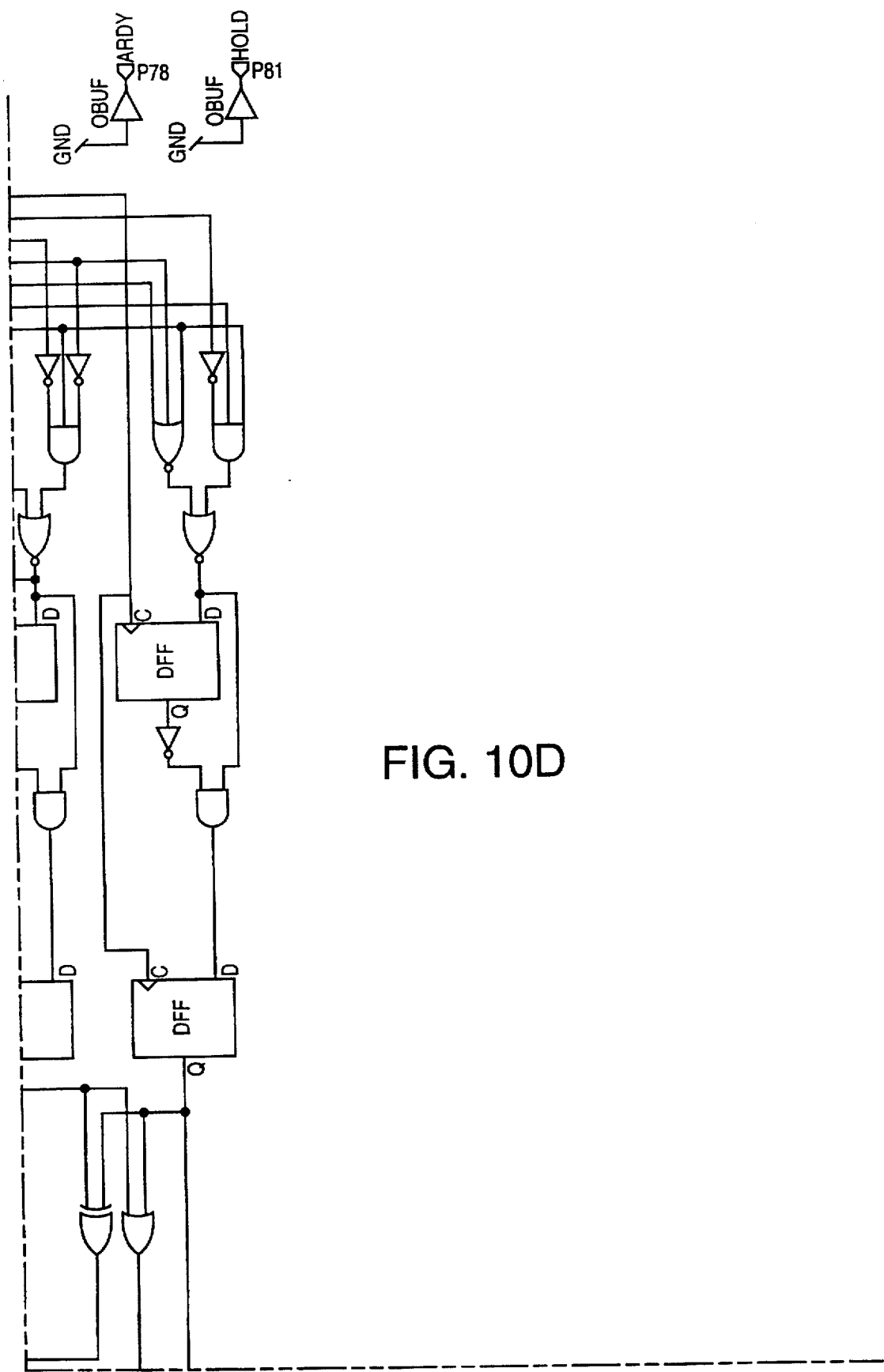
Figure 10E:
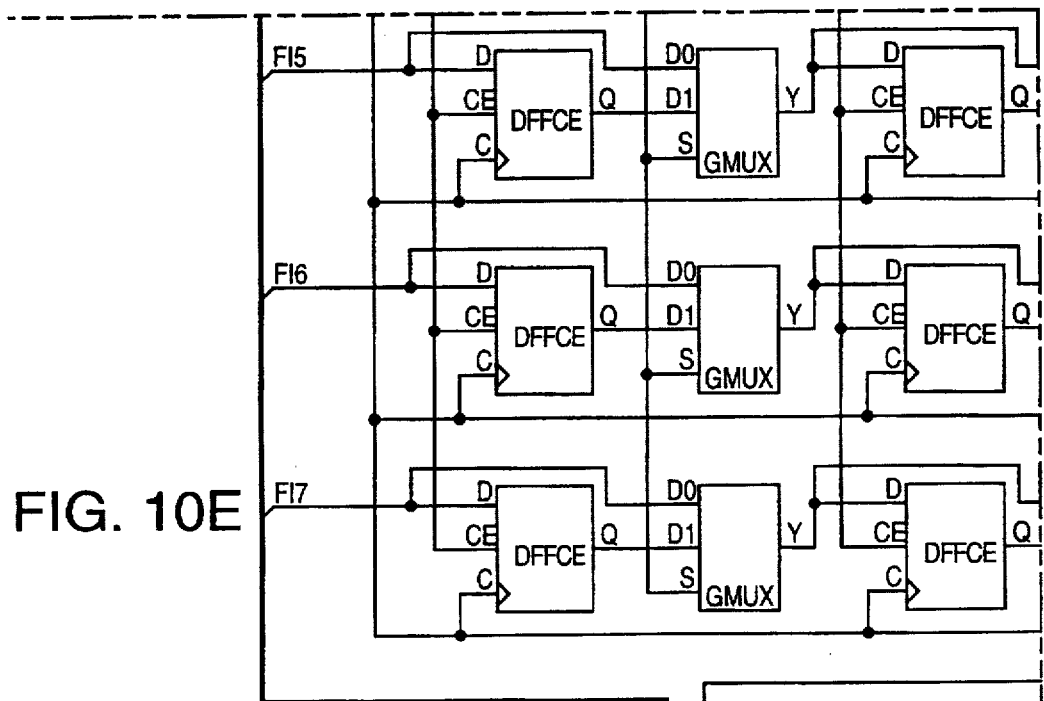
Figure 10E:
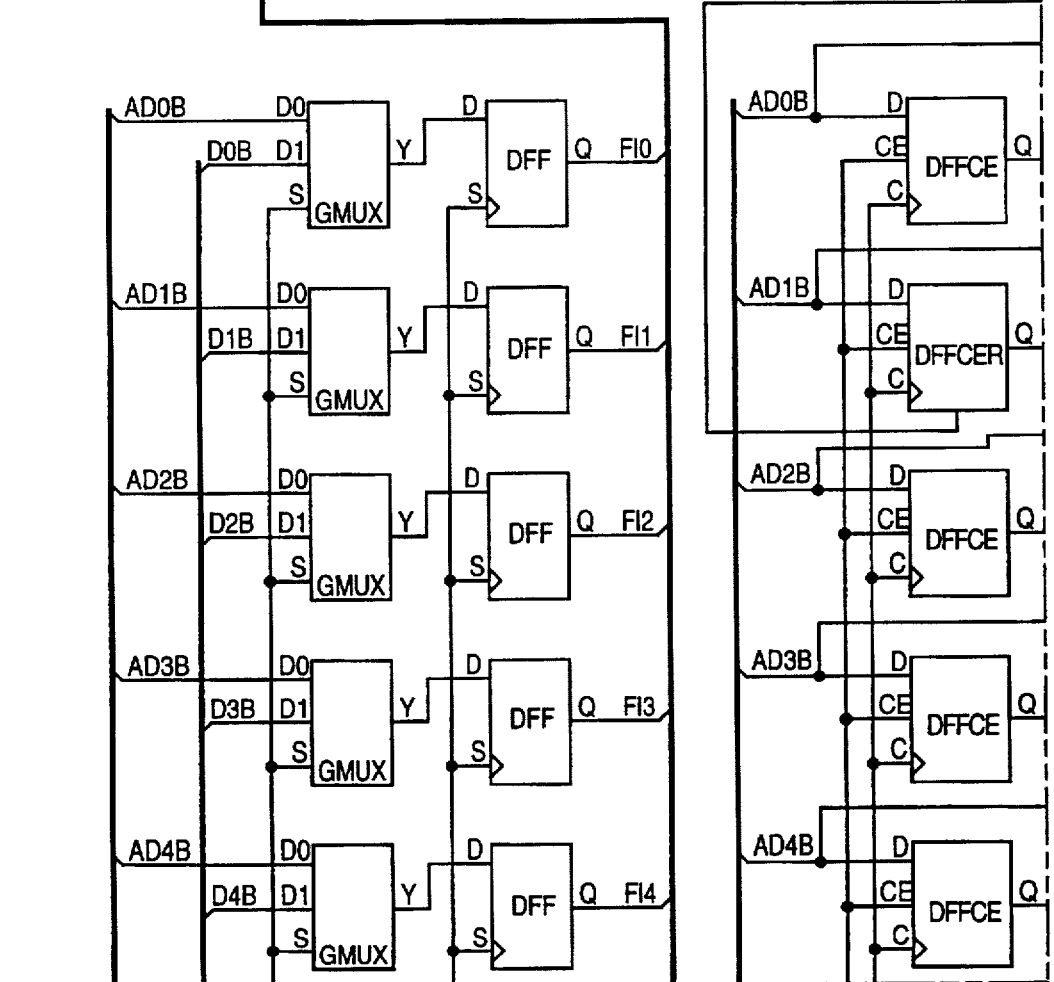
Figure 10F:
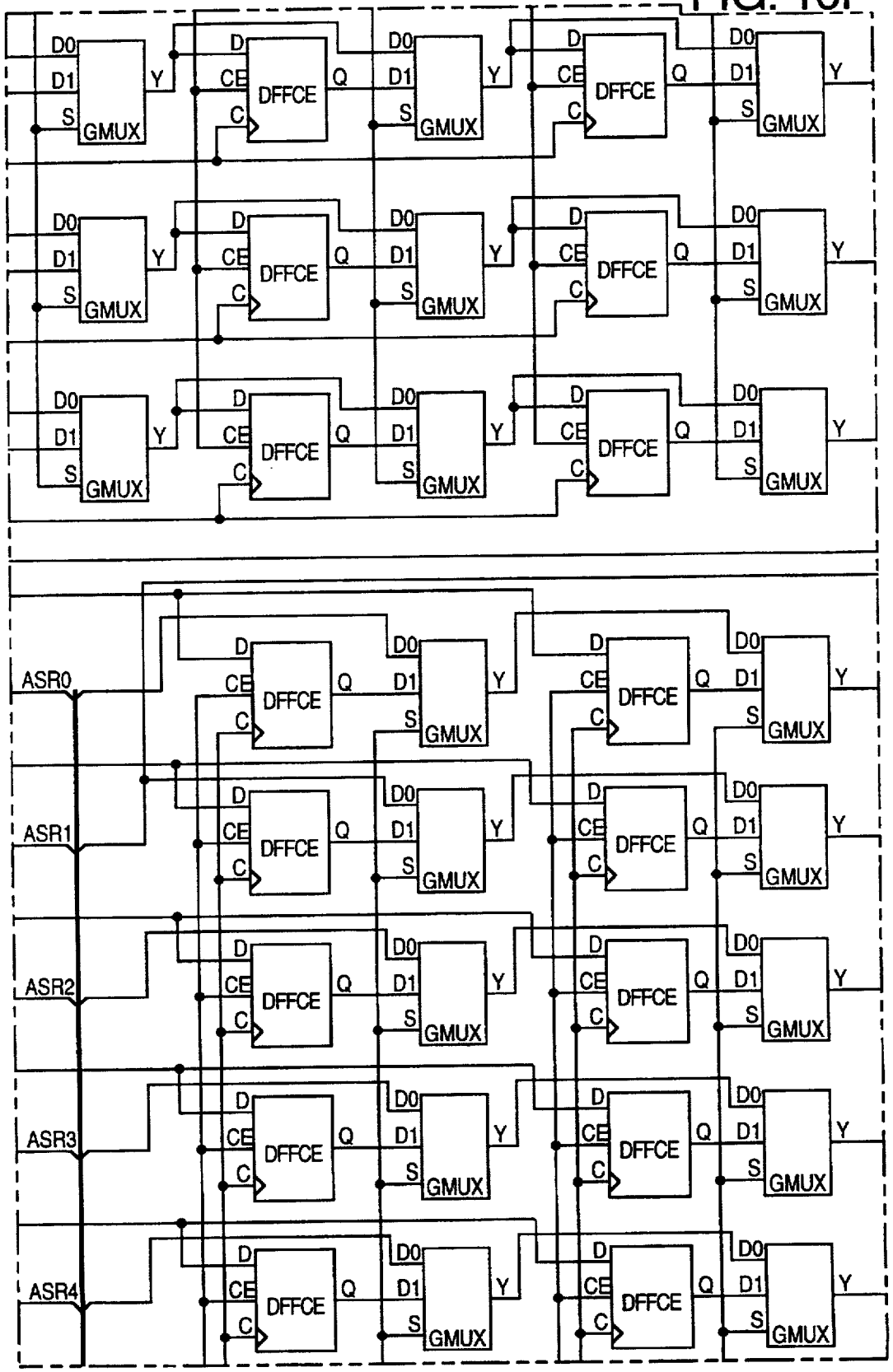
Figure 10G:
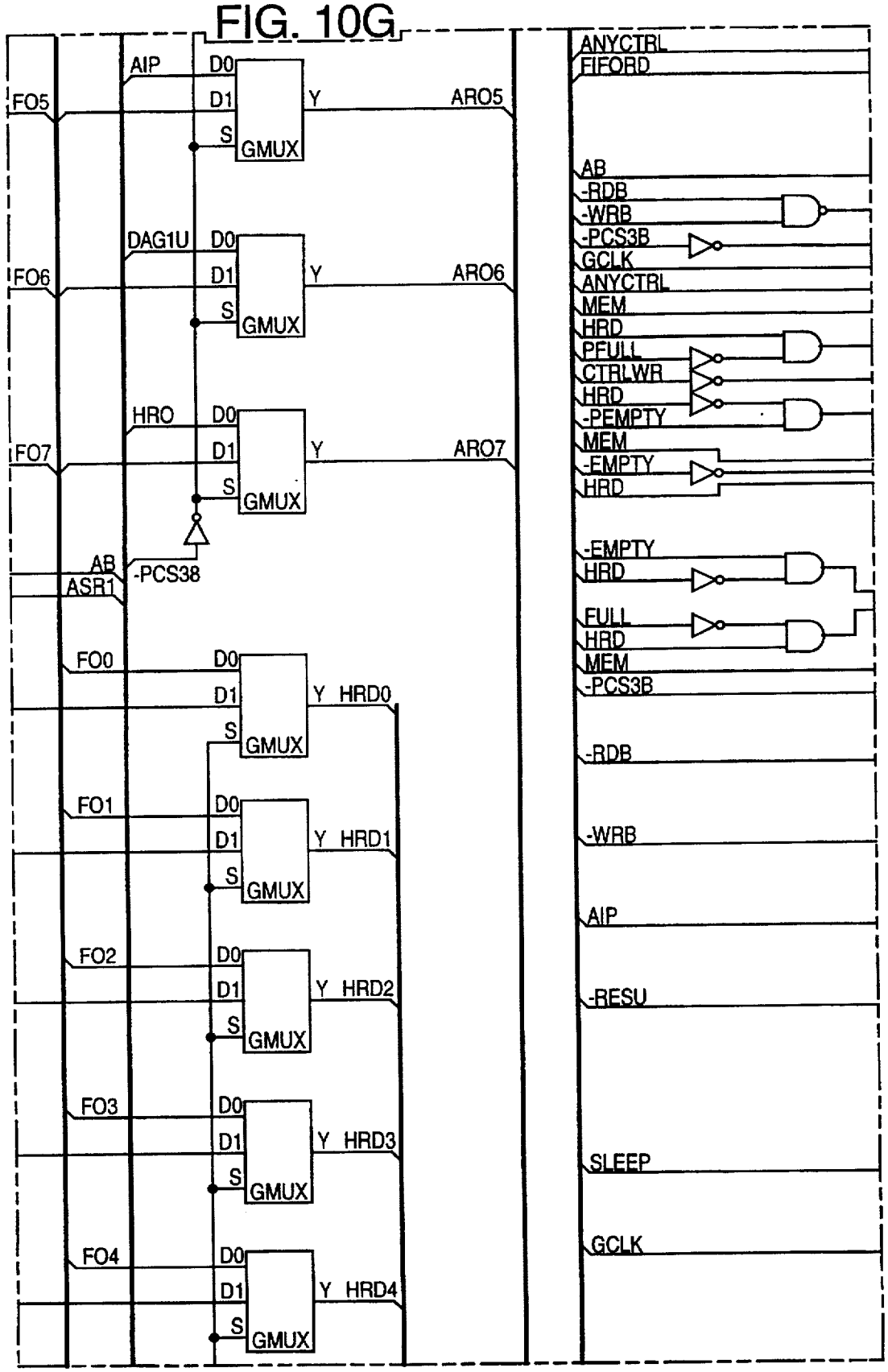
Figure 10H:
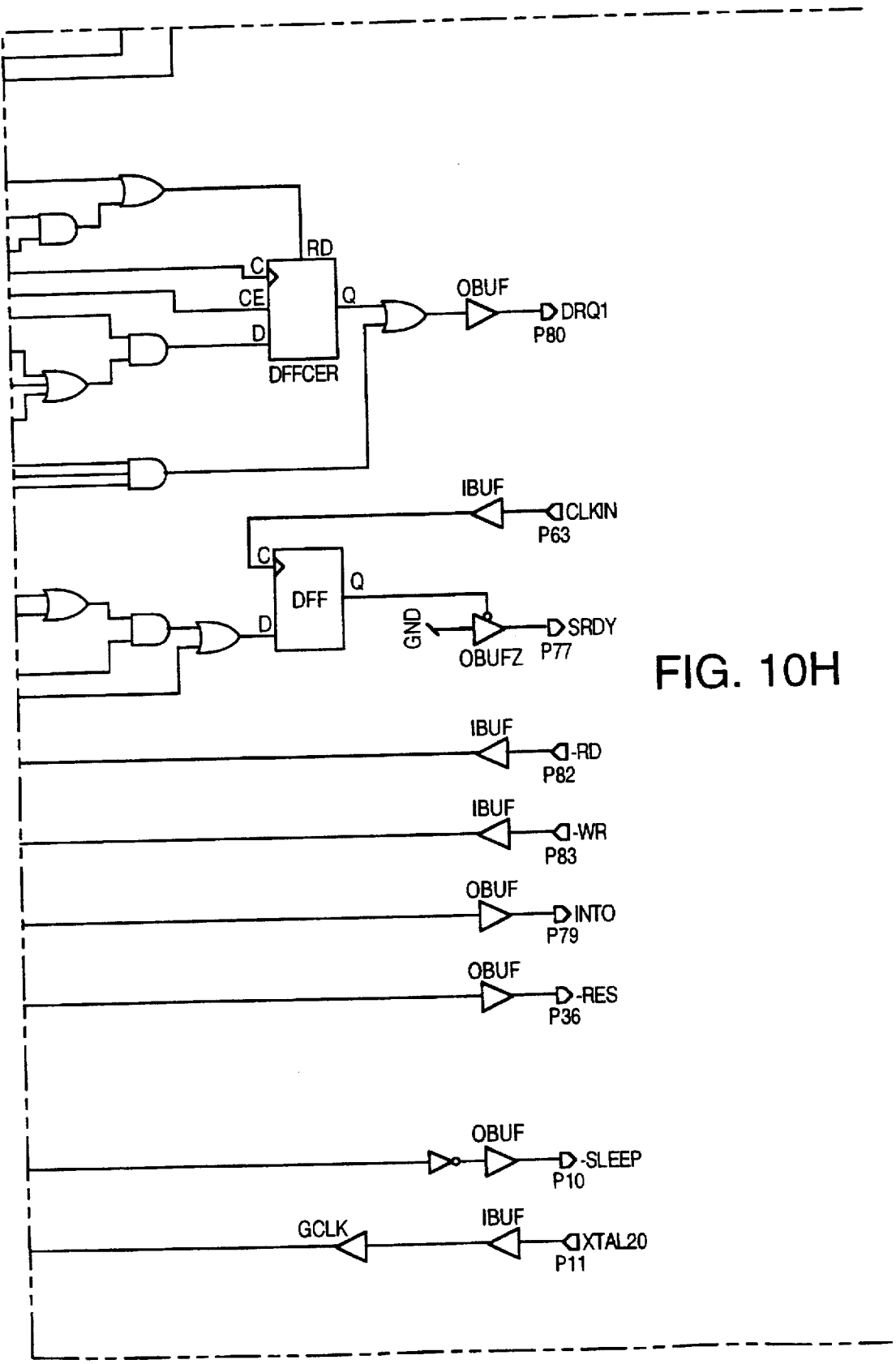
Figure 10I:
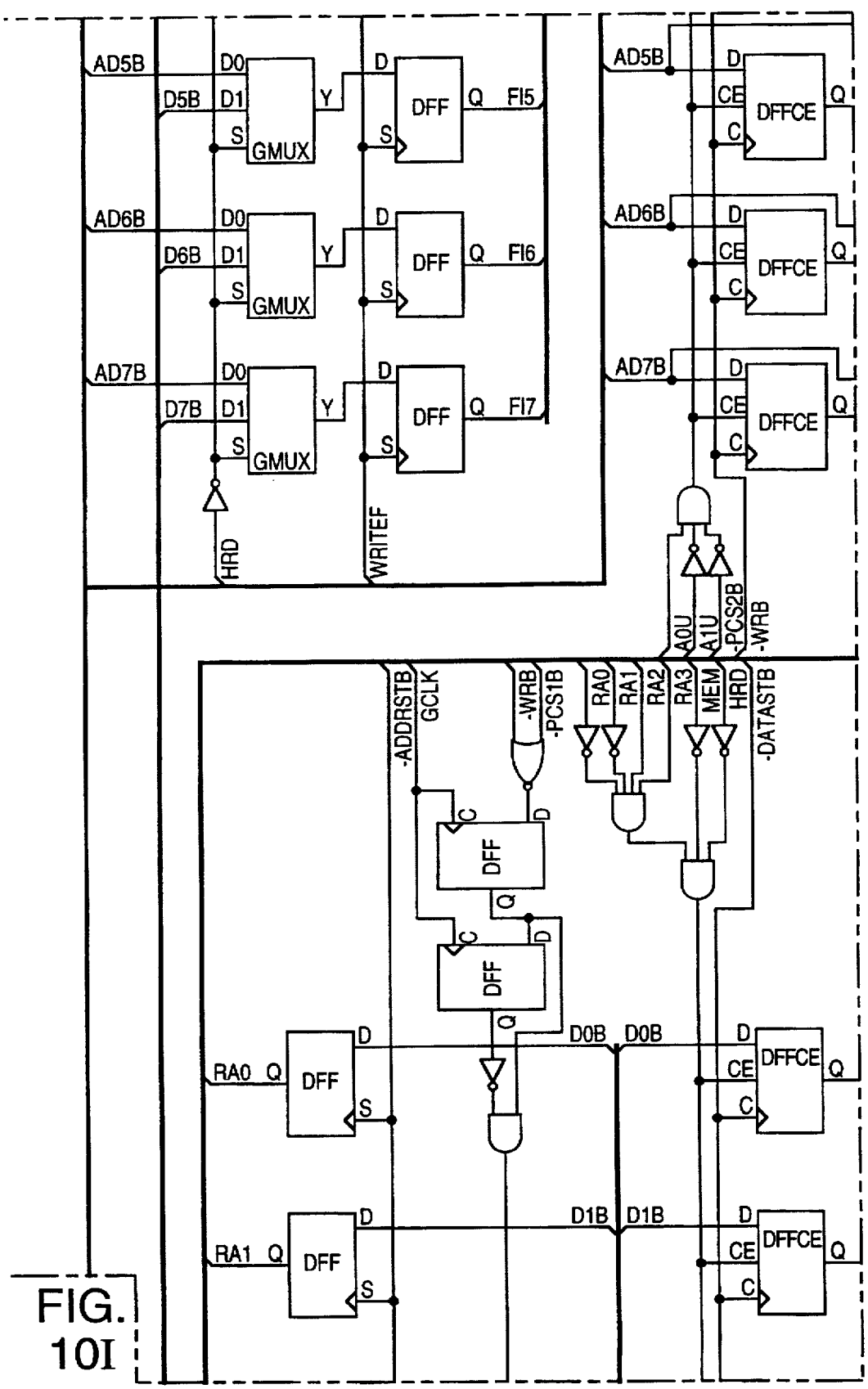
Figure 10J:
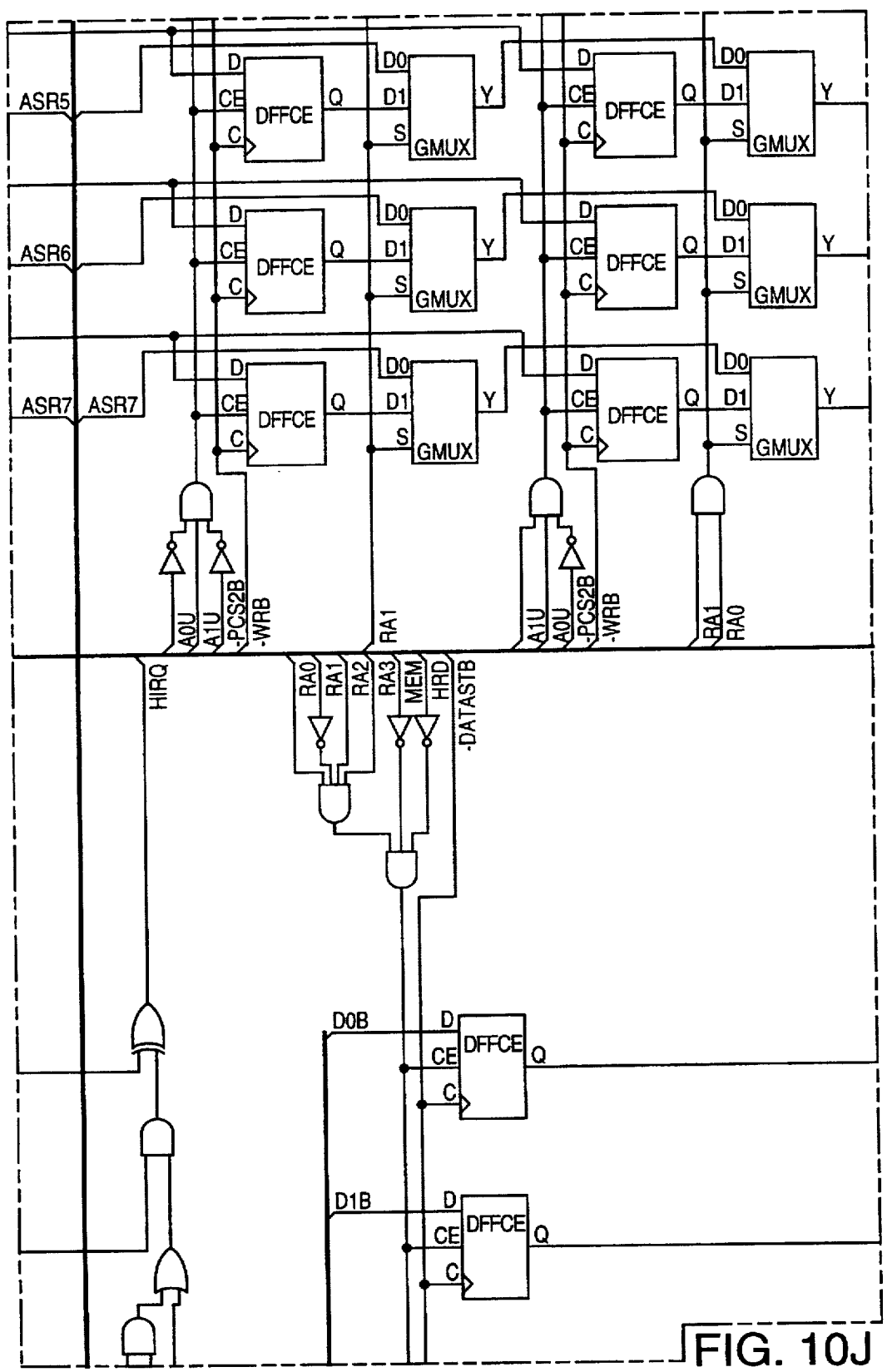
Figure 10K:
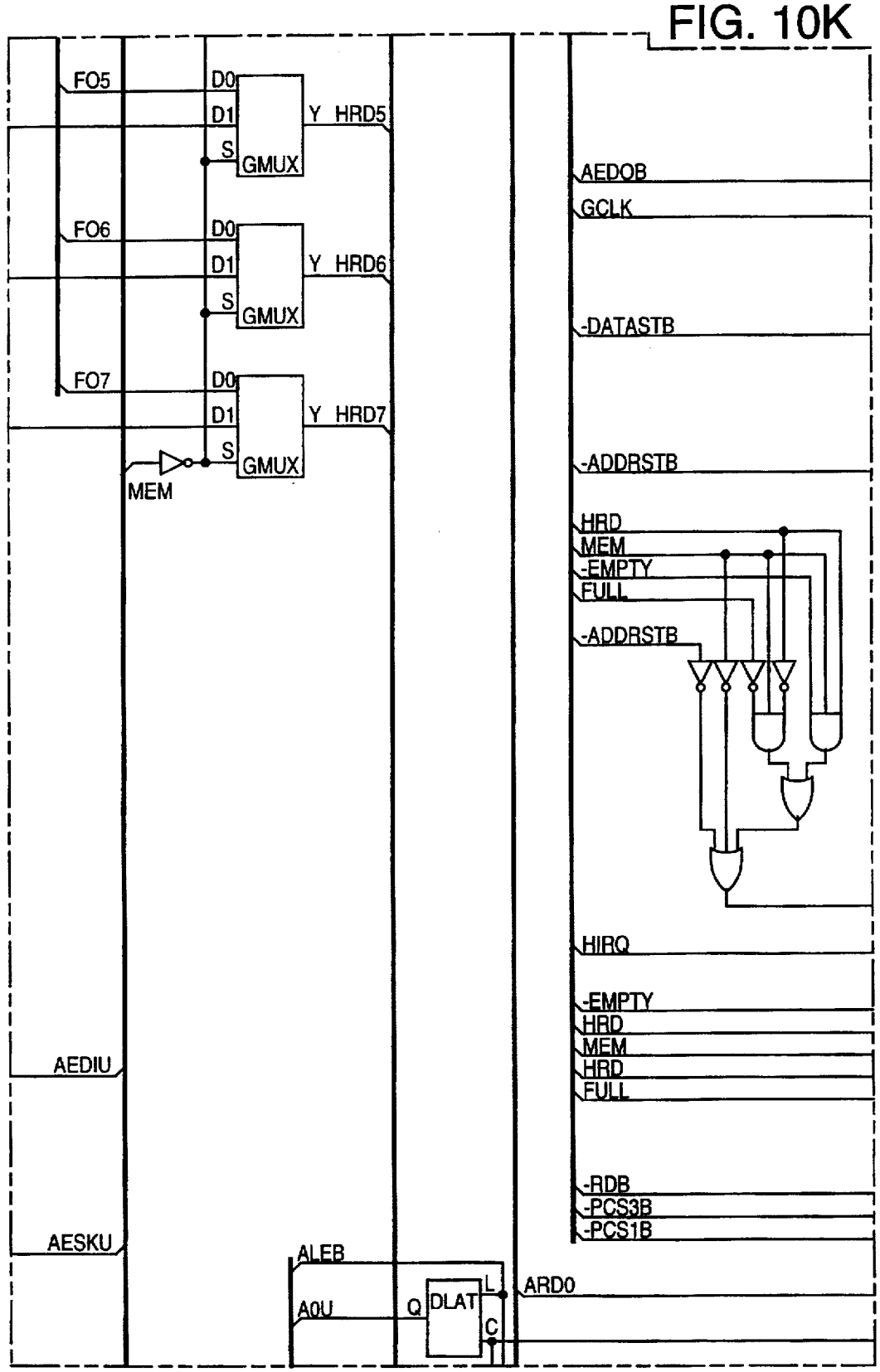
Figure 10L:
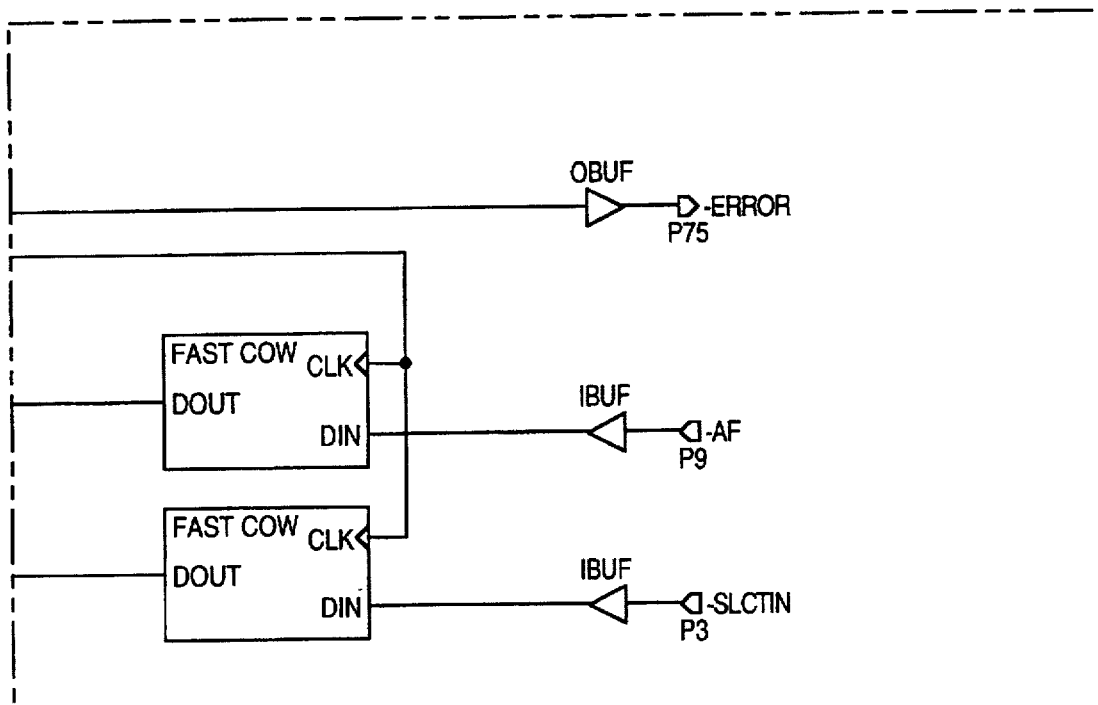
Figure 10L:
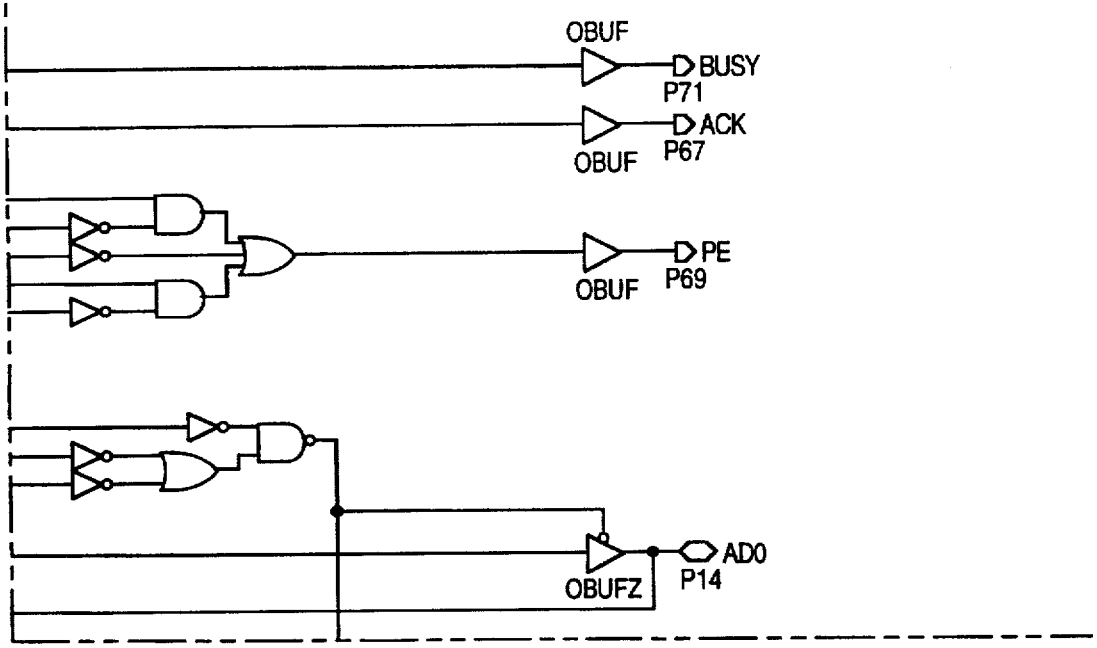
Figure 10M:
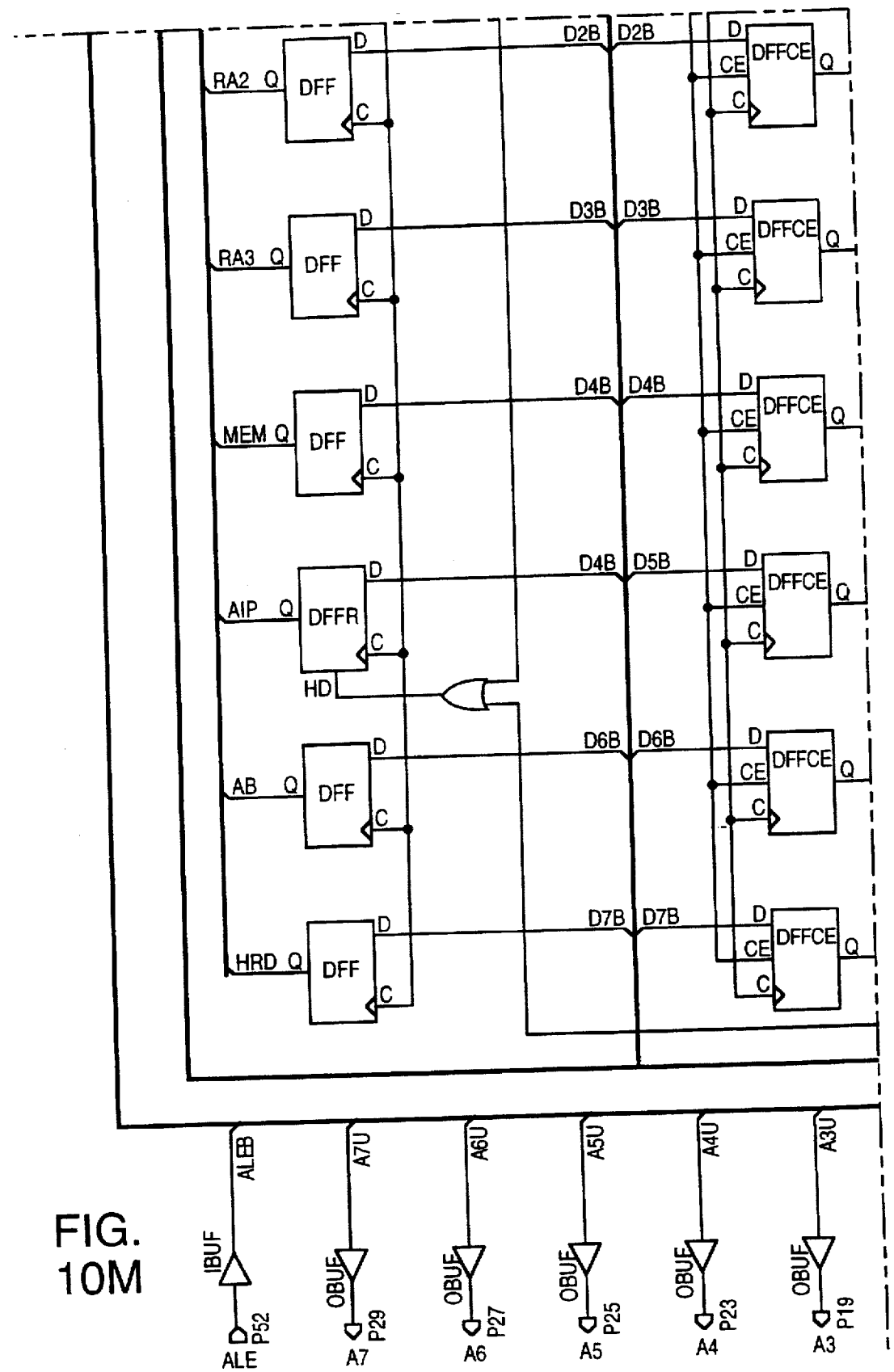
Figure 10N:
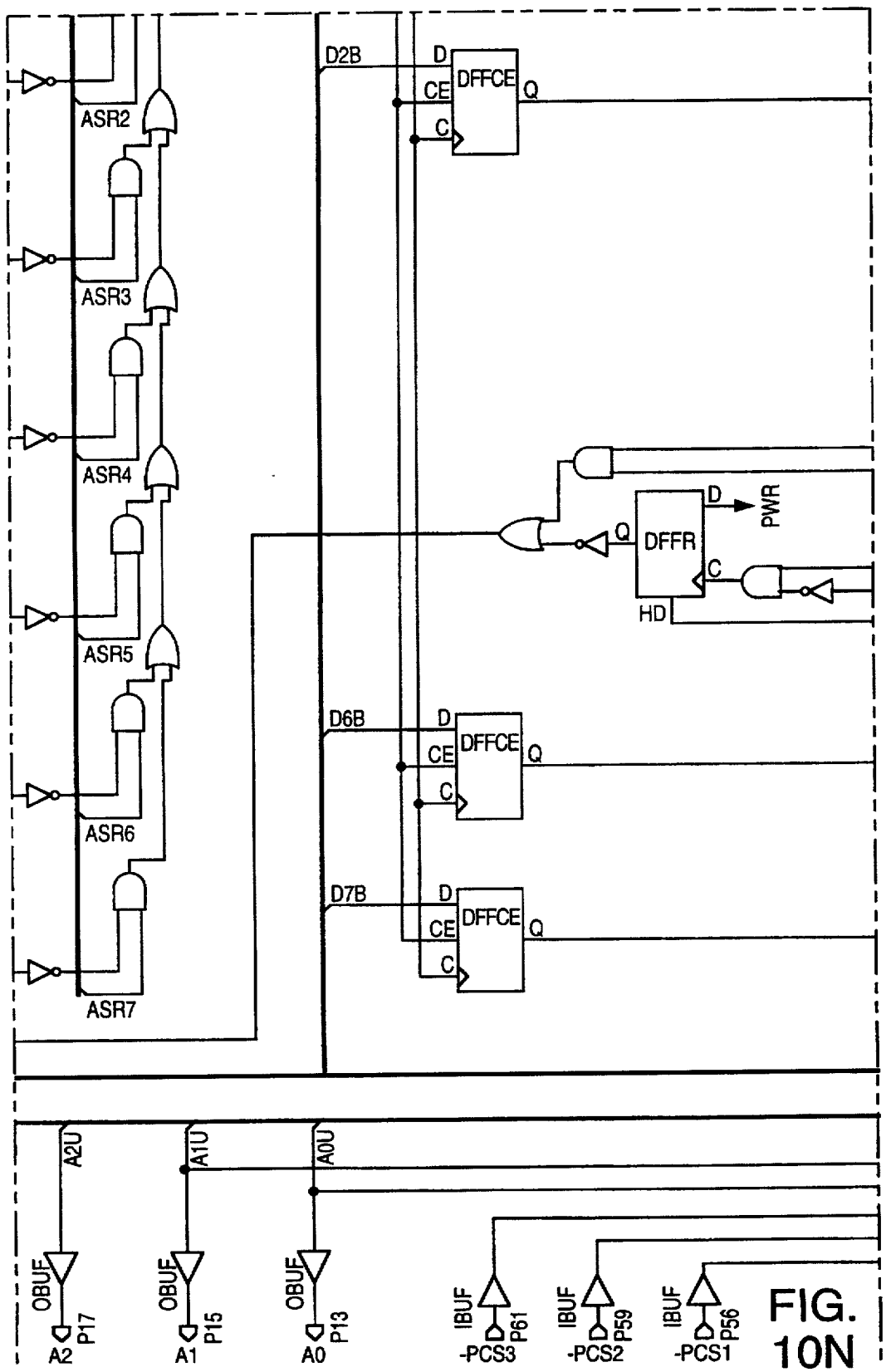
Figure 10O:
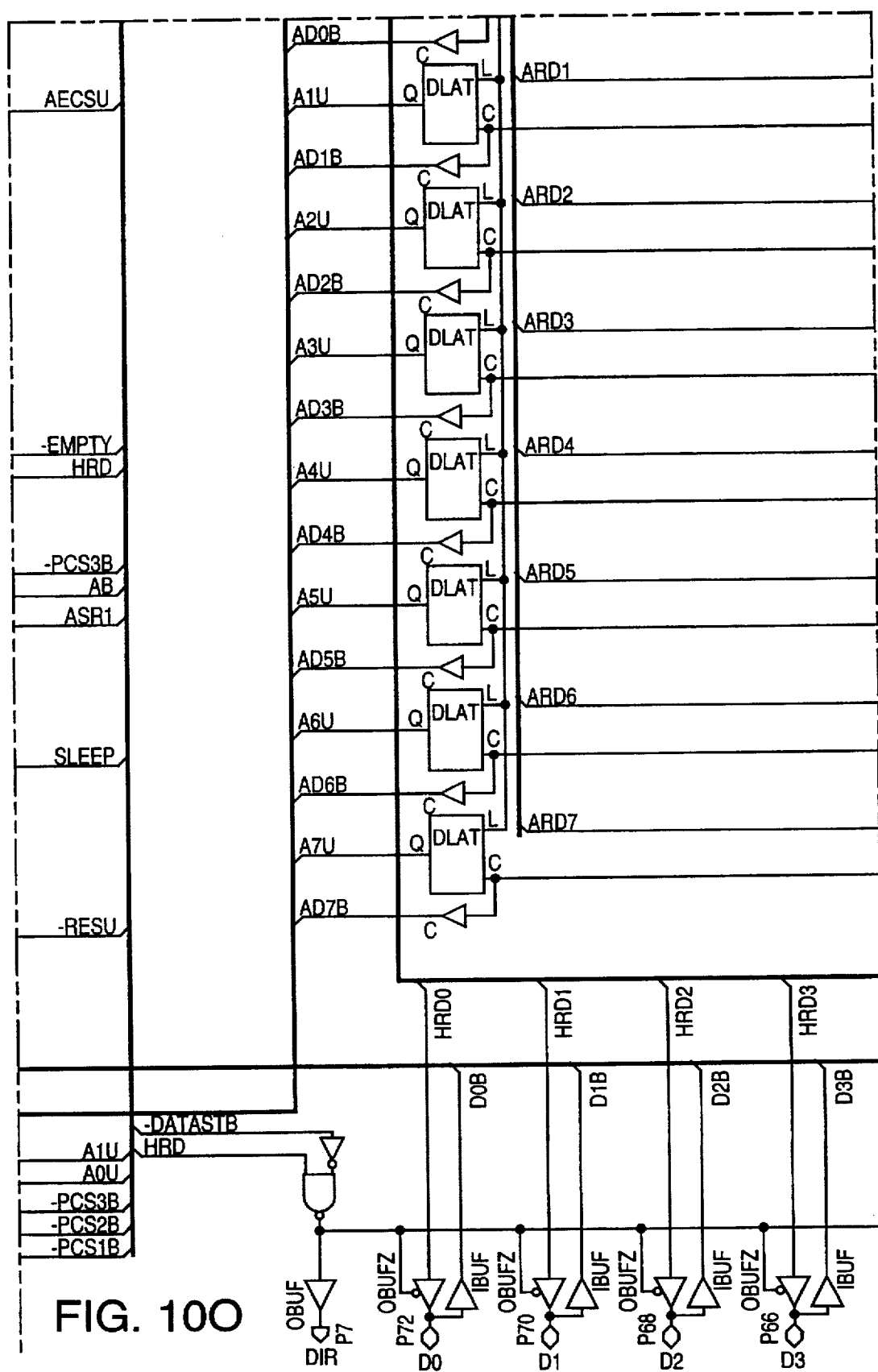
Figure 10P:
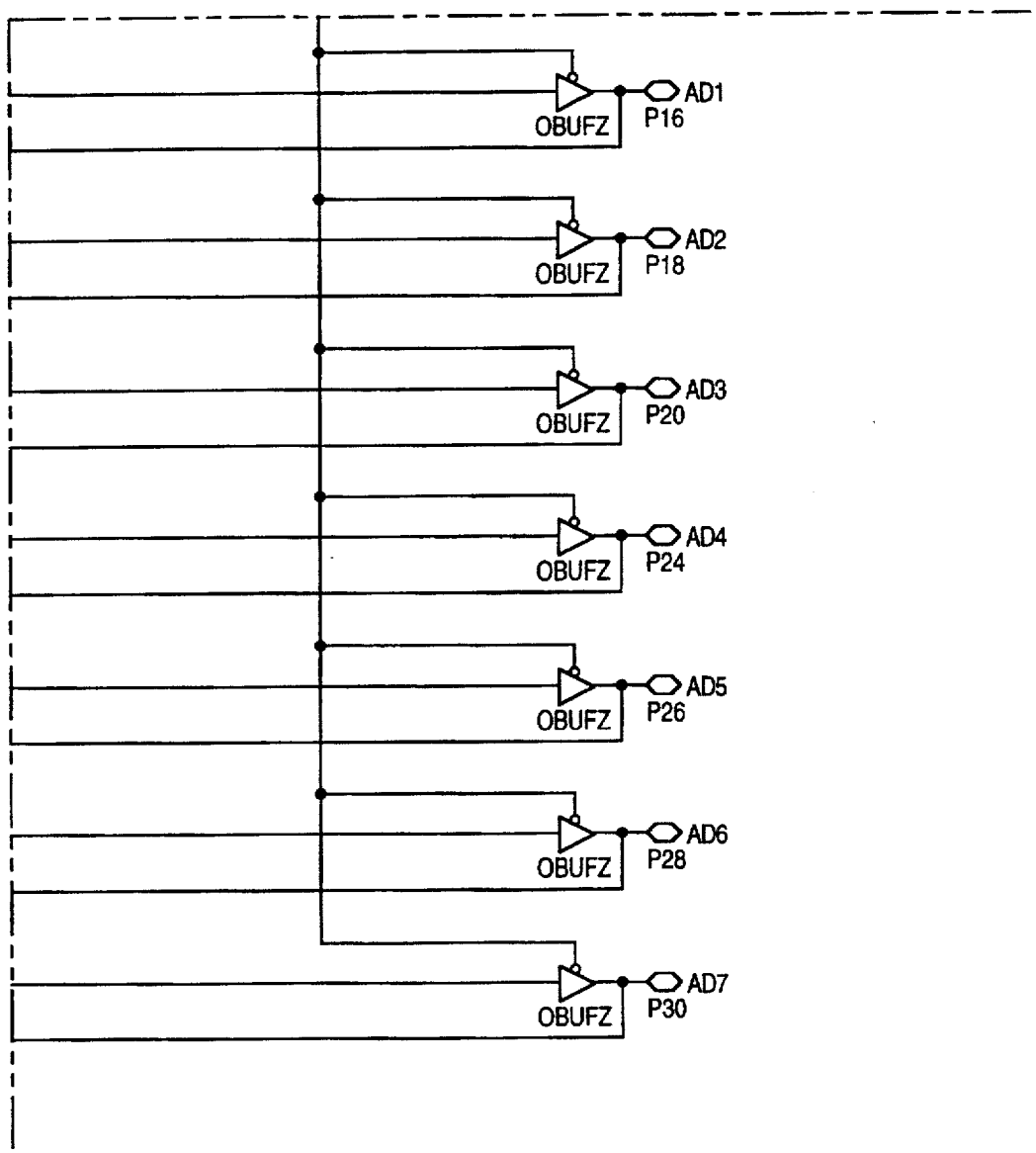
Figure 10P:
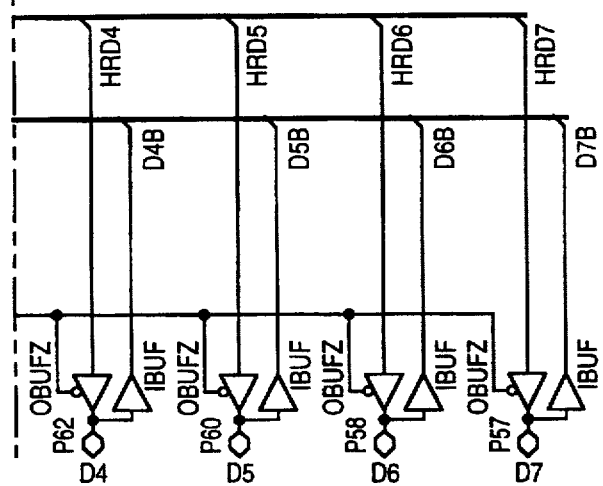
Figure 11A:
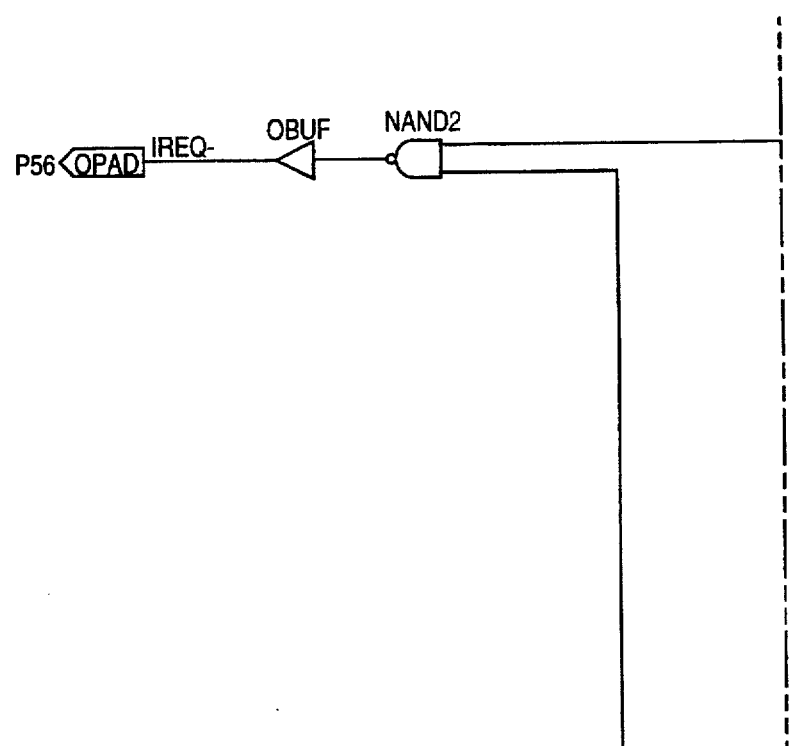
Figure 11A:
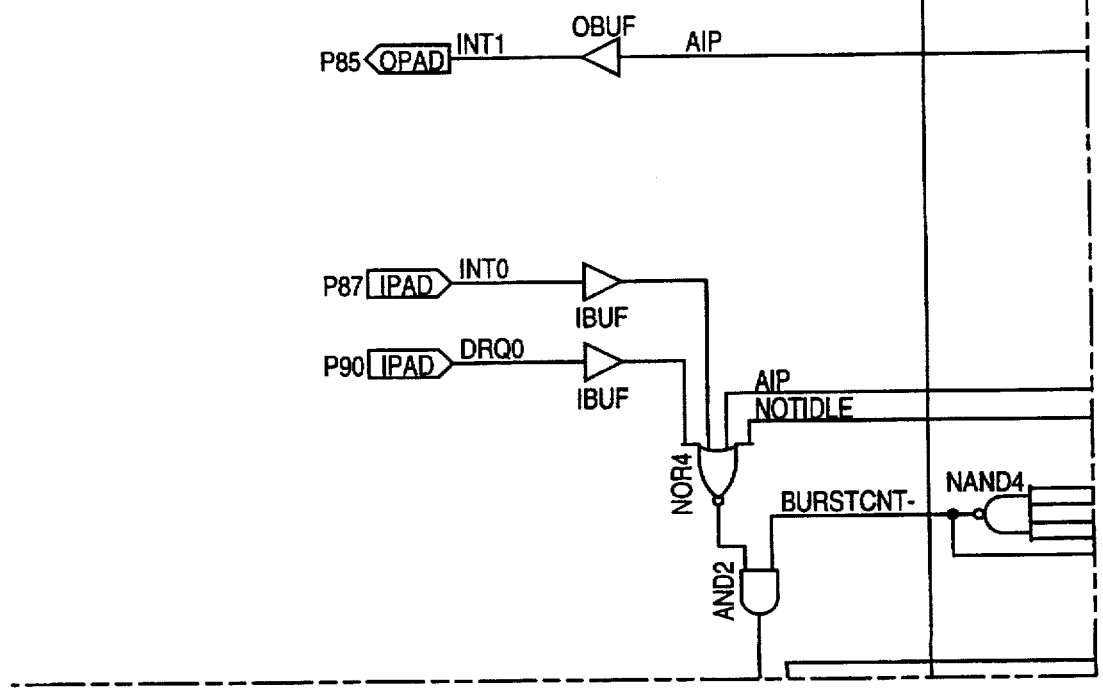
Figure 11B:
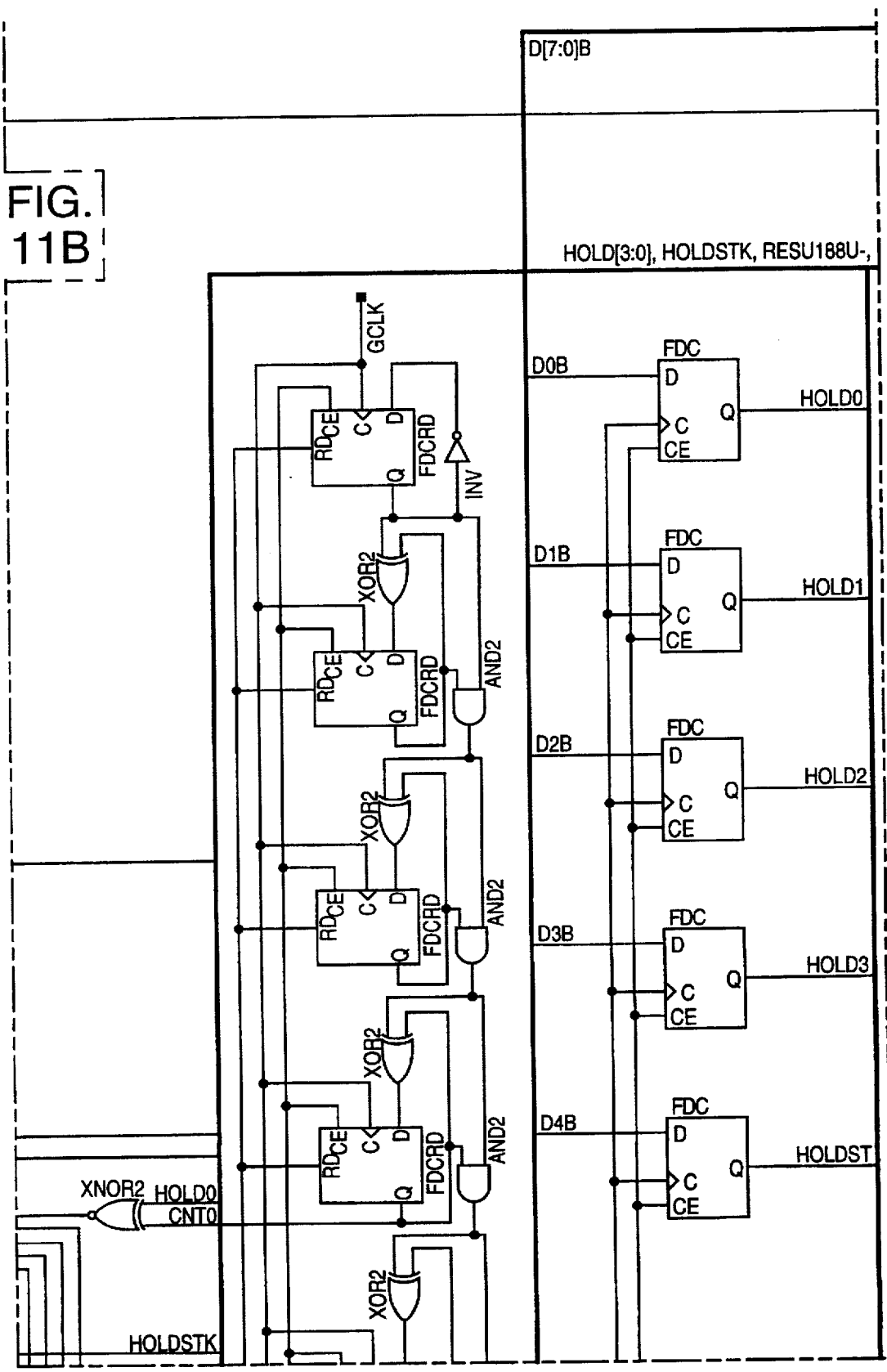
Figure 11D:
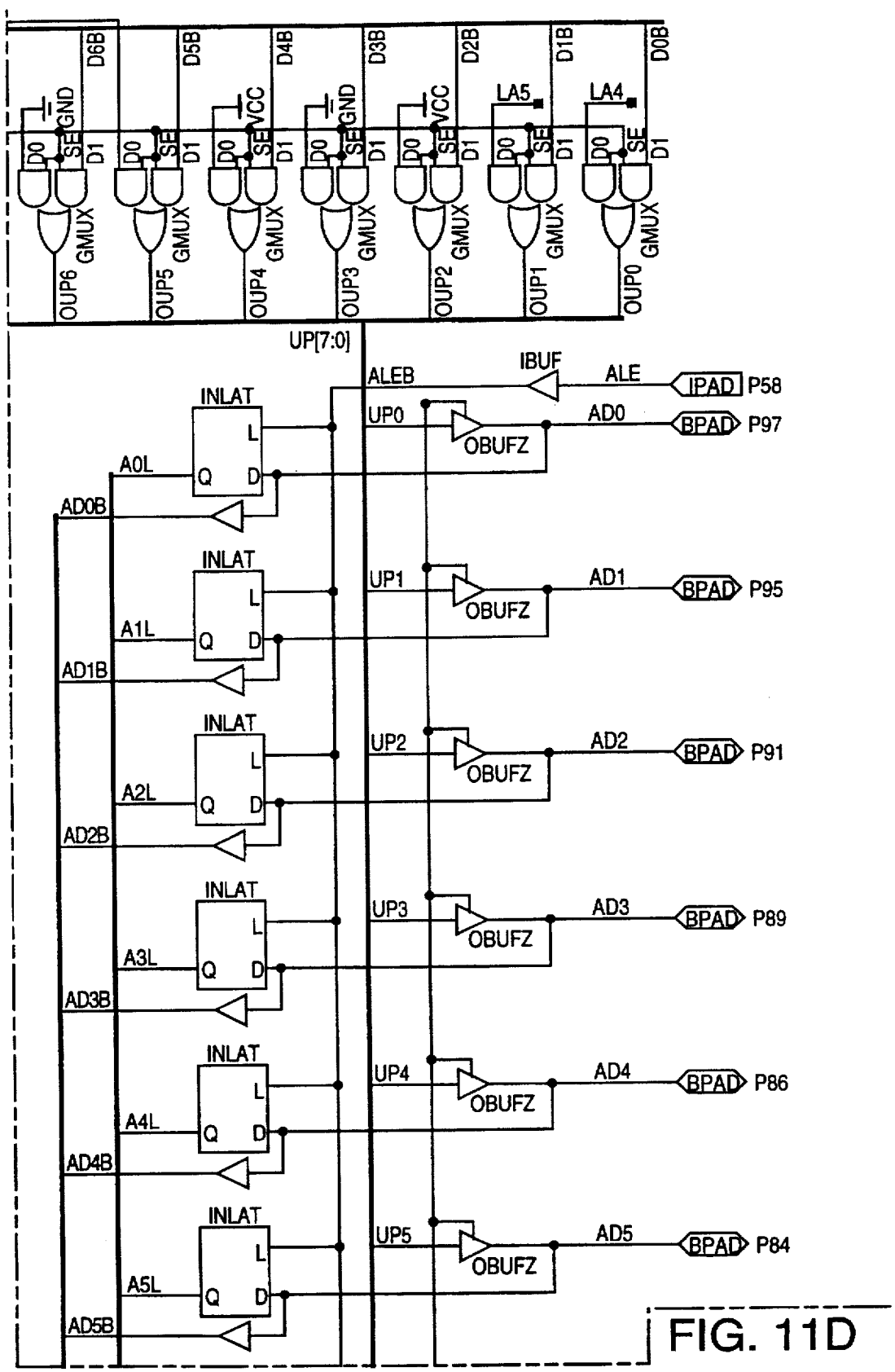
Figure 11E:
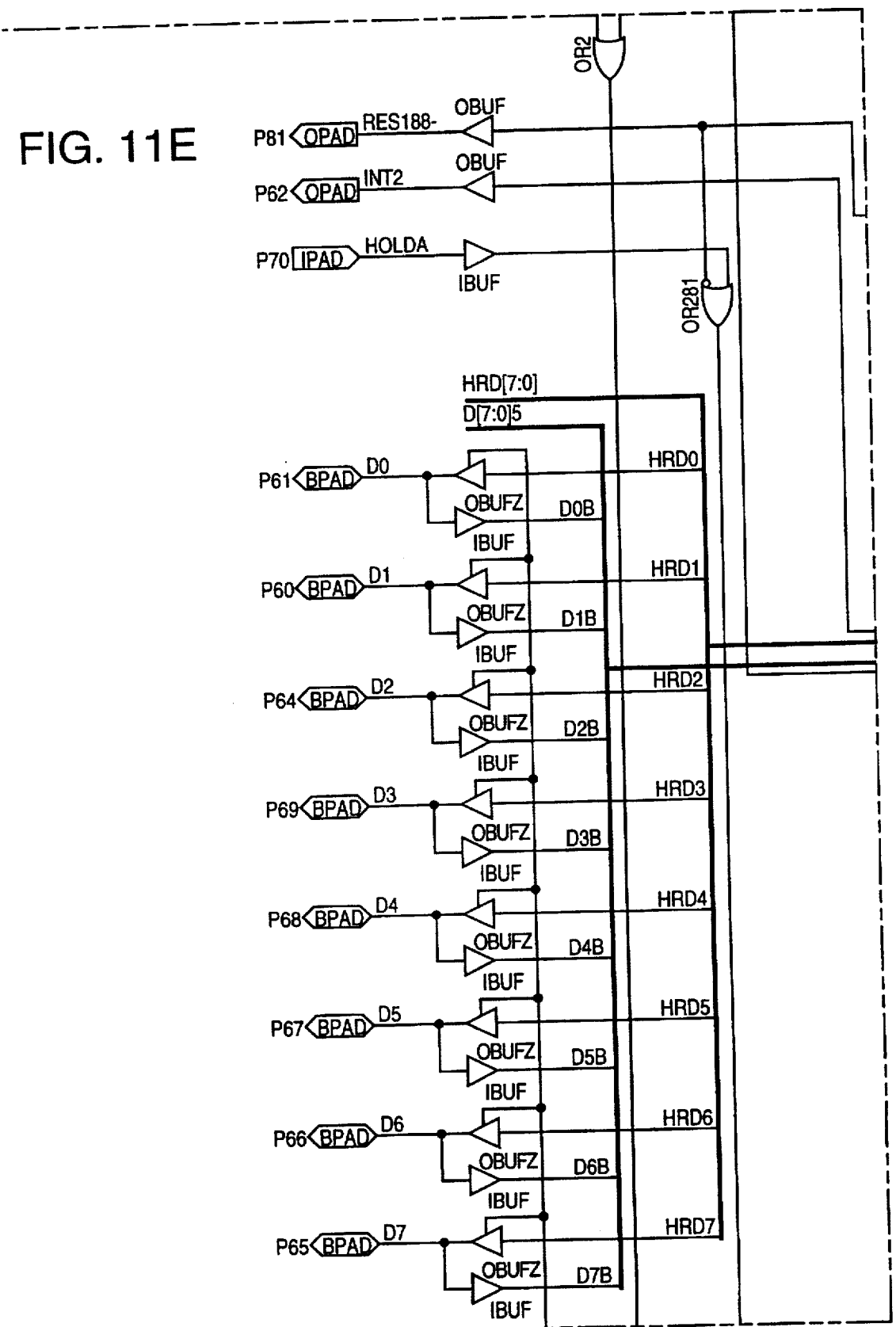
Figure 11F:
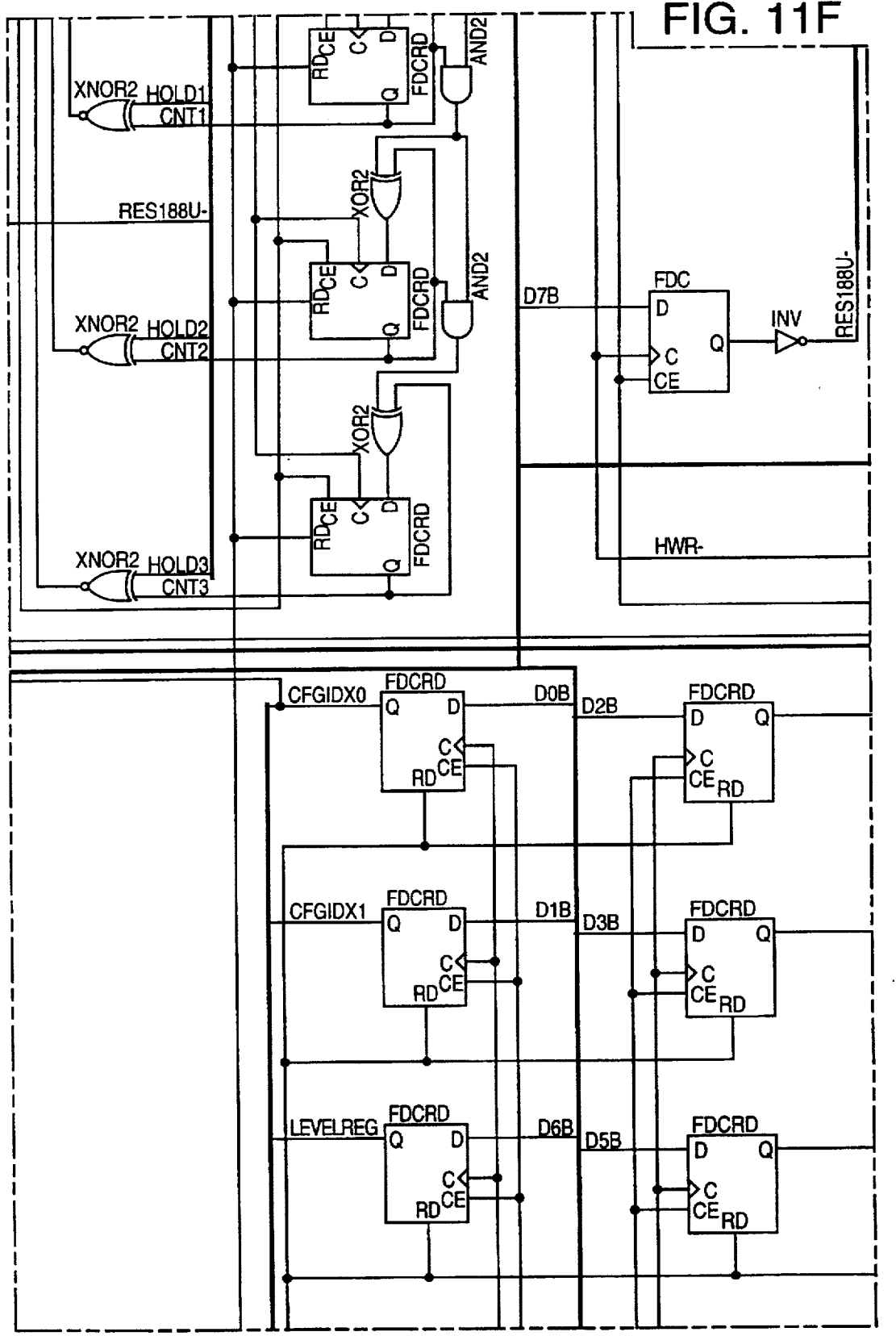
Figure 11H:
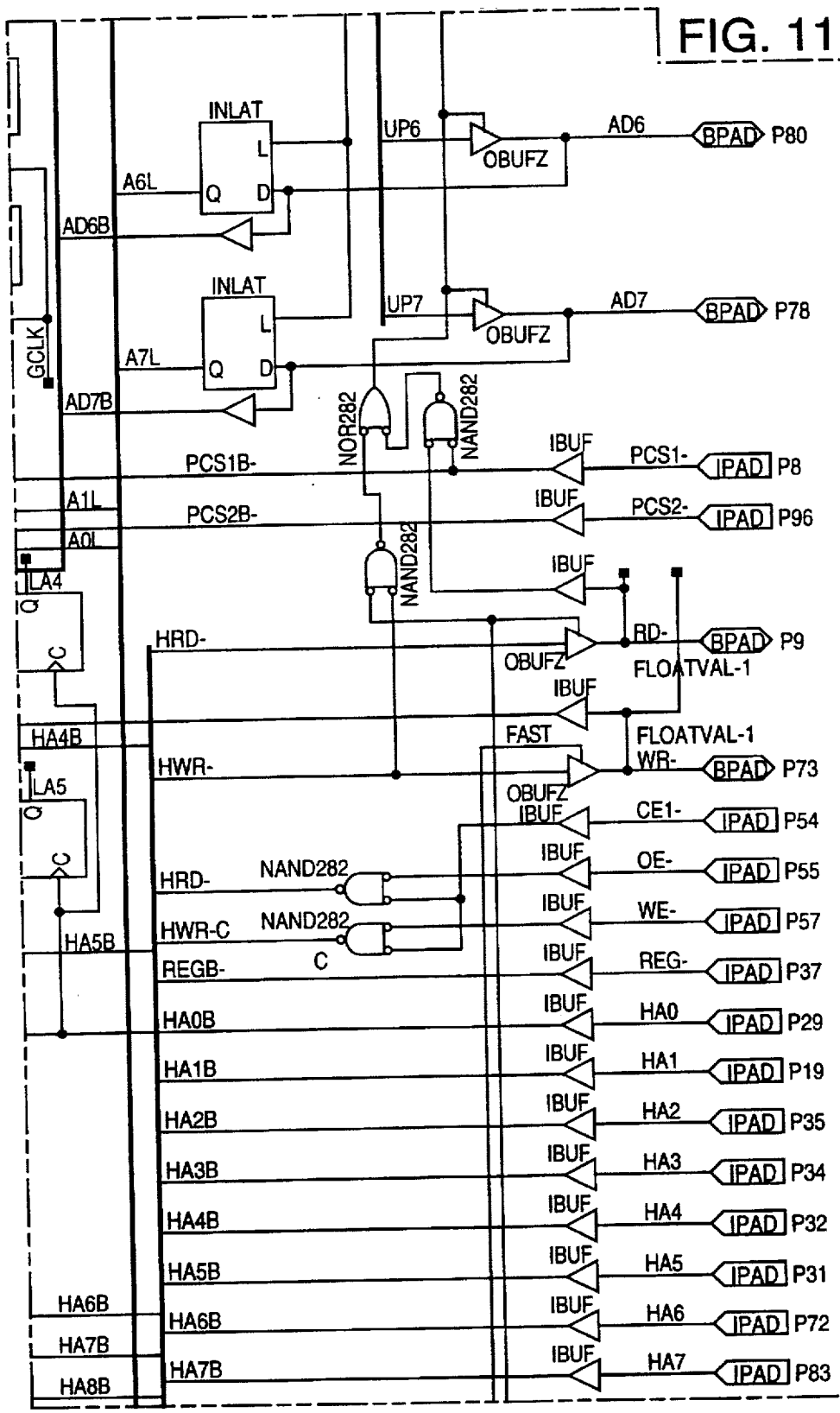
Figure 11I:
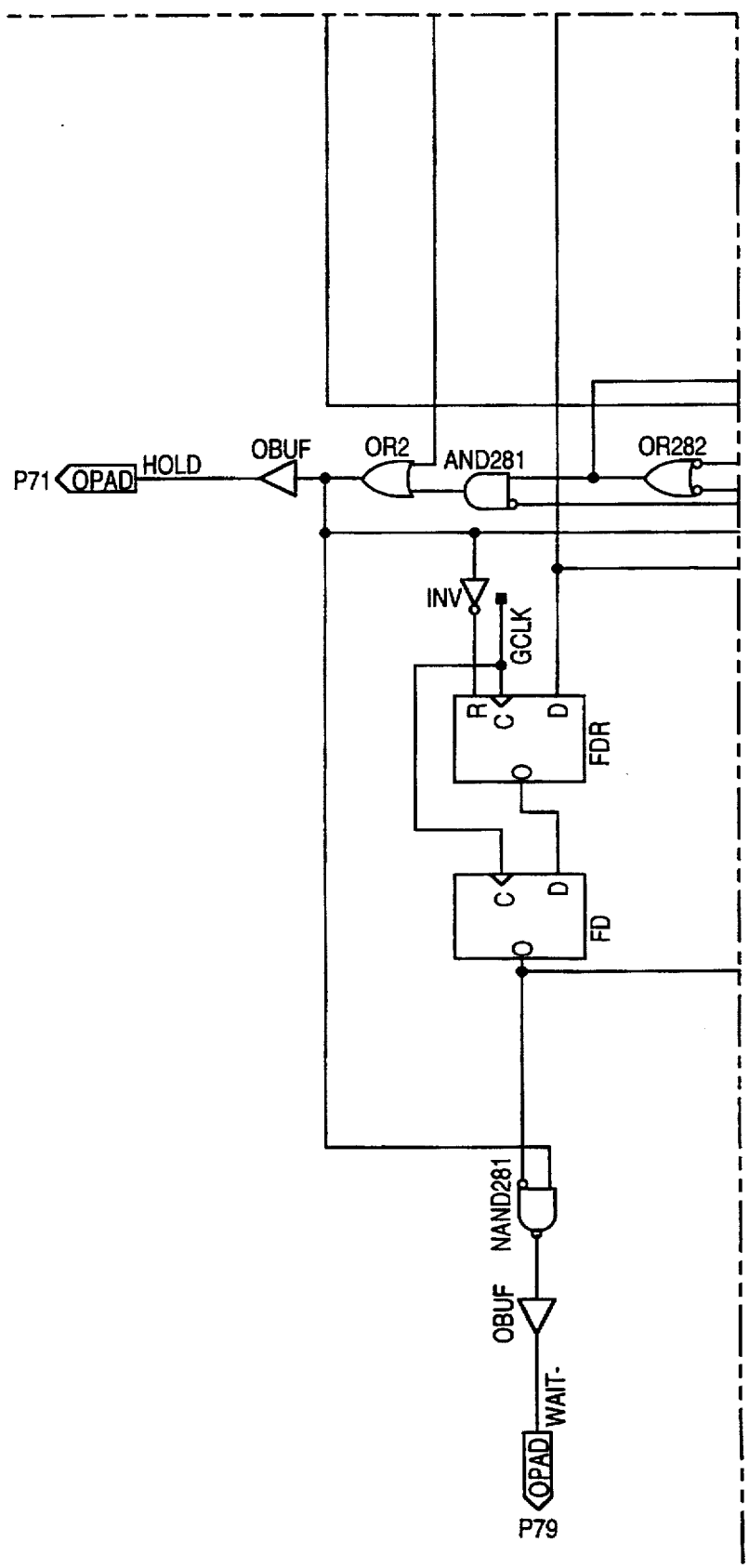
Figure 11J:
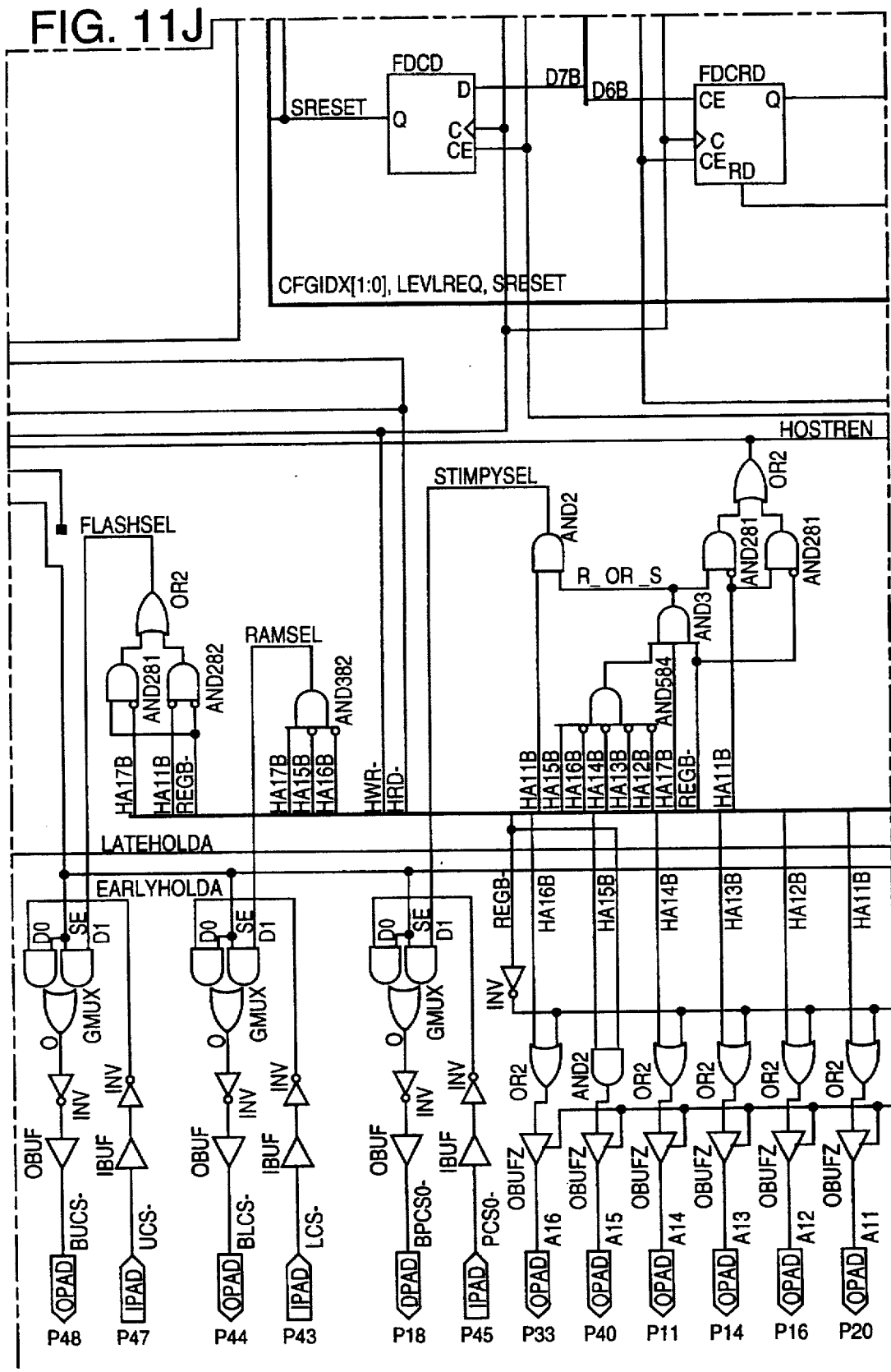
Figure 11K:
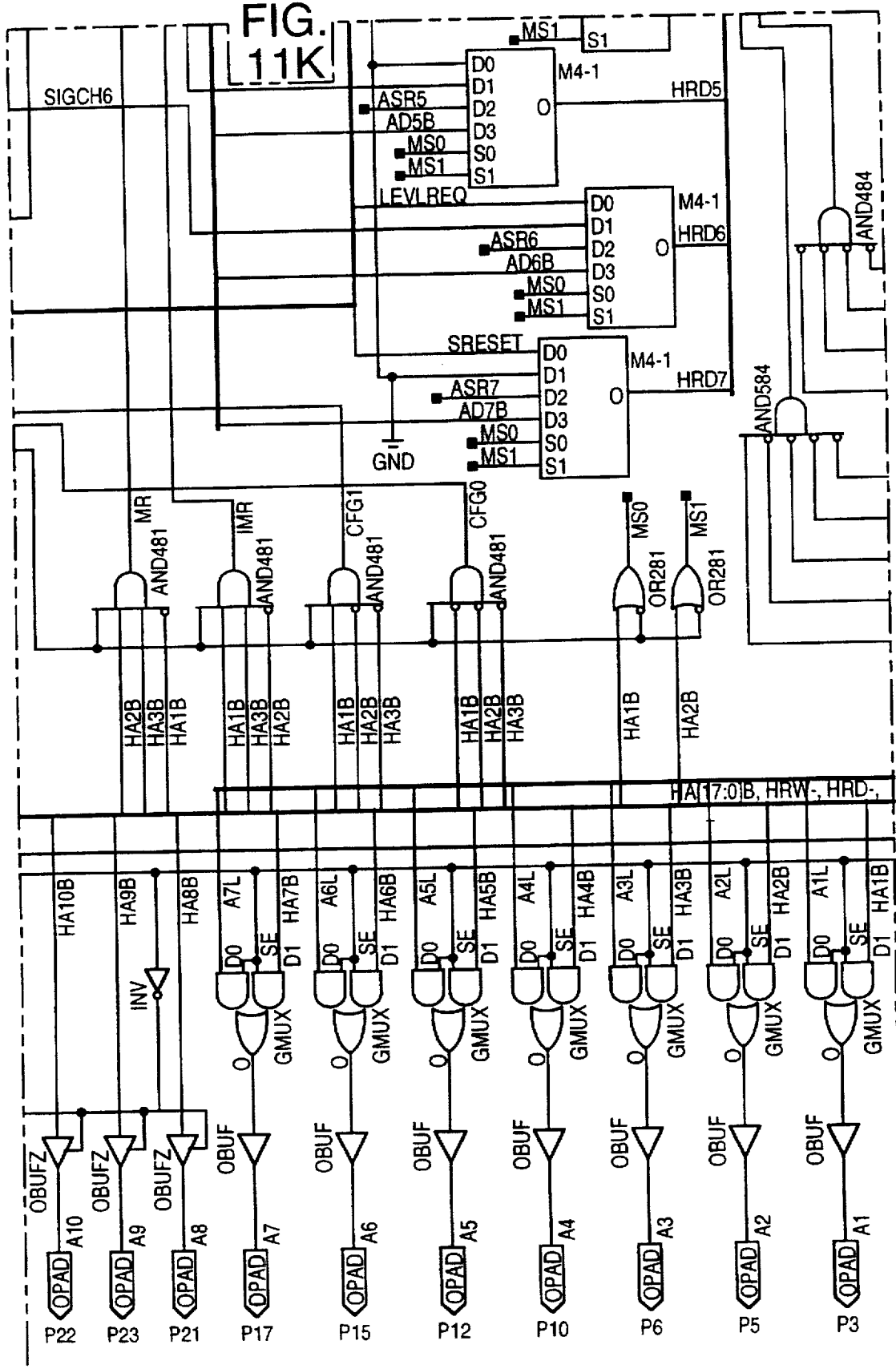
Figure 11L:
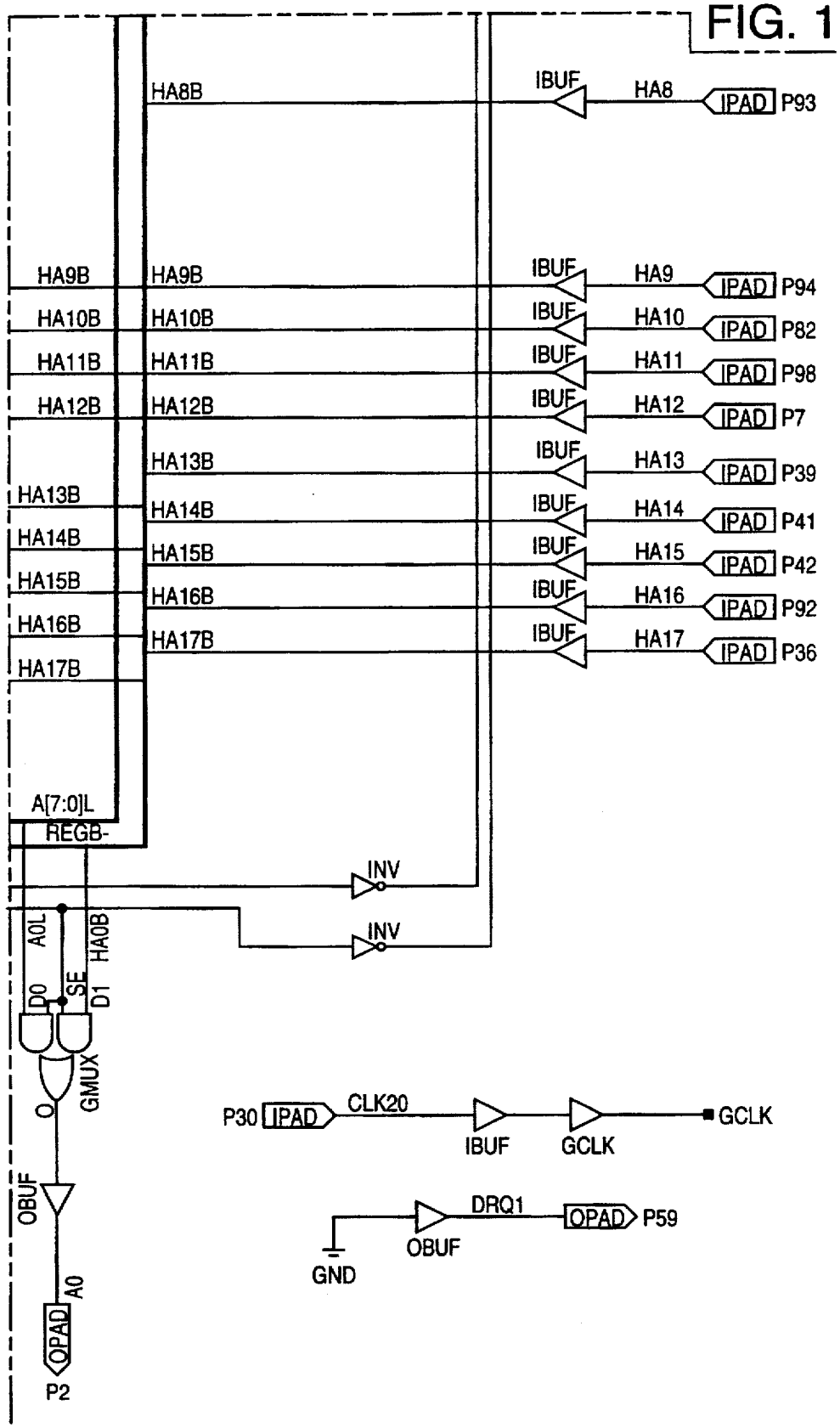

FIG. 9D illustrates a data path and associated control for receiving a serial bit stream into the ASIC from the radio circuit. The incoming serial bit stream is supplied to a Frame Detector/Descrambler/Parallelizer block on the conductor labelled RXD. Frame Detector Descrambler/Parallelizer synchronizes a block to a preamble sequence of incoming alternating ones and zeroes, detects a frame delimiter bit sequence, determines from the header of the incoming frame whether or not data bits follow, determines where in the frame those data bits are located, descrambles any following data bits based on a key which is supplied on bus KEY [15:0], and assembles the resulting bits into parallel bytes which are output from the block on the data bus labelled RXDATA[7:0]. A clock signal is also received from an incoming stream of bits which is described in further detail in the copending U.S. patent application entitled "NRZ Clock Recovery With Instant Lock" by Swaminatha V. Vasudevan, filed Jun. 25, 1993.

The RX CRC Generator block checks the sequence of incoming bits with the incoming CRC bits. The Parser block receives the sequence of data bytes RXDATA[7:0] from the Frame Detector/Descrambler/Parallelizer and parses the various bytes of the frame being received. The Parser also determines whether the frame being received is an Announce frame, an RTS frame, a CTS frame, a Data frame, or an ACK frame. A 13-byte deep Receive FIFO is provided to buffer successive bytes received on the bus RXDATA[7.0] so that they can be read on bus RXFIFO[7:0]. The Receiver Core FSM writes a byte of parallel information once every eight microseconds into the Receive FIFO block. The Receive FIFO is 13 bytes long as opposed to 5 bytes long like the transmit FIFO so that when the microcontroller is very busy, the radio controller ASIC will be able to receive and store an entire RTS, CTS or ACK frame without suffering a FIFO overflow.

In operation, the host (i.e. portable personal computer connected to a mobile unit) may wish to send a frame comprising a number of bytes over the radio link to another mobile unit or to an access point unit on a local area network. Bytes of the frame are written by the host one by one into the field programmable gate array U2 in a memory mapped fashion over the bus of the host and through connector P1. Once the field programmable gate array contains the bytes of information, the field programmable gate array U2 requests a DMA transfer by asserting line DRQ0 on pin 90. The 80C188 microcontroller U4 receives the DMA request from the field programmable gate array on pin 79 and relinquishes control of the address bus RA[16:0] as well as the address/data bus AD[7:0]. In this condition, data bytes are written from the field programmable gate array U2 directly into the transmit FIFO block of FIG. 9C of radio controller ASIC U6 under control of a DMA controller on the microcontroller U4.

Similarly, bytes of information received from the radio circuit may need to be removed from the Receive FIFO block of the radio controller ASIC U6 of FIG. 9D to make room for additional information. The Tx/Rx DMA Controller of FIG. 9B of ASIC U6 may assert a DMA request DRQ by generating a DMA request from pin 53 to the DRQ0 pin 76 of microcontroller U4. The DMA controller of microcontroller U4 will then read bytes of information from the Receive FIFO of ASIC U6 and write those bytes to the field programmable gate array U2.

SOFTWARE EXECUTING IN THE MOBILE UNIT

When DMA operations are not taking place on the address bus RA[16:0] and the address/data bus AD[7:0], the microcontroller U4 executes software residing in flash memory U3 and/or RAM U5. The software executed by the 80C188 microcontroller U4 is set forth in Microfiche Appendix A, the contents of which are a part of this specification. File RESTART.ASM contains code that executes initially to set up 80C188 microcontroller U4, to do housekeeping, and to initialize hardware of the mobile unit including registers in the radio controller ASIC U6 and registers in the field programmable gate array U2 which interfaces with the host. File HWDEF.INC contains definitions used by RESTART.ASM to initialize hardware. Other tasks also use the HWDEF.INC file to change operating parameters of the 80C188 microcontroller U4. The file TASKEXEC.ASM is a task executive program which allows multiple tasks to run separately in a multithreaded environment. It also facilitates intertask communication and synchronization so that different tasks can set events for one another, wait for events that are set by other tasks, send messages to other tasks, suspend themselves pending messages from other tasks, and suspend themselves pending events that are triggered by interrupt routines.

There are multiple task files in the system: HOSTISR.ASM, HSTTXTSK.ASM, HSTRXSK.ASM, MACTXTSK.ASM, MEDIAISR.ASM and SCHEDULE.ASM. The file HOSTISR.ASM contains a task that handles the host interface. Both parallel port and PCMCIA field programmable gate array interfaces are supported. HOSTISR.ASM comprises an interrupt service routine that performs the necessary handshaking to allow the host to read information including status information from the programmable gate array U2 which interfaces to the host. The file HSTTXTSK.ASM contains a task which receives an Ethernet-type packet from the HOSTISR.ASM, and fragments the packet as necessary into smaller units. The task MACTXTSK.ASM converts the fragmented packets into frames which are consistent with a communication protocol. MEDIAISR.ASM controls the radio controller ASIC U6 and the associated radio circuit of FIG. 8 to transmit the frames generated by MACTXTSK.ASM. MEDIAISR.ASM comprises an interrupt service routine that initiates the transmission of frames from the radio controller ASIC U6, handles reception of frames from the radio controller ASIC U6, and handles transmit and receive errors.

When MEDIAISR.ASM controls the radio controller ASIC U6 to receive a frame, the frame is passed to MACTXTSK.ASM. MACTXTSK.ASM decodes and dissembles the frames in accordance with a communication protocol into packets (small units). These units are then passed to HSTRXSK.ASM. HSTRXSK.ASM then assembles the small units back into either host Ethernet-type packets or another format in which the host is expecting to receive information. HOSTISR.ASM then handles the communication of the packets to the host via the field programmable gate array U2.

HOSTDEF.INC contains definitions including register addresses within the field programmable gate array U2 and bit definitions of the registers within the field programmable gate array U2. MEDIADEF.INC comprises a plurality of definitions including register addresses within the radio controller ASIC U6 and bit definitions of the registers inside the radio controller ASIC U6. SCHEDULE.ASM comprises an interrupt routine which controls frequency hopping and ad hoc initialization. ENVIRONMENT.INC defines the events that tasks can set by one task for another task. MACDEF.INC contains definitions related to the protocol which defines the format of frames including the lengths of the various frames and the meanings of the various fields within the various frames. GLOBALS.INC contains a list of functions and variables that are shared between tasks. DIAG.INC contains a number of diagnostic routines for testing.

PROTOCOL

Figure 12:
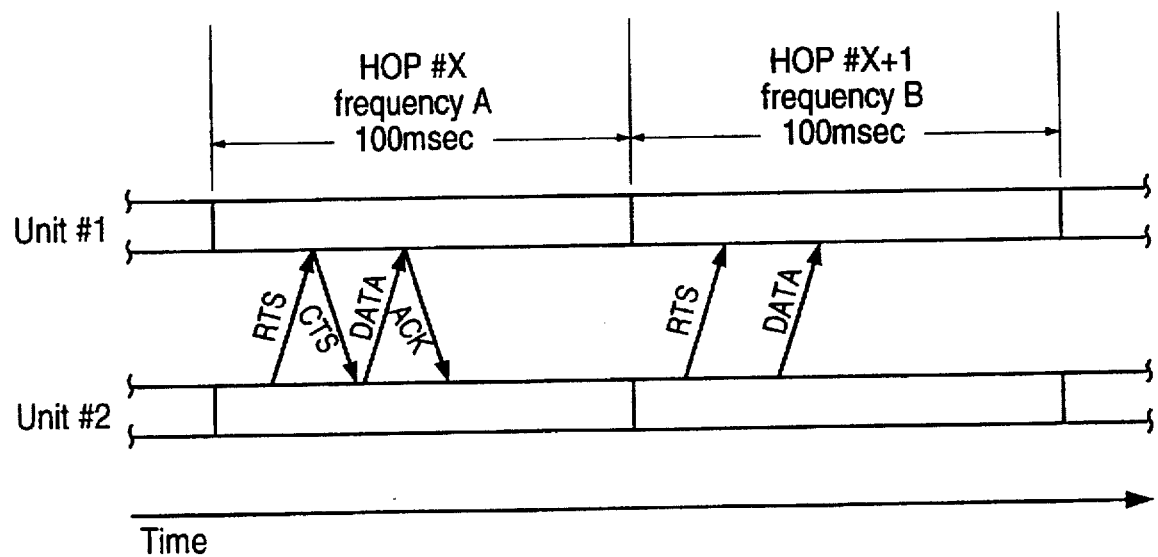
FIG. 12 is a diagram illustrating a directed MPDU communication and a multicast MPDU communication between two units.

FIG. 12 illustrates two units, one of which may be an access point unit, properly synchronized with each other in both time and frequency so that they are part of the same wireless local area network. Communication between units number 1 and number 2 is divided into hops. FIG. 12 illustrates two hops, hop number X and subsequent hop number X+1. Each of the hops is 100 milliseconds in duration. In order for the two units to communicate, the unit transmitting and the unit receiving must be tuned to the same frequency. FIG. 12 illustrates units 1 and 2 tuned to frequency A in hop number X and tuned to frequency B in subsequent hop number X+1. The units of a network transmit by repetitively sequencing through 82 hops, each of the 82 hops having a different frequency and having a duration of 100 milliseconds. Each frequency is used exactly once during one repetition of a hopping sequence.

There are two protocol data units (MPDU) formats for communicating information between units of the wireless network, a directed MPDU and a multicast MPDU. Hop number X in FIG. 12 illustrates a directed MPDU. The directed MPDU comprises a request to send (RTS) frame transmitted from unit number 2 to unit number 1, a clear to send (CTS) frame transmitted from unit number 1 back to unit number 2, a data frame (DATA) transmitted from unit number 2 to unit number 1, and an acknowledge (ACK) frame transmitted from unit number 1 to unit number 2. There may be numerous such directed MPDU communications between units in a given 100 millisecond hop. The bit rate of information transmitted during each hop is 1 megabyte so each bit has a duration of 1 microsecond.

Figure 13:
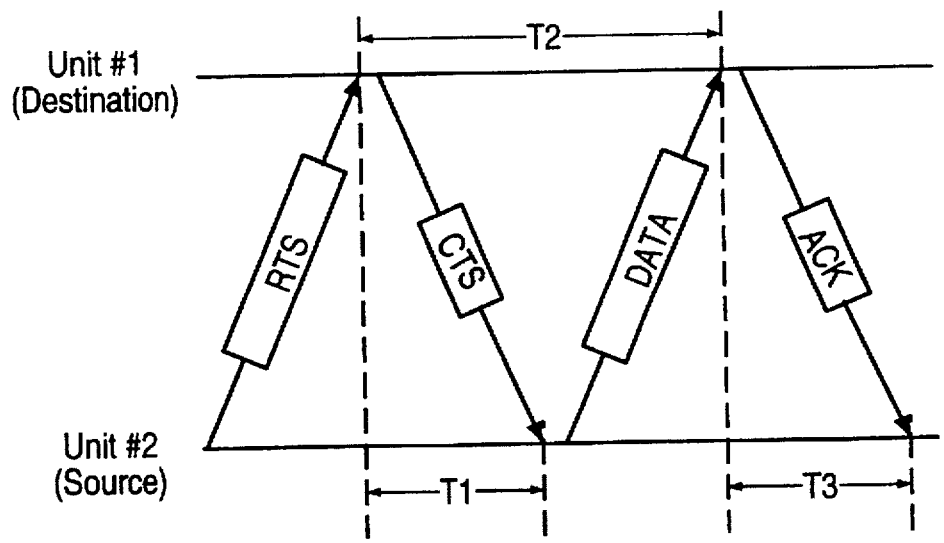
FIG. 13 is a diagram illustrating a directed MPDU communication between two units.

FIG. 13 illustrates a directed MPDU communication in greater detail. A directed MPDU is sent to a specific unit from a specific unit. Each directed MPDU generally consists of four frames: a RTS frame, a CTS frame, a DATA frame, and an ACK frame. RTS is used to reserve the communication channel for transmission of the DATA frame. RTS is able to reserve the communication channel because the RTS frame contains a destination address uniquely identifying the unit to which a following DATA frame is to be sent as well as a data length field. Other units receiving the RTS frame but which are not identified as the destination therefore are able to compute the amount of time required for the MPDU communication to be completed. The other units will therefore not attempt to use the communication channel during this period and the channel will be reserved. CTS is a transmission from the destination unit which is used to indicate that the destination unit can receive the DATA frame. The DATA frame is used to transmit the data of the MPDU communication to the designated unit. The ACK frame is used to acknowledge that the DATA frame was received without error.

The radio circuit illustrated in FIG. 8 requires about 50 microseconds to switch from a transmit mode to a receive mode. The minimum time between successive frames is therefore at least 50 microseconds. The maximum value of timeouts T1, T2 and T3 are as small as possible. T1 (the CTS timeout period) is the maximum time that a second unit will wait for a CTS frame after sending an RTS frame. T3 (the ACK timeout period) is the maximum time that a sending unit will wait for an ACK frame after transmitting the DAT frame. T2 (the DATA timeout period) is the maximum time that a receiving unit will wait for a DATA frame (250 microseconds maximum). T1 and T3 each have a duration of 50 to 100 microseconds.

Figure 14:
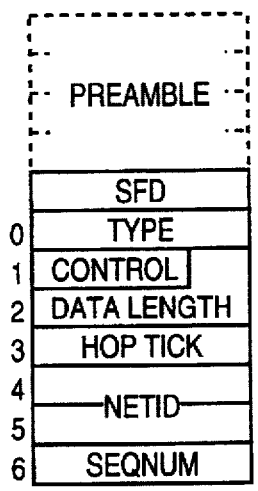
FIG. 14 is a diagram illustrating a general format of a header.

FIG. 14 is a diagram of the general header format used in all asynchronous service MPDU frames. A 32 bit preamble of alternating ones and zeros 10101010 ... starts the frame. This preamble enables the radio controller ASIC U6 to extract clock information from the incoming bit stream so that the individual bits of the frame can be clocked into the radio controller ASIC U6. An unique 8-bit Start Frame Delimiter (SFD) having a specific pattern of 10101011 follows the preamble and is used to determine that the received radio signal is in fact a frame to be received and not random noise that happened to cause the radio receiver to lock and to provide a demarkation of the beginning of the information to follow. The header is the following seven bytes comprising the TYPE, CONTROL, DATA LENGTH, HOP TICK, NETID, and SEQNUM fields. These fields are transmitted with the most significant byte first and with most significant bit first. A cyclic redundancy check (CRC) is also appended to each frame.

The TYPE field indicates whether the frame is an RTS, CTS, DATA, ACK, or ANNOUNCE frame. The TYPE field also indicates the MPDU type. The CONTROL field is a 6-bit field which describes the type of service and the structure of the wireless network. The DATA LENGTH is a 10-bit field which indicates the number of bytes in the DATA frame of the MPDU. The HOP TICK field indicates the number of ticks remaining in the current hop. Each tick represents 1/256 of the hop length. HOP TICK may be used by other units to synchronize their 100 millisecond hops in time so as to correspond to 100 millisecond hops of the transmitting unit. The NETID field is a 16-bit number that identifies the particular wireless network to which the sending unit belongs. Multiple different wireless networks may therefore operate at once in overlapping service areas provided that each network uses a different NETID. A NETID of OFFFFh indicates that the sending unit does not belong to any network. A group of units can therefore communicate without agreeing on a NETID. The field SEQNUM is an 8-bit sequence number used for duplicate detection. The sending unit increments this field on transmissions of each number MPDU.

The TYPE field in turn has two subfields: Frame Type and MPDU Type. Frame Type is the high order 4 bits and MPDU Type is the low order 4 bits. The most significant two bits of the MPDU Type subfield of the TYPE field are reserved. The next most significant bit is the ENCRYPT bit and the least significant bit is the SYSPKT bit. An ENCRYPT bit of "1" indicates that the data portion of the MPDU is encrypted. An ENCRYPT bit of "0" indicates that the data portion of the MPDU is not encrypted. A SYSPKT bit of "1" indicates that the current MPDU should be processed by the microcontroller of the mobile unit. A SYSPKT bit of 0 indicates that the current MPDU data should be passed to the host. The Frame Types designated by the first four bits of the TYPE field are as set forth in Table 1 below:

TABLE 1

| Frames Types are: | |
|---|---|
| RTS = 0; | Request To Send. |
| CTS = 2; | Clear to Send. |
| ACK = 4; | Acknowledge. |
| DATA = 8; | Data. |
| RTSI = 1; | Request To Send Inbound, time bounded service. |
| CTSI = 3; | Clear to Send Inbound, time bounded service. |
| RTSO = 5; | Request To Send Outbound, time bounded service. |
| CTSO = 7; | Clear to Send Outbound, time bounded service. |
| ANNOUNCE = 6; | Announce MPDUs are one frame that says: "I'm here." |

The bits of the CONTROL field also are broken down into subfields. The bits, listed from highest order to lowest order, comprise: a TB bit, a HIERARCHICAL bit, an AP bit, a RETRY bit, two reserved bits, and the two most significant bits of the DATA LENGTH field. A TB bit of "0" indicates that this MPDU is for asynchronous service and not for time bounded service. A TB bit of "1" indicates that this MPDU is for time bounded service which defines a special format of the rest of the frame. A HIERARCHICAL bit of "1" indicates that the MPDU will only be received by access point units. Access point units always clear the HIERARCHICAL bit before relaying an MPDU. The HIERARCHICAL bit is used to force asynchronous traffic through an access point unit. An AP bit of "1" indicates that the current MPDU was sent by an access point unit. The AP bit allows wireless units to distinguish between an MPDU sent directly and one that has been forwarded by an access point unit. A RETRY bit of "1" indicates that the current MPDU is a retransmission of an earlier MPDU.

Figure 15:
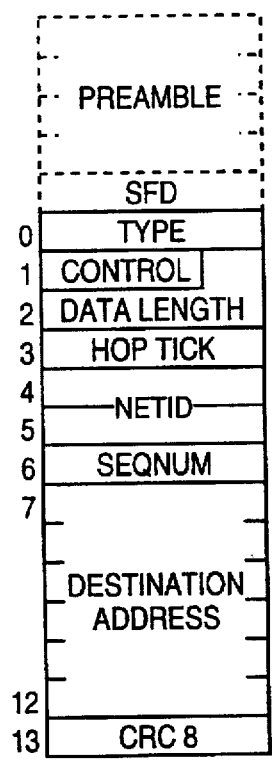
FIGS. 15–19 are diagrams illustrating a format of an RTS frame, a CTS frame, a DATA frame, an ACK frame, and an announce frame, respectively.

FIG. 15 is a diagram showing the various fields comprising an RTS frame. RTS, or Request-To-Send, is a transmission from a source unit to a destination unit which initiates the MPDU. It is a fixed length frame of 14 bytes (not counting the preamble and SFD byte). The field TYPE has a format of 0x, where x is the MPDU Type. HOP TICK is the HOP TICK of the transmitting unit. The DATA LENGTH field is not the length of this frame but rather it is the length of the payload of the DATA frame that will be sent if the source unit receives a CTS frame. DESTINATION ADDRESS is the 48-bit unique identification code which uniquely identifies the destination unit. CRC 8 is an 8-bit cyclic redundancy check which is computed on the RTS frame.

Figure 16:
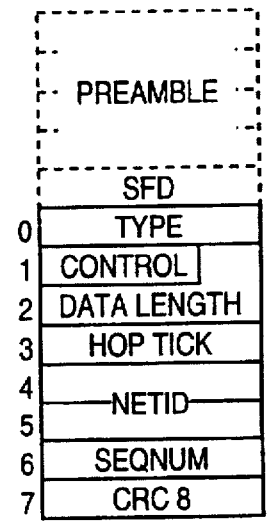

FIG. 16 is a diagram showing the various fields comprising a CTS frame. CTS, or Clear-To-Send, is a transmission from the destination unit to the source unit granting permission to transmit the DATA frame. CTS is not used for flow control in this context. CTS indicates that the destination unit can hear the source unit and is ready to receive the DATA frame. There is no implication about the availability of buffers in the receiving unit. CTS is important for "carrier sense" in a wireless network because it conveys the length of the data frame to those wireless units that can hear the destination unit but not the source of the MPDU. In accordance with Table 1, the TYPE field has the format of 2x, where x is the MPDU Type. CRC 8 is an 8-bit cyclic redundancy check computed on the CTS frame.

Figure 17:
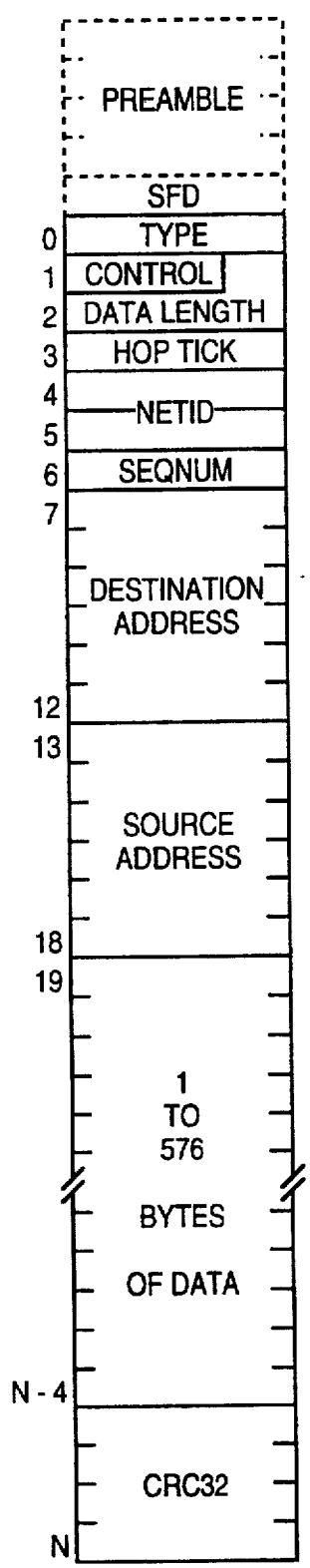

FIG. 17 is a diagram showing the various fields comprising a DATA frame. DATA is a transmission from the source unit to the uniquely identified destination unit that contains the data "payload" of the MPDU. The payload may be from 1 to 576 bytes in length as specified by the DATA LENGTH field, not counting the preamble and SFD byte. The total length of the DATA frame is: 7+12+4+DATA LENGTH bytes. Seven bytes are provided for the header, 12 bytes for SOURCE ADDRESS and DESTINATION ADDRESS, and 4 bytes for the CRC 32 field. In accordance with Table 1, the TYPE field has the format of 8x, where x is the MPDU type. DATA is a variable length field specified in the DATA LENGTH field of the RTS, CTS, DATA and ACK frames. The minimum DATA LENGTH is 1 byte. The maximum DATA LENGTH is 576 bytes. CRC 32 is a thirty-two bit IEEE 802 standard cyclic redundancy check sequence on the DATA frame.

Figure 18:
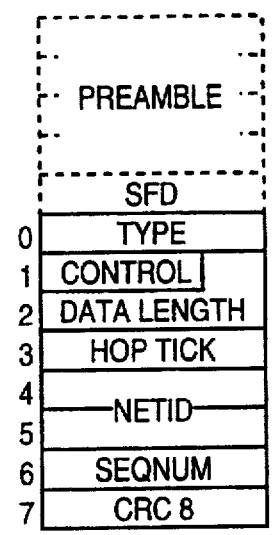

FIG. 18 is a diagram showing the various fields comprising an ACK frame. ACK is a transmission from the destination unit to the source unit that acknowledges receipt of the DATA frame with a correct MPDU check sequence. Negative acknowledgments are not used in the protocol. An ACK frame always indicates successful receipt of the DATA frame. The ACK is a fixed length frame of 8 bytes not counting the preamble and SFD byte. In accordance with Table 1, the TYPE field is of the form 4x, where x is the MPDU Type.

Figure 19:
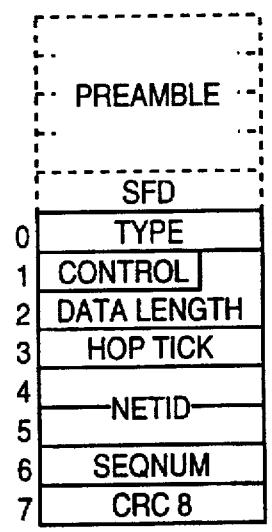

FIG. 19 is a diagram showing the various fields comprising an ANNOUNCE frame. Announce is a single frame MPDU. It is used to indicate that there is a unit using a particular NETID and hopping sequence. It conveys the NETID of the network of the unit transmitting the ANNOUNCE frame and HOP TICK of that unit. A unit joining the network for the first time listens to determine where other mobile units and access point unit are in their hopping sequence. If a network is idle, ANNOUNCE frames are sent periodically on each hop by member of the network. In accordance with Table 1, the field TYPE is of the form 61b. 61h designates an ANNOUNCE frame and SYSPKT. The CONTROL field equals 0 or 20h if an access point unit sent the ANNOUNCE frame. DATA LENGTH is always 0.

Whereas hop number X of FIG. 12 illustrates an example of a directed MPDU, hop number X+1 of FIG. 12 illustrates an example of a multicast MPDU. A multicast MPDU consists only of two frames: an RTS frame and a DATA frame.

Figure 20:
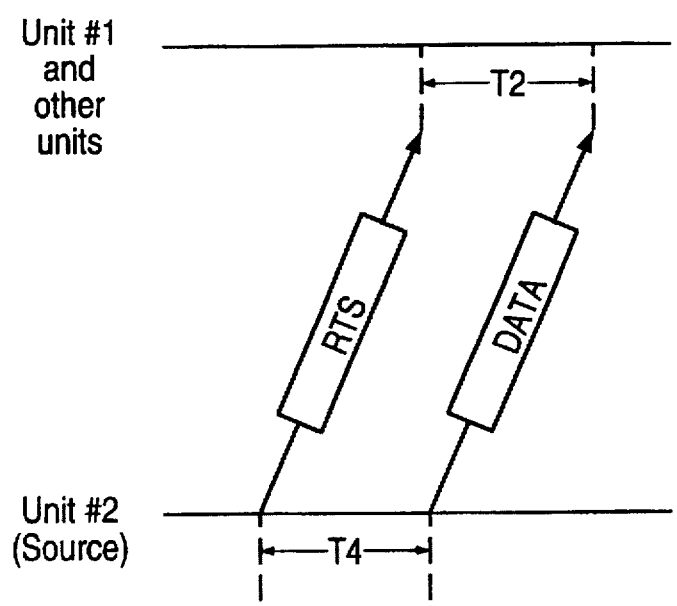
FIG. 20 is a diagram illustrating a multicast MPDU communication between two units.

FIG. 20 illustrates a multicast MPDU communication in greater detail. A multicast MPDU is an MPDU which is destined for more than one receiving unit. A multicast MPDU may have a group address in which case it is directed to a group of receiving units. In the alternative, a multicast MPDU may be called a broadcast MPDU which has an address directed to every receiving unit. Multicast MPDUs do not have a specific destination unit to provide return CTS or ACK frames. If all receiving units transmitted return CTS and ACK frames, there would likely be collisions. The unit sending a multicast MPDU inserts a delay of time T4 between the transmission of the RTS frame and the transmission of the DATA frame. T4 is the interframe gap (IFG) time plus the time required to transmit a CTS frame. At a one megabyte per second data bit rate, T4 is 154 microseconds. The frame formats for multicast RTS and DATA frames are the same as the frame formats for RTS and DATA frames of directed MPDUs.

A positive acknowledge protocol is used. Low level acknowledgments are used to improve the reliability of the wireless medium. When a directed MPDU is sent, the source unit expects an ACK after the DATA frame. If an ACK is not received within 100 microseconds, the ACK is assumed lost and the MPDU is scheduled for retransmission. This process is repeated 9 times. If no ACK is received after the ninth attempt, a send failure is reported. Broadcast and multicast MPDUs do not expect ACKs and are never retransmitted. The retransmission method is enhanced to work better with the spread spectrum frequency hopping of the radio circuit. Sending stations retransmit directed MPDUs up to three times on a particular frequency. If no ACK is received after the third attempt, a sending unit will wait until its radio hops to the next frequency before sending additional retransmissions. This minimizes the effect of narrow band interference because a sender will attempt to transmit on a least three different frequencies before aborting a transmission.

Whenever frames are retransmitted, there is a possibility of duplicates. The communication protocol employed detects and filters out duplicate MPDUs and conserves channel bandwidth. Transmitting units do not send a new MPDU during retransmission attempts of a previous MPDU. There is only one MPDU outstanding per sending unit. The receiving unit may receive MPDUs from other units interleaved with retransmissions from one unit.

Each wireless unit maintains a list of recently received MPDUs. MPDUs are identified by a 16 bit number (MPDU ID) that is the SEQNUM field concatenated with the low byte of the 48-bit source address field. Whenever a directed MPDU is accepted by a receiving unit, its MPDU ID is stored in the list. The list contains 128 entries. When a new MPDU ID is added to the list, the oldest one in the list is discarded.

Sending units set the RETRY bit (in the CONTROL field of the frame header) whenever they transmit an MPDU more than once. If an RTS for an MPDU is received with the RETRY bit set, the destination unit will send the CTS (if ready) and prepare to receive the DATA frame. After the DATA frame is received, the MPDU ID list is scanned to see if there are any matching entries. If no match is found, the MPDU is not a duplicate and reception proceeds as usual. If, however, a match is found in the MPDU ID list, then the MPDU is a duplicate. The destination unit will send an ACK frame, but will discard the MPDU because it was already delivered to the higher level software. If the ACK frame is received, the source unit will stop retransmitting the MPDU. The following duplicate detection rules are applied: 1) MPDU IDs are stored only when a directed MPDU is received with a matching NETID and a matching DESTINATION ADDRESS; and 2) The MPDU ID list is scanned for potential duplicates only when an MPDU is received with a matching NETID and a matching DESTINATION ADDRESS, and the RETRY bit is set.

The carrier is sensed by: 1) detecting the start of a frame using hardware of the radio controller ASIC U6; and 2) maintaining a logical NetBusy flag. All units maintain the NetBusy flag by detecting RTS and CTS frames. A unit will transmit only when NetBusy is not true and FrameDetect is not true. Whenever a valid RTS or CTS frame is received, NetBusy is set to TRUE and a NetBusy timer is set to clear NetBusy after transmission of the corresponding DATA and ACK frames. Receiving units therefore can compute the total time NetBusy is TRUE because the DATA LENGTH field in RTS and CTS frames specifies the length of the DATA frame. Other MPDU frames are fixed length so the time NetBusy is TRUE can also be determined for these frames. When the time elapses, the unit clears the NetBusy flag (NetBusy=FALSE).

Every receiving unit has a time out for receiving a DATA frame. The data frame timeout T2 is illustrated in FIG. 13 as T2. Every unit that receives an RTS frame will set its NetBusy and the NetBusy timer. If a corresponding DATA frame is not received within 250 microseconds, the NetBusy flag will be cleared immediately. This limits the reservation time of an RTS frame that is not followed by the rest of the MPDU such as conditions when a unit attempts to transmit to another unit that is no longer on the network.

CHANNEL CONTENTION AND COLLISIONS

Before sending, units check NetBusy and FrameDetect and defer to any transmissions in progress. This is known as Listen Before Talk or "LBT". It is possible that more that one unit can sense the channel, conclude that the channel is not busy, and begin transmitting. When more than one unit simultaneously starts to transmit, a collision occurs. Collisions may cause frames to be garbled, but it is possible that some units may receive one of the transmissions correctly. Collisions cause a frame to be lost and waste bandwidth. Bandwidth is wasted because the garbled frames are transmitted to completion and there is no useful data transfer until the frames are finished. CSMA/CD protocols such as Ethernet reduce this wasted bandwidth by detecting the collision early in the frame by using a Listen While Talk (LWT) protocol and aborting the transmission as soon as a collision is detected. To minimize the effect of collisions in accordance with one embodiment of the present invention, the above-described RTS/CTS exchange is used to resolve channel contention. After an RTS/CTS exchange, any unit that "heard" either frame will not attempt a transmission until the rest of the MPDU is finished. This eliminates collisions during the DATA frame. If collisions do occur, they will occur during the subsequent RTS frame when multiple units determine that the channel is free and determine to initiate a transmission at the same time. However, because an RTS frame is only 13 bytes long, wasted bandwidth is minimal. If an RTS frame is garbled, no CTS frame will be sent for colliding RTD frames and the source unit will be able to determine that the transmission must be sent again.

When a CTS frame is not received by a source unit, the source unit assumes that a collision occurred and schedules a retransmission of the MPDU. An ACK frame not being received by the source unit indicates that either the DATA frame was damaged or that the ACK frame itself was damaged. In either case, the source unit must retransmit the entire MPDU.

Retransmissions from different units must, however, not be sent at the same time or they will cause another collision. Each unit therefore delays its retransmission for a random amount of time in order to reduce the probability of another collision. The delay before a retransmission is called the backoff time. On the first transmission attempt, there is no backoff time. The source unit retransmits as soon as the channel is detected to be free. For all retransmission attempts of the same MPDU, however, the source unit waits random backoff time before sending the RTS frame.

To implement the backoff time feature, a special backoff timer is used. The backoff timer only counts down when the NetBusy flag is false. The sending unit computes a random number, scales this number, and uses it to set the initial value of the backoff timer. The backoff time is a multiple of the "slot size". The slot size is the time required to reserve the channel for the transmission of a DATA frame. In some embodiments, the time required to reserve the channel is the length of an RTS frame, plus the length of a CTS frame, plus some overhead for the interface gap (IFG).

The following pseudocode illustrates a method of determining the backoff time.

```
int backoff( )
    int WaitTime;
{
    WaitTime = (Random( ) MOD MaxSlots) * SlotSize;
    REPEAT
        IF (NOT NetBusy) WaitTime = WaitTime - 1;
    UNTIL (WaitTime <= 0);
}
```

In this example, the variable SlotSize has a value of 360 microseconds which equals the length of an RTS and CTS frame plus overhead. After the statement WaitTime= (Random( ) MOD MaxSlots) * Slotsize;, WaitTime is the number of microseconds to wait. The variable MaxSlots has a value of 16. When the network is idle, units will backoff up to 5.8 milliseconds per retry. When traffic exists on the network, the backoff time may be much longer. Random( ) is a function that returns a random number. The unit ID number is used as the seed for the random number generator. After the backoff timer elapses, the source unit senses the channel again and retransmits as soon as the channel is available.

This method of determining a backoff time has two desirable properties. First, source units delay their transmissions for a longer time when the network is busy. The network therefore automatically remains stable under heavy loads because the WaitTime will not elapse unless the network is idle. Second, the method eliminates the "clustering" which may occur when multiple units are waiting to transmit and their backoff timers elapse during the transmission of a long frame. Even though those backoff timers may elapse at different times, the transmission attempts will be clustered at the same time, just after the end of the long frame. Because the backoff timer set forth above will not count down during the transmission of a frame, clustering is avoided. There are no retransmissions for broadcast or multicast packets.

The following pseudocode describes the operation of the wireless network protocol used by mobile units and access point units in more detail. In the example, hardware and software are assumed to be synchronized and the pseudocode is executed exactly as fast or as slow as required. Many of the software timer loops in the examples are implemented by hardware in the preferred embodiment illustrated in FIG. 7.

```
/* XWM pseudo code type declarations                                          */
    typedef unsigned char byte;
    typedef unsigned int word;
    struct header {             /* header is the frame header format          */
        byte ftype;             /* frame type                                 */
        byte control;
        word datalen;           /* payload length of DATA frame               */
        byte hoptick;           /* sender's tick count                        */
        word netid;
        byte seqnum;
        byte destadr[6];        /* 48 bit unique destination ID               */
        byte srcadr[6];         /* 48 bit source address                      */
    };
/* XWM pseudo code constants                                                  */
MaxSlots = 16;          /* the maximum number of slots to back off            */
SlotSize = 361;         /* 360 microsecond slot size                          */
MaxTries = 9;           /* maximum number of send attempts per MPDU           */
HopMax = 3;             /* send 3 times per hop maximum                       */
HopLen = 100;           /* 100 millisecond per frequency hop                  */
CTSWait = 100;          /* max # microseconds to wait for CTS, T1             */
ACKWait = 100;          /* max # microseconds to wait for ACK, T3             */
DATAWait = 250;         /* max µsecs to wait for DATA frame, T2               */
/* transmit( ) return codes                                                   */
SentOK = 0;             /* successful send                                    */
GaveUp = 0x80;          /* gave up after MaxTries send attempts               */
/* sendMPDU( ) return codes                                                   */
LostAck = 1;            /* timed out waiting for ACK                          */
LostCTS = 2;            /* timed out waiting for CTS                          */
/* XWM pseudo code global variables                                           */
boolean gotACK;         /* received the ACK I was waiting for                 */
boolean gotCTS;         /* received the CTS I was waiting for                 */
boolean netBusy;        /* network busy                                       */
boolean frameDet;       /* frame detect                                       */
boolean iamSending;     /* True when this node is sending MPDU                */
byte sstat;             /* hardware serial status register                    */
byte myAddr[6];         /* node address for this station                      */
word myNetID;           /* the netID this node is using                       */
word myTick;            /* the hop tick counter for this node                 */
int curhop;             /* the current frequency number                       */
header tframe;          /* tframe is the frame to be transmitted              */
header rframe;          /* rframe is the frame just received                  */
word duplist[128];      /* list of mpduIDs used to filter dupes                */
byte cd;                /* current duplist index                              */
/* standard functions                                                         */
int random( );   /* returns random number between 0 and 65535                 */
int setbusy(byte ftype, word len);
    /* sets the netBusy timer for the appropriate time                        */
int clrbusy(word when);
    /* clears the netBusy flag after when time expires                        */
int sendframe(header *fp, byte ftype);
    /* sends the proper type and length frame from      *fp                   */
    /* fp is a pointer to the frame to send                                   */
    /* sendframe also sets fp->hoptick to current myTick                      */
int duplicate(word id);
    /* returns True if id matches an mpduID in duplist                        */
    /* returns False if no match found                                        */
int rcv_indication( );
    /* informs the host that a good packet has been received                  */
            MPDU TRANSMIT OPERATION PSEUDOCODE /* sendMPDU( ) sends exactly one MPDU
        it waits for the CTS and ACK frames
        returns SentOK, NoACK, or NoCTS
        sendMPDU( ) is called by the transmit( ) routine below                */
int sendMPDU( )
    {
    word timeout;
    iamSending = True;
    WHILE ((netBusy) OR (frameDet))
        { };           /* defer to current transmissions                      */
    IF (tframe.destadr[0] >= 0x80)/* if multicast bit == 1
        { /* if broadcast, no need to wait for ACK or CTS                     */
        gotCTS = True;
        gotACK = True;
        }
    ELSE /* directed MPDU must wait for CTS and ACK                           */
        {
        gotCTS = False;
        gotACK = False;
        }
```

```
            sendframe (&tframe, RTS);
            timeout = CTSWait;
            WHILE ((NOT gotCTS) AND (timeout > 0))
                    timeout = timeout - 1; . . . . . .   /* Wait for CTS            */
            IF got CTS
                    {
                    sendframe(&tframe, DATA);
                    timeout = ACKWait;
                    WHILE ((NOT gotACK) AND (timeout > 0))
                            timeout = timeout - 1; . . . .   /* Wait for ACK       */
                    iamSending = False;
                    IF (gotACK)
                            RETURN(SentOK);
                    ELSE
                            RETURN(NoACK);
                    }
            ELSE
                    {
                    iamSending = False;
                    RETURN (NoCTS);
                    }
        }
/* transmit( ) is the high level transmit routine.
            it is called as a result of a send command from the host
            transmit includes all of the retry and backoff logic                     */
int transmit( )
            }
            int tries;
            int hoptry;
            int sendhop;
            int sendstat;
            /* Format MPDU.                                                          */
            tframe.netid = myNetID;
            tframe.seqnum = tframe.seqnum + 1;
            tries = 0;
            sendhop = curhop;
            hoptry = 0;
            sendstat = sendMPDU( );
            WHILE ((sendstat != SentOK) AND (tries < MaxTries))
                    {
                    IF (curhop == sendhop) /* if still on the same hop               */
                            hoptry = hoptry + 1;
                    ELSE
                    hoptry = 0;
                    IF (hoptry >= HopMax)     /* if sent too many times on           */
                            {                 /* this hop wait till next hop         */
                            WHILE (sendhop == curhop) { };
                            hoptry = 0;
                            curhop = sendhop;
                            }
                    tries = tries + 1;
                    tframe.control.retry= 1;/*set retry bit for dup detect            */
                    backoff( );
                    sendstat = sendMPDU( );
                    {
            IF (tries >= MaxTries) sendstat = GaveUp;
            RETURN(sendstat);
        }
                        MPDU RECEIVE OPERATION PSEUDOCODE /*Every wireless station processes all of the frames it
receives, and always sets the NetBusy flag. The receive( )
routine is the highest priority task in the mobile unit
firmware. A frame detect interrupt will interrupt any other
firmware function and cause the receive( ) routine to run.                           */
        int receive( )
            {
            word mpduID;
            /* assumes all of the received header is in memory
                    set netBusy flag regardless of netid or CRCok                    */
            setbusy(rframe.ftype, rframe.datalen);
            IF (sstat != CRCok)
                    RETURN(sstat); . . . . . . . . .    /* abort if bad CRC          */
            IF (rframe.netid != myNetID)
                    {
                    /* if RTS, clear netBusy if DATA frame never comes               */
                    IF (rframe.ftype == RTS) clrbusy(DATAWait);
                    RETURN(sstat);                      /* abort if not myNetID      */
                    }
            SWITCH (rframe.ftype)
```

```
        }
        CASE RTS:
            myTick = rframe.hoptick;/* adjust my tick counter              */
            IF (rframe.destadr == myAddr)
                sendframe(&rframe, CTS); /* send the CTS                   */
            /* clear netBusy if DATA frame never comes                     */
            clrbusy(DATAWait);
            BREAK;
        CASE DATA:
            IF (rframe.destadr == myAddr)
            {                    /* if addressed to me                     */
                sendframe(&rframe, ACK); /* send the ACK                   */
                /* save MPDUid in duplist                                  */
                mpduID = rframe.seqnum + rframe.srcadr[6]*0x100;
                duplist[cd] = mpduID;
                cd = (cd+1) MOD 128;
                IF (rframe.control.retry)
                         /* this a retry, must check duplicate             */
                    IF (NOT duplicate(mpduID))
                        rcvindication( ); /* report successful rcv         */
                ELSE /* not a retry, so can't be a duplicate               */
                    rcvindication( );/* report successful receive          */
            }
            ELSE /* not directed to me                                     */
                IF (rframe.destadr[0] >= 0x80)/* if multicast              */
                    rcvindication( ); /*report successful receive          */
            }
            BREAK;
/*
receive( ) routine continued . . .
*/
        CASE CTS:
            myTick = rframe.hoptick;/* adjust my tick counter*/
            IF (rframe.seqnum == tframe.seqnum)
                IF (iamSending) gotCTS = True;
            BREAK;
        CASE ACK:
            IF (rframe.seqnum == tframe.seqnum)
                IF (iamSending) gotACK = True;
            BREAK;
        /* for CTS and ACK frames
            could also check (rframe.datalen == tframe.datalen)
        */
        }
    RETURN(sstat);
}
```

INITIALIZATION WITH AN ACCESS POINT

In order for a wireless network to be established in accordance with the present invention, all mobile units and all access point units of the network are synchronized to frequency hop at the same times and to the same frequencies. FIG. 12 shows such a synchronization between two units. When a first unit is brought into radio communication range with a second unit that is already part of a network so that the first unit can join the network of the second unit, however, the first unit may be tuned to a different frequency than second unit and the 100 millisecond hop periods of the two units may be offset in time with respect to each other.

Figure 21:
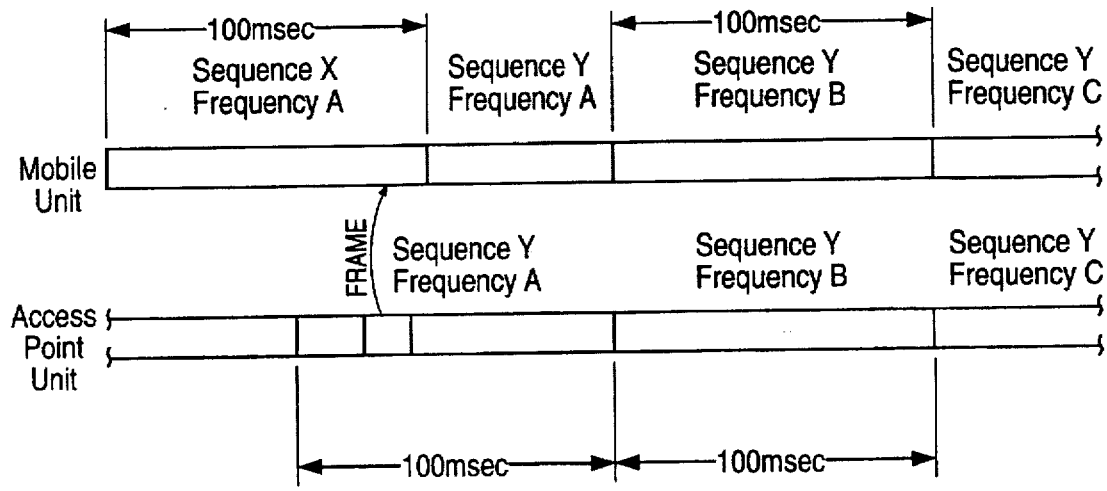
FIGS. 21–24 are diagrams illustrative of a synchronization of units in accordance with one embodiment of the present invention.

FIG. 21 illustrates hops of a mobile unit and an access unit. The mobile unit wishes to join the network of the access point unit. The access point unit is a unit operating on an existing network. The two units are not yet synchronized in frequency and time in the first 100 millisecond period of the mobile unit illustrated in FIG. 21. In one specific embodiment, there are 82 different sequences which may be used by a network to pass through the eighty-two hop frequencies: 2401, 2402 . . . 2482 MHz. Sequences may be constructed as hyperbolic hop codes as described in "Frequency Hop Codes with Nearly Ideal Characteristics . . ." by Marin and Titlebaum, IEEE Transactions on Communications, September 1992. Each network, however, must use the same sequence of frequencies so that all the units of a network will move from frequency to frequency in unison. The access point unit in FIG. 21 is illustrated as having a sequence including a subsequence of frequency A, frequency B, and frequency C. Providing multiple hopping sequences allows for multiple different wireless networks to operate in the same radio communication area. Each unit therefore must be able to determine the particular sequence being used by the particular network of which it is to be a part.

In the first 100 millisecond period illustrated in FIG. 21, the mobile unit receives a frame from the access point unit. This frame may, for example, be a frame addressed by the access point unit to another unit of the network using sequence Y. Because all frames contain the field NETID, the mobile unit is able to determine from the NETID that the particular hopping sequence being used by the access point unit is hopping sequence Y. If an unregistered mobile unit receives a frame transmitted by an access point, the mobile unit will adopt the NETID of the access point rather than the access point adapting the NETID of the mobile unit, because mobile units do not control access points. Therefore, once the mobile unit in FIG. 21 receives the NETID and determines that it would like to join that network, the mobile unit adopts the hopping sequence Y of the network.

In order for the mobile unit to detect a frame from which the NETID can be determined, it is necessary for the mobile unit to have its receiver tuned to the frequency at which the frame is transmitted. In some embodiments, a unit may simply tune its receiver to one of the 82 hop frequencies until a frame transmission is received. Preferably, however, a new mobile unit tunes its radio receiver to receive on all 82 frequencies over multiple hop periods in a total amount of time period equalling less than eighty-two 100 millisecond periods. This reduces the maximum amount of time required for a new unit to detect a frame transmission. Such scanning may be accomplished by cycling through a default randomly chosen hopping sequence, lingering on each frequency for 20 milliseconds or until a NETID is received. After the NETID of the unit which transmitted a frame is received, a lookup table may be used to determine the hopping sequence used by the transmitting unit. Adapting the correct hopping sequence does not, however, necessarily result in the mobile unit's hops being synchronized in time with the hops of the access unit.

As illustrated in FIGS. 14-19, each frame transmitted also contains a HOP TICK field. In each unit, the value HOP TICK is loaded with the value 255 at the beginning of each hop. Every 1/256 of a hop, the unit decrements HOP TICK by one. When HOP TICK reaches zero, the unit tunes its radio to the frequency of the next hop, and loads HOP TICK with a value of 255. Units transmit in the HOP TICK field of the frames they transmit the current value of their HOP TICK. Accordingly, the mobile unit of FIG. 21 which is attempting to join a network of which the access point is a member, can determine from the HOP TICK field of a received frame where the access point unit is located in its current 100 millisecond frequency hop. The mobile unit is therefore able to synchronize with the access point unit (as well as other units which are part of a network with the access point unit) by adopting the value of HOP TICK transmitted from the access point unit and by using the hopping sequence determined from NETID. The mobile unit is illustrated in FIG. 21 switching to the sequence Y of unit number 2 after the reception of a frame in the first 100 millisecond period of the access point unit so that the mobile unit is using sequence Y and frequency B by the second 100 millisecond period of the access point unit.

There must be some traffic on the network during each hop in order to ensure that units remain in synchronization and to allow new units to join the network. When there is an access point unit in the network, the access points transmit announce frames every 10 milliseconds. When there is no access point unit in the network, all units maintain a count of the MPDUs they have received during a hop. At the beginning of each hop, every unit computes a random number R. If a unit has heard less than 4R frames when the HOP TICK matches R, the unit transmits an announce frame. This method of the mobile units-transmitting announce frames does not reduce the efficiency of the network because it is only evoked when there is little or no useful data traffic being sent over the network.

AD HOC NETWORK INITIALIZATION

Figure 28:
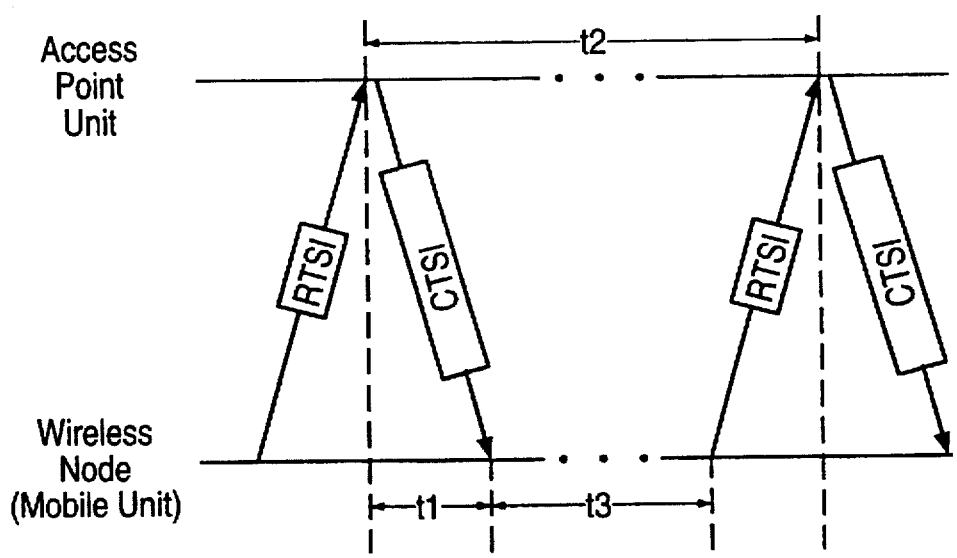
FIG. 28 is an illustration of an inbound MPDU of the time bounded service in accordance with one embodiment of the present invention.

FIG. 28 illustrates a situation in which two mobile units, neither of which is part of a network, are brought into radio communication range to form a network. Because no access point unit is involved, the network to be formed as described above is called an "ad hoc" network. Mobile unit 1 and mobile unit 2 are initially transmitting on different frequencies and are out of synchronization in time. The two units are also initially using different hop sequences.

Both mobile unit 1 and mobile unit 2 transmit announce frames (indicated as arrows in FIG. 23) at least once every e.g. 5 milliseconds because no network activity has been received by either mobile unit in the past. If both units were to remain in one frequency hop of the 82 frequency hops transmitting and receiving, it is likely that the two units would never receive each other's announce frames. Similarly, if each of the two units were simply to transmit and receive at the frequency of its current hop, then it would also be likely that the two units would not receive the announce frames from one another. Mobile unit 1 could be transmitting and receiving in hop 1 at frequency A while mobile unit 2 would be transmitting and receiving in hop 3 at frequency C. When mobile unit 1 switched to hop 2 and frequency B, mobile unit would switch to hop 4 and frequency D.

Figure 22:
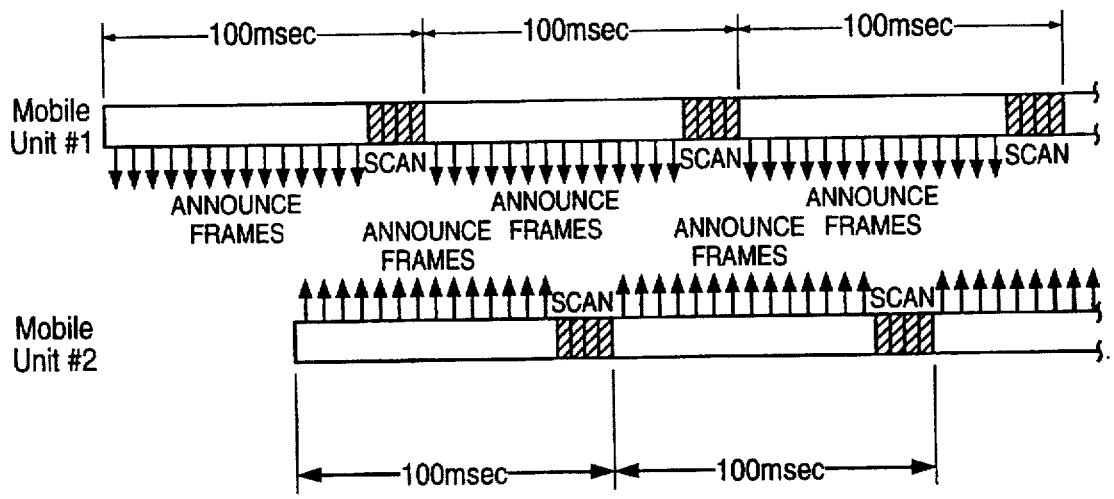

Accordingly, each mobile unit receives at multiple different frequencies (called scanning) during each hop. Because announce frames are guaranteed to occur at least every 5 milliseconds if no other transmission activity is present, and if other activity is present the typical frame duration is 5 milliseconds, a frequency is scanned for a period of 5 milliseconds. In the embodiment illustrated in FIG. 22, four different frequencies are scanned at the end of each 100 millisecond period, each for a period of 5 milliseconds. This is the situation described above in which multiple frequencies are scanned each hop so that all 82 hop frequencies can be scanned in less that eighty-two 100 millisecond hop periods. Because the scan periods of the hops of mobile unit number 1 coincide with the announce frames transmitted by mobile unit number 2, and because the scan periods of mobile unit number 2 coincide with the announce frames transmitted by mobile unit number 1, one of the mobile units will receive a frame from the other and the NETID and HOP TICK can then be used to form an ad hoc network.

Figure 23:
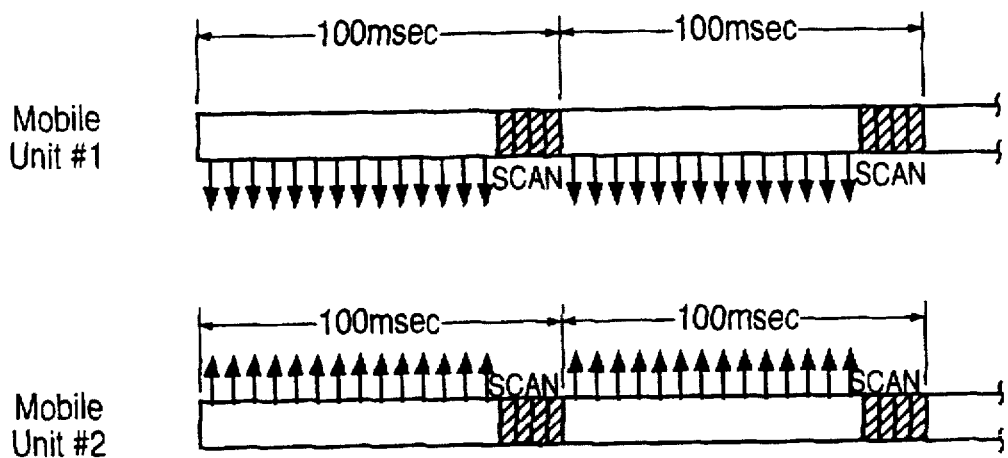

FIG. 23 illustrates a situation in which each of the two such mobile units would not, however, receive a frame from the other within eighty-two 100 millisecond periods. In this situation, the two mobile units happen to be substantially synchronized with each other in time so that the scan periods of the two mobile units exactly coincide. Neither mobile unit would be transmitting during the scan periods of the other.

Therefore, in accordance with one embodiment of the present invention, the mobile units do not scan and/or transmit identically during all hops. Each mobile unit may, for example, use a table such as set forth below to determine whether it is to scan or to transmit in the current hop.

TABLE 2

| Hop Number | Scan/Transmit | Hop Number | Scan/Transmit |
| --- | --- | --- | --- |
| 0 | 1 | 42 | 1 |
| 1 | 0 | 43 | 0 |
| 2 | 1 | 44 | 0 |
| 3 | 1 | 45 | 0 |
| 4 | 0 | 46 | 0 |
| 5 | 0 | 47 | 1 |
| 6 | 1 | 48 | 0 |
| 7 | 1 | 49 | 0 |
| 8 | 0 | 50 | 0 |
| 9 | 1 | 51 | 0 |
| 10 | 0 | 52 | 0 |
| 11 | 0 | 53 | 1 |
| 12 | 0 | 54 | 1 |
| 13 | 1 | 55 | 0 |
| 14 | 0 | 56 | 1 |
| 15 | 0 | 57 | 1 |
| 16 | 0 | 58 | 0 |
| 17 | 1 | 59 | 0 |
| 18 | 0 | 60 | 0 |
| 19 | 1 | 61 | 0 |

TABLE 2-continued

| Hop Number | Scan/Transmit | Hop Number | Scan/Transmit |
|---|---|---|---|
| 20 | 0 | 62 | 0 |
| 21 | 0 | 63 | 0 |
| 22 | 1 | 64 | 0 |
| 23 | 1 | 65 | 0 |
| 24 | 0 | 66 | 1 |
| 25 | 0 | 67 | 1 |
| 26 | 1 | 68 | 0 |
| 27 | 1 | 69 | 0 |
| 28 | 1 | 70 | 0 |
| 29 | 1 | 71 | 1 |
| 30 | 1 | 72 | 1 |
| 31 | 1 | 73 | 0 |
| 32 | 0 | 74 | 1 |
| 33 | 1 | 75 | 1 |
| 34 | 1 | 76 | 0 |
| 35 | 1 | 77 | 0 |
| 36 | 0 | 78 | 0 |
| 37 | 0 | 79 | 1 |
| 38 | 1 | 80 | 1 |
| 39 | 1 | 81 | 0 |
| 40 | 1 |  |  |
| 41 | 0 |  |  |

Figure 24:
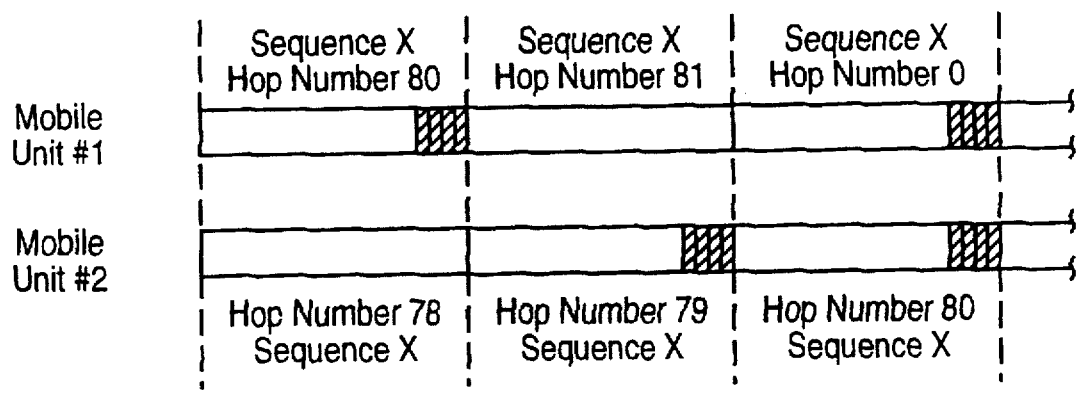

In Table 2, a "1" in the Scan/Transmit column designates a scan whereas a "0" designates a transmit. Each hop number corresponds with one of the eighty-two frequencies at which the units may receive and transmit. The scan values of a table such as Table 2 may be selected to have a maximum number of situations where one mobile unit is scanning and other mobile unit is transmitting for each possible spacing of hops between two mobile units. If, for example, the mobile unit 1 is two frequency hops ahead of the mobile unit 1 as illustrated in FIG. 24, mobile unit 1 may be in hop number 80 and mobile unit 2 may be in hop number 78. This is a situation where one mobile unit is scanning and the other is transmitting because the scan/transmit entry for hop number 80 is "1" and the scan/transmit entry for hop number 78 is "0". Subsequently, when mobile unit 1 is in hop number 81 and mobile unit 2 is in hop number 79, mobile unit 1 will be announcing and mobile unit 2 will be scanning. The total number of scan/transmit pairs for all the different hop numbers for this hop separation of two is made to be a maximum. In a similar fashion, the total number of scan/transmit pairs for all the different hop numbers of the two mobile units for a hop separation of three is also made to be a maximum. The table used may be made to have a maximum number of scan/transmit pairs for all the different hop numbers for each possible hop separation.

That the two mobile units can now receive frames from one another and that the two mobile units have adopted the same NETID and HOPTICK does not, however, determine which of the two mobile units will adopt the hop frequency of the other where the two hop frequencies differ. Where one unit is a unit mobile unit and the other unit is an access point unit, the mobile unit simply adopts the NETID and HOP TICK of the access point unit. If, however, a mobile unit is not able to form a network with an access point, then the mobile unit attempts to form an ad hoc network with another mobile unit that is not already associated with an access point. But where two mobile units come into contact, it must be determined which hopping sequence and HOPTICK will be adopted for the ad hoc network.

In accordance with one embodiment of the present invention, the mobile unit having the smaller hop number will adopt the HOP TICK and hop frequency of the mobile unit having the larger hop number. This determination of the hop frequency of which mobile unit will be adopted must, however, always result in the same hop frequency being determined to be the hop frequency of choice by all mobile units at all times in the sequence.

FIG. 24 illustrates a situation where the hop numbers of mobile unit 1 and mobile unit 2 are offset with respect to each other by 2. When mobile unit 1 is in hop number 81 and mobile unit 2 is in hop number 79, mobile unit 1 would have the hop number of choice because hop number of 81 would be the greater hop number of the two mobile units. 100 milliseconds later in time when mobile unit 1 would have a hop number of 0 and when the mobile unit 2 would have a hop number of 80, however, mobile unit 2 would have the hop number of choice because hop number 80 is the greater hop number.

In order to avoid such a situation where the hop frequency of choice changes depending on where in the hopping sequence the two mobile units are located, the determination is made based upon the hop numbers of the two mobile units at a location in the sequence where the separation in hop number between the two mobile units is smallest. Alternatively, the determination could be made based upon the hop numbers where the separation is the largest. In FIG. 24, the two mobile units have a hop separation of 2 when mobile unit 1 is in hop number 81 and have a separation of 80 when mobile unit 1 is in hop number 0. The hop frequency of mobile unit 1 is therefore determined to be the hop frequency of choice because in the hops of smaller hop separation, mobile unit 1 has the greater hop number. After making this determination, mobile unit 2 will adopt the hop frequency of mobile unit 1.

In the event that there are multiple mobile units in a network and the new mobile unit is determined to have the hop frequency of choice, then the multiple mobile units all change their hop frequencies to the hop frequency of the new mobile unit. In this way, a large number of mobile units attempting to form an ad hoc network will all eventually coalesce to a single NETID and HOPTICK.

Appendix D, which is a part of the present disclosure, is a listing of a pascal program which generated the scanning table of Table 2 set forth above.

TAG CENTERED ROAMING

Roaming is a collaborative effort. A set of access points and mobile units cooperate to make roaming as fast and smooth as possible. Each access point unit constructs a table that contains information about other access point units in the system, with the help of the mobile units. The information in the tables describes to a mobile unit which access point units are good candidates for roaming and exactly how to tune to and synchronize with each access point unit. Every time an access point unit enters the network, it announces its presence and finds out about all the other access point units that are already in the network. Access points coordinate amongst themselves to ensure that they do not use the same NETID and hopping sequence.

When a mobile unit enters a network with infrastructure (a network with a hardwired interconnect), it finds an access point unit by scanning the frequencies. The mobile unit then attempts to register with that access point unit. If the access point unit authenticates the mobile unit it sends a scrambling key to the mobile unit. The mobile unit loads that key into its memory, and then, the mobile unit's data frames are scrambled as they are transmitted. The mobile unit also receives a copy of the access point table (APTable) if it registers successfully.

When the mobile unit is idle, it attempts to tune to the other access point units in its table to verify the information in the table and to determine which access point units are the best candidates for roaming. This verification is very brief, about 20 milliseconds per check. After a short time, the mobile unit will have a short list of (e.g. 2 or 3) access point units that it could roam to if necessary.

If the mobile unit cannot send messages reliably to its current access point unit, it registers with a new access point unit. The new access point unit will contact the old access point unit over the wired portion of the network and inform the old access point unit that the mobile unit has roamed away. If any messages were waiting for the mobile unit, they are transferred to the new access point unit and then relayed to the mobile unit. If there are no buffered messages, this handoff is very quick, about 20 milliseconds. Once a mobile unit has been authenticated by one access point unit, it does not have to be authenticated again.

The mobile units first listen. Specifically, they scan the frequencies in search of an access point unit. As soon as they find an access point unit, they adopt its NETID (network ID number) and hopping sequence and attempt to register. If registration is successful, the mobile unit automatically learns about the other NETIDs that are in use in the same system and can roam to a different access point unit if necessary. If the mobile unit is unable to register with any access point unit, it will attempt to form an ad hoc group (explained in detail above).

Access point units communicate with each other over the wired LAN using the access point unit-to-access point unit protocol (carried within the conventional bridge-to-bridge protocol of 802.1D). Before an access point unit starts up its wireless interface, the access point unit will: 1) pick a random NETID (the first one it tries could, for example, be the NETID it used previously) and hopping sequence, 2) find all other access point units connected to the same wired LAN system, 3) multicast a message indicating that a new access point unit is about to use that hopping sequence, and 4) listen to hear any access point units that respond with a conflict message. If there is a conflict, the access point unit repeats the process until it finds a free NETID and hopping sequence. Overlapping the communication ranges of individual access point units on a single network therefore is possible by using different hopping sequences.

Each NETID maps into a hopping sequence. Every network unit (access point unit or mobile unit) has a table of all hopping sequences. If a unit wants to communicate with other units using a particular NETID, it must listen until it hears an MPDU with a matching NETID. One method for quick scanning is to cycle through the hopping sequence backwards, lingering on each frequency for 20 milliseconds or until a matching NETID is found. When a matching MPDU is heard, the other information necessary to synchronize the HOPTICK is also heard. The HOPTICK indicates when to move to the next frequency in the hopping sequence. Units must always receive at least one MPDU before they start transmitting on an active NETID.

A mobile unit registers with an access point unit through a message exchange as defined above. The mobile unit sends a RegisterFirst message containing information about the identity of the mobile unit. The access point unit responds with a RegisterResponse message. If the registration was successful, the access point unit responds with a RegisterResponse message containing an APTable which describes the wireless environment. If the registration was not successful, the RegisterResponse message contains a NACK rather than the APTable. The RegisterFirst and RegisterResponse messages are the only messages that are transmitted in unscrambled form. All other interactions with the access point unit take place through scrambled messages.

Once a mobile unit successfully registers with an access point unit, the access point unit with which the mobile unit has registered will relay messages from the wired LAN for the mobile unit and will relay messages to the wired LAN for the mobile unit. A registered mobile unit is able to access the wired LAN through the access point unit and unscramble any messages sent using the access point unit's NETID.

If a mobile unit is not registered, it is unable to send or receive messages from the wired LAN. It is also unable to interpret messages sent by the access point unit other that the RegisterResponse. An unregistered mobile unit can, however, search for other mobile units that want to operate in an ad hoc network.

A mobile unit decides to switch to a new access point unit by a decision made automatically by the mobile unit. A mobile unit decides to switch to a new access point unit when its quality of service through the current access point unit degrades. Quality of service is measured by the number of retries needed to send an MPDU. A "pull" method is used for a handoff of a mobile unit from an access point unit to another access point. When a mobile unit wishes to roam, it contacts a new access point unit and attempts to register. If registration is successful, the new access point unit contacts the old access point unit over the wire (using the access point unit-to-access point unit protocol) and "pulls" the context of the mobile unit to the new access point unit. The roaming mobile unit contacts the new access point that is on a different hopping sequence by accessing the information that it needs in the APTable.

Mobile units receive a copy of the APTable each time they register or roam to an access point unit. For each access point unit in the APTable, its hop offset and tick offset are stored. The APTable therefore tells the mobile unit where the new access point unit is relative to the mobile unit's hopping sequence. The information in the APTable allows the mobile unit to tune directly to the new access point unit's current frequency without scanning. Because all access point units on the same network use the same scrambling key, a roaming mobile unit is able to interpret messages from any access point unit on the same network. A mobile unit that has not been authenticated will not be able to roam because it will not understand the scrambled messages from access point units.

The MPDU TYPE field has a bit that indicates User or System Packet. If the bit is zero, the MPDU contains user data and the payload is passed to the host. If the bit is one, it is a System Packet. This bit is used to differentiate between MPDUs that should be processed by the unit firmware and MPDUs that should be passed to the host.

Power management is realized by a two message exchange. A mobile unit that will be operating in low power mode sends a SleepRequest message to its access point unit. If there are messages pending in the access point unit for that mobile unit, the access point unit will reply with a SleepNotOk message and will forward the remaining messages. If there are no messages pending and resources are available, the access point will respond with a SleepOk message. The SleepRequest message contains a parameter that indicates the duration of the requested sleep time. While the mobile unit is "sleeping", the access point unit buffers any messages that are intended for the mobile unit. When the mobile unit wakes up, the mobile unit sends a WakeUp message to the access point unit and normal operation resumes. There is also a ForcedSleep message that the mobile units may send in an emergency situation such as when they are about to lose power and have no control over the loss of power. There is no response from the access point unit for a ForcedSleep message.

In most file server network environments, the client workstation initiates the data transfers. The client therefore can control when its network interface will be idle. The only unexpected messages received by the client are watchdog packets from the server. These watchdog packets are used by the server to verify that the client is still there. If the client does not respond within a specified amount of time, the server will terminate the session. If such a file server is operating on a network comprising an access point unit and an associated mobile unit, the access point unit may respond to watchdog packets addressed to the sleeping mobile units instead of simply buffering them and allowing the server to terminate the session.

The APTable is an array containing elements of the following structure:

```
struct APinfo {
    ushort netID;
    addr nodeID;            //1148 bit node ID of AP
    uchar hopSeq;           //11 the hopping sequence used by AP
    uchar hopOffset;        //11 hop offset WRT my hop index
    uchar tickOffset;       //11 tick offset WRT to my HOPTICK
    uchar neighborStatus;   //11 near, far, or unknown ...
}
```

Access point units keep track of each handoff that they are involved in (to or from this access point unit) during roaming. After a short period of time, an access point unit has a complete list of all of the other access point units that it is possible to roam to—the "likely neighbor" list. This list will include access point units that are out of radio range of the source access point unit and even some access point units that are reachable only by going through a dead area. The "likely neighbor" list is encoded in the APTable by setting the neighborStatus field to "near."

Each time a mobile unit registers with an access point unit, it gets a copy of that access point unit's APTable. This occurs when the mobile unit first enters the system as well as each time there is a handoff. Mobile units therefore quickly learn about their changing environment as they move around the system. Access point units alone can not provide the hopOffset and the tickOffset, because they are not able to hear all of the other access point units over the wireless medium. This dynamic information must be supplied to the access point units by the mobile units.

Mobile units scan the radio frequencies to determine the relative timing of the other access point units. This is also known as the "break" approach. Mobile units occasionally go off line when they are idle and listen to other frequencies. They linger on each frequency until they hear any MPDU from or forwarded by an access point unit, or until 10 milliseconds has passed. Eventually, they will hear all of the access point units that are within range. Mobile units occasionally do a "complete scan" of all of the frequencies in the manner described above during a single "break" to look for new access point units coming within communication range. It is not guaranteed that every access point unit within range will be heard because access point units continue to hop during a scan and each will hop eight times during a complete scan. A single, "complete scan" will not usually find all of the available access point units. Several short scans work as well as a single long scan.

Mobile units also periodically do "short scans" to look for known neighboring access point units. After several short scans, they will have heard every possible known access point unit. It has been found that 100 milliseconds is a convenient duration for the scan, since a mobile unit could simply skip a hop while scanning. The mobile units do not send messages when they scan; they simply receive. If a scanning mobile unit receives any MPDU from an access point unit, it can determine the hopOffset and tickOffset.

Units using a given hopping sequence visit each frequency exactly once during a hopping sequence and always go through the sequence in the same order. Every unit has the hoptable[ ] which is the array of hopping sequences. There is a function or a table for mapping NETID into a particular hopping sequence. Every frame contains NETID. When a mobile unit scans other frequencies and hears an MPDU, the mobile unit determines which hopping sequence is being used. Knowing the frequency and the hopping sequence, the mobile unit can compute the hop index (or hop number). The hop index is the entry in the hopping sequence array that the access point unit is using.

The hopOffset for a given NETID is the difference between my hop index and the hop index observed on the current frequency for that NETID. If myNETID is on hop hoptablet[myNETID,i] (that is the ith entry in the hopping sequence for myNETID) and another access point unit is on hop hoptable[hisNETID,i+5], then the hopOffset for his-NETID is 5. One second later (or 10 hops), I will be on hop hoptable[myNETID, i+10] and the other access point unit will be on hop hoptable[hisNETID,i+15]. This offset will remain the same until one of the access points using myNETID or hisNETID is reset.

The determination of tickOffset is simpler. When mobile units scan, they continue to maintain their original HOPTICK timer. As soon as they hear any frame on a scanned frequency, they can determine the tickOffset. tickOffset=hisHOPTICK−myHOPTICK.

The mobile units record the information they gather during each scan in their local copy of the APtable. If any new information was collected, the mobile units send an update message to their access point units at the end of the scan. Whenever an access point unit changes its APTable, it broadcasts an update to all of its mobile units. At initialization, the APTable contains only the netID and NETID of the other access point units. HopOffset and tickOffset are zero and neighborStatus is "unknown".

Then, when the first mobile unit registers with an access point unit and subsequently hears other access point units during a scan, any information it gathers comprises a change and therefore cause an update to be sent to the access point unit of the mobile unit. As more mobile units enter the system and scan other frequencies, more APTable[ ] entries are filled in. After all of the information in the APTable is filled in, there will be very few changes and therefore very few updates.

This system is a learning system. The longer the access point units have been functioning in a network, the better the information in their APTables. The more mobile units in a network and the more handoffs, the better the information about the network.

Figure 25:
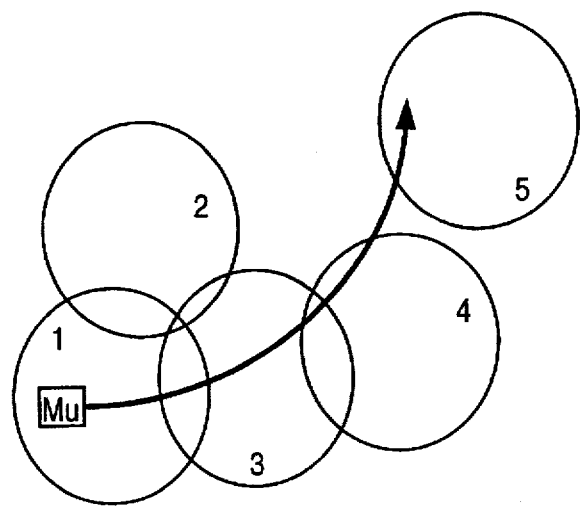
FIG. 25 is a diagram illustrating roaming.

FIG. 25 is an diagram of a mobile unit designated Mu which is roaming. The circle labeled 1 in FIG. 25 represents an area within which access point number 1 (not shown) can communicate with a mobile unit. Access point number 1 will be able to communicate with a mobile unit Mu if mobile unit Mu is located within area 1. The circles labeled 2–5 are similar areas of other access points (not shown) of the illustrated network. The arrow illustrates the roaming travel of mobile unit Mu.

Figure 26:
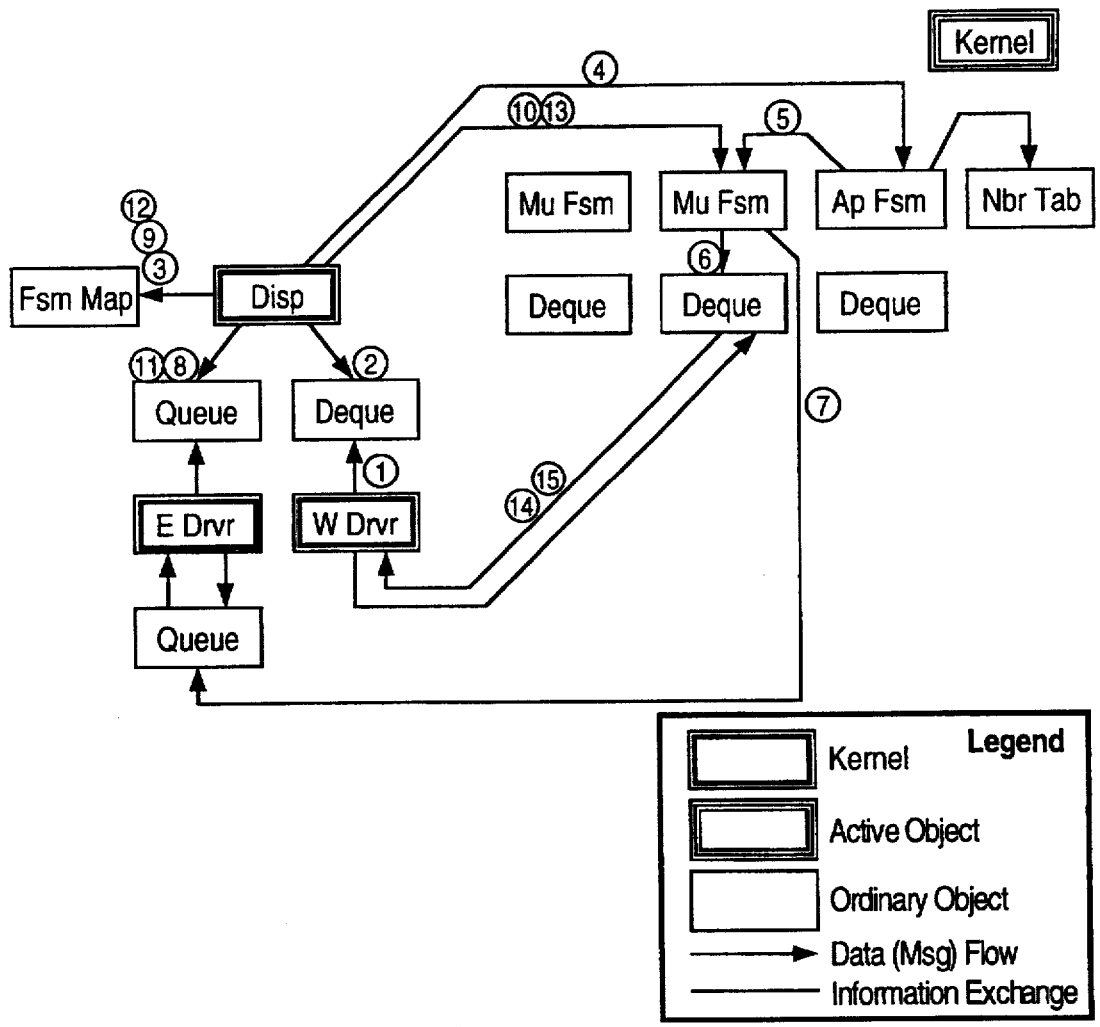
FIG. 26 is an instance diagram of one embodiment of software executing in an access point unit in accordance with the present invention. The instance diagram is associated with the roaming illustrated in FIG. 25.

FIG. 26 is an instance diagram illustrating the operation of software associated with the roaming of mobile unit Mu of FIG. 25. The table below is a corresponding list of function calls with may be performed by the software in Microfiche Appendix C in an example of roaming. The circled numbers in the instance diagram of FIG. 26 correspond with the numbers labelling the function calls in the table below.

TABLE 3

| | Function Calls | |
|---|---|---|
| 1 | insertMsg( ); | /* last driver description */ |
| 2 | getMsg( ); | /* it's a RegisterRoam */ |
| 3 | lookup( ); | /* lookup returns 0 */ |
| 4 | processMsg( ); | /* AP needs to build an MuFsm */ |
| 5 | ctor( ); | /* arg says it RegisterRoam */ |
| 6 | ctor( ); | /* the MuFsm creates it deque */ |
| 7 | insertMsg( ); | /* handoffReq msg */ |
| | eventually, the old Access Point Unit responds by the hardwired network ... | |
| 8 | getMsg( ); | /* it's a HandoffData */ |
| 9 | lookup( ); | /* finds the roaming MuFsm */ |
| 10 | processMsg( ); | /* the MuFsm enqueues the data */ |
| 11 | getMsg( ); | /* it's a HandoffComplete */ |
| 12 | lookup( ); | /* gets the roaming MuFsm */ |
| 13 | processMsg( ); | /* still in the Roaming state */ |
| 14 | insertMsg( ); | /* RegisterRoamAck */ |
| 15 | insertMsg( ); | /* the forwarded data */ |

The function call software flow begins with the mobile unit Mu roaming out of communication range of access point unit 1. When the mobile unit senses that it has lost contact with access point unit 1, the mobile unit Mu transmits a message to access point unit 3 requesting to register with access point unit 3. The mobile unit Mu knows that access point 3 is a likely now to be in communication range from the APTable storing likely access points for roaming. When the wireless driver of access point unit 3 receives the message, the insertMsg( ) function is called which is represented in Table 3 with number 1. As illustrated in FIG. 26, this is a function of the deque. Sometime later, the dispatcher instructs the deque to retrieve the identification number of the mobile unit that sent the message. This is represented in Table 3 with number 2. The dispatcher then reads the identification number out of the deque and performs a lookup of the identification number. This is represented in Table 3 with number 3. The lookup returns a value of zero indicating that the mobile unit is a new mobile unit from which access point unit 3 has not yet heard. Process control is then handed off to the core software of access point unit 3 as represented by number 4. A software object is then created for the new mobile unit to be managed by access point unit 3. The access point unit then builds a state machine to manage messages between the new mobile unit and access point unit 3. The Ethernet driver then outputs a handoff request message for access point unit 1 which is represented in Table 3 by number 7. Eventually the old access point unit, access point unit 1, responds across the Ethernet infrastructure and forwards any Ethernet messages it was storing for mobile unit Mu which had roamed from its communication range. The dispatcher of access point unit 3 then instructs the queue to supply the dispatcher with the next message. The message is determined to be handoff data as represented in Table 3 as number 8. The dispatcher then looks up the point identification number as represented in Table 3 by number 9. Because the mobile unit has been heard from before, the dispatcher instructs the finite state machine associated with the new mobile unit to process the message. This is represented in Table 3 as number 10. The forwarded data is queued for transmission to the mobile unit. The finite state machine then determines that the message indicates that the hand off from access point 1 to access point 3 is complete. This is represented in Table 3 as number 11. The finite state machine therefore formulates a RegisterRoamAck message and does an insertMsg( ) into the outgoing wireless driver. This is illustrated in Table 3 as number 14. The RegisterRoamAck message is then sent as represented in Table 3 as number 15.

TIME BOUNDED SERVICE

Figure 27:
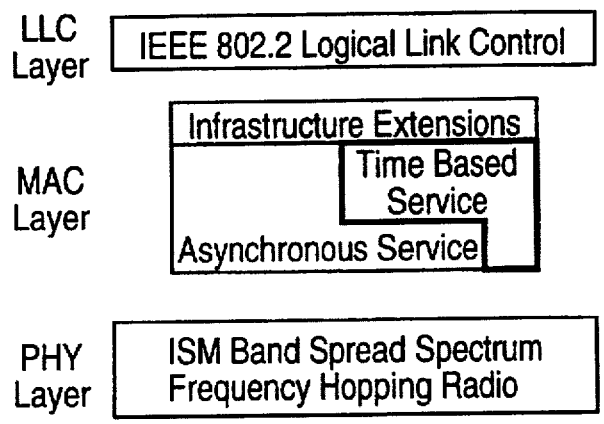
FIG. 27 is a diagram illustrating the relationship of the asynchronous service and the time bounded service to higher and lower level protocols.

The above described protocol is a Media Access Control (AC) layer (see FIG. 27) protocol with enhancements for improved reliability, support of hidden units, and associated wireless LANs. There may be two types of service provided to the higher level logical link control (LLC) layer protocol: an asynchronous service and a time bounded service. The asynchronous service as described above is a Listen Before Talk (LBT) protocol that provides low-delay, asynchronous delivery of MAC Protocol Data Units (MPDUs) between any units within direct radio communication range of each other. The time bounded service is used to transfer data between a wireless unit and an access point unit at a constant rate. Time bounded traffic and asynchronous traffic can share the same medium. Time bounded service is optional, but every wireless access point unit and mobile unit supports the asynchronous service and the infrastructure extensions.

The time bounded service protocol is physical layer independent. It works equally well with other wireless physical (PHY) layers. The time bounded service supports e.g. real time voice traffic or video traffic. The time bounded service operates under the assumptions that: 1) it is generally better to drop a voice "packlet" than to delay it for a long time, 2) voice traffic does not generally have to be as reliable as data traffic, 3) it is generally better to deliver a voice packlet in error than to delay it for a long time, and 4) voice traffic always flows through the access point unit. The time bounded service transfers data over a point-to-point connection between an access point unit and a wireless node (mobile unit) that are within range (defined by the physical layer) of each other. The protocol minimizes the delay variance between successive frames sent over the connection.

The time bounded traffic is controlled by access point units. Mobile units wishing to send time bounded messages negotiate with their access point unit to set up a voice connection using the asynchronous service. The access point unit grants the connection request only if there is enough available bandwidth to support a new call. If the access point unit accepts the connection, it assigns a local identifier that is used in subsequent packet headers for that connection. One of the parameters of the call setup is quality of service. This parameter dictates the timing between time bounded packlets for a connection. Time bounded data is transferred in fixed length "packlets". A time bounded data packet contains an ATM cell (usually containing digitized voice) and a wireless MAC header. After a call is established, the access point unit sends time bounded packlets to the wireless node at fixed intervals. The access point unit and wireless node (mobile unit) exchange a series of modified RTS and CTS frames with data attached to transfer the time bounded data. There are two types of MPDUs for time bounded service: inbound MPDUs and outbound MPDUs. All time bounded MPDUs are directed; there is no time bounded multicast. Each time bounded MPDU is a two frame exchange.

Inbound MPDUs (see FIG. 28) cause data to flow from a wireless node (mobile unit) to an access point unit. This is a flow of data into the wired infrastructure. The access point unit sends an RTSI frame and the wireless node (mobile unit) responds with a CTSI frame that includes the time bounded data. The access point unit sends RTSI frames at fixed intervals, t2, for the duration of the connection. Each time the access point unit receives an RTSI, it responds with an immediate CTSI frame. There are no ACKs (acknowledgement) and no retransmissions. If one of the frames is lost, it is ignored. The gap between the Inbound MPDUs, t3, is available for asynchronous traffic or other time bounded MPDUs.

Figure 29:
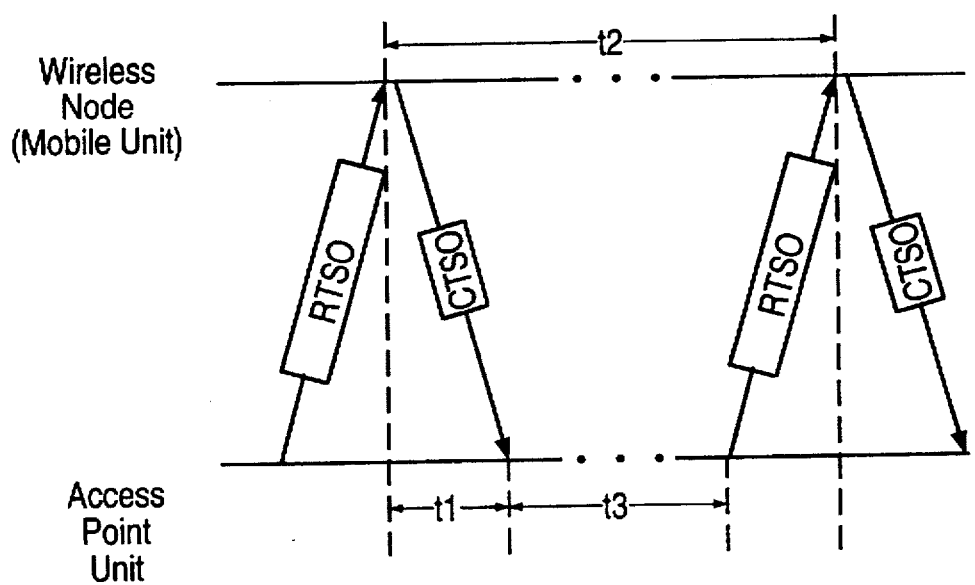
FIG. 29 is an illustration of an outbound MPDU of the time bounded service in accordance with one embodiment of the present invention.

Outbound MPDUs (see FIG. 29) cause data to flow from an access point unit to a wireless node. This is a flow of data out from the wired infrastructure. The access point sends an RTSO frame which includes the data. The wireless node responds with a CTSO frame. RTSO frames are sent at a constant interval, t2, as illustrated in FIG. 29.

All time bounded service frames have the same header format. The header is always preceded by a preamble of 32 bits and a Start Frame Delimiter (SFD) which is eight bits long. Frames such as RTSI and CTSO append an 8 bit CRC to the header. The time bounded header comprises several fields. The VCID field contains a virtual circuit identifier which is assigned by the access point unit each time a time bounded connection is established. VCID is unique within a basic service area defined by the transmission range of the PHY layer. The NETID/VCID combination is unique within a domain. The VCID field contains an 8 bit number. The MORE field indicates the number of times (e.g. 4) in the future to reserve the medium for MPDUs from this connection. The field GAPTIME indicates the time between successive MPDUs from this connection measured in slot times.

Figure 30:
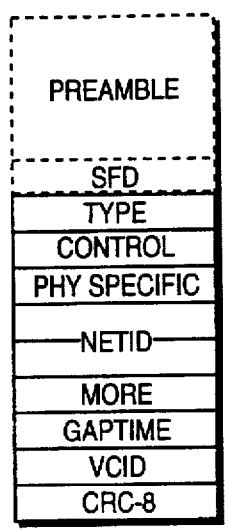
FIGS. 30–33 are diagrams illustrating a format of a RTSI frame, a CTSI frame, a RTSO frame, and a CTSO frame, respectively.

FIG. 30 is a diagram of an RTSI frame. RTSI frames are sent from an access point unit to a mobile unit and are used to maintain timing between MPDUs of the connection. The field TYPE is equal to 1x, where x is the MPDU type. The field CONTROL={TB=1, HIERARCHICAL=0, AP=1, RETRY=0}. The field CRC-8 is an 8 bit CRC computed on the entire frame.

Figure 31:
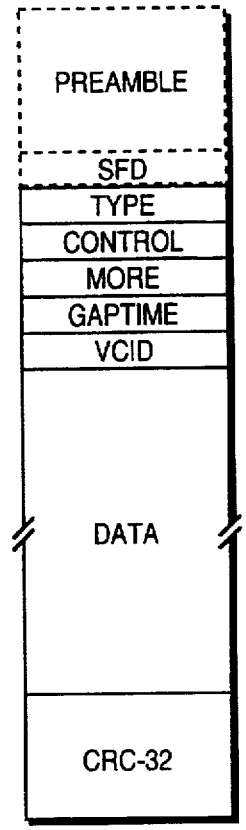

FIG. 31 is a diagram of a CTSI frame. CTSI frames are sent from the mobile unit to the access point unit in response to an RTSI frame. CTSI frames contain the data payload for the MPDU. The field TYPE=3x, where x is the MPDU type. The field CONTROL={TB=1, HIERARCHICAL=1, AP=0, RETRY=0}. The field DATA is the payload of the inbound MPDU. The field CRC-32 is a 32 bit CRC computed on the entire frame.

Figure 32:
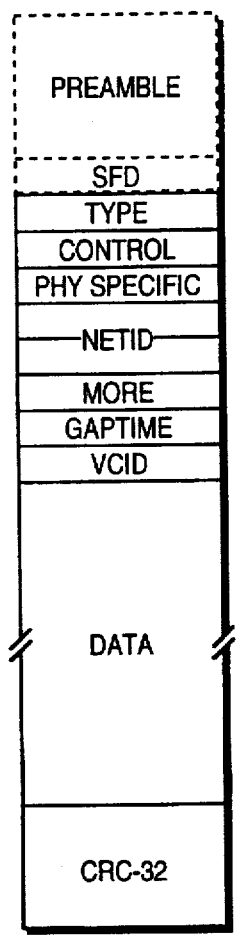

FIG. 32 is a diagram illustrating an RTSO frame. RTSO frames carry the data for outbound connections. RTSO frames are sent from an access point unit to a mobile unit. The field TYPE=5x, where x is the MPDU type. The field CONTROL={TB=1, HIERARCHICAL=0, AP=1, RETRY=0}. The field DATA is the payload of the outbound MPDU. The field CRC-32 is a 32 bit CRC computed on the entire frame.

Figure 33:
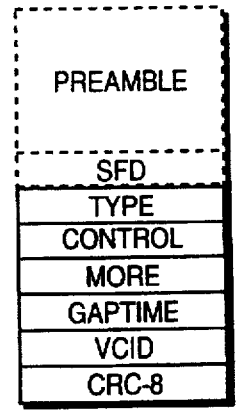

FIG. 33 is a diagram illustrating a CTSO frame. CTSO frames are sent from the mobile unit to the access point unit and are used to propagate timing information for an outbound connection. The field TYPE=7x, where x is the MPDU type. The field CONTROL={TB=1, HIERARCHICAL=1, AP=0, RETRIAL=0}. The field CRC-8 is an 8 bit CRC computed on the entire frame.

The length of the payload for time bounded MPDUs is a fixed length. A digital distribution system for time bounded connections may be based on ATM cell switching. One option for IEEE 802.11 is to specify the payload of the time bounded MPDUs as an ATM cell or multiple ATM cells. Using this assumption about the payload, it may be possible to simplify the frame check sequence for time bounded MPDUs.

The time bounded service minimizes the MPDU delay variance. One way to achieve minimum delay variance is to provide guaranteed bandwidth for time bounded connections through a central point coordination function. The access point units are a location for this centralized coordination function.

The time bounded service operates in conjunction with the asynchronous service which uses a distributed control, multiple access protocol. Mobile units operating in the asynchronous mode do not have to check with any point coordination function before transmitting. If a mobile unit perceives that the network is idle, it may initiate an asynchronous transmission, but this is a problem for the time bounded service. Once a call is established, time bounded connections should not contend for the media for each MPDU during a connection. Because of the minimum delay variance requirement, time bounded MPDUs cannot defer to other traffic once the connection has been started.

A solution is a two step process that is a combination of distributed and centralized control. Call set up and bandwidth allocation are managed by a point coordination function. All time bounded connections are set up through the access point unit. Access point units are aware of traffic level for their service area. Access point units know many calls are in progress and the number of asynchronous nodes in their area and they manage the bandwidth accordingly. The access point units also control the timing of the connection and initiate all time bounded MPDUs. Once a connection is granted, the access point unit sends the first MPDU at a time when the media is idle and coordinated with other connections that are ongoing. After the first MPDU, subsequent MPDUs for that connection are sent at fixed intervals. The access point unit then manages the bandwidth according to a predetermined policy.

Figure 34:
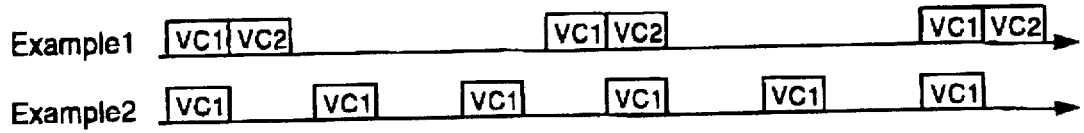
FIG. 34 is a diagram illustrating access point units managing bandwidth in accordance with the time bounded service in accordance with the present invention.

FIG. 34 illustrates two examples of access points managing bandwidth. As illustrated in the upper line in FIG. 34, the access point unit can group all of the time bounded voice connections together (VC1 and VC2 in this example) in order to keep maximum size gaps available for asynchronous traffic. Alternatively, as illustrated in the lower line in FIG. 34, the access point unit spaces the voice connections evenly in an attempt to minimize latency for the asynchronous service. The operation of the MAC layer may be identical regardless of the particular predetermined policy used by access point units.

The second part of the time bounded protocol is a distributed coordination function to reserve the bandwidth for time bounded MPDUs and to inform all of the mobile units in the service area to prevent contention with time bounded frames. This is done by an extension to the above described carrier sense method of the asynchronous service. Each time bounded MPDU has a fixed length. Any node that receives a time bounded frame can determine the length of time the network will be busy for that MPDU exchange. There is a GAPTIME field in all time bounded frames that specifies when the next MPDU for this connection will be sent. GAPTIME is used to reserve bandwidth for subsequent frames of the same voice connection. Any unit that receives a time bounded frame assumes that the network will be busy for the length of one timed based MPDU after GAPTIME time has passed. This "reserve ahead" mechanism prevents other nodes within range of either end of the voice connection from contending for the network during the transmission of time bounded frames for this voice connection. An additional field in the header called MORE indicates the number of intervals the reservation covers. With MORE and GAPTIME, it is possible to reserve ahead up to e.g. four transmission opportunities. This makes the time bonded service mechanism more reliable because each voice connection will actually reserve a specific transmit opportunity up to four times.

After an access point unit and a mobile unit have successfully exchanged the first MPDU of a time bounded voice connection, the medium is reserved at both ends of the voice connection. However, the access point units initiate the timing of a voice connection without knowing the state of the reserved ahead state of the mobile unit. To resolve this potential problem, the response to the call setup message and the first MPDU of the voice connection are timed as if they were successive MPDUs from an established voice connection. The mobile unit will respond with a confirmation message if its network allocation vector indicates the network will be available for the first MPDU transfer. Otherwise, the mobile unit will not respond and the access point unit will attempt to initiate the voice connection at a different time.

Most of the complexity of the time bounded service is in the point coordination function which is the access point unit. However, there are enhancements to the distributed coordination function in every mobile unit to support time bounded service. In particular, the carrier sense mechanism is expanded. A wireless mobile unit that supports the asynchronous service only needs to know about the current transmission in order to implement carrier sense. When time bounded service is added, however, each mobile unit must keep a map of what will happen in the future.

The net allocation vector (the reserve ahead mechanism as implemented in software) must be able to record network availability for some period of time into the future. The transmit procedure for asynchronous MPDUs is slightly more complex. A sending mobile unit must find an idle period that is long enough for transmission of the entire MPDU (rather than the first idle period) before contending for the media. These changes are not an unreasonable burden on the MAC implementation.

The time bounded service works well with collocated or overlapping service areas. All nodes maintain their own net allocation vector based on the frames they "hear" on the network. This includes frames with matching NETID and those frames from different service areas with different NETIDs. Network reservations for time bounded connections are automatically propagated only to those mobile units that are within range of one of the ends of a connection.

Figure 37:
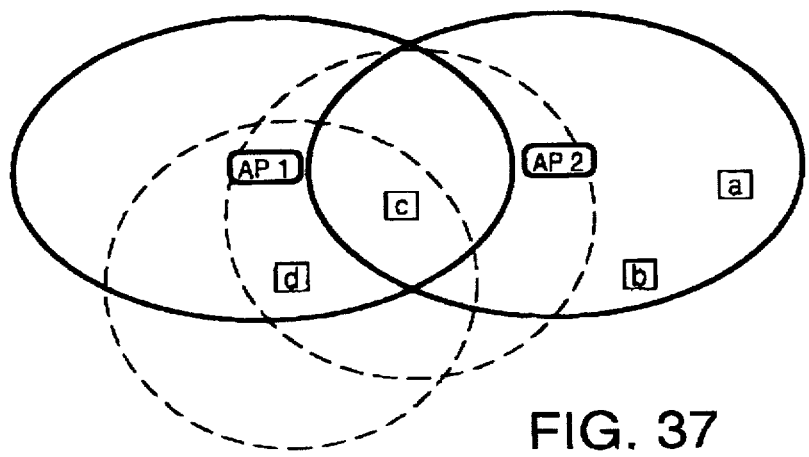
FIG. 37 is a diagram illustrating the operation of time bounded service in overlapping service areas in accordance with the present invention.

FIG. 37 is a diagram illustrating four mobile units a, b, c and d (designated as square boxes), as well as two access point units AP1 and AP2 (designated as rectangular and rounded boxes). Mobile unit c can hear both access points AP1 and AP2. Mobile unit c's net allocation vector will include reservations for all of the time bounded traffic for AP1 and AP2. Mobil unit d can only hear AP1 and mobile unit c. If mobile unit c is registered with AP1 and has established a time bounded connection, then mobile unit d's net allocation vector simply includes any asynchronous traffic and all of the time bounded traffic from AP1. Traffic from AP2 and mobile units a and b will not affect mobile unit d.

If mobile unit c is registered with AP2 instead, mobile unit d's net allocation vector will include everything described above plus the reservations for any time bounded traffic between AP2 and mobile unit c. As soon as the first time bounded MPDU is sent from AP2 to mobile unit c, mobile unit d will learn about the relevant time bounded traffic from the other service area.

In actuality, the boundaries of service areas are not as well defined as illustrated in FIG. 37. Consider the situation in which mobile unit b is moving towards AP1. When mobile unit b initiated a time bounded connection with access point AP2, there were no conflicting reservations in its network allocation vector. As it crosses the boundary into access point unit AP1 service area, mobile unit b may encounter new traffic with reservations that conflict with its connection with access point unit AP2. If the conflict is for a single MPDU, mobile unit b could choose to ignore the conflict and remain silent during the conflicting period. The result would be a dropped MPDU, but the connection would continue unhindered after the first successful new MPDU exchange. If the conflict is with another time bounded connection, mobile unit b must abort its connection. It does so by sending a CTSO or CTSI with GAPTIME and MORE=0. At that point, mobile unit b can initiate a new connection with access point unit AP2 or associate with access point unit AP1 and establish a connection there.

RADIO CIRCUITRY

FIG. 8 is a detailed schematic of a radio transmitter for transmitting at 1 Mbits/sec as well as a radio receiver for receiving transmissions at 1 Mbits/sec in accordance with Part 15.247 of the Federal Communications Commission (FCC) rules which govern Industrial, Scientific and Medical (ISM) bands. To support spread spectrum frequency hopping in the 2.4 GHz ISM band, the transmitter and receiver can be tuned to one of 82 different frequencies spaced at 1 MHz intervals: 2401, 2402, . . . 2481 and 2482 MHz. Range between a transmitter of a unit and a receiver of another unit is approximately 150 feet in a typical office building where a typical office building is assumed to have some sheetrock walls such that the attenuation is approximately a square law power fall off for the first 3 meters and a 4th law fall-off thereafter. Transmitter power output of one specific embodiment is approximately +17 dBm and receiver sensitivity is approximately −85 dBm.

Figure 38:
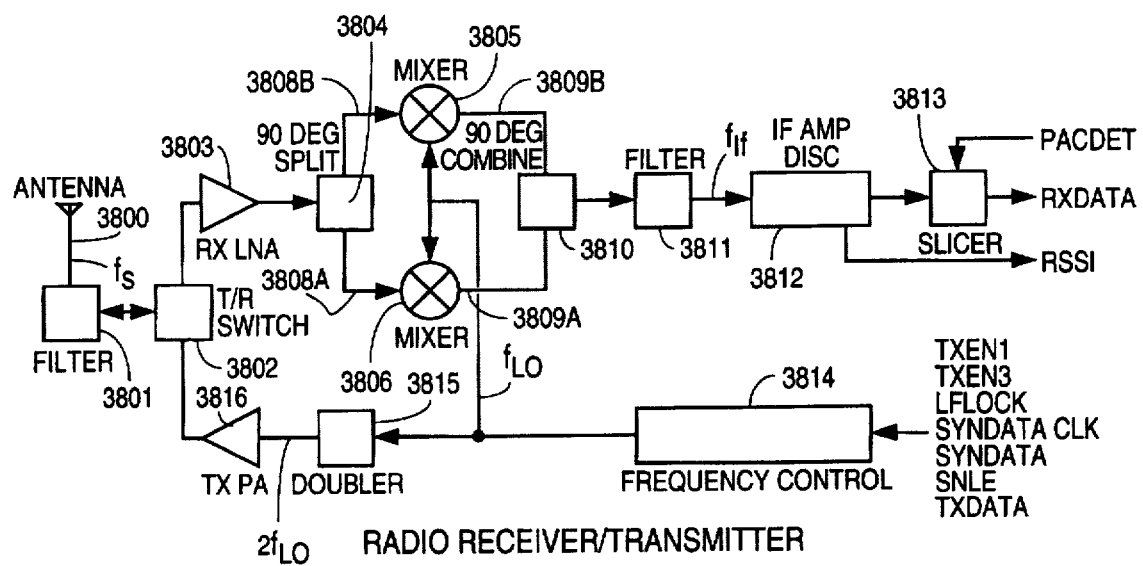
FIGS. 38 and 39 are block diagrams of a radio receiver/transmitter circuit in accordance with the present invention.

FIG. 38 is a block diagram of a low cost, low power and small size radio receiver and transmitter circuit. The incoming signal is received on a printed circuit tab antenna 3800, is filtered by a printed circuit filter 3801, and supplied by a T/R switch 3802 to the receiver low noise amplifier 3803. The receiver LNA 3803 uses two cascaded bipolar amplifiers. Overall frequency response is tailored to provide substantial attenuation below 1.5 GHz in order to minimize problems causes by cellular portable telephones in the 825–845 MHz range. The output of the receiver LNA 3803 is supplied through a 90° splitter 3804 to two mixers 3805 and 3806 which are connected in image-reject configuration with a local oscillator signal 3807 coupled in phase and with RF inputs 3808A and 3808B coupled in quadrature. The mixer outputs 3809A and 3809B are passed to a low noise preamplifier. A quadrature network 3810 combines the outputs of these preamplifiers and the resulting signal is passed to a three pole LC filter 3811 centered at 4.75 MHz. The remainder of the intermediate frequency (IF) signal gain required is provided by an limiting IF amplifier 3812 in integrated circuit form. The limiting IF amplifier has an additional single pole filter for control of the overall noise bandwidth. Quadrature detection is used to demodulate the incoming FSK signal to generate the output signal RXDATA of the radio receiver. A DC coupled buffer amplifier drives a post-demodulation filter and then a slicer 3813 which provides a continuous 0 or 1 logic output bit stream. The slicer threshold is set automatically by signal PACDET which is a pass filtered version of output of the post-demodulator filter.

When there are no incoming bits, the threshold filter time constant is short, about 20 microseconds. This allows the threshold to adjust rapidly to offsets caused by frequency errors. Once the radio controller ASIC U6 (see FIG. 7) has determined that a valid frame is being received, then the threshold filter is switched to operate as a hold circuit to maintain the correct DC threshold to receive the remainder of the frame. This technique allows rapid adaptation to frequency offsets while at the same time allowing any data pattern to appear in the data field of a data frame. The frequency control block of FIG. 38 is illustrated in greater detail in FIG. 39. In FIG. 38, incoming bits to be transmitted are supplied to the input TXDATA of the frequency control block 3814. The output of the frequency control block is supplied to a voltage doubler 3815. The output of the voltage doubler 3815 is filtered and then amplified by a transmitter power amplifier (PA) 3816 in three bipolar transistor stages. Overall frequency response is tailored to provide a rejection notch at the VCO frequency. The output of the power amplifier is coupled through T/R switch 3802 by a PIN diode (which is switched to its low resistance state), through printed filter 3801, and to tab antenna 3800 which is printed on the printed circuit board of the mobile unit. Coupling of the power amplifier 3816 output to the antenna through the PIN diode and coupling the PIN diode to the antenna 3800 via a quarter wave line ensures that almost all the power passes to the antenna. The printed circuit filter 3801 provides bandpass response at 2.4 GHz and band reject notches at 4.8 GHz and 7.2 GHz.

On receive, power amplifier 3816 is biased off. A voltage is, however, applied to the collector of the power amplifier 3816 resulting in the output of the power amplifier being a primarily capacitive impedance. The PIN diode of the T/R switch 3802 is biased to its high impedance state. The quarter wave line is therefore connected to an input matching network of the receiver LNA. Nearly all the received signal power is therefore coupled to the receiver LNA 3803 resulting in an overall 2-pole bandpass response.

Figure 39:
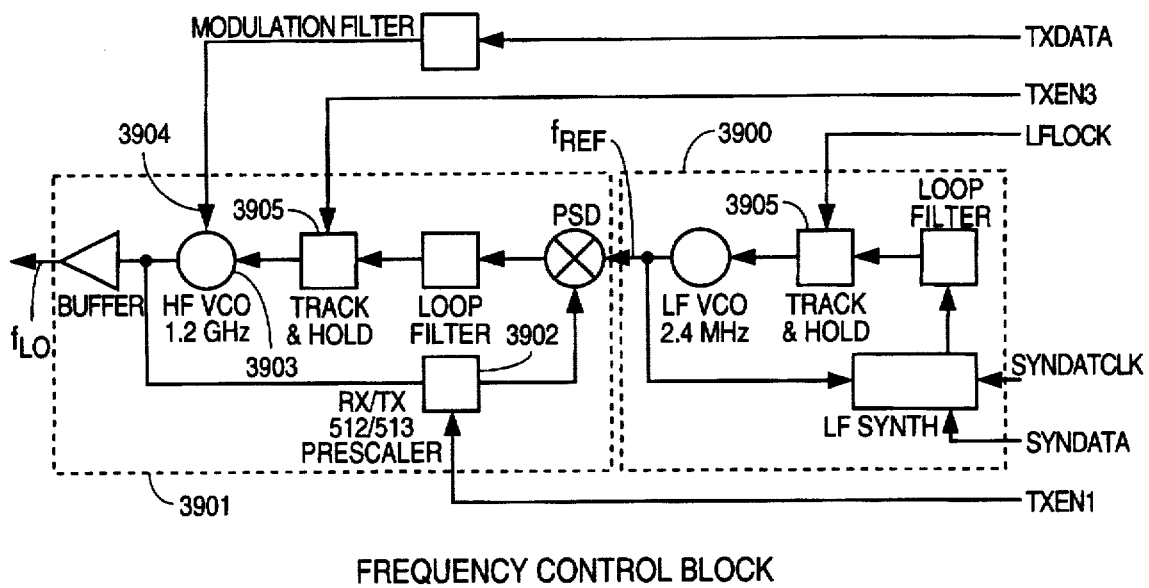

FIG. 39 is a more detailed diagram of the frequency control block 3814 in FIG. 38. The frequency control block 3814 comprises two phase-locked loops. The first phase-locked loop, called the low frequency (LF) phase-locked loop 3900, generates a reference signal for the second phase-locked loop, called the high frequency (HF) phase-locked loop 3901. The HF phase-locked loop includes a prescaler 3902 and controls a voltage controlled oscillator (VCO) 3903. The prescaler 3902 is set to divide by 512 on receive and by 513 on transmit. The IF varies slightly across the band because the IF is effectively 1/513 of the transmit frequency. All frequencies are derived from a single 20 MHz crystal. The parameters for transmitter/receiver operation in each of the 82 frequency hops is set forth below:

TABLE 4

| Parameter | Value | Characteristic |
| --- | --- | --- |
| Frequency hops | 2401,2402 ... 2482 MHz | 82 hops, spaced at 1 MHz intervals |
| Frequency error | ±150 kHz maximum | for less than 3 dB degradation in error rate |
| Data rate | 1 Mbps | fixed data rate |

TABLE 4-continued

| Parameter | Value | Characteristic |
| --- | --- | --- |
| Data polarity | Non-inverting | data "1" at radio input produces data "1" at radio output |
| Modulation | GFSK, 700 kHz prefilter ±175 kHz deviation | data "1" corresponds to negative frequency deviation |
| Transmitter power output | +17 dBm | 20 dB power bandwidth is less than 1 MHz; meets Part 15.247 of FCC rules |
| Receiver sensitivity | −85 dBm | for 1 in $10^6$ error rate |
| Error rate floor | better than 1 in $10^7$ | equivalent to 1 to 2000 frame loss rate for maximum length frames |
| Maximum frame length | 5 ms | equivalent to 625 bytes at 1 Mbps |
| Line coding | NRZ, no bit stuffing or other manipulation required | modem frequency response extends to DC |
| Decision threshold | adapts to ±5% error within 15 µs | corrects for TX/RX frequency errors; fixed after-frame detect |
| TX/RX turnaround time | less than 50 µs | MAC protocol defines at least 50 µs gap between ratio frames |
| Slot change time | less than 5 ms | hops are fixed length, nominally 100 ms |
| Image response | −20 dB | 9.5 MHz below receive hop |
| Other receiver spurious | better and −60 dB | |
| Transmitter harmonics | better than −30 dBc | meets Part 15.247 of FCC rules |
| Other transmitter spurious | better than −60 dBc | |

Switching from transmit to receive involves only the HF phase-locked loop 3901 which settles in less than 25 microseconds. Changing from hop to hop requires settling the LF phase-locked loop 3900 to a different frequency which may take up to 2 milliseconds of settling time. Synthesizer R and N values are carefully selected for each hop to maximize the reference frequency. After settling is complete, the LF track-and-hold 3905 is set to hold for the remainder of the hop.

During transmission, the HF phase-lock loop 3901 is first set to the correct frequency by switching the prescaler 3902 to divide by 513. The correct tuning voltage is then held for the remainder of the transmit frame. VCO pulling caused by imperfect power supply regulation and RF pickup is eliminated by switching all the transmitter stages on before the tuning voltage is held. A separate VCO control input 3904 is used to apply transmit modulation. During receiving, this input 3904 is unused and therefore is biased to 2.5 voltage and tri-stated. On transmit, the TXDATA transmit data input drives the input to 0 volts or 5 volts for logic 0 and logic 1, respectively. Tri-stating is removed only after the HF loop has been held. This technique provides a modulation bandwidth down to DC resulting in accurate modulation for any data pattern. Droop caused by leakage in the VCO hold capacitor 185 and associated circuitry during transmission is not significant for up to 5 milliseconds of frame duration.

At the start of each new hop, all transmit and receive operations are suspended by the 80C188 microcontroller U4 (see FIG. 7) via the radio controller ASIC U6. The LF phase-locked loop is programmed for the new hop and the LF track-and-hold 3902 is enabled. After the phase-lock loop has settled, the 80C188 microcontroller resumes normal operation. When a frame is transmitted, the HF loop is switched to the correct frequency by the radio controller ASIC driving the TXEN1 input to the radio circuit to a logic 1 voltage level. After 16 microseconds, the radio controller ASIC applies a logic 0 to the TXEN2 input (see FIG. 8) of the radio circuit to switch on all the transmitter stages. At this point, some pulling of the HF VCO frequency can be expected, so a further 16 microseconds of settling time is allowed before the radio controller ASIC applies a logic 0 TXEN3 input to the radio circuit. The TXDATA input to the radio circuit is then driven by the radio controller ASIC. At the end of the transmit frame, the radio controller ASIC returns all radio control signals to their receive states to conserve power. The only sequencing requirement is that TXEN2 should be deactivated before TXEN1.

Interface between the radio controller ASIC U6 and the radio circuitry is set forth below:

TABLE 5

| Name | I/O | Description |
| --- | --- | --- |
| LFLOCK | In | Controls LF synthesizer lock CMOS logic 1 locks the LF loop, logic 0 holds the LF VCO control voltage. Sets LF synthesizer for each hop. |
| RXEN | In | Switches on the RX LNA, IF amplifiers, and output comparator. CMOS logic 0 enables the RX, logic 1 disables. Uses for power management. |
| LFEN | In | Switches on the LF VCO, synthesizer, and crystal oscillator. CMOS logic 0 enables the receiver, logic 1 disables. Used for power management. |
| HFEN | In | Switches on the HF loop, including the prescaler and HF VCO. CMOS logic 0 enables the receiver, logic 1 disables. Used for power management. |
| RXDATA | Out | Derived from an open collector comparator via a resistor network. For a CMOS load, logic low is less than $0.3 * V_{cc}$ and logic high is greater than $0.7 * V_{cc}$. Data 1 corresponds to logic 1. RXDATA is not clocked by the radio. It represents the best estimate of the current received data state. |
| TXDATA | In | CMOS logic 1 is data 1, which produces a deviation below the nominal carrier frequency. The radio reques TXDATA to be tristated when the transmitter is not operating. |
| RSSI | Out | Received signal strength indication. This is an analog level which indicates the strength of the received signal. One possible application is to drive a Schmitt trigger to provide an energy-detect LBT function. High output corresponds to signal present. |
| TXEN3 | In | Controls HF loop lock. CMOS logic 1 locks the loop, logic 0 hold the VCO control voltage. Logic 0 is required before modulation is applied. |
| PACDET | In | Switches the receiver slicer threshold time constant. CMOS logic 0 must be asserted while a frame is being decoded, that is, after 8 bits of dotting followed by the 16 bit frame sync word have been correctly received. CMOS logic 1 is required at all other times. |
| ACT | In | CMOS logic 0 lights activity LED |
| LNK | In | CMOS logic 0 lights link integrity LED |
| TXEN1 | In | Switches the frequency control system between transmit and receive. CMOS logic 1 is for receive, logic 0 for transmit. |

TABLE 5-continued

| Name | I/O | Description |
| --- | --- | --- |
| SYNDATA | In | Sets the divider ratios in the frequency synthesizer. See Fujitsu data book for a description of synthesizer programming. |
| SYNDATA CLK | In | Clock SYNDATA into the synthesizer |
| SYNLE | In | Load enable signal for the snythesizer |
| TXEN2 | In | Switches transmitter on. CMOS logic 0 for transmit, 1 for receive |

The voltage signals at the outputs of the mixers 3805 and 3806 are very weak signals. The signal at the input of the IF amplifier may, for example, be in the microvolt level. Second order mixers are generally used in conventional receivers. In a possible receiver configuration, $f_{IF}=f_S-f_{LO}$, where $f_{IF}$ is the frequency of the IF signal, $f_S$ is the frequency of the incoming signal being received on the antenna, and $f_{LO}$ is the frequency of the signal supplied to the second order mixers by a local oscillator. Using a prescaler to generate a local oscillator having a frequency 512 times the frequency of a reference signal $f_{REF}$ requires a reference signal frequency of $f_{REF}=f_{LO}/512$. If, for example, $f_S$ were 2436.75 MHz, then $f_{REF}$ would be about 4.75 MHz. 4.75 MHz is, however, the frequency of the IF signal on the input of the IF amplifier because $f_{IF}=f_S-f_{LO}$. The conventional design therefore results in shielding requirement due to reference signal noise from the local oscillator appearing on the input to the IF amplifier and overwhelming the small amplitude intelligence signal.

In accordance with one embodiment of the present invention, third order mixers 3805 and 3806 are used in combination with a switched prescaler 3902 to build a very low cost and very compact frequency control system which is capable of rapid switching of the radio between transmitting and receiving. No special shielding between the frequency control block 3814 and the IF amplification circuitry is needed. This allows the radio circuit to be inexpensively placed on one printed circuit board in a PCMCIA form factor. The third order mixers 3805 and 3806 may be HSMP2822 mixers made by Hewlett-Packard. Component U4 of the prescaler of FIG. 8 may a HB507PF made by Fujitsu.

Using third order mixers eliminates the need during receiving for a local oscillator operating at the IF frequency. In accordance with one embodiment of the present invention, $f_{IF}=f_S-2f_{LO}$, where $f_{IF}$ is the frequency of the IF signal on the input of IF amplifier 3812, where $f_S$ is the frequency of the incoming signal to be received on antenna 3800, and where $f_{LO}$ is the frequency of the local oscillator signal supplied to mixers 3805 and 3806 from the frequency control block 3814.

In accordance with one embodiment of the present invention, it may be desired to receive an incoming signal having a frequency $f_S$ of 2436.75 MHz. Because the IF frequency $f_{IF}$ amplified by the IF amplifier 3812 is 4.75 MHz, $f_{LO}$ is 1216 MHZ due to the use of third order mixers 3805 and 3806. Because the prescaler 3902 is set to divide by 512 on receive, the reference signal frequency $f_{REF}$ output by the LF phase locked loop is 2.375 MHz, not 4.75 MHz. The 2.375 MHz reference signal output of the LF phase locked loop therefore does not interfere with the weak 4.75 MHz IF signal being received at the input of the IF amplifier.

During transmit, the 2.375 MHz reference signal results in local oscillator frequency $f_{LO}$ of 1218.375 MHz on the output of the frequency control block 3814 due to the prescaler being set to divide by 513 during transmissions. This results in a signal being output to the antenna having the frequency $f_S$ of 2436.75 MHz due to frequency doubler 3815. The radio transmitter/receiver circuit can therefore be rapidly switched between receive and transmit modes by switching the prescaler using the TXEN1 signal. To tune to different hop frequencies, the LF phase locked loop is controlled to change the frequency of the reference signal $f_{REF}$.

ACCESS POINT UNIT HARDWARE

Figure 40A:
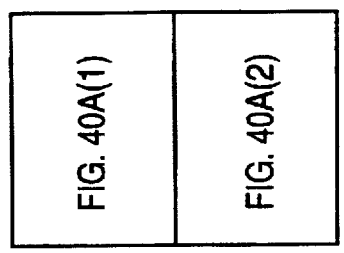
Figure 40B:
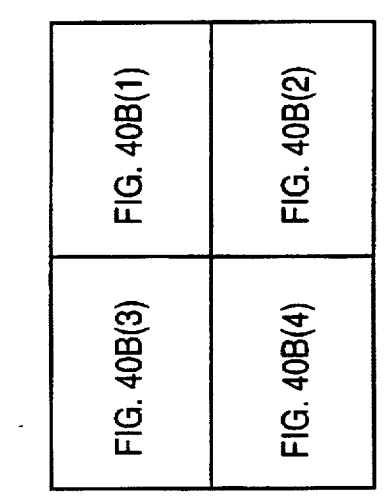
Figure 40C:
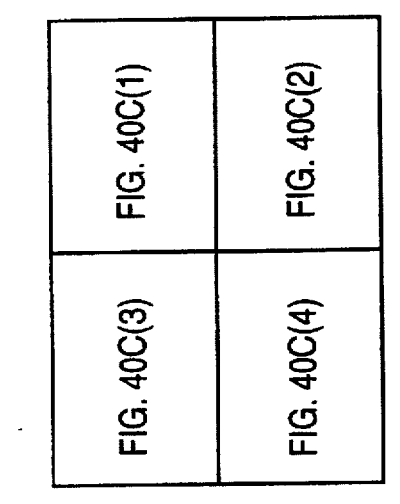
Figure 40D:
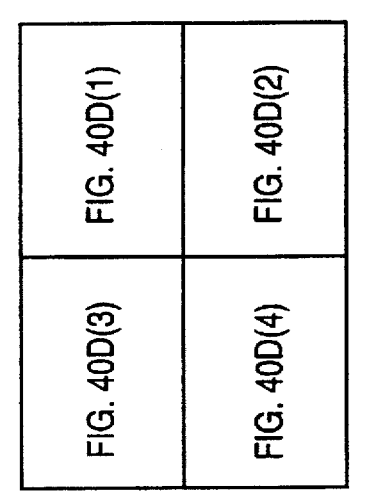
Figure 40E:
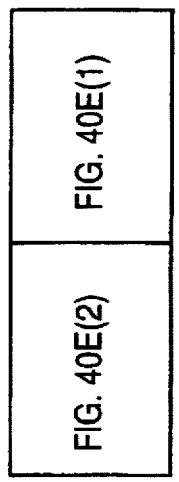
Figure 40G:
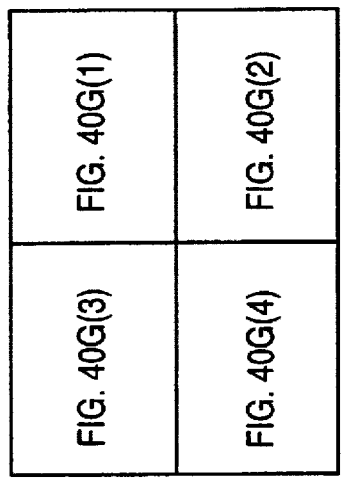
Figure 40J:
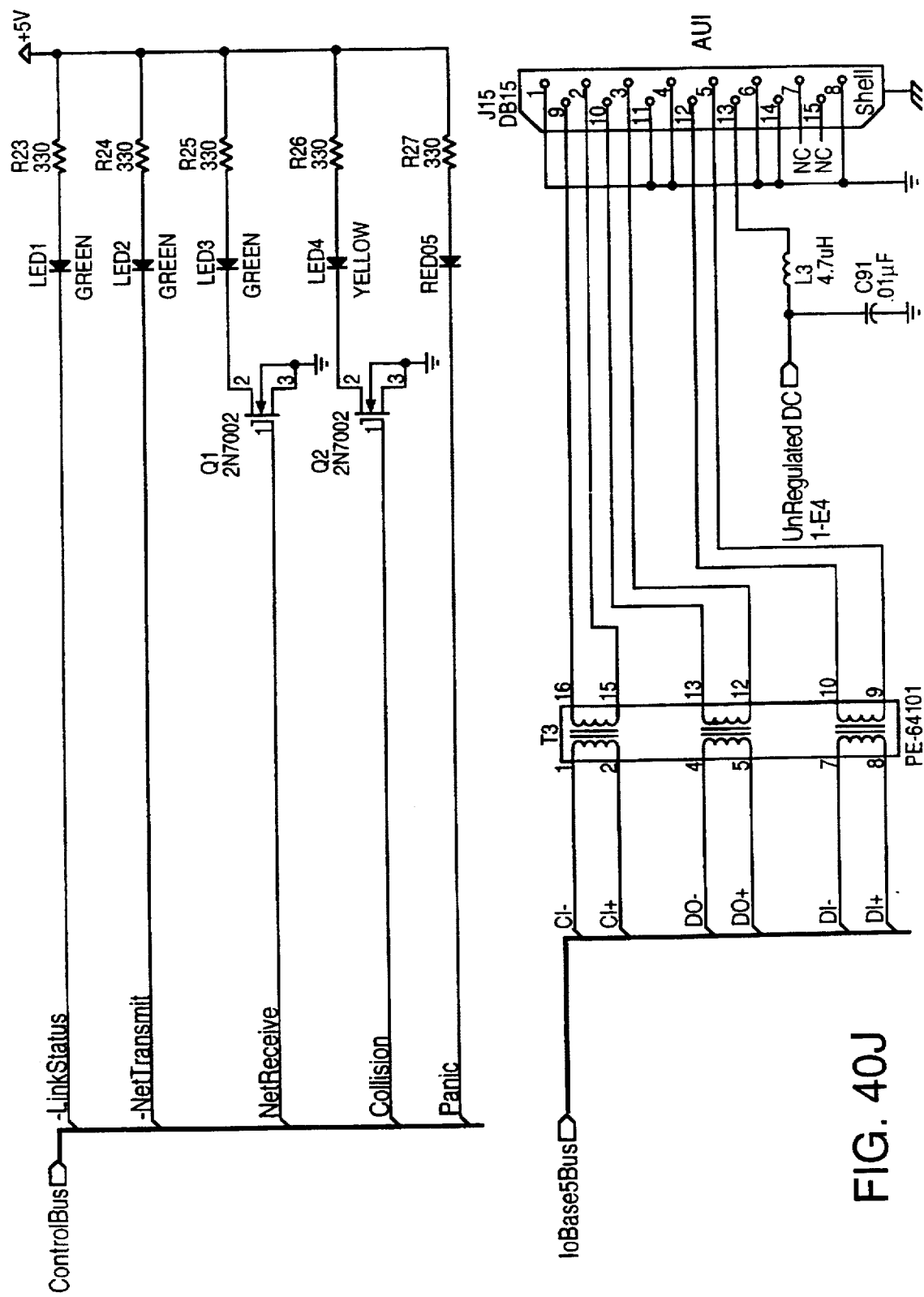
Figure 40K:
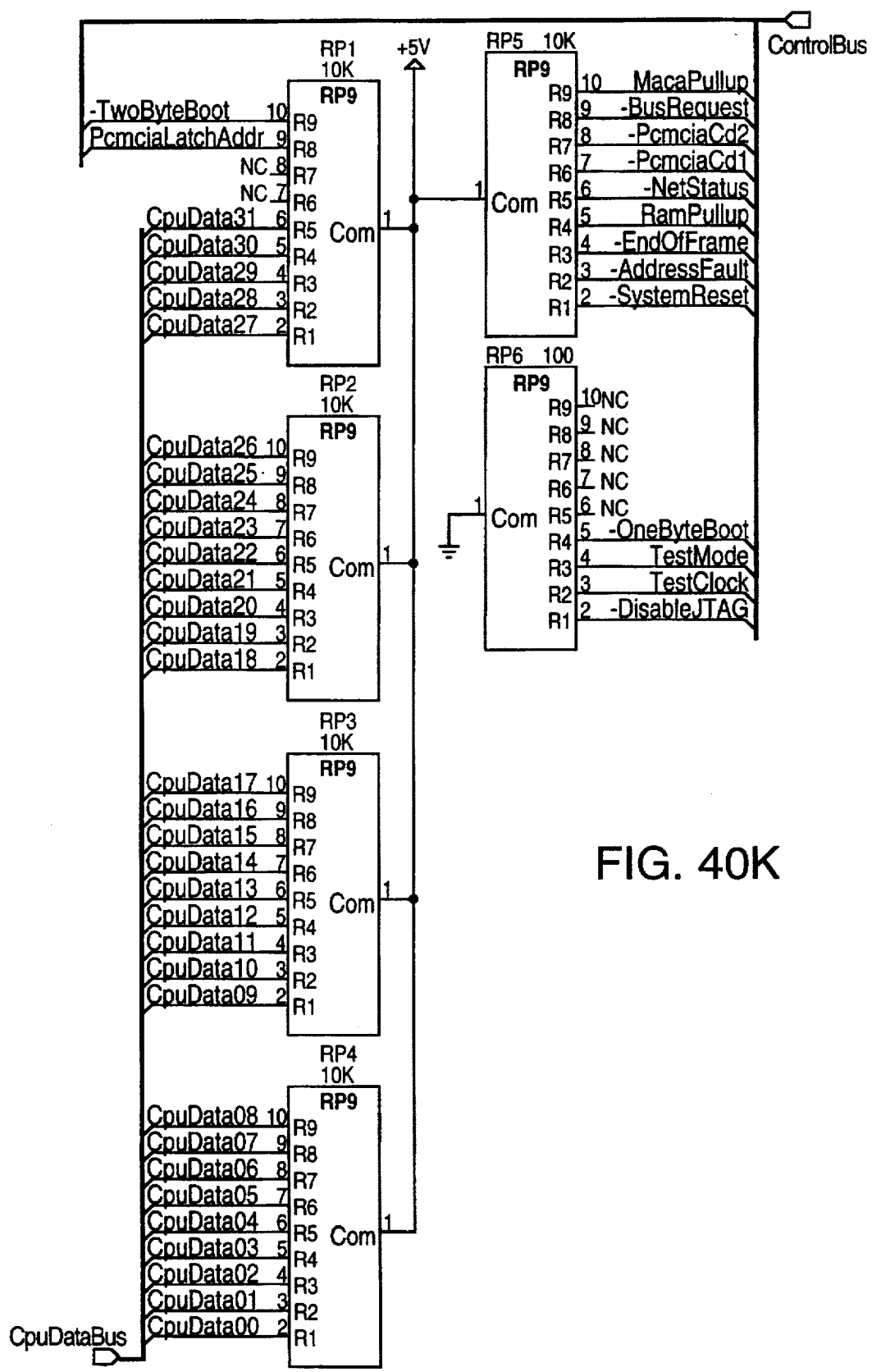
Figure 40L:
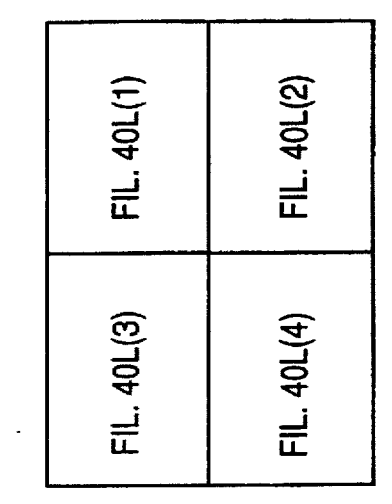
Figure 40M:
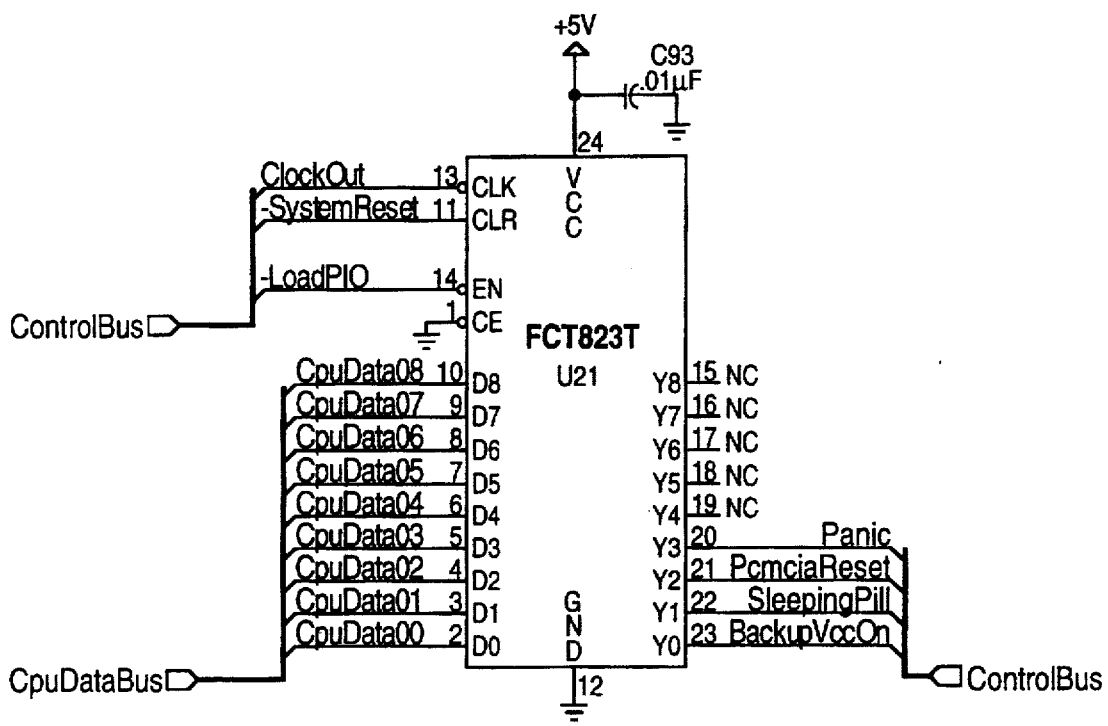
Figure 40M:
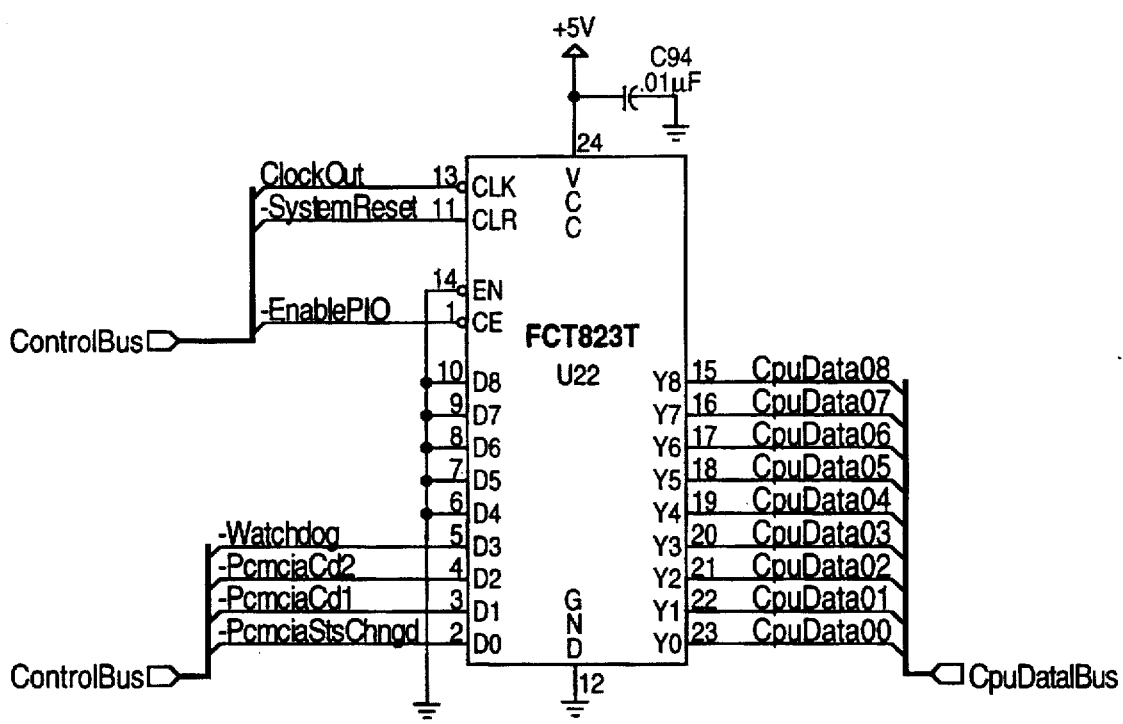
Figure 41:
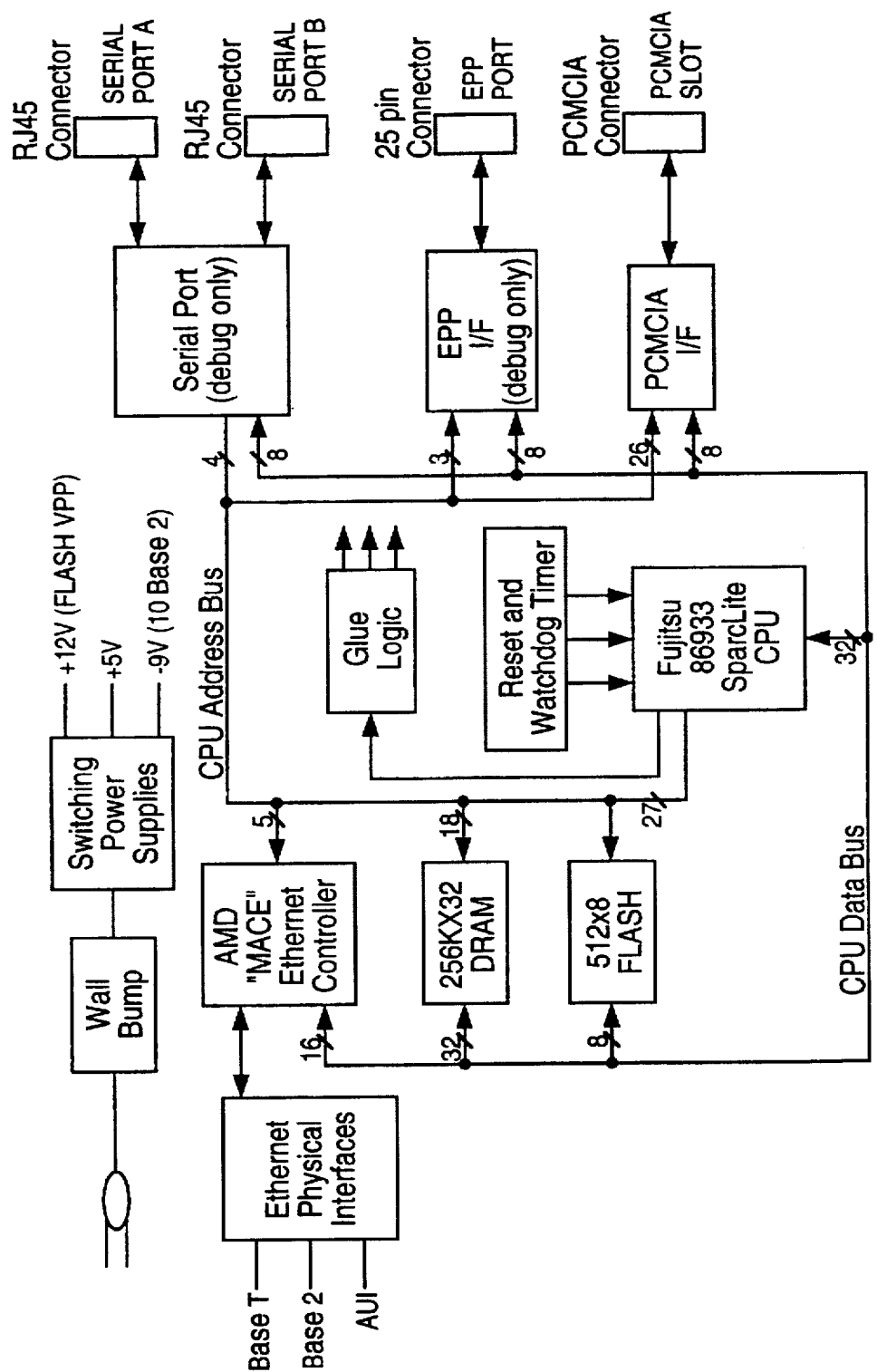
FIG. 41 is a block diagram of an embodiment of an access point unit in accordance with the present invention.

FIGS. 40A–M are a schematic of one embodiment of an access point unit in accordance with the present invention. Component U1 is a switching voltage regulator. Component U2 is a supervisory circuit which provides power on reset and watch dog timer functions. Component U3 is a 32-bit RISC SPARC processor made by Fujitsu. Component U4 is a programmable device containing "glue" logic, a burst mode DRAM controller, a bus controller, and an interrupt controller. The glue logic is realized as a Xilinx XC3120-5 component. Component U4 reads its configuration data from nonvolatile flash memory U11–U14. Components U6 and U7 comprise 256K of 32 bit wide DRAM. The DRAM are NEC 42S4260 256K×16 components. Component U5 is an address MUX for the DRAM components U6 and U7. Components U8 and U9 are static random access memories (SRAM). Component U10 is a buffer to reduce loading due to flash memories U11–U14. The flash memory is realized as AMD 28F020 256K×8 components. Component U15 is also a testability slot. Component U16 is a configuration memory in which various parameters related to roaming and other system functions are stored. This memory is maintained over power outages by a battery. Component U17 is a bus buffer. Component J12 is a PCMCIA connector. Component U16 is a buffer for the address bus whereas component U19 is a buffer for the data bus. Component U20 is an AMD 79C940 Ethernet UART chip which produces Ethernet packages from the contents of memory or converts Ethernet packages into information which is written into memory. The access point unit provides three types of connectors for coupling to a hardwired network connector. J13 is a 10 base T connector (such as a common telephone land-line jack), component J14 is a BNC connector, and component J15 is an AUI connector. Components LED1, LED2, LED3, and LED4 are LEDs to indicate Ethernet traffic, wireless traffic, 10 base T link integrity and access point unit integrity. The PCMCIA header J12 shown in FIG. 40H is a slot through which the access point unit controls a mobile unit. This PCMCIA header therefore allows the access point unit to use the radio circuit illustrated in FIG. 8. FIG. 41 is a block diagram of the access point unit schematic of FIG. 40A–M.

ACCESS POINT UNIT SOFTWARE

Figure 42:
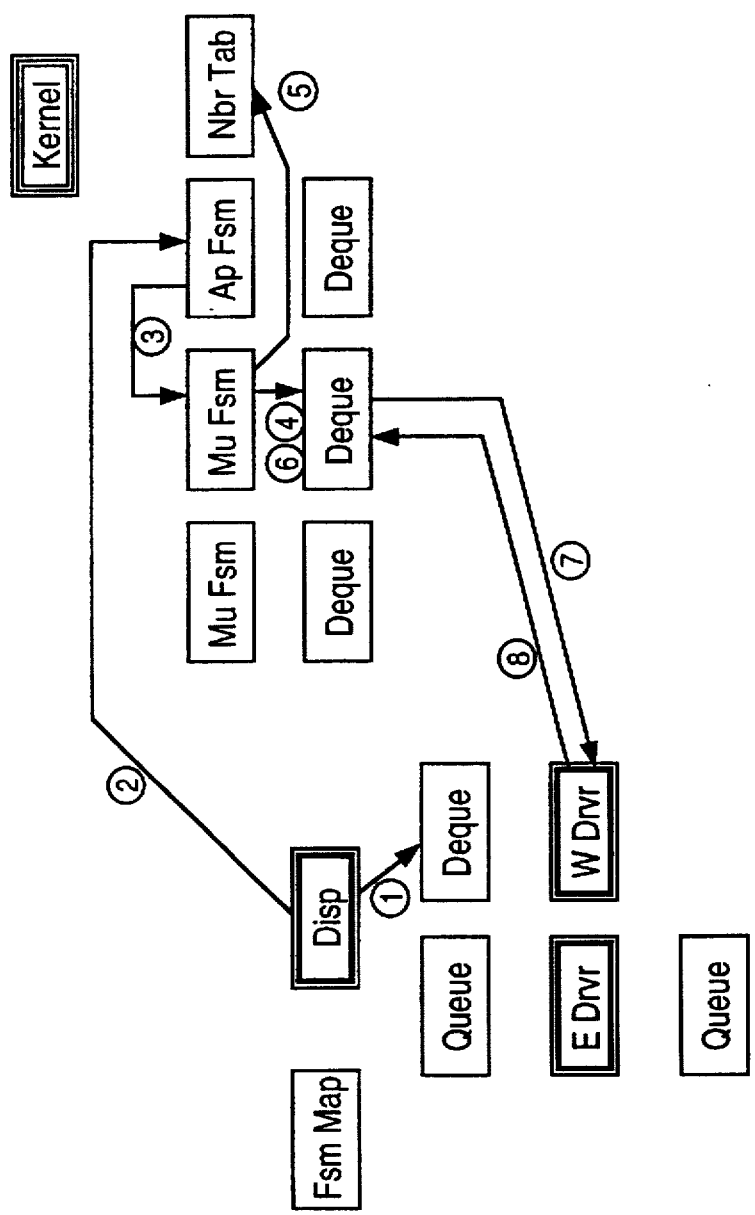
FIGS. 42, 43A–43B, and 44 are instance diagrams illustrating an operation of access point unit software during a registration of a mobile unit, a handling of a user message, and a discovery of a new access point unit by a mobile unit, respectively.

One embodiment of software executing in the access point unit of FIG. 40A–M is provided in microfiche Appendix C which is a part of the present disclosure. FIG. 42 is an instance diagram of an illustrative scenario of a mobile unit registering with an access point unit. The numbered function calls of the table below correspond with the circled numbers appearing in the instance diagram FIG. 42.

TABLE 6

| | Function Calls | |
|---|---|---|
| 1 | getMsg( ); | |
| 2 | processMsg( ); | |

TABLE 6-continued

| | Function Calls | |
|---|---|---|
| 3 | MuFsm::MuFsm( ); | /* constructor */ |
| 4 | Deque::Deque( ); | /* constructor */ |
| 5 | getNeighbors( ); | |
| 6 | insertMsg( ); | /* RegisterAck */ |
| 7 | restart( ); | |
| 8 | getMsg( ); | |

Figure 43A:
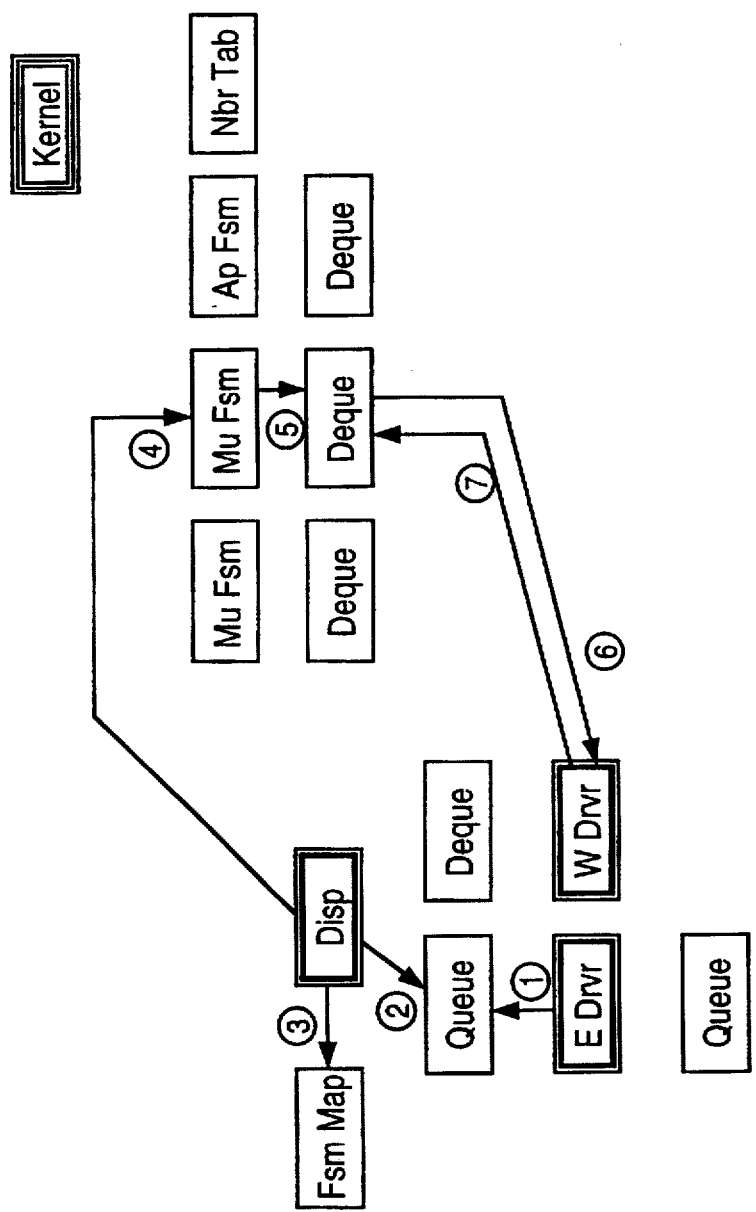
Figure 43B:
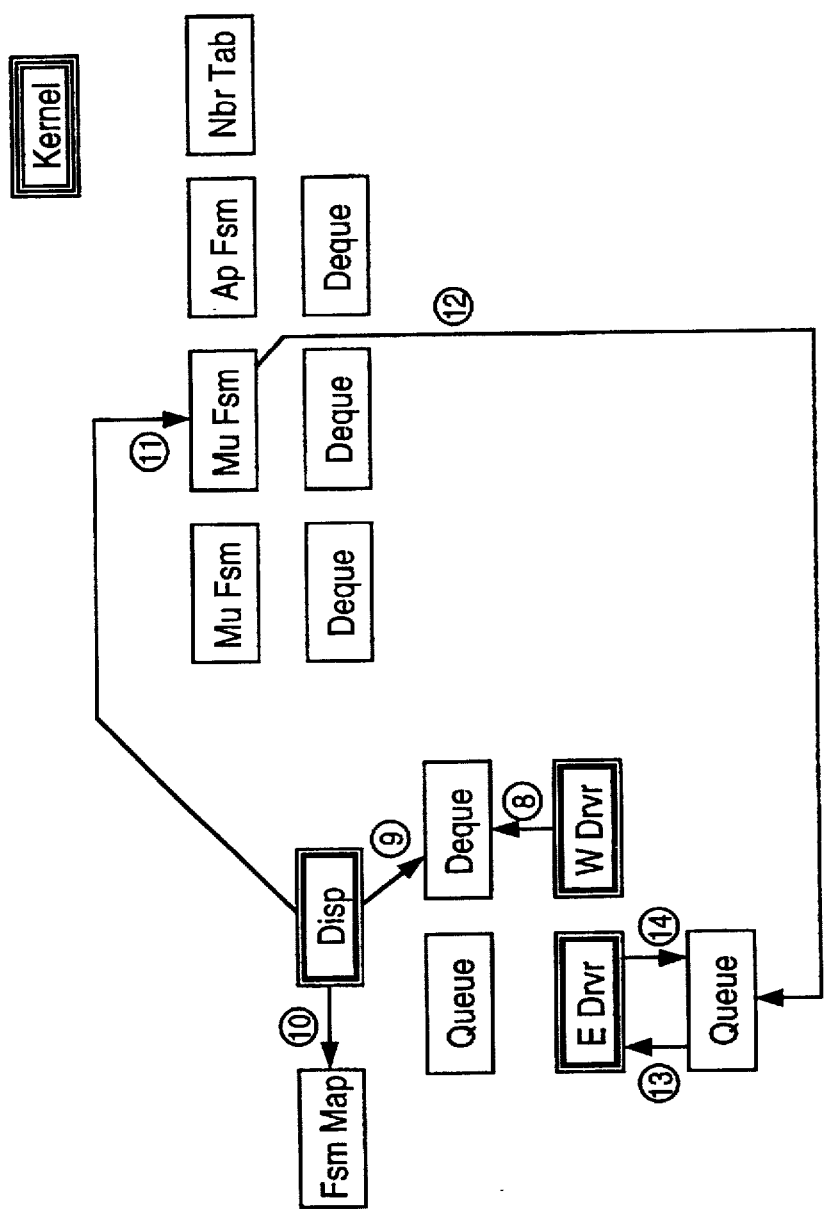

FIGS. 43A–B comprise an instance diagram of another illustrative scenario of an embodiment operation of the software executing in the access point unit of FIG. 40A–M. The function calls in the numbered lines of the table below correspond with the circled numbers appearing in the instance diagram of FIGS. 43A–B.

TABLE 7

| | Function Calls |
|---|---|
| 1 | insertMsg( ); |
| later . . . | |
| 2 | getMsg( ); |
| 3 | lookup( ); |
| 4 | processMsg( ); |
| 5 | insertMsg( ); |
| 6 | restart( ); |
| 7 | getMsg( ); |
| asynchronously . . . | |
| 8 | insertMsg later (the next dispatcher look at the queue . . . ( ); |
| 9 | getMsg( ); |
| 10 | lookup( ); |
| 11 | processMsg( ); |
| 12 | insertMsg( ); |
| 13 | restart( ); |
| 14 | getMsg( ); |

Figure 44:
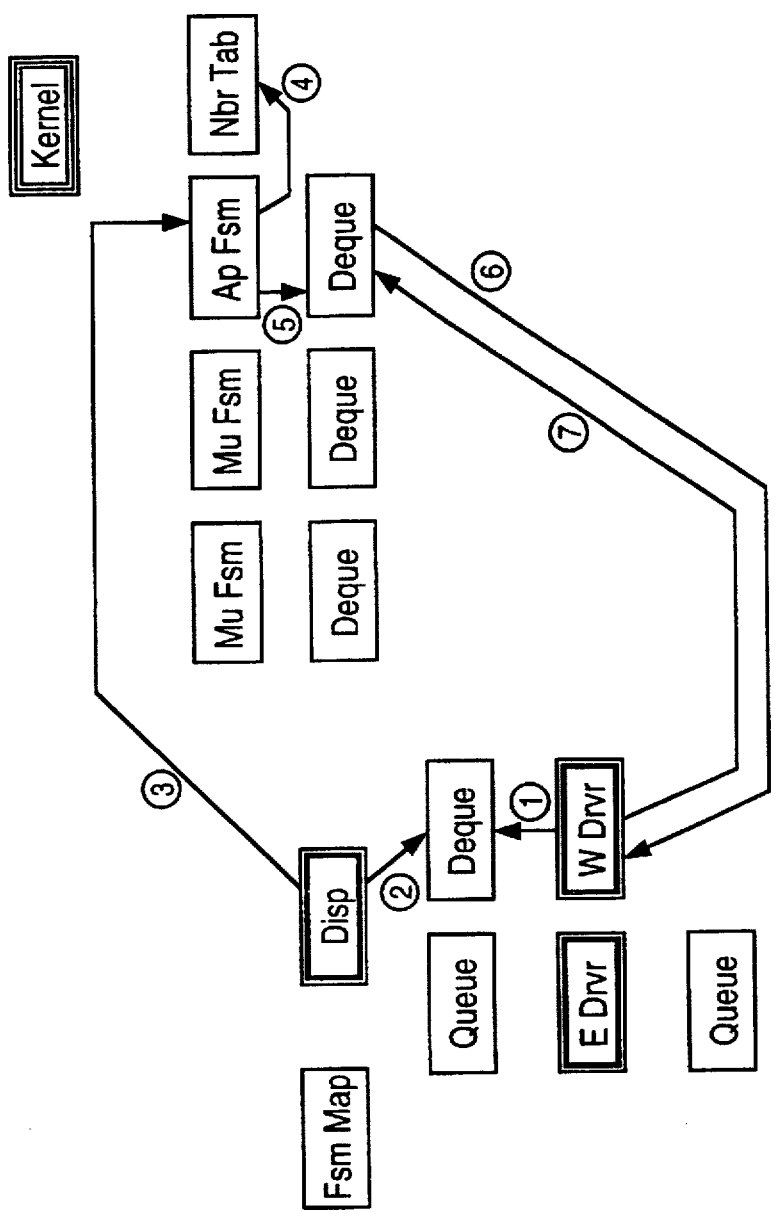

FIG. 44 is an instance diagram of yet another illustrative scenario of the operation of software executing in the access point unit of FIGS. 40A–M. The function calls in the numbered lines of the table below correspond with the circled numbers appearing in the instance diagram of FIG. 44.

TABLE 8

| | Function Calls | |
|---|---|---|
| 1 | getMsg( ); | |
| 2 | processMsg( ); | |
| 3 | MuFsm::MuFsm( ); | /* constructor */ |
| 4 | Deque::Deque( ); | /* constructor */ |
| 5 | getNeighbors( ); | |
| 6 | insertMsg( ); | /* RegisterAck */ |
| 7 | restart( ); | |
| 8 | getMsg( ); | |

Although the present invention has been described in connection with specific embodiments for purposes of illustrating the disclosed invention, the invention is not limited thereto. Various modifications, adaptations and substitutions of various features and elements disclosed may be practiced without departing from the scope of the invention as defined in the appended claims.

APPENDIX D

```
(*
------------------------------------------------------------ *)
(* scantbl.pas --- program to generate scaning table for      *)
(* wireless network adapter.                                  *)
(*
------------------------------------------------------------ *)
program scantbl;
uses crt;
const
     NUM_HOPS=82;
     NO_SCAN=0; SCAN=1; UNASSIGNED=2;
type stat_def = record
                min, max, avg   : integer;
           end;
var
     offset, n              :
integer;
     keep_going             :
boolean;
     right_stats, left_stats :
stat_def;
     scan_table, rights, lefts :
array[0 . . . 81] of integer;
(*
------------------------------------------------------------ *)
(* procedure to display the table                             *)
(*
------------------------------------------------------------ *)
procedure display_table(right_stats, left_stats : stat_def);
var
     n, x, y : integer;
begin
for n := 0 to (NUM_HOPS-1) do
     begin
     y := (n mod 21) + 2;
     x := (n div 21) * 16 + 1;
     gotoxy(x, y);
     if scan_table[n] = NO_SCAN then
          write('no scan')
     else if scan_table[n] = SCAN then
          write('scan       ')
     else if scan_table[n] = UNASSIGNED then
          write('------')
     end;
gotoxy(1, 24);
write('right: min=', right_stats.min);
write('    max=', right_stats.max);
write('    avg=', right_stats.avg);
gotoxy(40, 24);
write('left: min=', left_stats.min);
write('    max=', left_stats.max);
write('    avg=', left_stats.avg);
end;
(*
------------------------------------------------------------ *)
(* procedure to write the table to disk                       *)
(*
------------------------------------------------------------ *)
procedure write_table;
var
     filename           : text;
     low, high          : integer;
procedure write_a_line(start, finish : integer);
var
     n                    : integer;
begin
write (filename, '        db        ');
for n := start to finish-1 do
     if scan_table[n] = NO_SCAN then
          write(filename, '0, ')
     else if scan_table[n] = SCAN then
          write(filename, '1, ');
if scan_table[finish] = NO_SCAN then
     writeln(filename, '0')
else if scan_table[finish] = SCAN then
     writeln(filename, '1')
end;
begin
assign(filename, 'scantbl.inc');
rewrite(filename);
writeln(filename, 'scan_table   label    byte');
low  := ((NUM_HOPS div 4) * 0);
high := ((NUM_HOPS div 4) * 1) - 1;
write_a_line(low, high);
low  := ((NUM_HOPS div 4) * 1);
high := ((NUM_HOPS div 4) * 2) - 1;
write_a_line(low, high);
low  := ((NUM_HOPS div 4) * 2);
high := ((NUM_HOPS div 4) * 3) - 1;
write_a_line(low, high);
low  := ((NUM_HOPS div 4) * 3);
high := ((NUM_HOPS div 4) * 4) - 1;
write_a_line(low, high);
low  := ((NUM_HOPS div 4) * 4);
high := NUM_HOPS - 1;
write_a_line(low, high);
close(filename)
end;
(*
------------------------------------------------------------ *)
(* procedure to evenize the table                             *)
(*
------------------------------------------------------------ *)
procedure evenize_table(offset, right_min, left_min : integer);
var
     x, y : integer;
begin
for x := 0 to (NUM_HOPS-1) do
     begin
     if (x+offset) < NUM_HOPS then
          y := x+offset
     else
          y := x+offset-NUM_HOPS;
     if (scan_table[x]=SCAN) then
          if (rights[offset] <= right_min) and
    (scan_table[y]=UNASSIGNED) then
               begin
               scan_table[y] := NO_SCAN;
               rights[offset] := rights[offset] + 1
               end;
     if (scan_table[x]=NO_SCAN) then
          if (lefts[offset] <= left_min) and
    (scan_table[y]=UNASSIGNED) then
               begin
               scan_table[y] := SCAN;
               lefts[offset] := lefts[offset] + 1;
               end
     end
end;
(*
------------------------------------------------------------ *)
(* procedure to analyze the table                             *)
(*
------------------------------------------------------------ *)
procedure analyze_table;
var
     offset, x, y : integer;
begin
for offset := 1 to (NUM_HOPS-1) do
     begin
     rights[offset] := 0;
     lefts[offset] := 0;
     for x := 0 to (NUM_HOPS-1) do
          begin
          if (x+offset) < NUM_HOPS then
               y := x+offset
          else
               y := x+offset-NUM_HOPS;
          if (scan_table[x]=SCAN) and (scan_table[y]=NO_SCAN) then
               rights[offset] := rights[offset] + 1;
          if (scan_table[x]=NO_SCAN) and (scan_table[y]=SCAN) then
               lefts[offset] := lefts[offset] + 1;
          end
     end
end;
(*
------------------------------------------------------------ *)
(* procedure to get the right stats                           *)
```

APPENDIX D-continued

```
(* analyze table must be called before this function    *)
(*                                                      *)
(* ---------------------------------------------------- *)
procedure set_right_stats(var rs : stat_def);
var
    n : integer;
begin
rs.min := 1000;
rs.max := 0;
rs.avg := 0;
for n := 1 to (NUM_HOPS-1) do
    begin
    rs.avg := rs.avg + rights[n];
    if rights[n] < rs.min then
        rs.min := rights[n];
    if rights[n] > rs.max then
        rs.max := rights[n]
    end;
rs.avg := rs.avg div NUM_HOPS
end;
(*                                                      *)
(* ---------------------------------------------------- *)
(* procedure to get the minimum number of lefts         *)
(* analyze table must be called before this function    *)
(*                                                      *)
(* ---------------------------------------------------- *)
procedure set_left_stats(var ls : stat_def);
var
    n : integer;
begin
ls.min := 1000;
ls.max := 0;
ls.avg := 0;
for n := 1 to (NUM_HOPS-1) do
    begin
    ls.avg := ls.avg + lefts[n];
    if lefts[n] < ls.min then
        ls.min := lefts[n];
    if lefts[n] > ls.max then
        ls.max := lefts[n]
    end;
ls.avg := ls.avg div NUM_HOPS
end;
(*                                                      *)
(* ---------------------------------------------------- *)
(* main program body                                    *)
(*                                                      *)
(* ---------------------------------------------------- *)
begin
clrscr;
for n := 0 to (NUM_HOPS-1) do        (* initialize
    arrays                              *)
    begin
    rights[n] := 0;
    lefts[n] := 0;
    scan_table[n] := UNASSIGNED
    end;                                (*
we must pre assign at least          *)
scan_table[0] := SCAN;               (* one
element of this array               *)
repeat
    for n := 1 to (NUM_HOPS-1) do
        begin
        offset := NUM_HOPS - n;
        analyze_table;
        set_right_stats(right_stats);
        set_left_stats(left_stats);
        display_table(right_stats, left_stats);
        if (rights[offset] <= right_stats.min) or (lefts[offset]
        <= left_stats.min) then
            evenize_table(offset, right_stats.min,
left_stats.min);
        end;
    keep_going := FALSE;
    for n := 0 to (NUM_HOPS-1) do
        if scan_table[n] = UNASSIGNED then
            keep_going := true
until not keep_going;
analyze_table;
```

APPENDIX D-continued

```
set_right_stats(right_stats);
set_left_stats(left_stats);
display_table(right_stats, left_stats);
write_table;
end.
```

We claim:

1. A method of initializing a wireless area network, comprising the step of:

using a hop number of a current hop period of a first unit to determine whether said first unit scans or transmits during a portion of said current hop period, said current hop period being one of a sequence of hop periods, each of said hop periods of said sequence having a different hop number.

2. The method of claim 1, further comprising the step of:

scanning one frequency during said portion for an amount of time X, and transmitting at least once every amount of time X when in said current hop period but not in said portion of said current hop period.

3. The method of claim 1, further comprising the step of:

scanning multiple frequencies during said portion of said current hop period, each frequency being scanned for a time X.

4. The method of claim 1, further comprising the step of:

before said using step, scanning for a transmission sent by a unit connected by wire to the area network.

5. The method of claim 1, further comprising the step of:

after said using step, receiving a transmission having a field indicative of a sequence of hop periods used by a second unit and having a field indicative of an amount of time remaining in a current hop period of said second unit.

6. The method of claim 5, said current hop period of said second unit corresponding to a current hop number, further comprising the step of:

after said receiving step, determining whether to adopt said current hop number of said second unit or to retain said current hop number of said first unit by comparing said hop number of said current hop period of said first unit with said current hop number of said current hop period of said second unit.

7. The method of claim 6, wherein:

the hop number adopted or retained by said first unit is the hop number having the greatest hop number when the absolute value of said hop number of said current hop period of said second unit minus said hop number of said current hop period of said first unit is less than the total number of hops in said sequence of hops minus the absolute value of said hop number of the current hop period of said second unit minus said hop number of said current hop period of said first unit, wherein otherwise the hop number adopted or retained is the smallest hop number.

8. The method of claim 6, wherein:

the hop number adopted or retained by said first unit is the hop number having the smallest hop number when the absolute value of said hop number of said current hop period of said second unit minus said hop number of said current hop period of said first unit is less than the total number of hops in said sequence of hops minus the absolute value of said hop number of the current hop period of said second unit minus said hop number of said current hop period of said first unit, wherein otherwise the hop number adopted or retained is the greatest hop number.

9. A wireless mobile unit comprising a connector for coupling to a computer bus, a digital portion, and a radio transmitter/receiver circuit portion, said wireless mobile unit not being in communication with any local area network, a plurality of hop periods comprising a sequence of hop periods, said wireless mobile unit scanning during portions of selected ones of said sequence of hop periods and transmitting during others of said sequence of hop periods, said wireless mobile unit periodically transmitting during each of said plurality of hop periods of said sequence when said wireless mobile unit is not scanning.

10. The wireless mobile unit of claim 9, wherein said digital portion comprises means for determining whether to scan or transmit during each hop period of said sequence of hop periods.

11. The wireless mobile unit of claim 10, wherein said digital portion comprises means for determining whether or not to adopt a hop number of another wireless mobile unit.

12. The wireless mobile unit of claim 11, wherein said digital portion comprises means for determining whether or not to synchronize in time to a hop tick of another wireless mobile unit.

13. A method of initializing a wireless area network having a plurality of units, comprising the steps of:
using a hop number of a current hop period of a first unit to determine whether or not said first unit scans during a portion of said current hop period, said current hop period being one of a sequence of hop periods, each of said hop periods of said sequence having a different hop number;
receiving a transmission having a field indicative of a sequence of hop periods used by a second unit and having a field indicative of an amount of time remaining in a current hop period of said second unit; and
determining whether to adopt said current hop number of said second unit or to retain said current hop number of said first unit, wherein the hop number adopted or retained by said first unit is the hop number having the greatest hop number when the absolute value of said hop number of said current hop period of said second unit minus said hop number of said current hop period of said first unit is less than the total number of hops in said sequence of hops minus the absolute value of said hop number of the current hop period of said second unit minus said hop number of said current hop period of said first unit, wherein otherwise the hop number adopted or retained is the smallest hop number.

14. A method of initializing a wireless area network having a plurality of units, comprising the steps of:
using a hop number of a current hop period of a first unit to determine whether or not said first unit scans during a portion of said current hop period, said current hop period being one of a sequence of hop periods, each of said hop periods of said sequence having a different hop number;
receiving a transmission having a field indicative of a sequence of hop periods used by a second unit and having a field indicative of an amount of time remaining in a current hop period of said second unit; and
determining whether to adopt said current hop number of said second unit or to retain said current hop number of said first unit, wherein the hop number adopted or retained by said first unit is the hop number having the smallest hop number when the absolute value of said hop number of said current hop period of said second unit minus said hop number of said current hop period of said first unit is less than the total number of hops in said sequence of hops minus the absolute value of said hop number of the current hop period of said second unit minus said hop number of said current hop period of said first unit, wherein otherwise the hop number adopted or retained is the greatest hop number.

15. A mobile unit for a wireless area network, comprising:
a connector for coupling to a computer bus;
a logic portion coupled to the connector; and
a radio transmitter/receiver coupled to the logic portion;
wherein the logic portion defines a sequence of hop periods, and when said mobile unit is not in communication with the wireless area network, the radio transmitter/receiver scans during portions of selected hop periods and transmits during other portions of said hop periods when it is not scanning.

* * * * *